(12) United States Patent
Helou, Jr.

(10) Patent No.: US 12,296,739 B2
(45) Date of Patent: May 13, 2025

(54) MODULAR CONTAINER TRANSPORT SYSTEMS

(71) Applicant: Biosphere Aerospace, LLC, Carpinteria, CA (US)

(72) Inventor: Elie Helou, Jr., Santa Barbara, CA (US)

(73) Assignee: Biosphere Aerospace, LLC, Carpinteria, CA (US)

( * ) Notice: Subject to any disclaimer, the term of this patent is extended or adjusted under 35 U.S.C. 154(b) by 295 days.

(21) Appl. No.: 17/521,721

(22) Filed: Nov. 8, 2021

(65) Prior Publication Data

US 2022/0203880 A1    Jun. 30, 2022

Related U.S. Application Data

(63) Continuation of application No. 15/877,309, filed on Jan. 22, 2018, now Pat. No. 11,167,682, which is a
(Continued)

(51) Int. Cl.
*B65D 88/12* (2006.01)
*B60K 7/00* (2006.01)
(Continued)

(52) U.S. Cl.
CPC .............. *B60P 3/42* (2013.01); *B60K 7/0007* (2013.01); *B60P 3/11* (2013.01); *B62D 61/12* (2013.01); *B64C 1/22* (2013.01); *B64D 7/08* (2013.01); *B64D 9/003* (2013.01); *B65D 88/005* (2013.01); *B65D 88/022* (2013.01); *B65D 88/12* (2013.01);
(Continued)

(58) Field of Classification Search
CPC ......... B60F 1/046; B62D 61/12; B62D 53/67; B62D 9/00; B62D 9/02; B62D 9/04; B60K 2007/0038; B60K 7/0007; B60P 1/6418

See application file for complete search history.

(56) References Cited

U.S. PATENT DOCUMENTS 2,387,527 A   10/1945   Nagamatsu
2,407,774 A    9/1946   Fowler
(Continued)

FOREIGN PATENT DOCUMENTS

CN   101092205   12/2007
CN   101234695    8/2008
(Continued)

*Primary Examiner* — Emma K Frick
(74) *Attorney, Agent, or Firm* — Sheppard, Mullin, Richter & Hampton LLP

(57) ABSTRACT

Disclosed are apparatus, systems, and methods, including a ground transport drive container comprising an outer container having a cuboid shape and comprising a plurality of fittings for securing the outer container to another apparatus; and a drive wheel assembly. The drive wheel assembly comprises one or more wheels and a deployment mechanism secured to the one or more wheels. An actuating member actuates the drive wheel assembly between a stowed configuration and one or more deployed configurations. In the stowed configuration, the drive wheel assembly is housed entirely within the outer container. In the one or more deployed configurations, the drive wheel assembly extends from the outer container.

7 Claims, 125 Drawing Sheets

Related U.S. Application Data continuation-in-part of application No. 15/867,557, filed on Jan. 10, 2018, now Pat. No. 10,967,973.

(60) Provisional application No. 62/452,139, filed on Jan. 30, 2017, provisional application No. 62/449,434, filed on Jan. 23, 2017, provisional application No. 62/445,193, filed on Jan. 11, 2017.

(51) Int. Cl.
| | |
|---|---|
| B60P 3/11 | (2006.01) |
| B60P 3/42 | (2006.01) |
| B62D 61/12 | (2006.01) |
| B64C 1/22 | (2006.01) |
| B64D 7/08 | (2006.01) |
| B64D 9/00 | (2006.01) |
| B65D 88/00 | (2006.01) |
| B65D 88/02 | (2006.01) |
| B65D 88/14 | (2006.01) |
| B65D 90/00 | (2006.01) |
| B65D 90/02 | (2019.01) |
| B65D 90/18 | (2006.01) |

(52) U.S. Cl.
CPC ......... *B65D 88/14* (2013.01); *B65D 90/0006* (2013.01); *B65D 90/0026* (2013.01); *B65D 90/023* (2013.01); *B65D 90/18* (2013.01); *B60K 2007/0038* (2013.01); *B64C 2211/00* (2013.01); *B65D 90/0013* (2013.01)

(56) References Cited

U.S. PATENT DOCUMENTS

| | | | |
|---|---|---|---|
| 2,776,146 A | 1/1957 | Marino | |
| 2,876,969 A | 3/1959 | Walter | |
| 2,967,061 A | 1/1961 | Schwab | |
| 3,028,130 A | 4/1962 | Burton | |
| 3,132,883 A | 5/1964 | Tantlinger et al. | |
| 3,174,634 A | 3/1965 | Peck | |
| 3,243,193 A | 3/1966 | Fulmer | |
| 3,253,668 A * | 5/1966 | Tantlinger | B60P 3/40 |
| | | | 414/458 |
| 3,280,931 A | 10/1966 | Cahill | |
| 3,378,276 A | 4/1968 | Fulmer | |
| 3,381,921 A | 5/1968 | Mcdonough | |
| 3,392,857 A | 7/1968 | Tantlinger | |
| 3,521,898 A * | 7/1970 | Fulmer | B60P 3/40 |
| | | | 280/43.23 |
| 3,631,999 A | 1/1972 | Walerowski | |
| 3,788,683 A | 1/1974 | Rumell | |
| 3,795,336 A | 3/1974 | Acker | |
| 3,826,322 A | 7/1974 | Williams | |
| 3,834,111 A | 9/1974 | Acker | |
| 3,869,168 A | 3/1975 | Matheson | |
| 4,231,709 A * | 11/1980 | Corsetti | B60P 1/6445 |
| | | | 280/43.23 |
| 4,362,458 A | 12/1982 | Jantzi | |
| 4,431,368 A | 2/1984 | Katz et al. | |
| 4,452,555 A | 6/1984 | Calabro | |
| 4,527,486 A | 7/1985 | Baird et al. | |
| 4,570,733 A | 2/1986 | Star | |
| 4,712,966 A | 12/1987 | Gross | |
| 4,863,334 A | 9/1989 | Girerd | |
| 4,936,733 A | 6/1990 | Girerd | |
| 4,993,125 A | 2/1991 | Capron et al. | |
| 5,006,031 A | 4/1991 | Fossing | |
| 5,050,897 A | 9/1991 | Stromberg | |
| 5,324,160 A | 6/1994 | Smith | |
| 5,380,029 A | 1/1995 | Portilla | |
| 5,618,151 A | 4/1997 | Rosenkranz | |
| 5,800,114 A | 9/1998 | Secondi | |
| 5,893,692 A | 4/1999 | Asanuma | |
| 6,138,783 A | 10/2000 | Chene | |
| 6,210,088 B1 | 4/2001 | Crosby | |
| 6,237,795 B1 | 5/2001 | Buckley | |
| 6,308,131 B1 | 10/2001 | Fox | |
| 6,363,586 B1 | 4/2002 | Neufingerl | |
| 6,390,742 B1 | 5/2002 | Breeden | |
| 6,439,131 B1 | 8/2002 | Higgins | |
| 6,450,522 B1 | 9/2002 | Yamada | |
| 6,494,404 B1 | 12/2002 | Meyer | |
| 6,537,015 B2 | 3/2003 | Lim | |
| 6,557,800 B2 | 5/2003 | Medina | |
| D480,857 S | 10/2003 | Wareham | |
| 6,634,658 B2 | 10/2003 | Larouche | |
| 6,749,388 B1 | 6/2004 | Schmidt | |
| 6,817,579 B2 | 11/2004 | Van Der Velden | |
| 6,884,018 B1 | 4/2005 | Dugan | |
| 6,945,832 B2 | 9/2005 | Roycroft | |
| 7,093,798 B2 | 8/2006 | Whelan | |
| D535,454 S | 1/2007 | Wareham | |
| 7,216,911 B2 * | 5/2007 | Andre | B62D 33/08 |
| | | | 280/638 |
| 7,320,289 B1 | 1/2008 | Clarke | |
| 7,344,109 B1 | 3/2008 | Rezai | |
| 7,997,623 B2 | 8/2011 | Williams | |
| 8,118,523 B2 | 2/2012 | Pedersen | |
| 8,118,532 B2 | 2/2012 | Phillips | |
| 8,240,495 B2 | 8/2012 | Ronci | |
| 8,282,110 B2 | 10/2012 | Schubert | |
| 8,646,753 B2 | 2/2014 | Ross | |
| 8,794,190 B1 | 8/2014 | Evers et al. | |
| 8,954,237 B2 * | 2/2015 | Gaussin | B62D 61/00 |
| | | | 280/412 |
| 9,126,644 B2 | 9/2015 | Banwart | |
| 9,205,910 B1 | 12/2015 | Campbell | |
| 9,242,523 B2 | 1/2016 | Teppig, Jr. | |
| 9,266,670 B2 * | 2/2016 | Fjetland | B65D 90/0033 |
| 9,511,702 B2 | 12/2016 | Ross | |
| 9,586,513 B2 | 3/2017 | Ellis et al. | |
| 9,914,467 B2 | 3/2018 | Nyce | |
| 10,023,252 B1 | 7/2018 | Bjone | |
| 10,207,552 B2 | 2/2019 | Brummel | |
| 10,351,344 B2 | 7/2019 | Gebhardt | |
| 11,338,864 B2 * | 5/2022 | Carlden | B62D 27/023 |
| 11,597,453 B2 * | 3/2023 | Borntrager | B60P 3/40 |
| 11,807,323 B2 * | 11/2023 | Claesson | B62D 65/04 |
| 11,827,136 B1 * | 11/2023 | Conway | B65D 90/0086 |
| 2003/0010550 A1 | 1/2003 | Prucher | |
| 2003/0175089 A1 | 9/2003 | Almind | |
| 2003/0190221 A1 | 10/2003 | Whitley | |
| 2003/0214143 A1 | 11/2003 | Walker | |
| 2004/0028495 A1 | 2/2004 | Tomkins et al. | |
| 2004/0135031 A1 | 7/2004 | Stupakis | |
| 2004/0245378 A1 | 12/2004 | Nonami | |
| 2005/0247824 A1 | 11/2005 | Allison | |
| 2006/0022090 A1 | 2/2006 | Mccoskey | |
| 2006/0038077 A1 | 2/2006 | Olin | |
| 2006/0108477 A1 | 5/2006 | Helou | |
| 2007/0025832 A1 | 2/2007 | Rawdon | |
| 2007/0276619 A1 | 11/2007 | Sugahara et al. | |
| 2008/0054580 A1 | 3/2008 | Glaser | |
| 2010/0116932 A1 | 5/2010 | Helou, Jr. | |
| 2010/0192998 A1 | 8/2010 | Villers et al. | |
| 2010/0276538 A1 | 11/2010 | Helou, Jr. | |
| 2010/0308180 A1 | 12/2010 | Hielou | |
| 2011/0017630 A1 | 1/2011 | Lee | |
| 2011/0155614 A1 | 6/2011 | Szeglin et al. | |
| 2012/0098243 A1 | 4/2012 | Diaz | |
| 2012/0298935 A1 | 11/2012 | Ross | |
| 2013/0156532 A1 | 6/2013 | Hemphill | |
| 2013/0341124 A1 | 12/2013 | Robinson | |
| 2014/0125501 A1 | 5/2014 | Baade | |
| 2014/0217230 A1 | 8/2014 | Helou | |
| 2014/0305769 A1 | 10/2014 | Eiden, III et al. | |
| 2015/0370258 A1 | 12/2015 | Fleureau | |
| 2016/0023614 A1 | 1/2016 | Leanna | |
| 2016/0275440 A1 | 9/2016 | Vladimirov | |
| 2017/0011339 A1 | 1/2017 | Buford | |
| 2017/0066490 A1 | 3/2017 | Fauroux | |
| 2018/0033244 A1 | 2/2018 | Northrup | |
| 2018/0049015 A1 | 2/2018 | Gupta | |

(56) References Cited

U.S. PATENT DOCUMENTS

| | | | |
|---|---|---|---|
| 2018/0118542 | A1 | 5/2018 | Shelagowski |
| 2019/0135435 | A1 | 5/2019 | Dubrulle |
| 2019/0173911 | A1 | 6/2019 | Jamsandekar |
| 2019/0197241 | A1 | 6/2019 | Martinez |
| 2019/0235489 | A1 | 8/2019 | Cantrell |
| 2019/0236246 | A1 | 8/2019 | Kim |
| 2019/0311635 | A1 | 10/2019 | Kreiner |
| 2019/0340876 | A1 | 11/2019 | Northrup |
| 2020/0005652 | A1 | 1/2020 | Priest |
| 2020/0051439 | A1 | 2/2020 | Priest |
| 2020/0051445 | A1 | 2/2020 | Priest |
| 2020/0160734 | A1 | 5/2020 | Priest |
| 2021/0129972 | A1 | 5/2021 | Sankrithi et al. |
| 2021/0188533 | A1 | 6/2021 | Grip |

FOREIGN PATENT DOCUMENTS

| | | | | |
|---|---|---|---|---|
| CN | 101559862 | | 10/2009 | |
| CN | 103552733 | | 2/2014 | |
| CN | 105143086 | A | 12/2015 | |
| DE | 102009032325 | A1 | 1/2011 | |
| EP | 1199259 | | 4/2002 | |
| EP | 2275361 | | 1/2011 | |
| EP | 3072739 | A1 * | 9/2016 | ............ B60F 3/0007 |
| WO | 2014167489 | A1 | 10/2014 | |

* cited by examiner

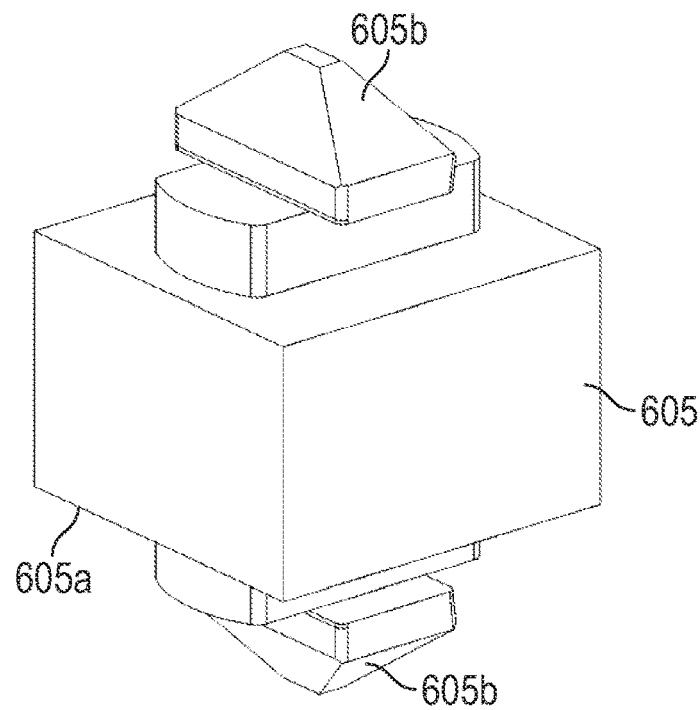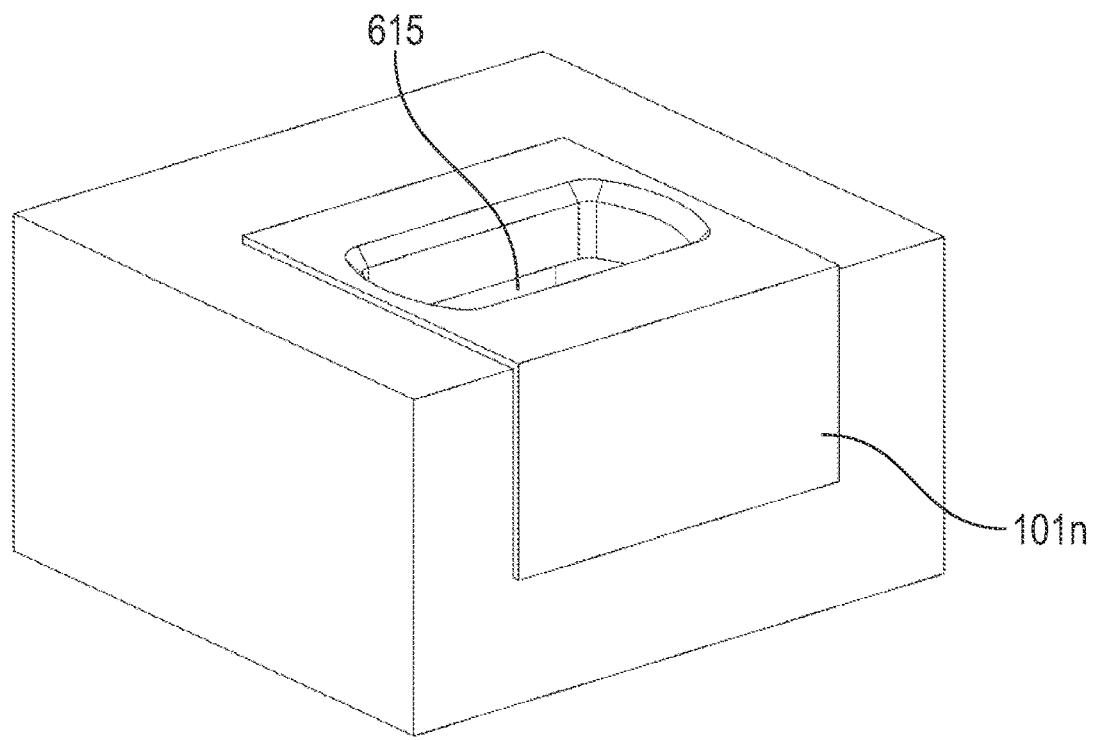
FIG. 6

| IMPERIAL UNITS | ISO 6343 External Dimensions | | | Dorsal External Dimensions | | |
|---|---|---|---|---|---|---|
| Container | Width | Length | Height | Width | Length | Height |
| 5' | N/A | N/A | N/A | 8' | 4'9.375" | 8'6" |
| 5' High Cube | N/A | N/A | N/A | 8' | 4'9.375" | 9'6" |
| 10' | 8' | 9'9.75" | 8'6" | 8' | 9'9.75" | 8'6" |
| 10' High Cube | N/A | N/A | N/A | 8' | 9'9.75" | 9'6" |
| 20' | 8' | 19'10.5" | 8'6" | 8' | 19'10.5" | 8'6" |
| 20' High Cube | 8' | 19'10.5" | 9'6" | 8' | 19'10.5" | 9'6" |
| 40' | 8' | 40' | 8'6" | 8' | 40' | 8'6" |
| 40' High Cube | 8' | 40' | 9'6" | 8' | 40' | 9'6" |
| 50' | N/A | N/A | N/A | 8' | 50'0.75" | 8'6" |
| 50' High Cube | N/A | N/A | N/A | 8' | 50'0.75" | 9'6" |

FIG. 7

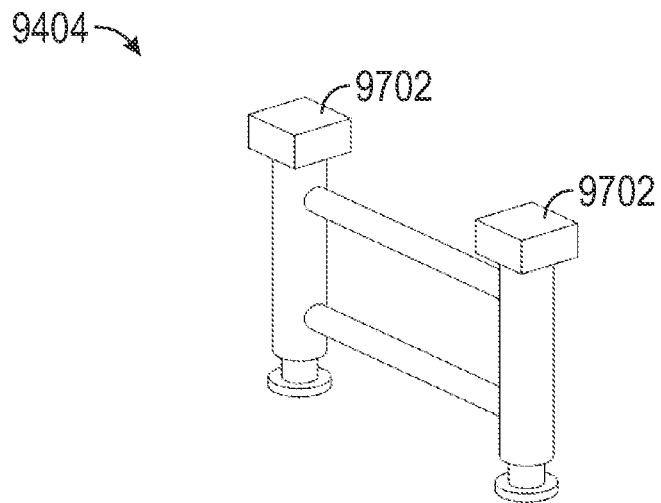
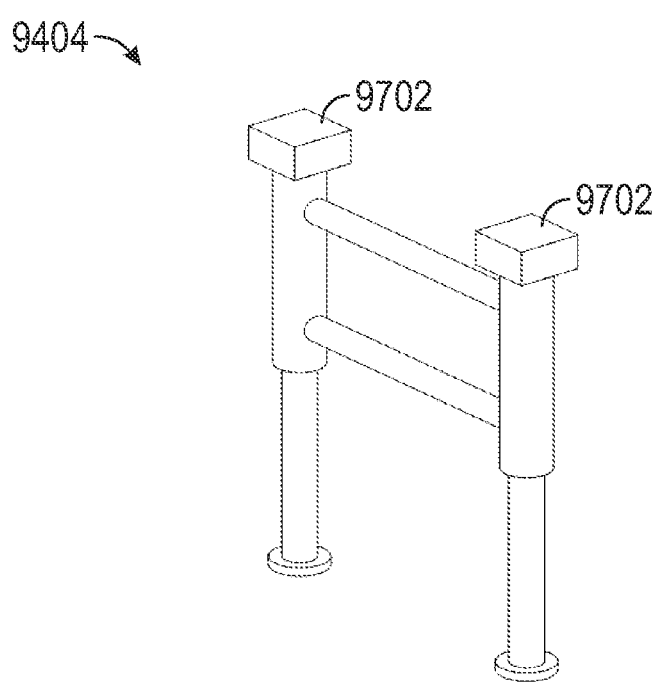
FIG. 97

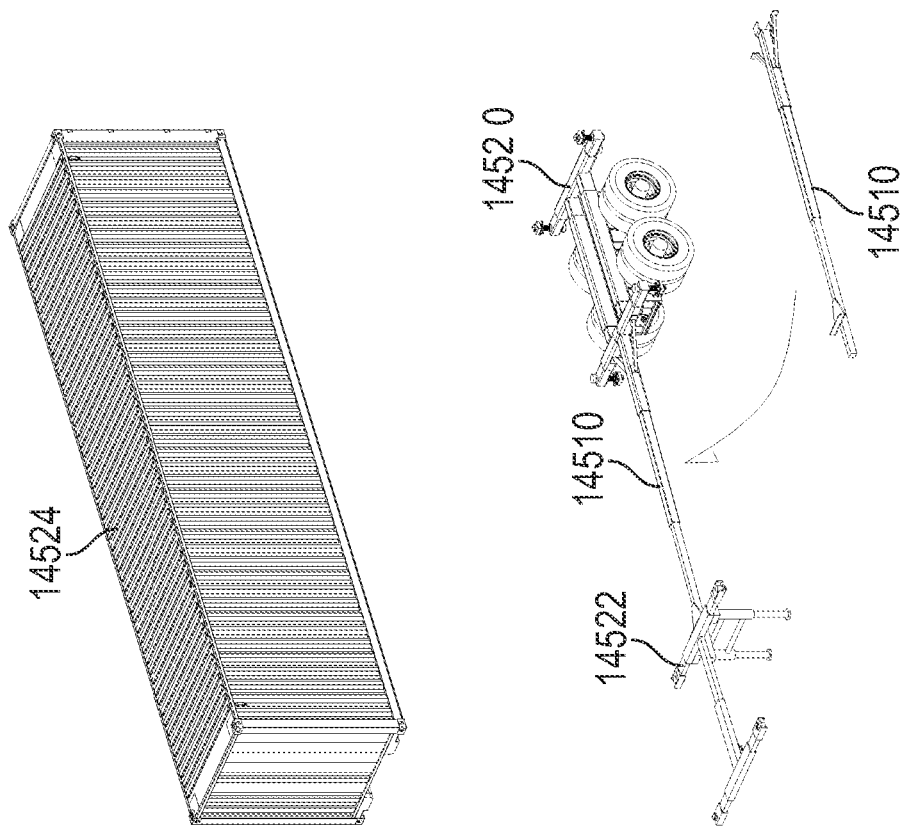
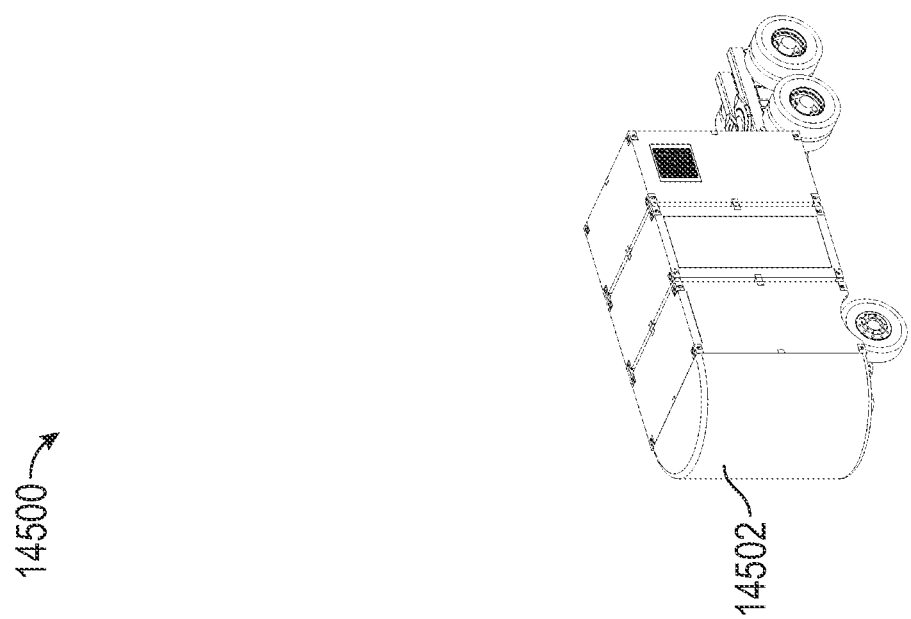
FIG. 114

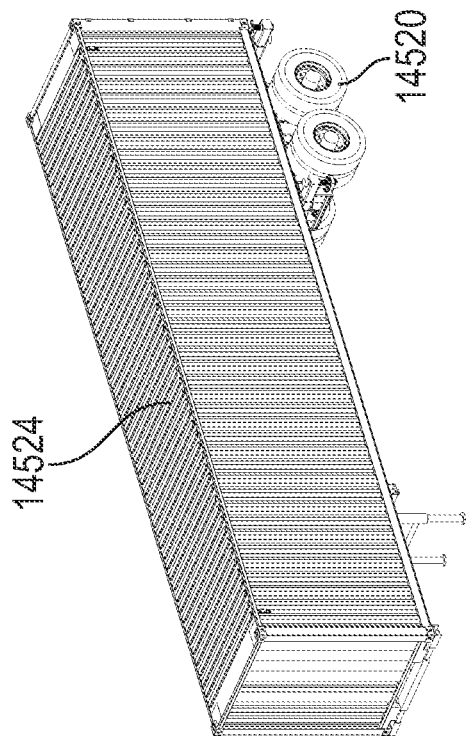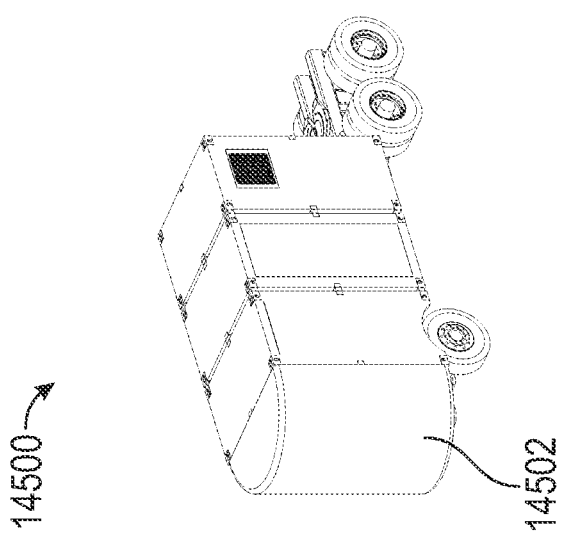
FIG. 115

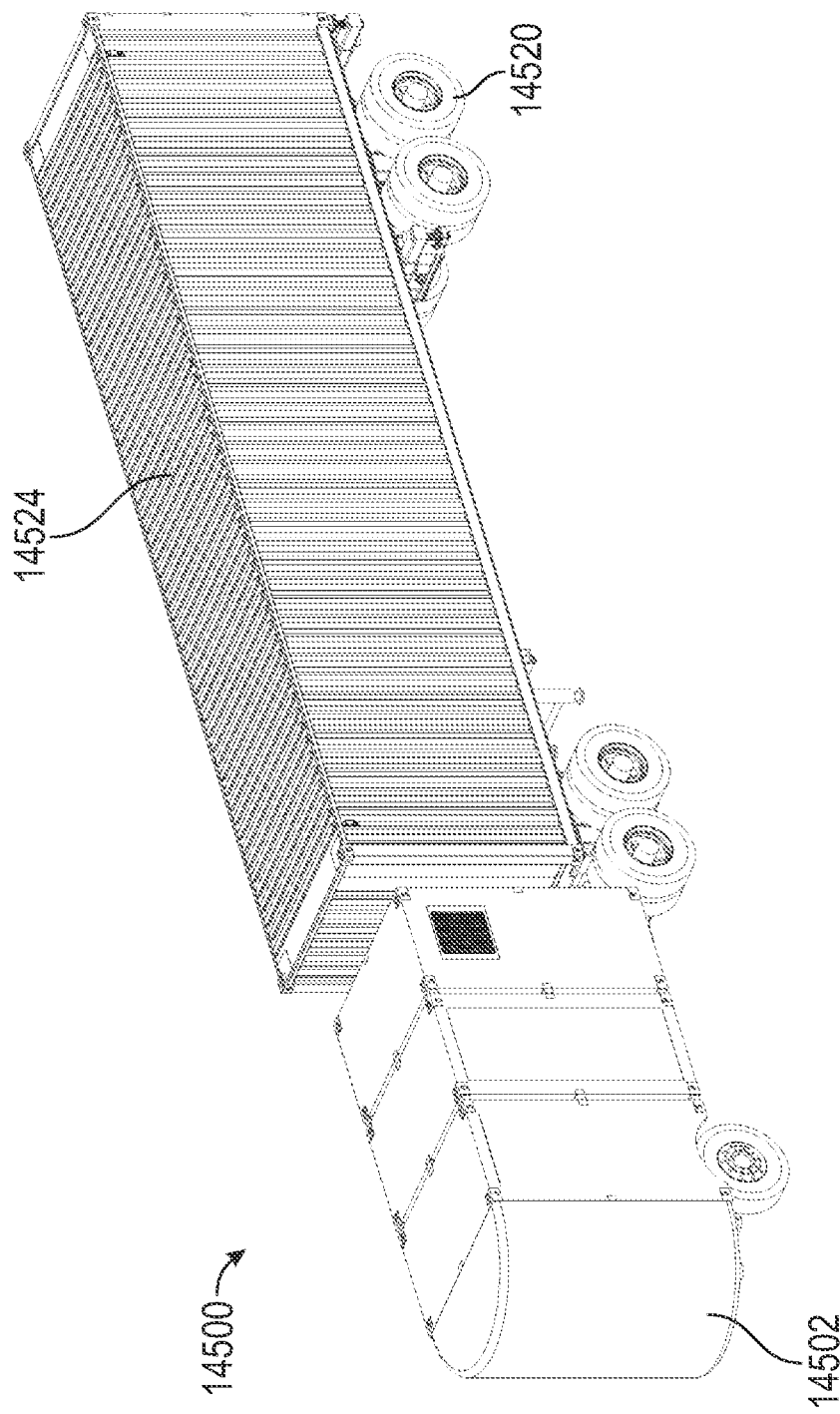

MODULAR CONTAINER TRANSPORT SYSTEMS

CROSS-REFERENCE TO RELATED APPLICATIONS

This application is a continuation of U.S. application Ser. No. 15/877,309, filed Jan. 22, 2018, which is a continuation-in-part of U.S. application Ser. No. 15/867,557, filed Jan. 10, 2018, and entitled "MODULAR CARGO TRANSPORT SYSTEMS," which claims priority to U.S. Provisional Application No. 62/445,193, filed Jan. 11, 2017, and entitled "MODULAR CARGO SYSTEMS AND METHODS," each of which are incorporated by reference herein in their entireties as if fully set forth herein. U.S. application Ser. No. 15/877,309, filed Jan. 22, 2018, also claims priority to U.S. Provisional Patent Application No. 62/449,434, filed Jan. 23, 2017 and entitled "MODULAR CARGO SYSTEMS AND METHODS INCLUDING MODULAR GROUND CARGO SYSTEMS AND METHODS," and U.S. Provisional Patent Application No. 62/452,139, filed Jan. 30, 2017 and entitled "MODULAR CARGO SYSTEMS AND METHODS INCLUDING SEMI-TRAILER SYSTEMS," each of which are incorporated by reference herein in their entireties as if fully set forth herein.

FIELD OF THE INVENTION

The present technology relates to the field of cargo transport systems. More particularly, the present technology relates to systems, apparatus, and methods for transporting modular containers, including intermodal containers.

BACKGROUND

The basic unit for transporting goods has been the truck. Being the basic unit, the truck has defined limitations on intermodal containers that may typically be transported by, for example, ships, trains, and trucks. Much of commerce today for which intermodal containers are most convenient are high volume, low weight products. Thus, volume, instead of weight, typically creates the limiting factor in the design of intermodal containers.

The aforementioned intermodal containers have greatly facilitated and lowered the cost of cargo transportation. However, air cargo, such as airplane and helicopter cargo, has generally been excluded from participation in intermodal cargo systems. Aircraft of a size capable of carrying substantial cargo have typically been designed first as passenger aircraft. Cylindrical fuselages and lack of large access ports thereto in such passenger aircraft limit the use of such aircraft for truly intermodal cargo systems. In addition, the weight of intermodal cargo systems often reduce the payload an aircraft is able to carry. In such conventional systems, the aircraft becomes the basic unit with odd shaped and smaller sized containers. As a result, even with containerized cargo, a truck must often be loaded with multiple individual containers for efficient distribution of air cargo. Military transports are also not particularly compatible with conventional intermodal cargo systems, as they are designed for oversized cargo such as rolling equipment (e.g., tanks and trucks), and palletized, irregularly shaped cargo. Most aircraft specifically designed for the military are often mission-directed and overall efficiency for competitive cargo transportation is not a first priority.

The inability of aircraft to practically participate in intermodal container cargo systems has been disadvantageous to international commerce. Business principals such as just-in-time supply and changing business environments including rapid global internet communication have created a demand for much more rapid international shipping than can be provided by conventional ships or ground transport. However, air cargo systems remain both expensive and inconvenient to intermodal shipping. Furthermore, even with respect to ground and water transport, size restrictions and other restrictions imposed by conventional intermodal cargo systems severely limit the ability of conventional intermodal cargo systems to maximize the efficiency and interchangeability that could be offered by such systems.

SUMMARY

The present disclosure may be embodied in a ground transport drive container comprising an outer container having a cuboid shape and comprising a plurality of fittings for securing the outer container to another apparatus; and a drive wheel assembly. The drive wheel assembly comprises one or more wheels and a deployment mechanism secured to the one or more wheels. An actuating member actuates the drive wheel assembly between a stowed configuration and one or more deployed configurations. In the stowed configuration, the drive wheel assembly is housed entirely within the outer container. In the one or more deployed configurations, the drive wheel assembly extends from the outer container.

In an embodiment, the drive wheel assembly further comprises a propulsion system for powering the one or more wheels.

In an embodiment, the propulsion system comprises one or more in-wheel electric motors.

In an embodiment, the ground transport drive container comprises an energy system for providing power to the one or more in-wheel electric motors.

In an embodiment, the ground transport drive container is convertible between a system stowed configuration, a partially deployed configuration, and a fully deployed configuration.

In an embodiment, in the system stowed configuration, the drive wheel assembly is in the stowed configuration and housed entirely within the outer container; in the partially deployed configuration, the drive wheel assembly is actuated to a first degree; and in the fully deployed configuration, the drive wheel assembly is actuated to a second degree that provides for greater ground clearance than the partially deployed configuration.

The present disclosure may also be embodied in a ground transport system comprising a container assembly to be transported, a first drive container secured to a first end of the container assembly, and a second drive container secured to a second end of the container assembly.

In an embodiment, the first drive container comprises an outer container having a cuboid shape and comprising a plurality of fittings. The first drive container is secured to the container assembly using at least some of the plurality of fittings. The first drive container also comprises a drive wheel assembly. The drive wheel assembly comprises one or more wheels, and a deployment mechanism secured to the one or more wheels. The first drive container also comprises an actuating member for actuating the drive wheel assembly between a stowed configuration and one or more deployed configurations. In the stowed configuration, the drive wheel assembly is housed entirely within the outer container, and in the one or more deployed configurations, the drive wheel assembly extends from the outer container.

In an embodiment, the second drive container comprises a second outer container having a cuboid shape and comprising a second plurality of fittings. The second drive container is secured to the container assembly using at least some of the second plurality of fittings. The second drive container also comprises a second drive wheel assembly. The second drive wheel assembly comprises one or more wheels, and a second deployment mechanism secured to the one or more wheels. The second drive container also comprises a second actuating member for actuating the second drive wheel assembly between a stowed configuration and one or more deployed configurations. In the stowed configuration, the second drive wheel assembly is housed entirely within the second outer container, and in the one or more deployed configurations, the second drive wheel assembly extends from the second outer container.

In an embodiment, the drive wheel assembly further comprises a propulsion system for powering the one or more wheels.

In an embodiment, the propulsion system comprises one or more in-wheel electric motors.

In an embodiment, the first drive container comprises a secured portion secured to the container assembly and a rotatable portion rotatably secured to the secured portion.

The present disclosure may also be embodied in a semi-truck-type transport container system comprising a container housing a chassis system. The chassis system comprises a chassis, a king pin interface plate mounted on the chassis, one or more drive wheel assemblies secured to the chassis, and an actuating mechanism for actuating the chassis between a deployed configuration and a stowed configuration.

In an embodiment, the actuating mechanism actuates the chassis system approximately 90 degrees between the deployed configuration and the stowed configuration.

In an embodiment, the semi-truck-type transport container system further comprises a second container. The semi-truck-type transport container system can be converted between a system deployed configuration and a containerized configuration. In the containerized configuration, the chassis is in the stowed configuration and the second container is secured to the first container to substantially enclose the chassis system.

In an embodiment, in the containerized configuration, the first container and the second container define a substantially cuboid container comprising a plurality of fittings for securing the substantially cuboid container to another apparatus.

In an embodiment, the substantially cuboid container comprises a compartment for enclosing container support hardware.

In an embodiment, the container support hardware comprises king pin hardware for securing a container assembly to the king pin interface plate on the chassis.

In an embodiment, the one or more drive wheel assemblies comprise a propulsion system for powering the one or more wheels.

In an embodiment, the propulsion system comprises one or more in-wheel electric motors.

BRIEF DESCRIPTION OF THE DRAWINGS

FIG. 6 is a perspective view of an example upper lengthwise intermediate fitting for a cargo container and corresponding fitting connectors, according to an embodiment of the present disclosure.

FIG. 7 is a table comparing external dimensions of existing ISO containers to cargo containers according to various embodiments of the present disclosure.

FIG. 97 depicts a perspective view of collapsible container support hardware, according to an embodiment of the present disclosure.

FIG. 114 depicts an exploded perspective view of a semi-trailer-type cargo transport system, according to an embodiment of the present disclosure.

FIG. 115 depicts a perspective view of the semi-trailer-type cargo transport system of FIG. 114 in a partially assembled state, according to an embodiment of the present disclosure.

FIG. 116 depicts a perspective view of the semi-trailer-type cargo transport system of FIG. 114 in an assembled state, according to an embodiment of the present disclosure.

Figure 1A:
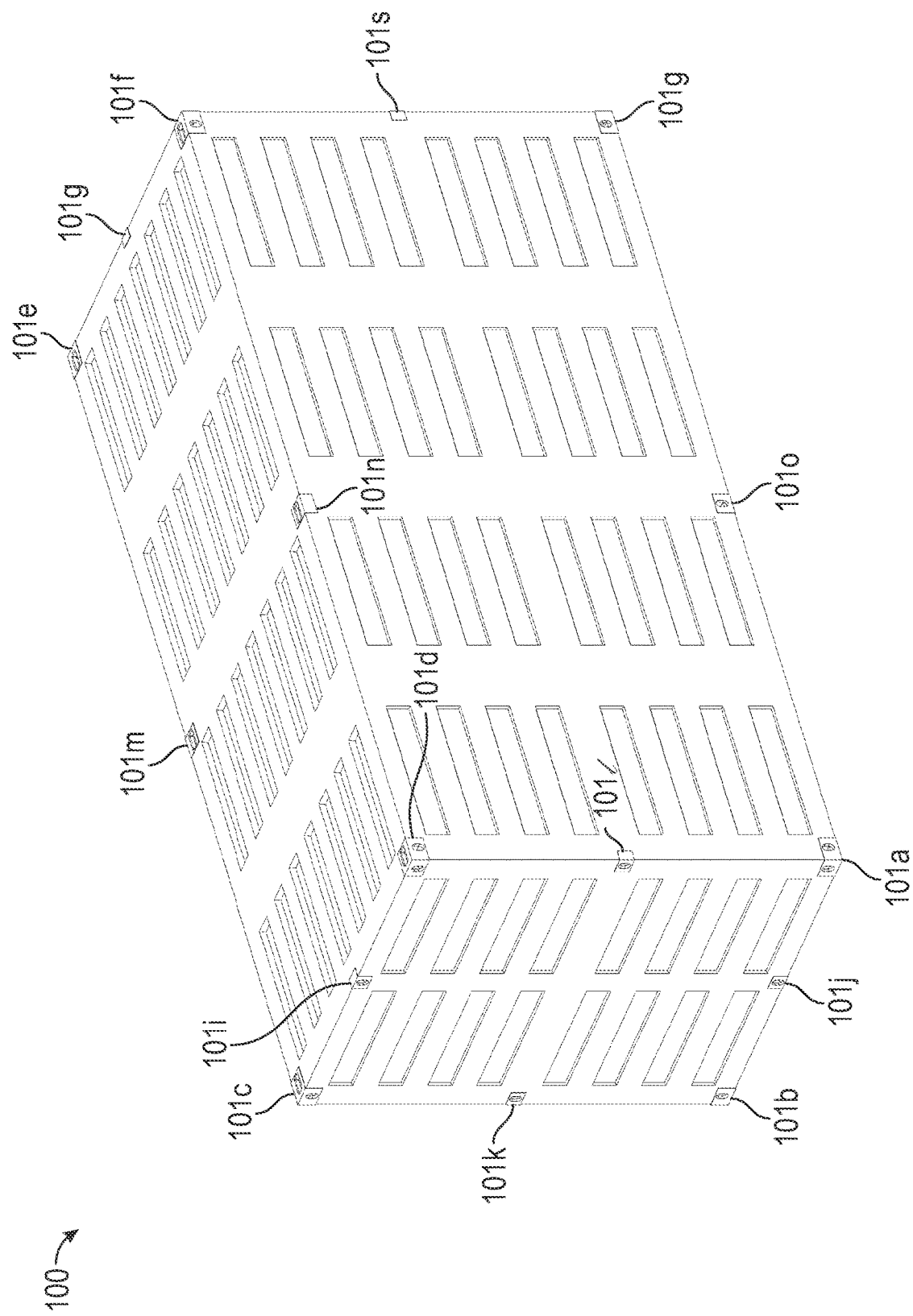
FIGS. 1A and 1B are perspective views of an example cargo container according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Specific, non-limiting embodiments of the present disclosure will now be described with reference to the drawings. It should be understood that such embodiments are by way of example only and merely illustrative of but a small number of embodiments within the scope of the present disclosure. Various changes and modifications obvious to one skilled in the art to which the present disclosure pertains are deemed to be within the spirit, scope and contemplation of the present disclosure as further defined in the appended claims.

In various embodiments, the present disclosure provides for systems and methods that include various sized containers and sub containers that fit together onto matching spine systems, and, in certain embodiments, defines spines and containers that would conform to ISO 636 and/or ISO 668 intermodal equipment. Various embodiments of the present disclosure exclude lifting hooks on the top fittings where the system may standardize the upper corner fittings to be similar to the lower corner fittings.

In addition, various embodiments of the present disclosure include spines that can have additional fittings to allow payloads to be shifted (e.g., from front to back) and better match center of gravity requirements of an aircraft system rather than having to shift the payload within the containers. In certain embodiments, spines can have sliding fittings to accommodate relocating the containers to match center of gravity requirements. In various embodiments, spines can include individual sliding fittings to account for thermal expansion differences and geometrical tolerance differences between spines and individual containers. In other embodiments, the spine can have heaters and/or coolers so that it can be brought to a similar temperature as attached containers. This may be useful, for example, when containers have been exposed to hot weather conditions.

Certain embodiments of the present disclosure also demonstrate how containers can be assembled into a carrying space that is double wide and/or double high to accommodate oversize cargo. In certain embodiments, the assembled containers can still fit onto existing intermodal infrastructures and can be assembled prior to loading onto an aircraft.

Figure 1B:
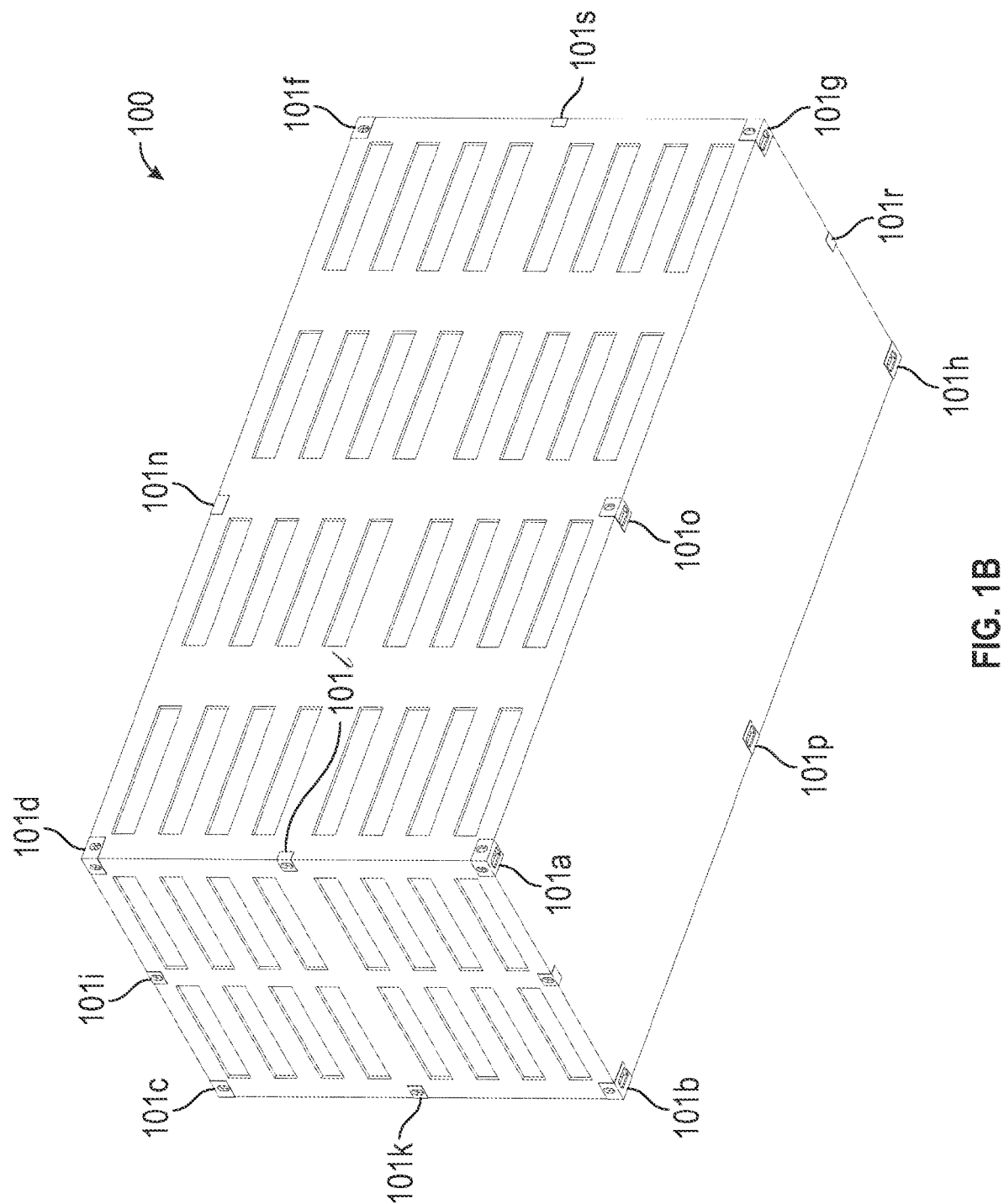

FIG. 1A provides a perspective view of an example cargo container 100 according to an embodiment of the present disclosure. FIG. 1B provides a bottom-up perspective view of the cargo container 100. In various embodiments, the cargo container 100 may be used as a container in a spine cargo transport system. Various embodiments of spine cargo transport systems are described in U.S. Pat. No. 7,261,257, issued on Aug. 28, 2007 and entitled CARGO AIRCRAFT; U.S. Pat. No. 7,699,267, issued on Apr. 20, 2010 and entitled CARGO AIRCRAFT; U.S. Pat. No. 8,608,110, issued on Dec. 17, 2013 and entitled CARGO AIRCRAFT SYSTEM; U.S. Pat. No. 8,708,282, issued on Apr. 29, 2014 and entitled METHOD AND SYSTEM FOR UNLOADING CARGO ASSEMBLY ONTO AND FROM AN AIRCRAFT; U.S. Pat. No. 9,493,227, issued on Nov. 15, 2016 and entitled METHOD AND SYSTEM FOR UNLOADING CARGO ASSEMBLY ONTO AND FROM AN AIRCRAFT; and U.S. Patent Publication No. 2014/0217230, filed on Feb. 5, 2013 and entitled DRONE CARGO HELICOPTER, each of which are incorporated by reference as if fully set forth herein. In the depicted embodiment, the cargo container 100 includes connection locations that do not exist on standard ISO containers. The cargo container 100 includes eight corner fittings 101*a-h*. In various embodiments, each corner fitting on a container may mirror at least one other corner fitting on the container. For example, a lower left front corner fitting 101*a* is the mirror image of a lower right front corner fitting 101*b* and an opposite mirror of a lower left rear corner fitting 101*g*. In various embodiments, the lower left front corner fitting 101*a* is also a mirror of an upper left front corner fitting 101*d*. In certain embodiments, certain or all corresponding lower fittings and upper fittings may differ, such that they do not mirror one another, as will be described in greater detail herein. A lower left rear corner fitting 101*g* is the mirror image of lower right rear corner fitting 101*h* (shown in FIG. 1B), and the opposite mirror of the lower left front corner fitting 101*a*. An upper left front corner fitting 101*d* is the mirror of an upper right front corner fitting 101*c*, and the opposite direction mirror of the lower left front corner fitting 101*a*. An upper right rear corner fitting 101*e* is the mirror image of an upper left rear corner fitting 101*f* and the opposite direction mirror of the lower right rear corner fitting 101*h* (shown in FIG. 1B). In various embodiments, the corner fittings 101*a-h* and additional fittings can be designed to transfer flight loads from one container to another and to attached spine systems, as will be described in greater detail herein.

As aircraft loads may be substantial, and may require additional fittings to transfer loads, the cargo container 100 is shown with additional connection fittings on the front and rear faces of the cargo container 100 as well as along the length of the cargo container 100. According to the depicted embodiment, intermediate fittings are included in a width-wise direction. A front upper width-wise intermediate fitting 101*i* is the mirror image of a front lower width-wise intermediate fitting 101*j* and in the opposite direction is the mirror of a rear upper width-wise intermediate fitting 101*q*, which is the mirror image of a rear lower width-wise intermediate fitting 101*r* (shown in FIG. 1B). Intermediate fittings are also included in a height-wise direction. A front left height-wise intermediate fitting 101*l* is the mirror of a front right height-wise intermediate fitting 101k and is also the opposite direction mirror of a rear left height-wise intermediate fitting 101s which in turn is the mirror of a rear right height-wise intermediate fitting 101t (not shown). Although not shown, in certain embodiments, the container corner fittings can also meet current ISO Intermodal requirements which may require additional types of connection fittings.

The cargo container 100 has additional intermediate connection fittings in the length-wise direction with an upper left length-wise intermediate fitting 101n being the mirror of an upper right length-wise intermediate fitting 101m. A lower left length-wise intermediate fitting 101o is the mirror image of a lower right length-wise intermediate fitting 101p. In certain embodiments, fitting 101n may not be the mirror of fitting 101o and, similarly, fitting 101m may not be the mirror of fitting 101p. This design attempts to minimize the number of required structural connections and will be depicted and described in greater detail herein, for example, with reference to various connected cargo containers.

Figure 2:
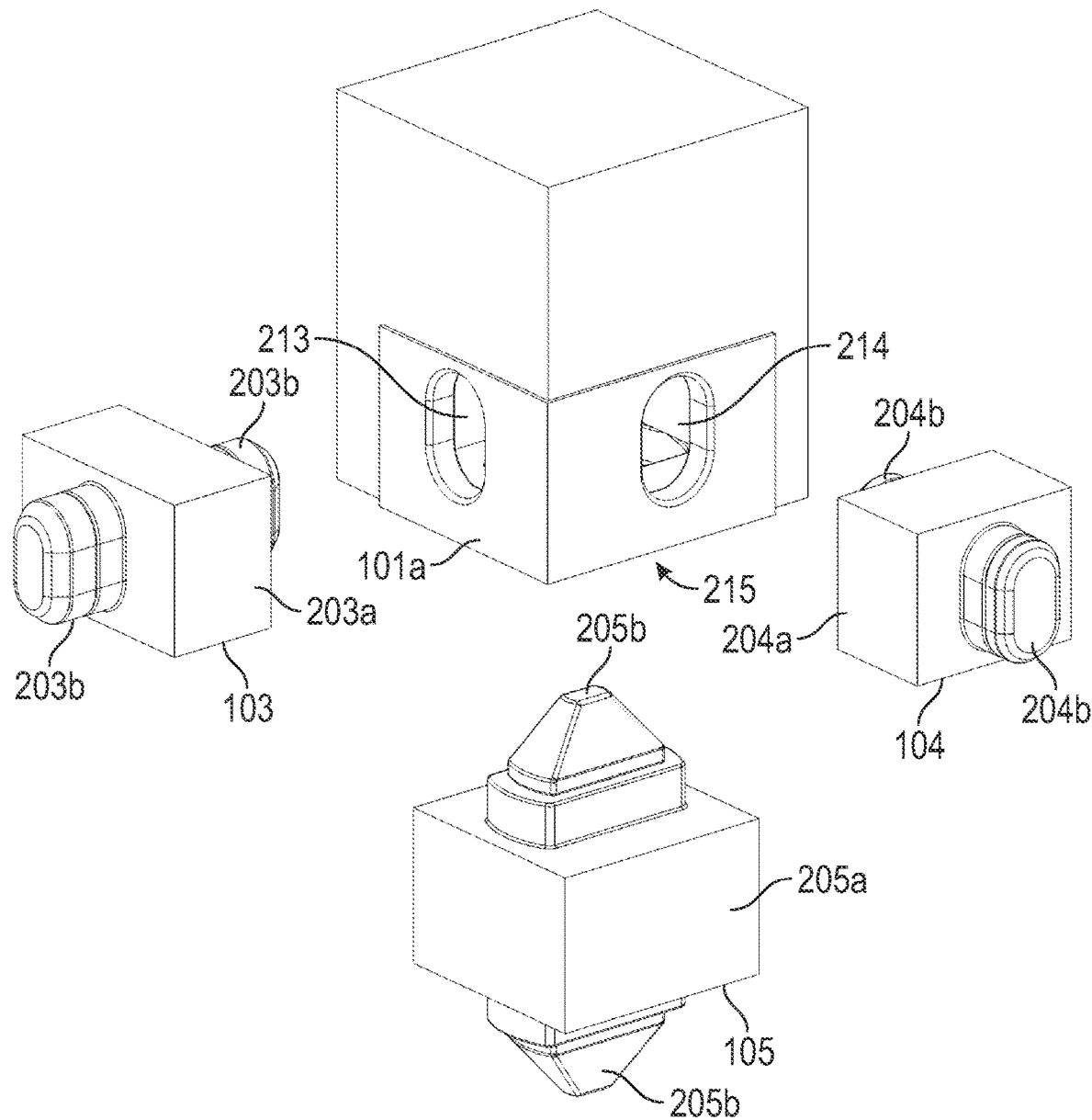
FIG. 2 is a perspective view of an example corner fitting for a cargo container and corresponding fitting connectors, according to an embodiment of the present disclosure.

FIG. 2 depicts an example embodiment of the lower left front corner fitting 101a depicted in FIG. 1A, according to an embodiment of the present disclosure. In one embodiment, the lower left front corner fitting 101a, or a mirror image thereof, may be used for any of the corner fittings 101a-h of FIGS. 1A-1B. The lower left front corner fitting 101a is designed to connect structurally to a corresponding fitting on another container in the left-to-right direction (i.e., a width-wise direction) via a fitting connector 104 and a first opening 214, in the front-to-back direction (i.e., a length-wise direction) via a fitting connector 103 and a second opening 213, and in the up-and-down direction (i.e., a height-wise direction) via a fitting connector 105 and a third opening 215 (not shown). The fitting connector 103 includes a central body 203a, and two rotating members 203b on either end of the central body 203a. The two rotating members 203b can be rotated between an unlocked position and a locked position. The two rotating members 203b, when in the unlocked position, are designed to be inserted into corresponding fitting openings in two cargo containers, and, once inserted, can be rotated into a locked position to secure the corresponding fittings to one another. Similarly, the fitting connectors 104, 105 also include central bodies 204a, 205a, respectively, and each fitting connector 104, 105 also includes two rotating members 204b, 205b, which operate substantially similarly to the rotating members 203b. The fitting 101a is designed in such a way that all three fitting connectors 103, 104, and 105 can be attached at the same time. In the depicted embodiment, the fitting connectors 103, 104, and 105 are quarter-turn type fitting connectors. These fitting connectors can, in an unlocked position, be placed to mate with their corresponding fitting openings and then rotated approximately 90 degrees into a locked position. The fitting connectors 103, 104, 105 shown in FIG. 2 can be configured to mate with all corner fittings on a cargo container, e.g., fittings 101a-h of FIGS. 1A-1B. In certain embodiments, the fitting connectors can be configured to individually rotate such that the fitting connector can lock onto one container prior to locking onto a second container.

Figure 3:
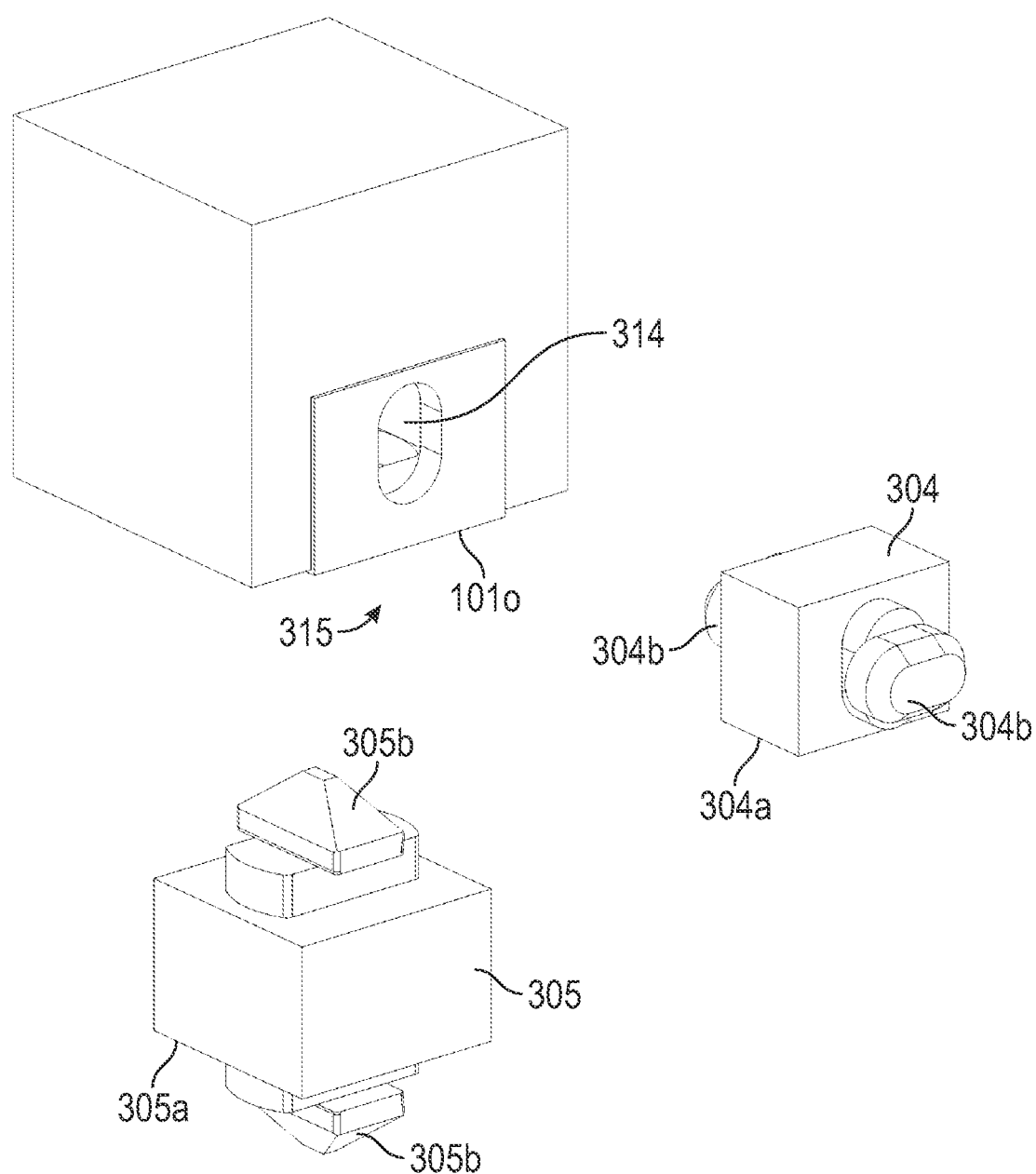
FIG. 3 is a perspective view of an example lower lengthwise intermediate fitting for a cargo container and corresponding fitting connectors, according to an embodiment of the present disclosure.

FIG. 3 depicts an example embodiment of the lower left length-wise intermediate fitting 101o of FIGS. 1A-1B, according to an embodiment of the present disclosure. In one embodiment, the lower left length-wise intermediate fitting 101o, or a mirror image thereof, can be used for any of the length-wise intermediate fittings 101m, 101n, 101o, 101p of FIGS. 1A-1B. The lower left length-wise intermediate fitting 101o is designed to connect structurally to a corresponding fitting on another container in the left-to-right (i.e., width-wise) direction via a fitting connector 304 and a first opening 314, and in the up-and-down (i.e., height-wise) direction via a fitting connector 305 and a second opening 315 (not shown). It can be seen that the fitting connector 304 may be identical to the fitting connector 104 of FIG. 2, and the fitting connector 305 may be identical to the fitting connector 105 of FIG. 2. Similar to the fitting connectors 104, 105, the fitting connectors 304, 305 have a central body 304a, 305b, and two rotating members 304b, 305b which can rotate between an unlocked position and a locked position. The rotating members 304b, 305b of fitting connectors 304, 305 are shown in the "locked" position, whereas the rotating members 204b, 205b of fitting connectors 104, 105 of FIG. 2 are shown in the "unlocked" position. The fitting 101o is designed in such a way that the two fitting connectors 304 and 305 can be attached at the same time.

Fitting connectors 104, 304, which go left to right (i.e., in a width-wise direction), can be configured to connect with fittings 101o and 101p as well as the left to right directions of the corner fittings 101a-h. Fitting connectors 105, 305, which go up and down (i.e., in a height-wise direction), can be configured to connect with fittings 101o and 101p, as well as the up and down directions of the corner fittings 101a-h.

Figure 4:
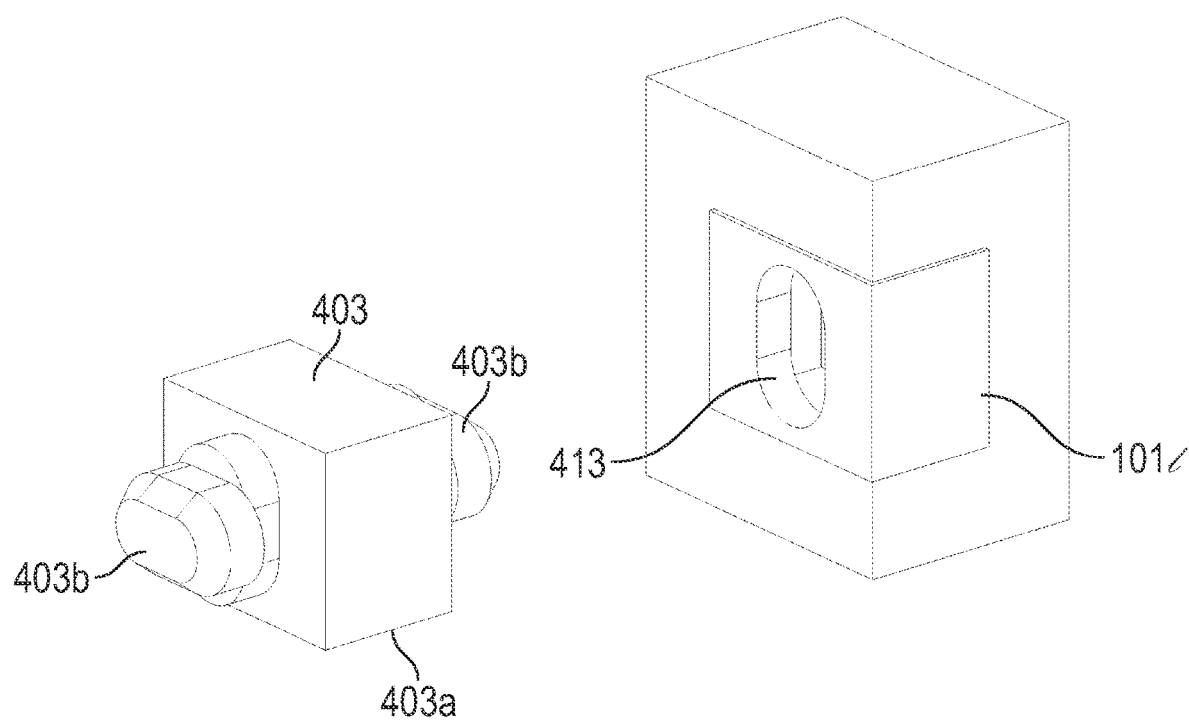
FIG. 4 is a perspective view of an example height-wise intermediate fitting for a cargo container and corresponding fitting connectors, according to an embodiment of the present disclosure.

FIG. 4 depicts an example embodiment of the front left height-wise intermediate fitting 101l of FIGS. 1A-1B. In one embodiment, the front left height-wise intermediate fitting 101l, or a mirror image thereof, can be used for any of the height-wise intermediate fittings 101k, 101l, 101s, 101t of FIGS. 1A-1B. The front left height-wise intermediate fitting 101l is designed to connect structurally to a corresponding fitting on another container in the front-to-back (i.e., length-wise) direction via a fitting connector 403 and an opening 413. Fitting connector 403 may be configured to correspond to additional fittings on a cargo container, such as front right height-wise intermediate fitting 101k, rear right height-wise intermediate fitting 101t and rear left height-wise intermediate fitting 101s. In certain embodiments, fitting connector 403 may have slightly different outer dimensions than fitting connector 103. In other embodiments, both fittings 103, 403 may be made to the same size to reduce the number of various fitting connectors. Similar to the fitting connector 103, the fitting connector 403 has a central body 403a and two rotating members 403b that can rotate between a locked position and an unlocked position.

Figure 5:
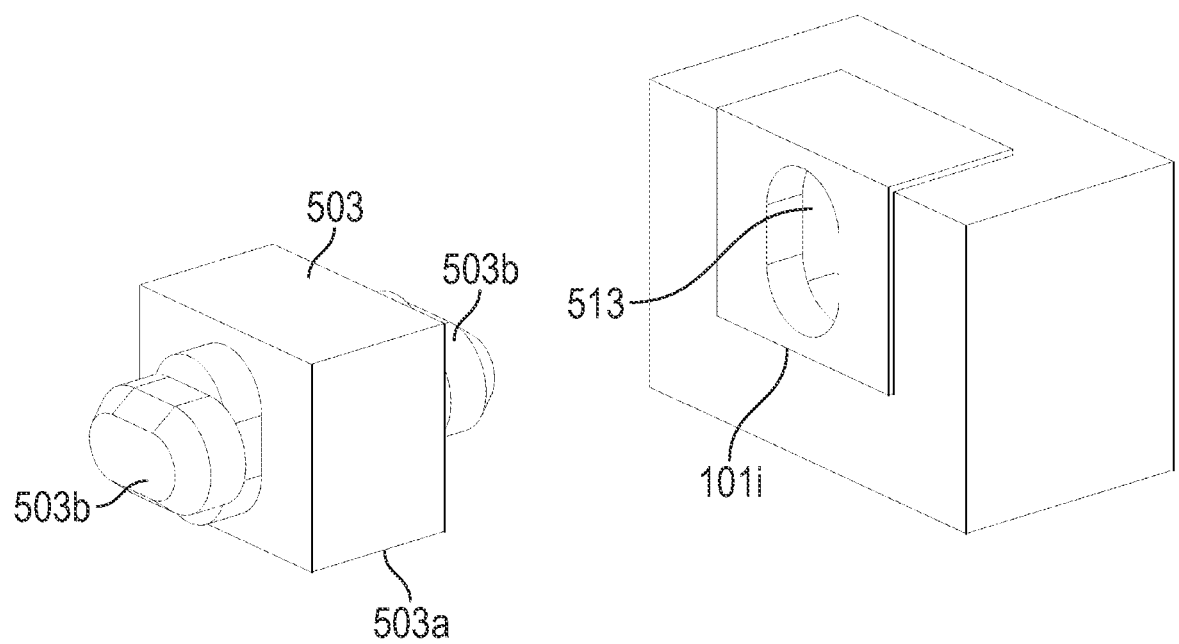
FIG. 5 is a perspective view of an example upper width-wise intermediate fitting for a cargo container and corresponding fitting connectors, according to an embodiment of the present disclosure.

FIG. 5 depicts an example embodiment of the front upper width-wise intermediate fitting 101i of FIGS. 1A-1B. In one embodiment, the front upper width-wise intermediate fitting 101i is a mirror image of the rear upper width-wise intermediate fitting 101q. The front upper width-wise intermediate fitting 101i is designed to connect structurally to a corresponding fitting on another cargo container in the front-to-back (i.e., length-wise) direction via a fitting connector 503 and an opening 513. The fitting connector 503 may be configured to correspond to additional fittings on a cargo container, such as the rear upper width-wise intermediate fitting 101q. In certain embodiments, the fitting connector 503 may have slightly different outer dimensions than fitting connectors 103 or 403. In other embodiments, each of the fitting connectors 103, 403, 503 may be identical to one another so as to reduce the number of various fitting connectors. Similar to the fitting connector 103, the fitting connector 503 includes a central body 503a and two rotating members 503b that can rotate between a locked position and an unlocked position.

In certain embodiments and scenarios, cargo containers can connect to one another in the front-to-back (i.e., lengthwise)direction using only the corner fittings (e.g., fittings 101a, 101b, 101c, 101d and/or fittings 101d, 101e, 101f, 101g connected to corresponding corner fittings on another cargo container). Fittings 101k, 101l, 101i, 101j, 101q, 101r, 101s, and 101t may optionally be utilized in applications that may need additional connections in the front-to-back direction.

FIG. 6 depicts an example embodiment of the upper left length-wise intermediate fitting 101n of FIGS. 1A-1B. In one embodiment, the upper left length-wise intermediate fitting 101n is a mirror image of the upper right length-wise intermediate fitting 101m. The upper left length-wise intermediate fitting 101n is designed to connect structurally to a corresponding fitting on another cargo container or a spine in the up-and-down (i.e., height-wise) direction via a fitting connector 605 and an opening 615. In certain embodiments, the fitting connector 605 may be identical to the fitting connector 105, and can be configured to mate with any other fittings on the cargo container 100 that is configured to connect in the up-and-down direction. Similar to the fitting connector 105, the fitting connector 605 can include a central body 605a, and two rotating members 605b that can rotate between a locked position and an unlocked position.

FIG. 7 is a table comparing existing ISO container external dimensions versus various embodiments of the presently disclosed cargo container external dimensions. The dimensions shown in FIG. 7 are based on the front-to-back fitting connectors 103, 403, and 503 having a connected thickness between two connected cargo containers of approximately three inches, the side-to-side fitting connectors 104, 304 having a thickness of approximately three inches after mating two cargo containers, and the vertical dimension of the fitting connectors 105, 305, 605 having a baseline thickness of approximately four inches when two cargo containers are connected. The thickness of fitting connectors 105, 305, 605 may be used to define dimensions and/or a height of an outer aerodynamic fairing. The external fitting connectors 103, 403, 503 may be defined by ISO standards as they would dictate the size of two 20' containers connected to fit in the same space as a 40' container. In certain embodiments, the size of any fitting connectors may be determined based on the access space required for automated or manual reach actuation systems to lock and/or unlock these fitting connectors. It should be understood that the dimensions of any of the fitting connectors can be modified as appropriate. In certain embodiments, based on the cargo container dimensions found in FIG. 7 and the number of fittings defined for this configuration of connections, a family of cargo containers can be developed. It should be understood that while various exemplary dimensions and sizes are discussed herein, any appropriate dimensions can be used. For example, two containers that are ½ width and/or ½ height of ISO standards can be combined to create a combination container that is a standard height and/or width.

Figure 8:
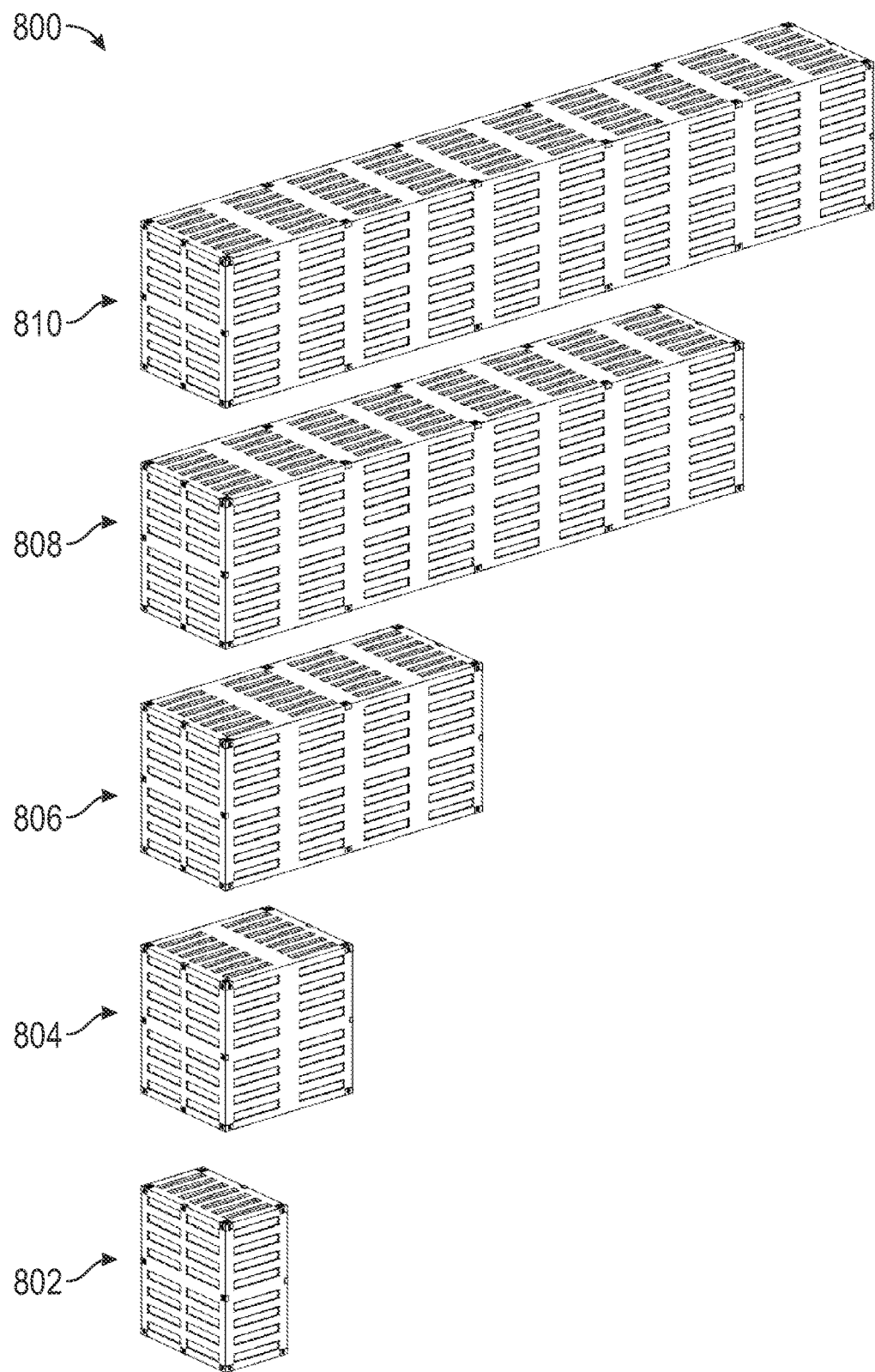
FIG. 8 depicts perspective views of a family of cargo containers, according to an embodiment of the present disclosure.
Figure 9:
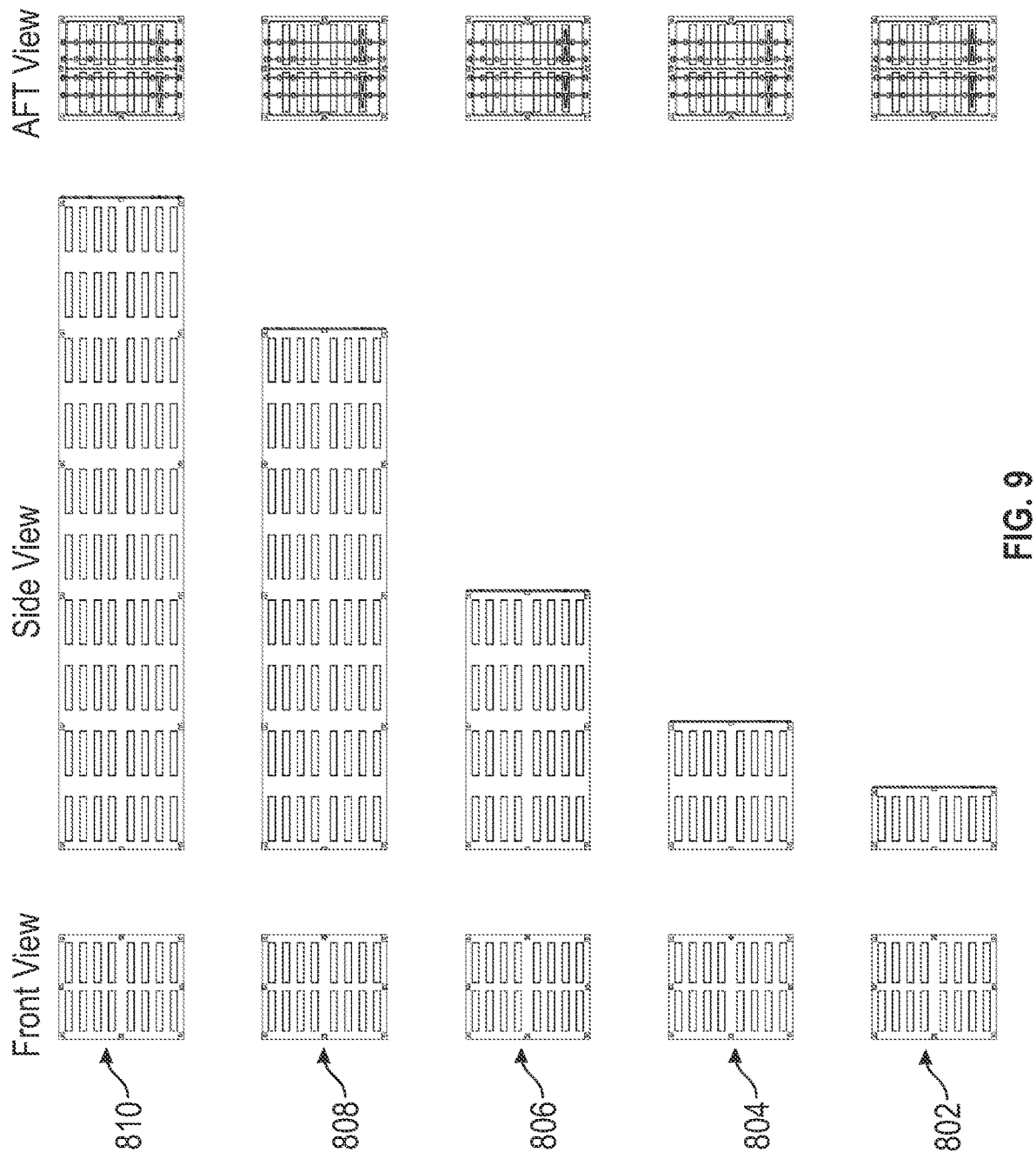
FIG. 9 depicts front, side, and rear plan views of the family of cargo containers of FIG. 8.

FIG. 8 depicts a family of cargo containers 800 according to an embodiment of the present disclosure. FIG. 9 provides, front, side, and rear views of the family of containers 800 of FIG. 8. The family of cargo containers 800 includes a 5' container 802, a 10' container 804, a 20' container 806, a 40' container 808, and a 50' container 810. The 50' container 810 could, in certain embodiments, be designed to fit on a 40' truck chassis with some cargo weight loading restrictions.

It can be seen that each cargo container has fittings at each of the eight corners of the cargo container, as well as center upper, center lower, center left, and center right fittings on both the front and rear ends of the cargo container, much like the example cargo container 100 of FIGS. 1A-1B. The longer cargo containers (in this example, cargo containers 20' and longer) also have additional fittings in the length-wise direction at substantially regular intervals. For example, in the example family of cargo containers 800, the cargo containers have additional fittings in the length-wise direction approximately every 10 feet. It can be appreciated that cargo containers can have more additional fittings (e.g., every 5 feet), or fewer additional fittings (e.g., every 20 feet).

The next few figures will demonstrate one example of how containers can be connected to one another.

Figure 10:
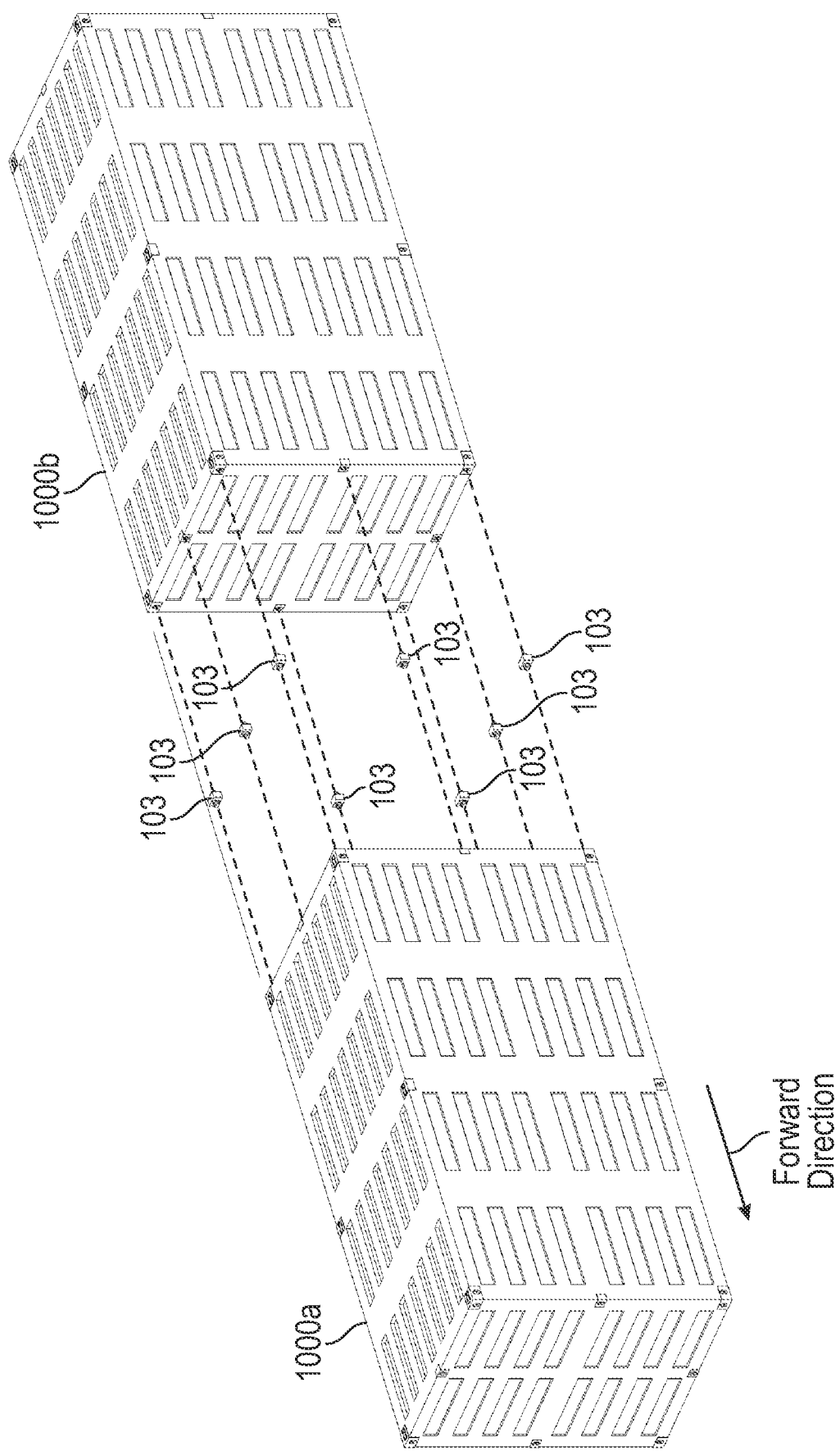
FIG. 10 depicts an exploded perspective view of two cargo containers being connected together in the front-to-back direction, according to an embodiment of the present disclosure.

FIG. 10 is an exploded perspective view showing how two containers 1000a, 1000b can be attached structurally in the front-to-back (i.e., length-wise) direction, in accordance with an embodiment of the present disclosure. In the example shown in FIG. 10, each cargo container 1000a, 1000b is essentially identical to the cargo container 100 of FIGS. 1A-1B and also the 20' cargo container 806 of FIG. 8. In this example scenario, each fitting on a rear or rear surface of the first cargo container 1000a is connected to each fitting on a front surface of the second cargo container 1000b using an appropriate fitting connector. In this example scenario, it is assumed that the front-to-back (i.e., length-wise) fitting connectors 103, 403, 503 are identical (i.e., each front-to back fitting connector is the front-to-back fitting connector 103 of FIG. 2). However, in other embodiments, different front-to-back fitting connectors may have different dimensions such that different front-to-back fitting connectors would be needed for different fittings.

Each fitting connector 103 is inserted into openings on two corresponding fittings on the cargo containers 1000a, 1000b (one fitting in cargo container 1000a and one fitting in cargo container 1000b) while the fitting connector 103 is in an unlocked position, and then, once inserted, rotating members of the fitting connector 103 are rotated into a locked position to secure the two corresponding fittings together. While the example in FIG. 10 shows eight fittings being secured together, it is anticipated that in certain embodiments, only the corner fitting connections would be needed, but more connections are shown and can be utilized if needed for structural requirements.

Figure 11:
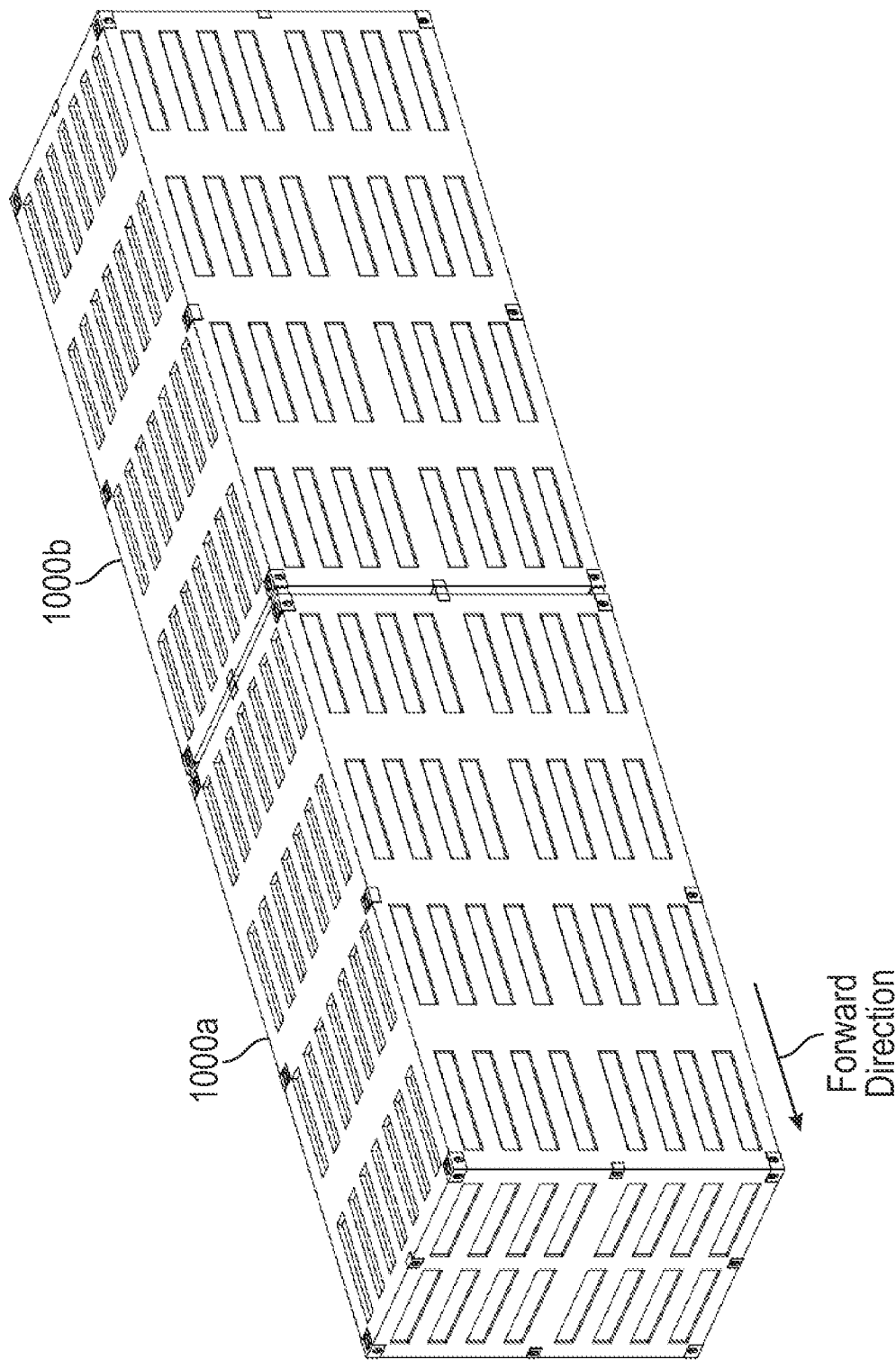
FIG. 11 depicts a perspective view of two cargo containers connected together in the front-to-based direction, according to an embodiment of the present disclosure.

FIG. 11 shows the two containers 1000a, 1000b connected in the front-to-back (i.e., length-wise) direction, in accordance with an embodiment of the present disclosure.

Figure 12:
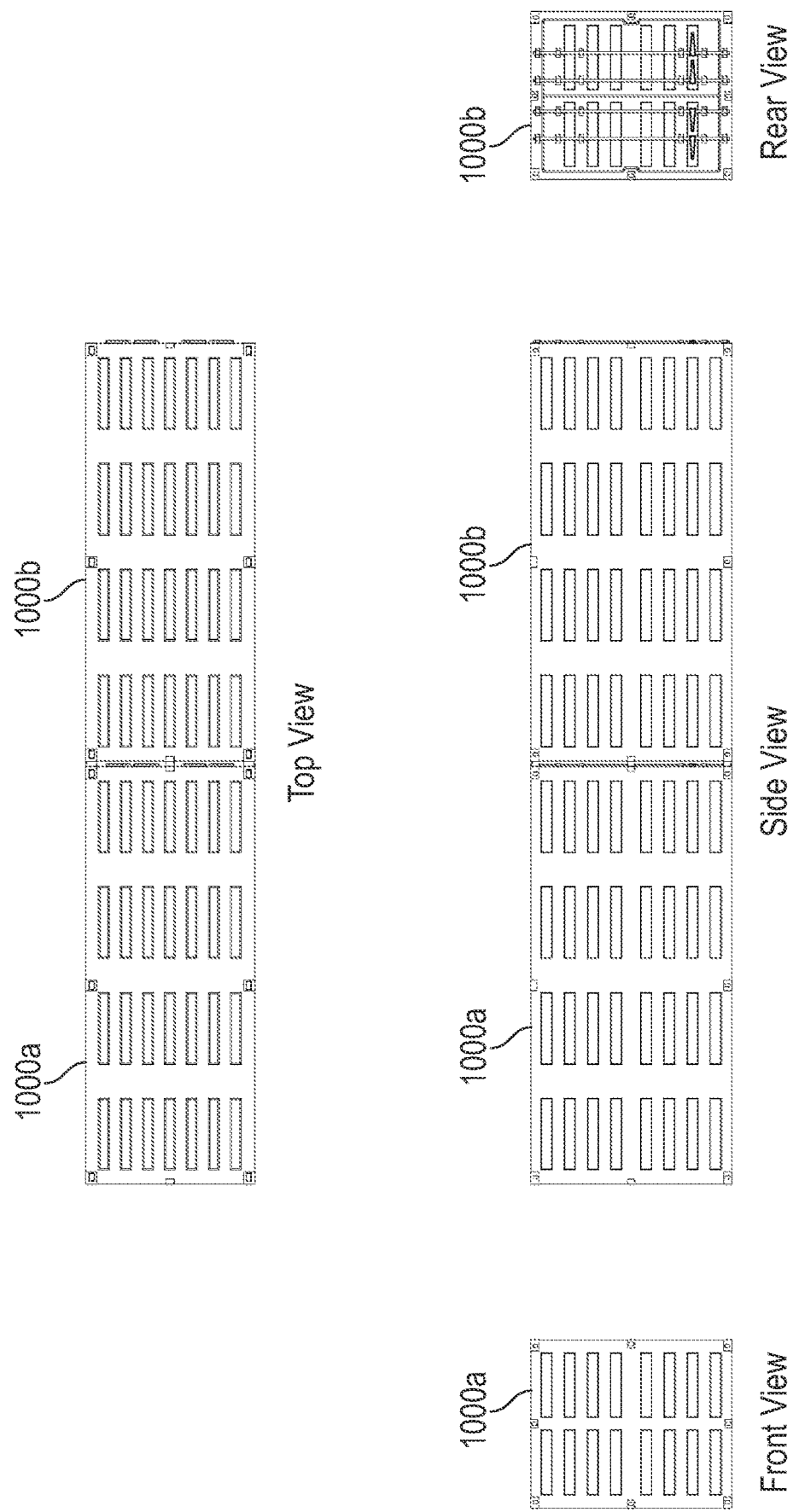
FIG. 12 depicts front, side, rear, and top plan views of the two connected cargo containers of FIG. 11.

FIG. 12 provides side, top, front, and back views of the two containers 1000a, 1000b connected in the front-to-back (i.e., length-wise) direction and the gap that is developed from the assembled system, in accordance with an embodiment of the present disclosure. In various embodiments, the two 20' cargo containers 1000a, 1000b fit into the same space as a 40' cargo container (e.g., cargo container 808 of FIG. 8).

Figure 13:
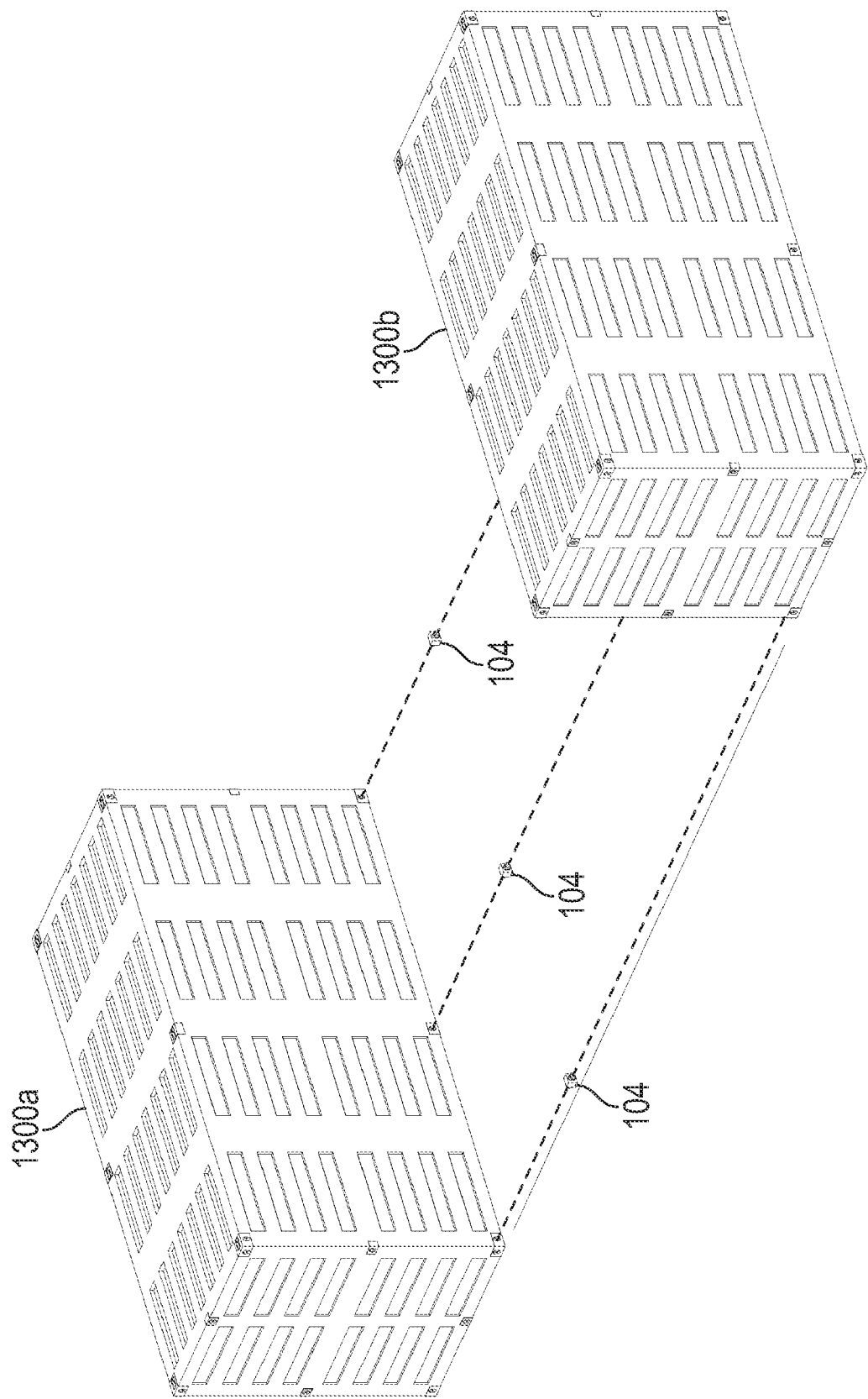
FIG. 13 depicts an exploded perspective view of two cargo containers being connected together in the side-to-side direction, according to an embodiment of the present disclosure.

FIG. 13 is an exploded perspective view showing how two containers 1300a, 1300b can be connected in the side-to-side (i.e., width-wise) direction, in accordance with an embodiment of the present disclosure. In the example shown in FIG. 13, each cargo container 1300a, 1300b is essentially identical to the cargo container 100 of FIGS. 1A-1B and also the 20' cargo container 806 of FIG. 8. In this example scenario, it is assumed that the side-to-side (i.e., width-wise) fitting connectors 104, 304 are identical (i.e., each side-to-side fitting connector is the side-to-side fitting connector 104 of FIG. 2).

In this particular configuration, there are no top side-to-side connections. This may be because, in certain embodiments, the top fittings on the containers 1300a, 1300b could be connected to a spine (e.g., on an aircraft being used to transport the containers) or to a second stack of containers, either of which could take the containers' upper side-to-side loads. This can assist in minimizing the number of connections required and still have a functional, structurally sound system. However, it should be appreciated that additional connections can be made if required.

Figure 14:
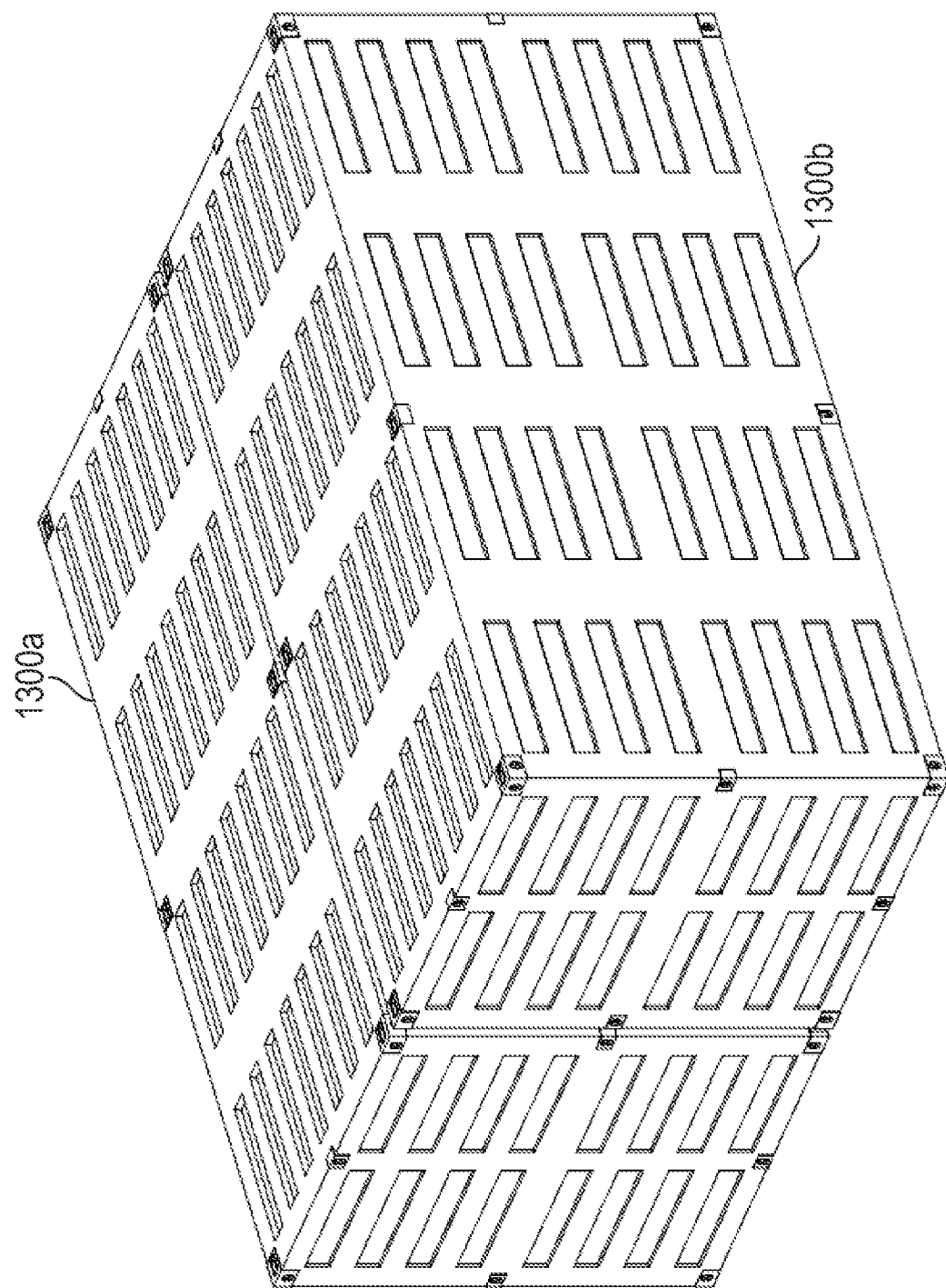
FIG. 14 depicts a perspective view of two cargo containers connected together in the side-to-side direction, according to an embodiment of the present disclosure.

FIG. 14 shows the two containers 1300a, 1300b connected in the side-to-side (i.e., width-wise) direction, in accordance with an embodiment of the present disclosure.

Figure 15:
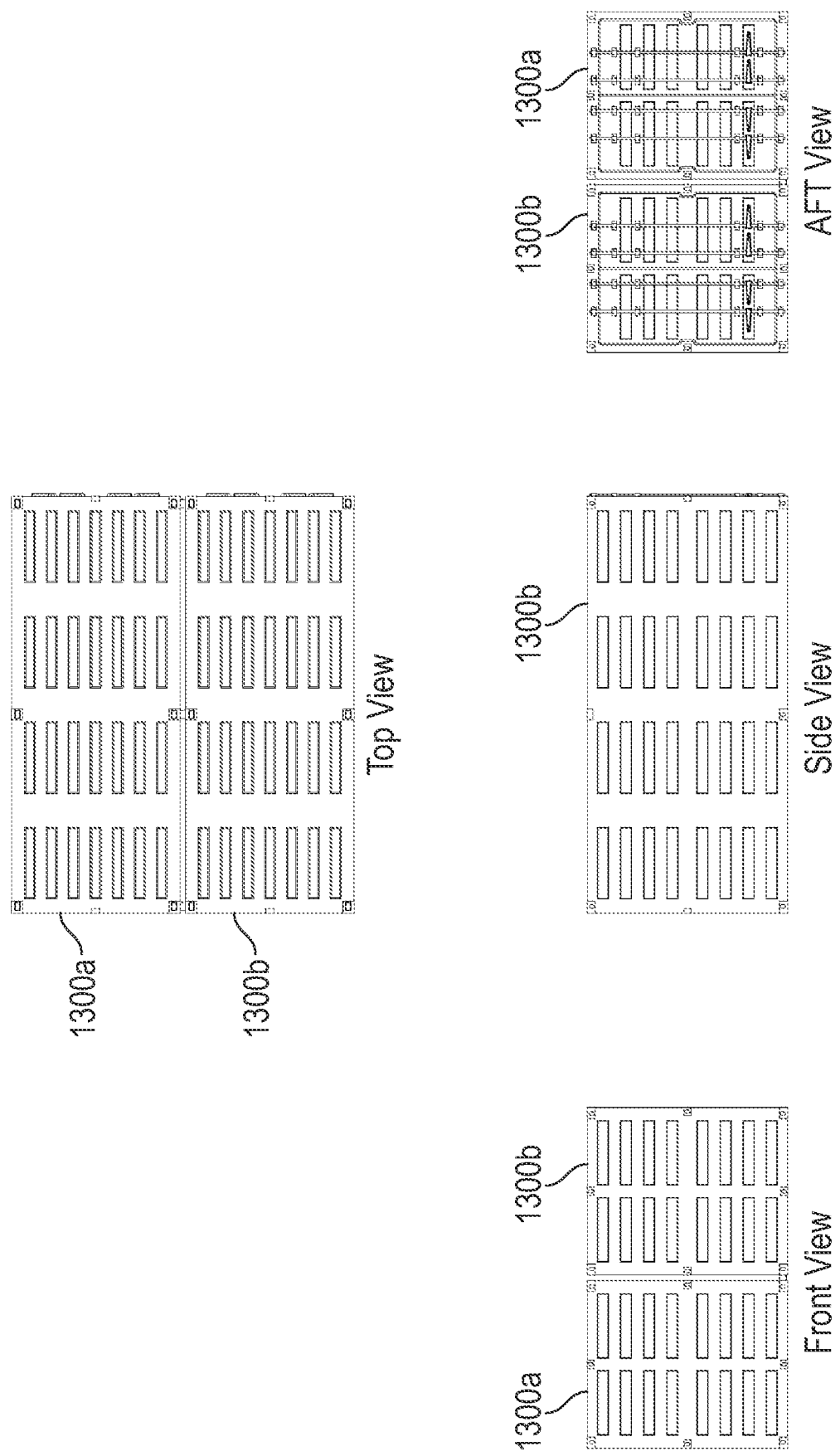
FIG. 15 depicts front, side, rear, and top plan views of the two connected cargo containers of FIG. 14.

FIG. 15 provides side, top, front, and back views of the two containers 1300a, 1300b connected in the side-to-side (i.e., width-wise) direction and the gap that is developed due to the fitting connector 104's thickness, in accordance with an embodiment of the present disclosure.

Figure 16:
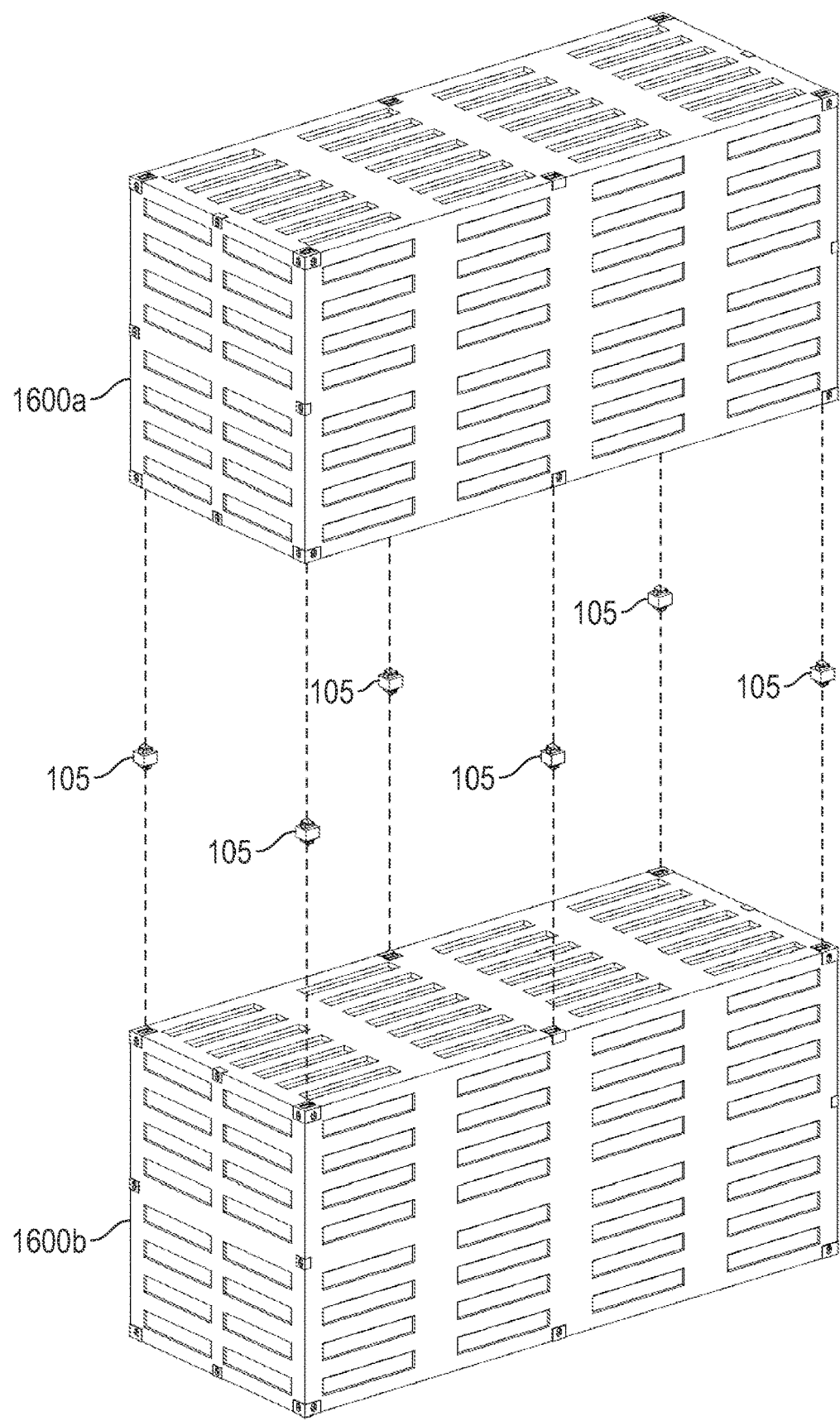
FIG. 16 depicts an exploded perspective view of two cargo containers being connected together in the top-to-bottom direction, according to an embodiment of the present disclosure.

FIG. 16 is an exploded perspective view showing how two containers 1600a, 1600b can be connected in the top-to-bottom (i.e., height-wise) direction, in accordance with an embodiment of the present disclosure. In the example shown in FIG. 16, each cargo container 1600a, 1600b is essentially identical to the cargo container 100 of FIGS. 1A-1B and also the 20' cargo container 806 of FIG. 8. In this example scenario, it is assumed that the top-to-bottom (i.e., height-wise) fitting connectors 105, 305, 605 are identical (i.e., each top-to-bottom fitting connector is the top-to-bottom fitting connector 105 of FIG. 2).

In this particular configuration, there are no top-to-bottom connections made using the front lower width-wise intermediate fitting and the rear lower width-wise intermediate fitting. This may be because, in certain embodiments, the containers 1600a, 1600b are only 8' wide, and do not require these fittings to connect in the top-to-bottom direction for structural integrity. This can assist in minimizing the number of connections required and still have a functional, structurally sound system. However, it should be appreciated that additional connections can be made if required and fittings can be modified as appropriate.

Figure 17:
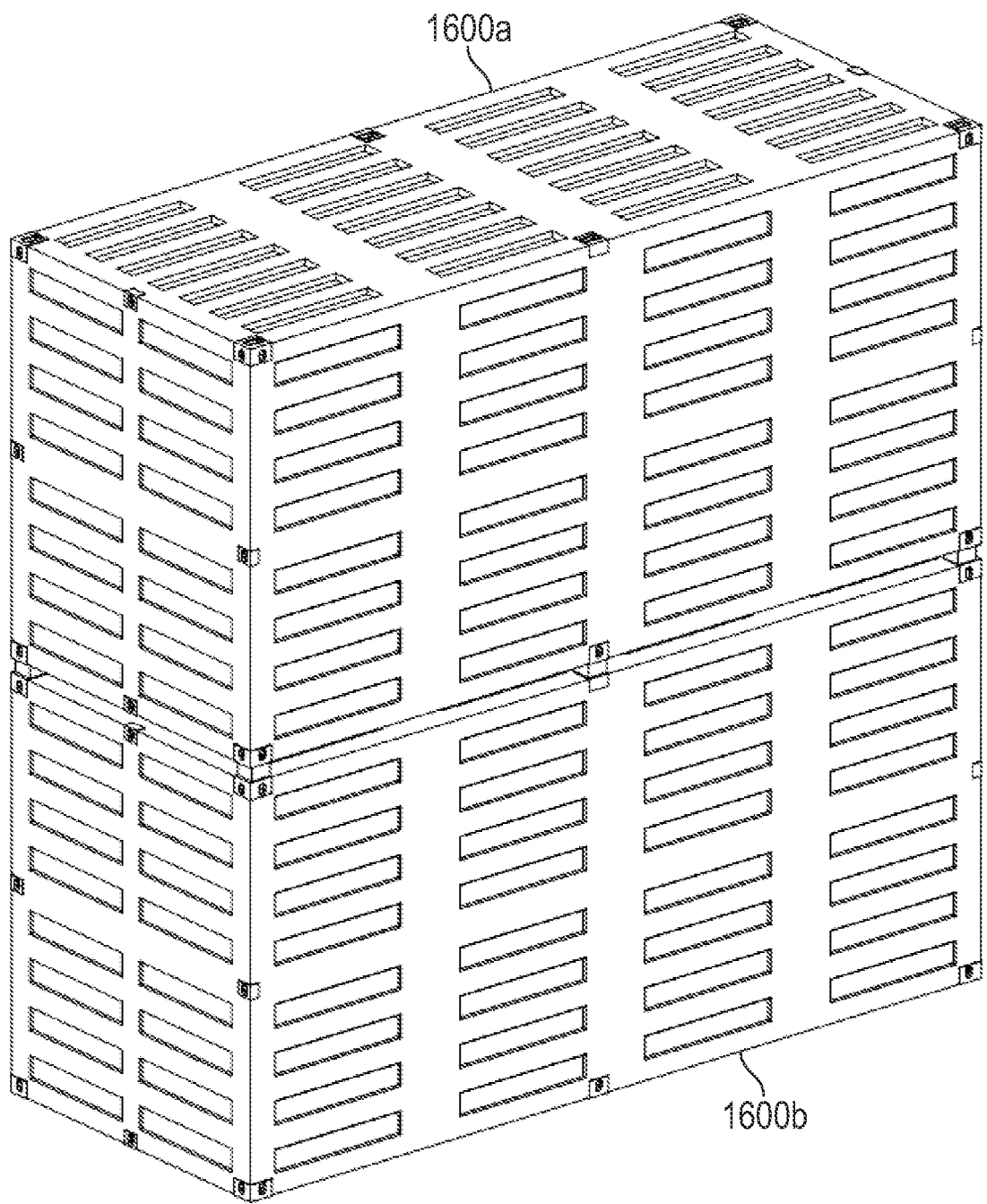
FIG. 17 depicts a perspective view of two cargo containers connected together in the top-to-bottom direction, according to an embodiment of the present disclosure.

FIG. 17 shows the two containers 1600a, 1600b connected in the top-to-bottom (i.e., height-wise) direction, in accordance with an embodiment of the present disclosure.

Figure 18:
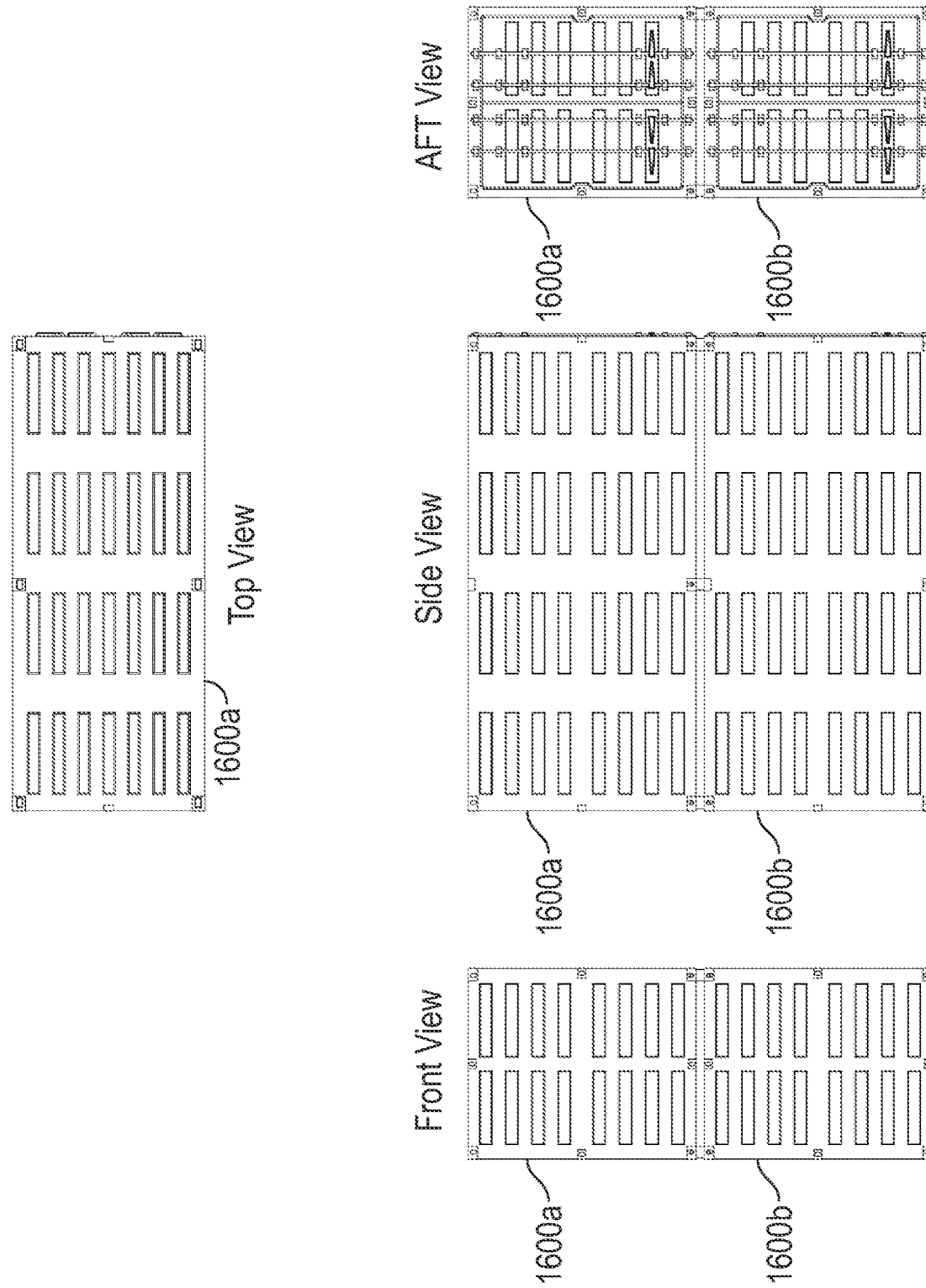
FIG. 18 depicts front, side, rear, and top plan views of the two connected cargo containers of FIG. 17.

FIG. 18 provides side, top, front, and back views of the two containers 1600a, 1600b connected in the top-to-bottom (i.e., height-wise) direction and the gap that is developed due to the fitting connector 105's thickness, in accordance with an embodiment of the present disclosure.

Figure 19:
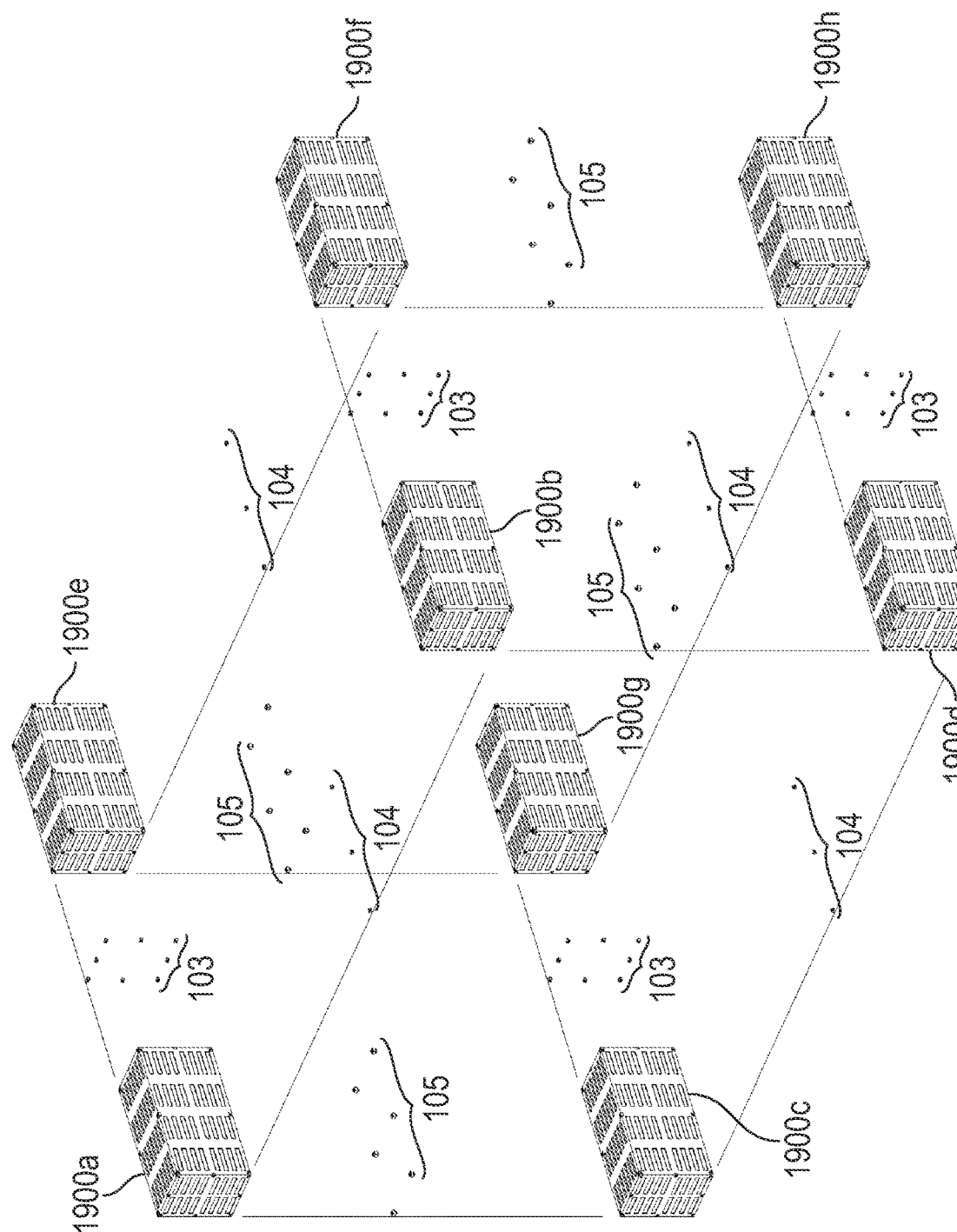
FIG. 19 depicts an exploded perspective view of eight cargo containers being connected together in the top-to-bottom, front-to-back, and side-to-side directions, according to an embodiment of the present disclosure.

FIG. 19 combines all the previous combinations from FIGS. 10-18 to show how eight containers 1900a-h can be combined, in accordance with an embodiment of the present disclosure.

Figure 20:
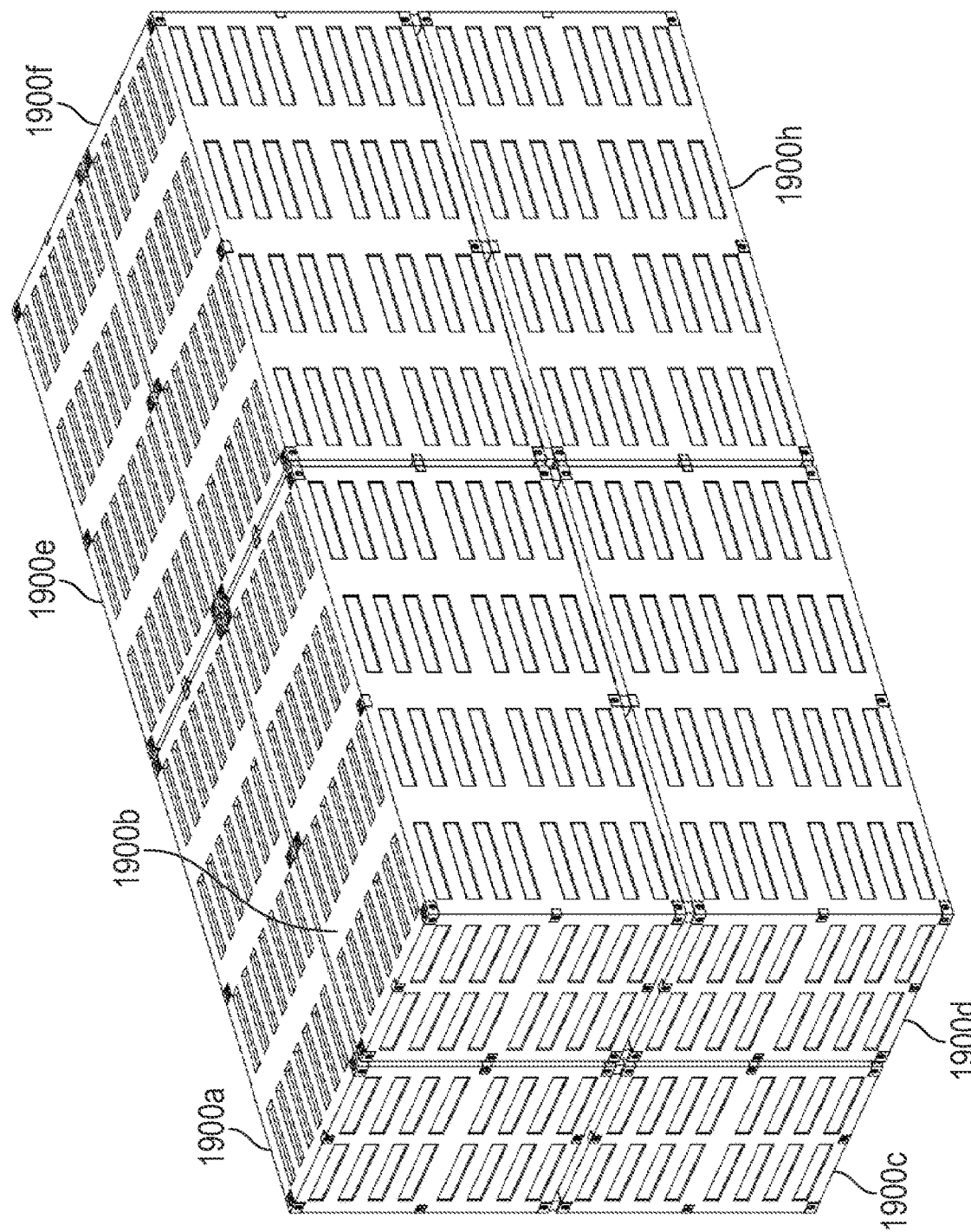
FIG. 20 depicts a perspective view of the eight cargo containers of FIG. 19 connected together.

FIG. 20 is a final, assembled eight container assembly, in accordance with an embodiment of the present disclosure.

Figure 21:
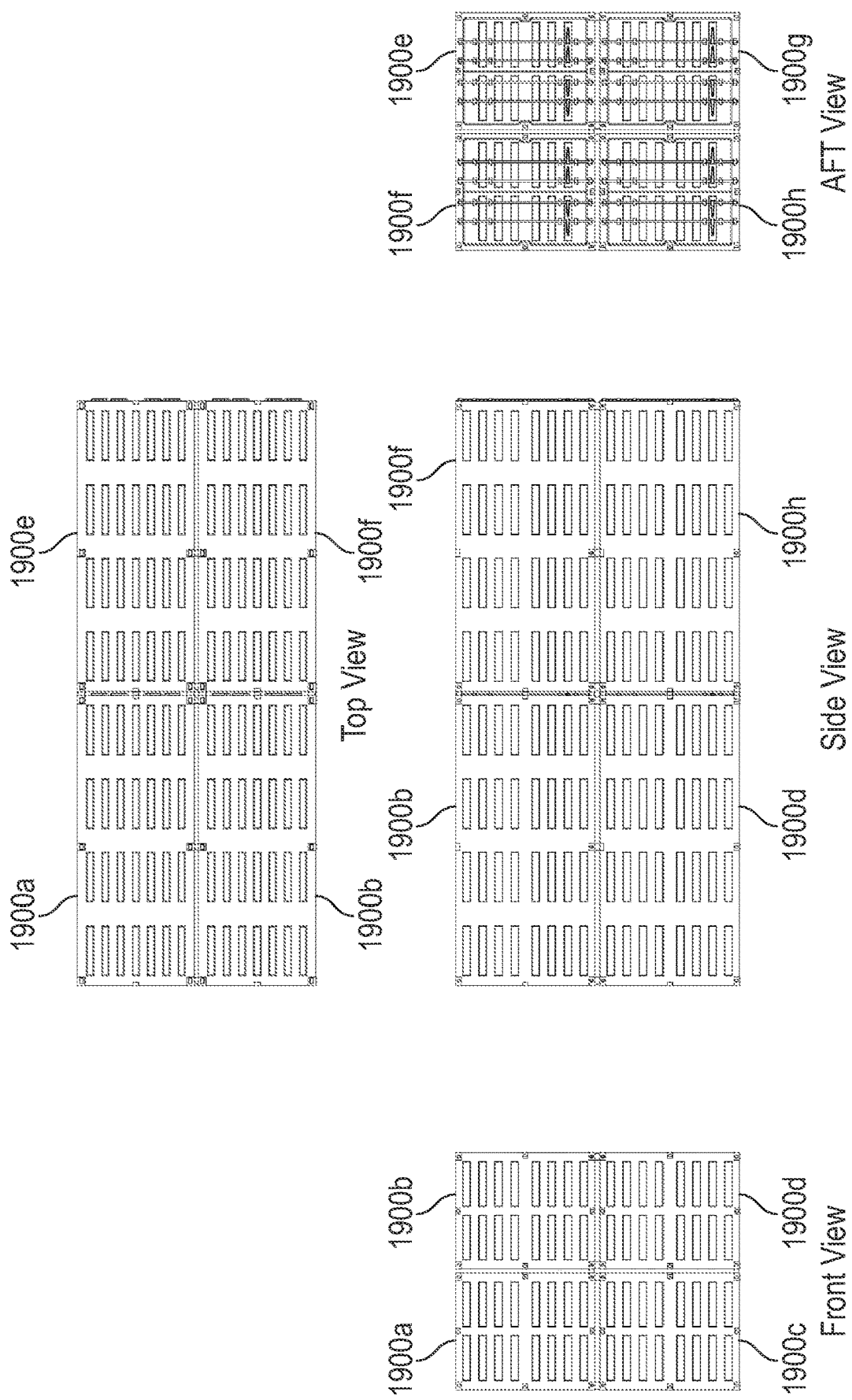
FIG. 21 depicts front, side, rear, and top plan views of the eight connected cargo containers of FIG. 20.

FIG. 21 provides, side, top, front, and back views of the eight-container assembly and shows the gaps of an assembled eight container assembly, in accordance with an embodiment of the present disclosure. As discussed gaps in the assembly may be provided so as to allow an automatic or manual reach actuation system to lock and/or unlock each fitting connector 103, 104, 105.

Figure 22:
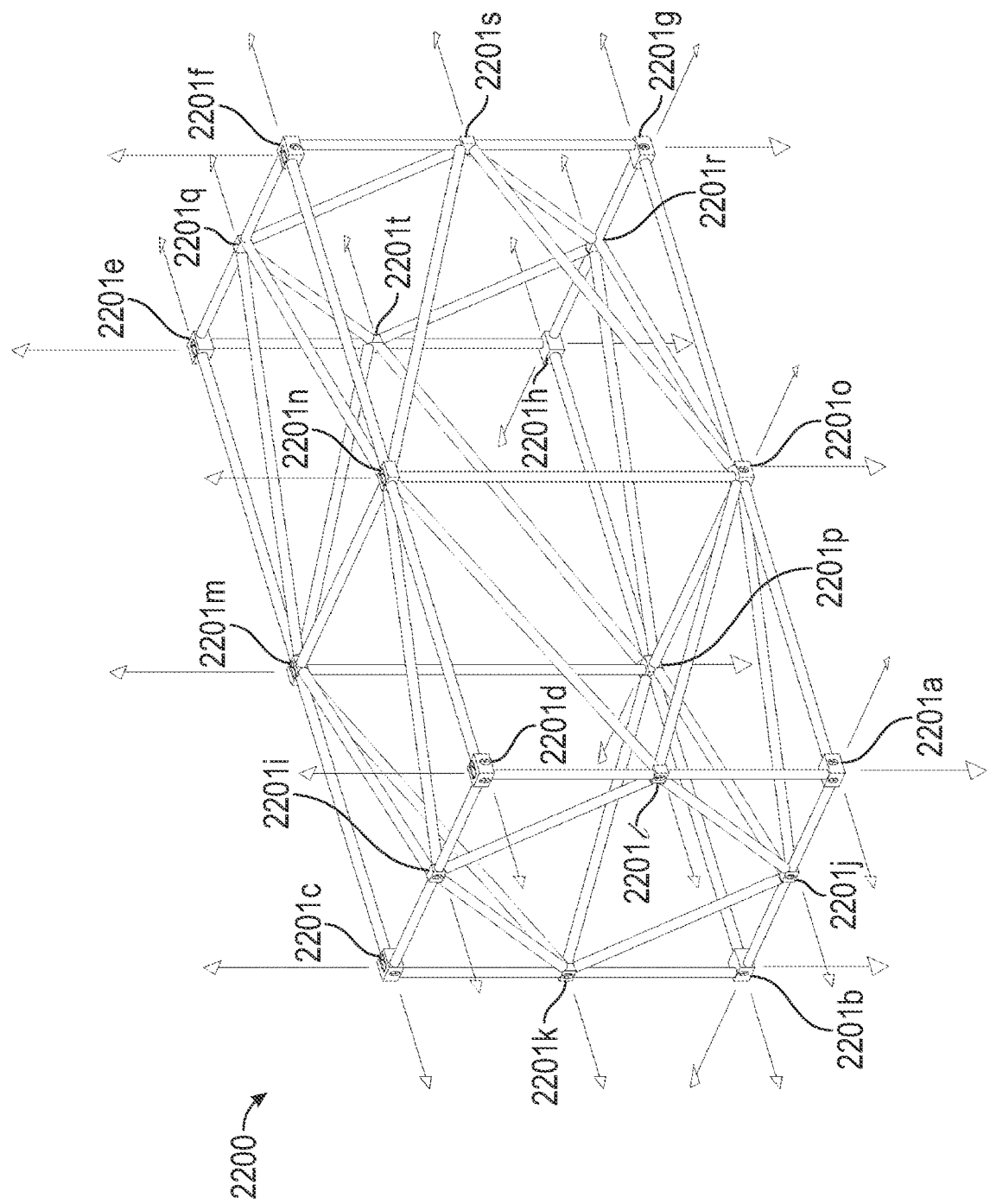
FIG. 22 depicts a perspective view of a truss-type cargo container, according to an embodiment of the present disclosure.

FIG. 22 is a perspective view of a cargo container 2200, according to an embodiment of the present disclosure. The cargo container 2200 represents an alternative embodiment to the cargo container 100 of FIGS. 1A-1B. Rather than having solid walls enclosing the cargo container, the cargo container 2200 has support beams between a plurality of fittings 2201a-t. The plurality of fittings 2201a-t are substantially identical to the fittings 101a-t of FIGS. 1A-1B. As was described with respect to the embodiments disclosed above, in certain embodiments, spine-to-container connections and container-to-container connections may occur only at discrete connection locations, i.e., fittings 101a-t or 2201a-t. This means that the space between the fittings can be anything in terms of geometries, structures, materials, etc., as long as the loads between the fittings and fitting connectors are transferred adequately. It should be understood that fittings, cross-members, and/or support beams can be added as needed based on container size and the cargo to be transported.

Figure 23:
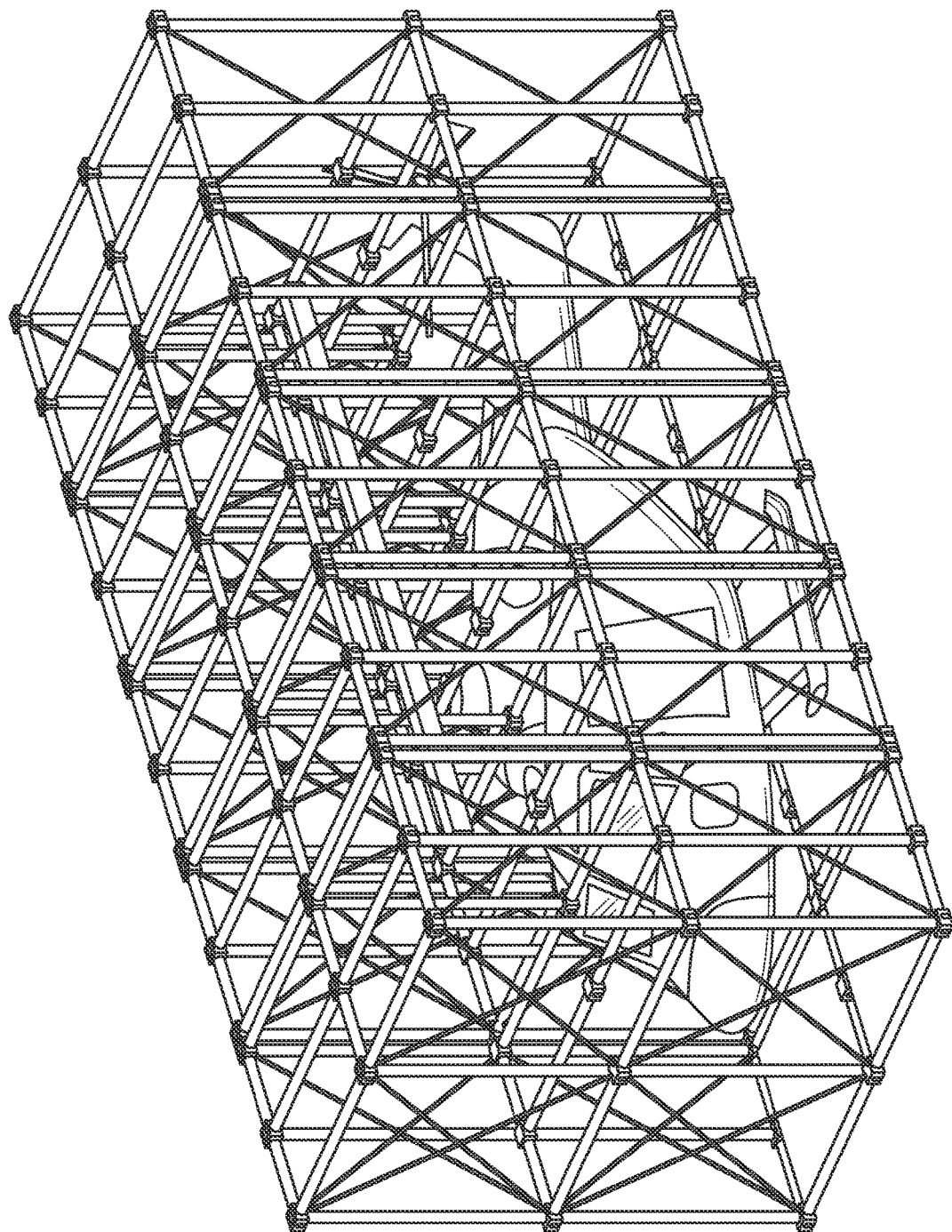
FIG. 23 depicts a perspective view of an example scenario in which a plurality of truss-type cargo containers are combined together and modified to fit an irregularly shaped, large payload, according to an embodiment of the present disclosure.

FIG. 23 depicts an example scenario in which twenty cargo containers have been connected together in a double-wide, double-high configuration in order to fit a helicopter 2304. Support beams connecting the various fittings of the cargo containers have been arranged such that the twenty cargo containers define an inner cavity within which the helicopter can fit. FIGS. 22 and 23 show the flexibility of the system, which includes double-wide and/or double-high container assemblies with one or more center walls or support structures (e.g., support beams) that can be removed. As long as the spine connection locations are met, the container structure and geometry can be almost anything.

This is an advantageous concept, as today's aircraft do not have this ability. By decoupling the payload fuselage section from the aircraft and transmitting all loads via the fittings and fitting connectors, it opens up the ability to customize the structure to a particular payload requirement without affecting the transport vehicle spine.

For instance, consider an example scenario of a transport system (e.g., a cargo aircraft) which has a 120' long spine (such as the spine 2502 of FIG. 25) which has 13 rows of mounts (i.e., fittings, connections, connection points, etc.) and is able to carry twelve 40' containers in a two wide and two tall configuration. If the transport system has a payload capacity of 360,000 lbs., this means that each row of mounts can carry 27,682 lbs. of payload. A tank that weighs 120,000 lbs. would need to connect to (120,000/17,681=4.33) 5 rows of spine mounts. Since, in our example design so far, 13 rows=120', then 5 rows=50'. Thus, a tank that will be carried by our example spine will need a container that spreads its load among 5 rows of mounts. And since a tank may be too wide for one container, it may need to take the entire row of double-wide container mounts/fittings/connections. By decoupling the fuselage load carrying portion of the aircraft (or other transport vehicle), the present disclosure provides for a system where unlimited customization can occur at the container level. No longer will a company have to design an entire aircraft to handle a particular heavy or large load, but instead, they can send a container to a company for modification or even design a new container as long as the connection location can match the spine fitting locations and the loads can be carried from fitting to fitting on the new container design. And since containers are designed to be transported by all land, sea, and air intermodal systems, it is easy to move containers around to be modified. In all cases, air safety factors could be taken into account.

Figure 24:
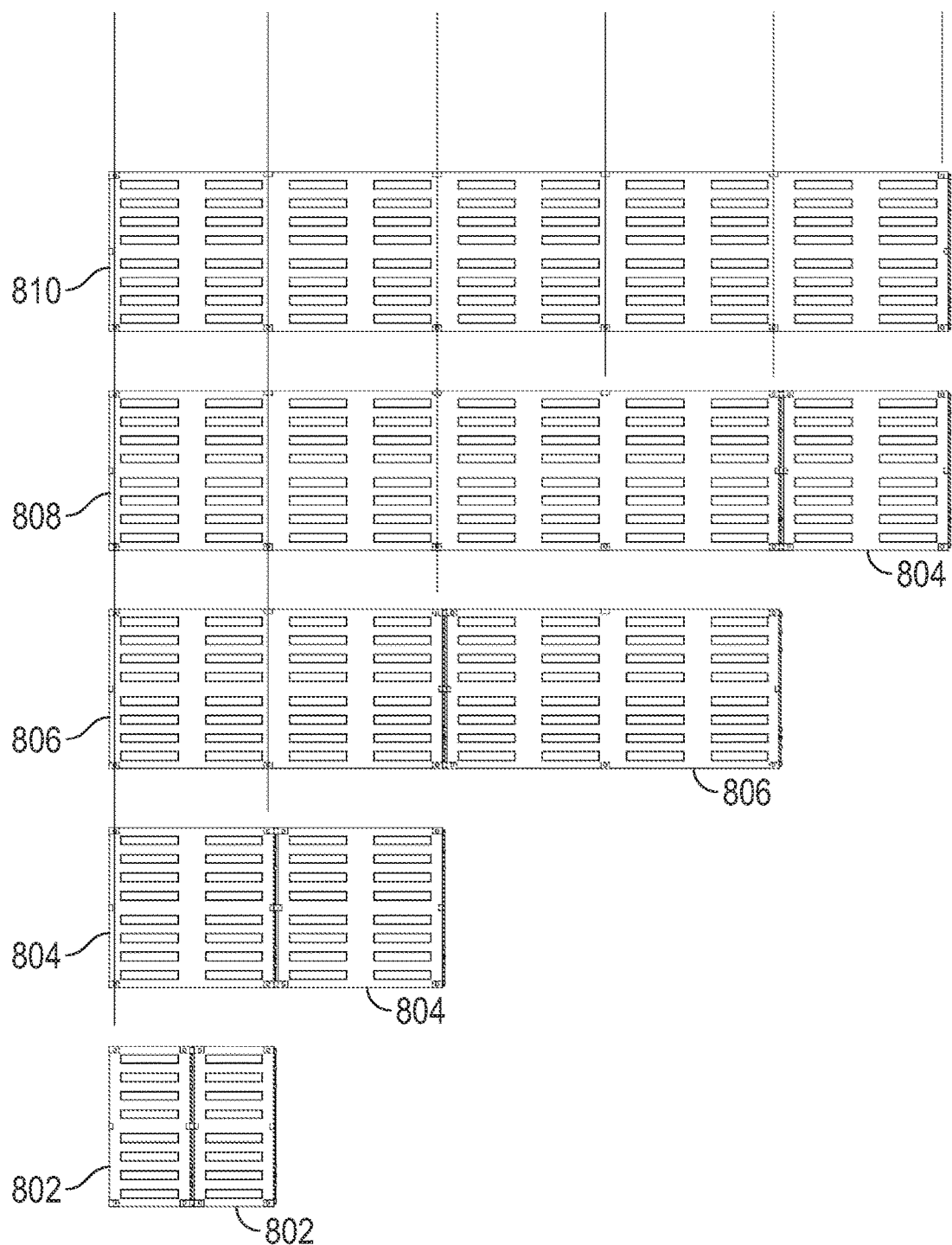
FIG. 24 depicts a side plan view of various configurations of a family of containers having dimensions and connections that allow different sized containers in the family to be connected to each other and to a matching spine, according to an embodiment of the present disclosure.

FIG. 24 depicts a side plan view of various configurations of the family of containers 800 of FIG. 8 connected to one another and to a transport vehicle spine, according to an embodiment of the present disclosure. FIG. 24 shows how a family of different length containers can be connected to each other and to a transport vehicle spine, in accordance with an embodiment of the present disclosure. The depicted embodiment shows a 50' segment of a spine with six rows of mounts (or fittings) located at 0", 109.75", 230.5", 351.25", 472", and 592.75". In other words, spine mounts (or spine fittings, or spine connections) are approximately 10' apart. Each row of mounts can be configured to be secured to corresponding fittings on a container assembly. It should be appreciated that the mount locations depicted in this embodiment, and all other embodiments disclosed herein, represent the location of a center-line with an added tolerance (e.g., a tolerance of +/−0.20" or a tolerance of +/−0.50", etc.). Furthermore, it should be appreciated that the mount locations depicted in the present disclosure are exemplary only, and mount locations can, in various embodiments, be modified without departing from the scope of the present disclosure. In the example embodiment, the spine can accommodate any combination of containers from 0' to 50', such as, for example a family of containers having containers with lengths of 5', 10', 20', 40', and 50' (such as the family of containers 800 of FIG. 8). A top row of FIG. 24 shows a 50' container 810 having six rows of fittings located 10' apart. A second row of FIG. 24 shows a 40' container 808 connected to a 10' container 804 to form a container assembly having the same length as the 50' container 810. A third row of FIG. 24 shows two 20' containers 806 connected to one another to form a container assembly having the same length as the 40' container 808. A fourth row of FIG. 24 shows two 10' containers 804 connected to one another to form a container assembly that has the same length as a 20' container 806. The final row of FIG. 24 shows two 5' containers 802 connected to one another to form a container assembly that has the same length as a 10' container 804. In the depicted example scenario, when a 5' container is used, two of them may need to be connected to emulate a 10' container, since a single 5' container by itself can only connect on one side to the spine.

Figure 25:
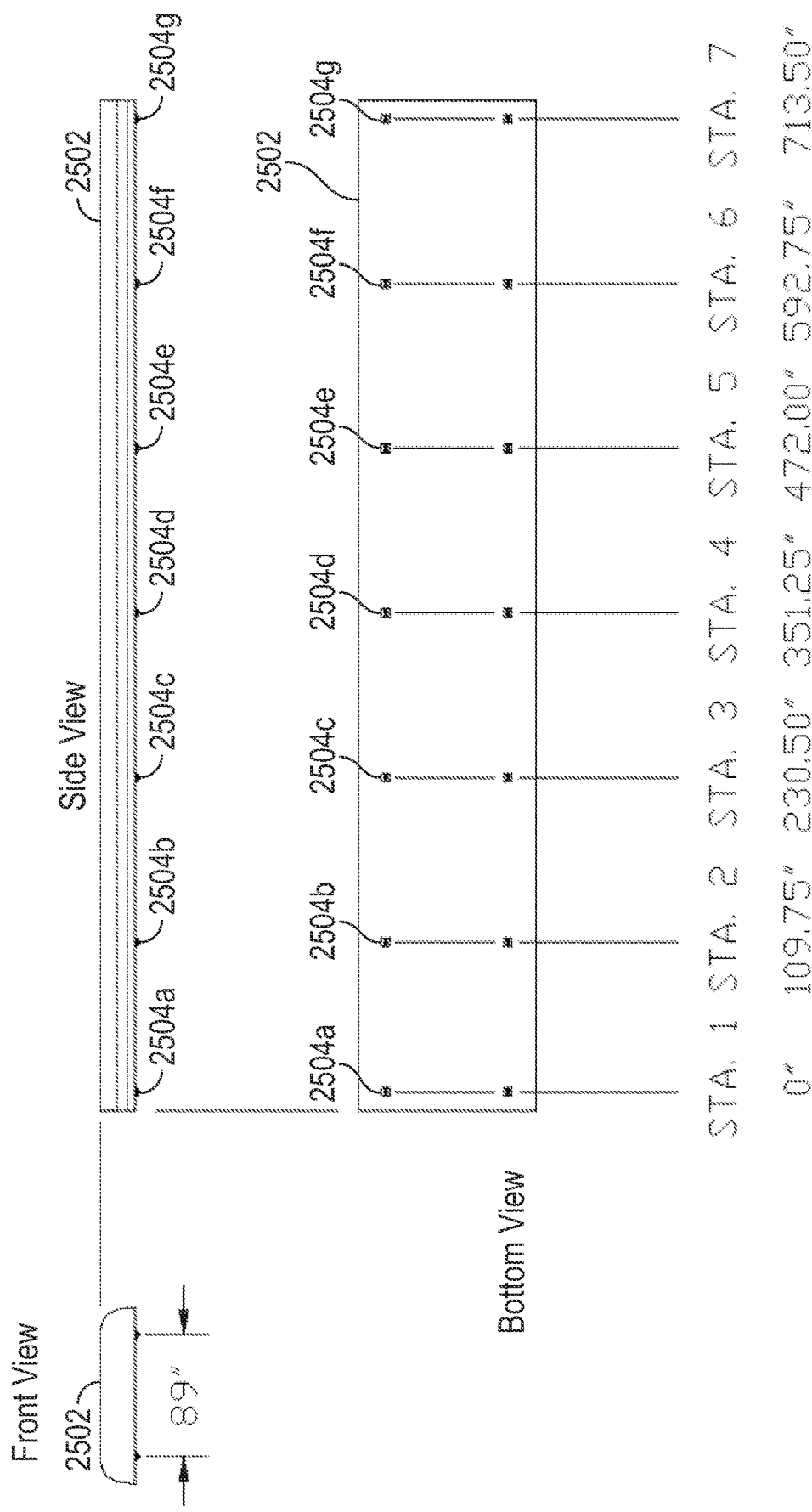
FIG. 25 depicts front, side, and bottom plan views of a single-width transport vehicle spine that matches the connections of the containers in FIG. 24, according to an embodiment of the present disclosure.

FIG. 25 depicts front, side, and bottom plan views of a transport vehicle spine 2502, according to an embodiment of the present disclosure. The spine 2502 may, in certain embodiments, be a 60' segment of a longer spine. The spine 2502, and any other spines, spine assemblies, or spine segments disclosed herein, can, in various embodiments, be incorporated into a transport vehicle, such as an aircraft, a boat, a train, and/or truck, to secure and transport a container assembly comprising one or more containers. As mentioned above, various embodiments of spine cargo transport systems are described in U.S. Pat. No. 7,261,257, issued on Aug. 28, 2007 and entitled CARGO AIRCRAFT; U.S. Pat. No. 7,699,267, issued on Apr. 20, 2010 and entitled CARGO AIRCRAFT; U.S. Pat. No. 8,608,110, issued on Dec. 17, 2013 and entitled CARGO AIRCRAFT SYSTEM; U.S. Pat. No. 8,708,282, issued on Apr. 29, 2014 and entitled METHOD AND SYSTEM FOR UNLOADING CARGO ASSEMBLY ONTO AND FROM AN AIRCRAFT; U.S. Pat. No. 9,493,227, issued on Nov. 15, 2016 and entitled METHOD AND SYSTEM FOR UNLOADING CARGO ASSEMBLY ONTO AND FROM AN AIRCRAFT; and U.S. Patent Publication No. 2014/0217230, filed on Feb. 5, 2013 and entitled DRONE CARGO HELICOPTER, each of which are incorporated by reference as if fully set forth herein.

The spine 2502 is 60' feet long and has seven rows of mounts 2504*a-g*, spaced approximately 10' apart. The spine 2502 is configured to receive cargo containers in a one-container wide configuration. In other words, each row of mounts 2504*a-g* has two mounts which are 89" apart from each other. Each mount is designed to align with a fitting on a top surface of a cargo container, such as fittings 101*d*, 101*c*, 101*n*, 101*m*, 101*e*, 101*f* of the cargo container 100 of FIGS. 1A-1B. In certain embodiments each mount may be configured to receive a fitting connector, such as a fitting connector 105 of FIG. 2, in order to be secured to a corresponding fitting on a top surface of a cargo container. In certain embodiments, each mount may be shaped substantially similarly to one half of a fitting connector, such as the vertical fitting connector 105, so that the mount itself can be inserted directly into a corresponding fitting on a top surface of a cargo connector. Certain example embodiment of spine mounts connected to cargo containers can be found in FIGS. 4A-4B of U.S. Pat. No. 8,608,110, issued on Dec. 17, 2013 and entitled CARGO AIRCRAFT SYSTEM.

In certain embodiments, spines can have additional rows of so that cargo containers can be moved, for example, forwards or backwards, to meet center of gravity requirements. In this way, instead of loads having to be adjusted inside the individual cargo containers, entire cargo containers can be moved forwards or backwards by a few feet or even a few inches in order to adjust center of gravity for an entire transport vehicle. As such, there is much more flexibility to adjust the entire container assembly in relation to the spine. In certain embodiments, spines can have many mounts, and any mounts that are not in use can be retracted. Certain embodiments can include spine mounts on a track that can be adjusted forward and/or backwards to move cargo containers in relation to the spine. Other embodiments can have spine mounts arranged symmetrically such that an entire container assembly (potentially comprising a plurality of containers) can be moved a set amount forward or backwards along a spine.

Figure 26:
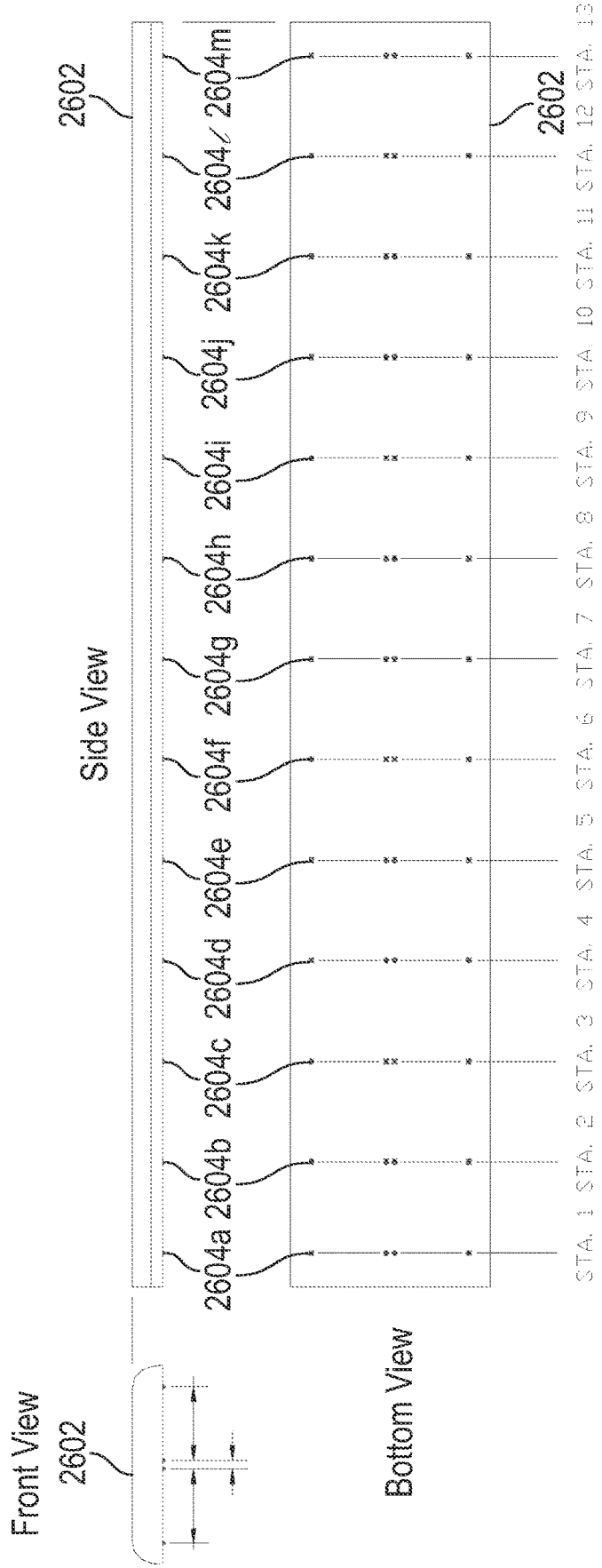
FIG. 26 depicts front, side, and bottom plan views of a double-width transport vehicle spine that connects to the containers of FIG. 24, according to an embodiment of the present disclosure.

FIG. 26 depicts front, side, and bottom plan views of a transport vehicle spine 2602, according to an embodiment of the present disclosure. The spine 2602 is 120' feet long and has thirteen rows of mounts 2604*a-m*, spaced approximately 10' apart. The spine 2602 is configured to receive cargo containers in a double-wide configuration. In other words, each row of mounts 2604*a-m* has two pairs of mounts (4 mounts in each row). Each pair of mounts are 89" apart from each other (to match the width of an ISO cargo container). There is a 10" spacing between adjacent pairs of mounts in a single row, which is based on a 3" thick side-to-side fitting connector 104 and the container corner fittings attachment locations. This spine configuration can accommodate, for example, twelve 40' containers (e.g., containers 808 of FIG. 8) in a two wide by two stack configuration three containers long.

Figure 27:
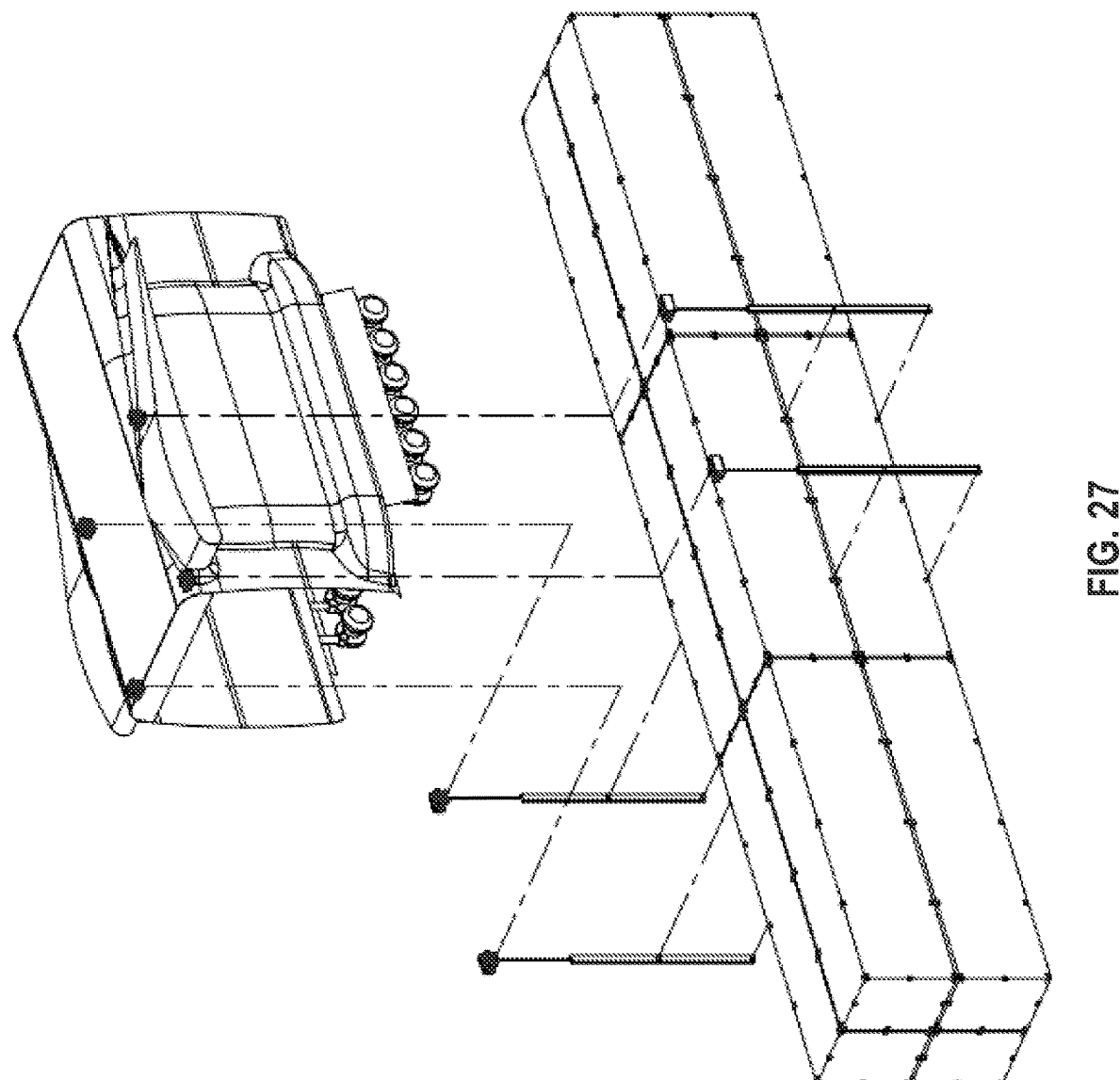
FIG. 27 depicts a perspective view of a container assembly being lifted by a winch assembly, according to an embodiment of the present disclosure.

As there may be scenarios where there is no ground equipment, FIG. 27 shows how a set of winches structurally connected to a center wing box structure can raise or lower a container assembly, in accordance with an embodiment of the present disclosure. The winch system shown in FIG. 27 is shown to engage with two fittings on the container assembly, one on a bottom container and one on an upper container. However, in other embodiments, it may be the case that a single fitting can be engaged. Thus, simple winch systems can be used to lower and raise containers to the spine. For example, if a container assembly is attached to a spine, the winch system can attach to the container assembly, and then unlock the spine mounts securing the container assembly to the spine. The winch system could then lower the containers to the ground. The winch system could then release from the container assembly and retract, and the aircraft can roll way from the container assembly. In the case of a single container on the ground or on a truck, the spine-based aircraft could roll over the container, lower the winch system and attach it to the container. The winch could then raise the container and secure it to the spine of the aircraft. In certain embodiments, the spine can include side tracks that could move the container assembly to the correct position on the spine before locking it in place. In this scenario, the container to container fitting connectors could be on arms that extend from the spine and connect to a first container prior to a second container being loaded on board. Winch locations can vary depending on landing gear configurations and additional ground extendable support structure.

Figure 28:
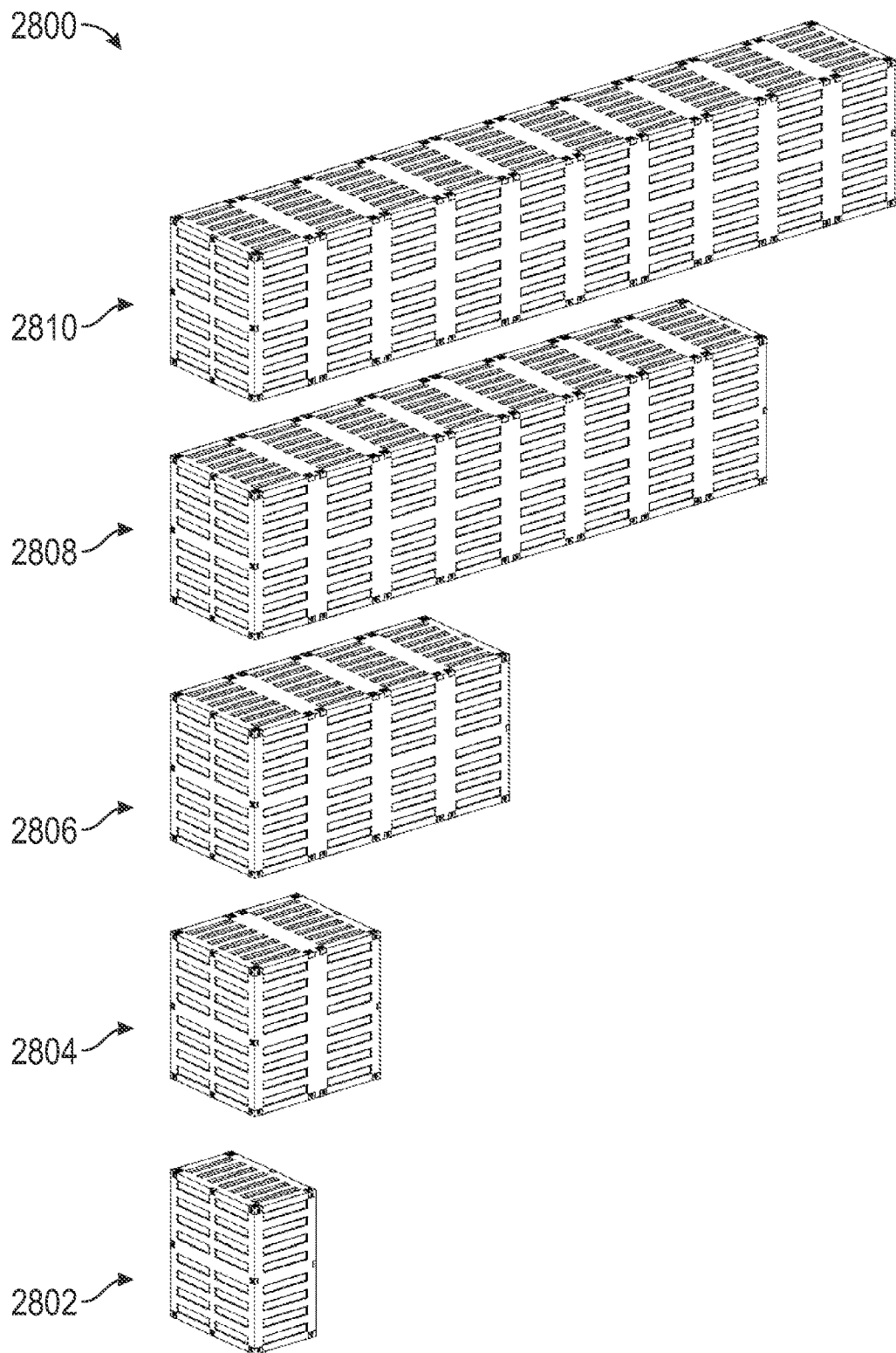
FIG. 28 depicts perspective views of a family of cargo containers with additional fittings, according to an embodiment of the present disclosure

FIG. 28 provides perspective views of a family of cargo containers 2800, according to an embodiment of the present disclosure. The family of cargo containers 2800 includes a 5' container 2802, a 10' container 2804, a 20' container 2806, a 40' container 2808, and a 50' container 2810. It can be seen that the family of cargo containers 2800 are substantially similar to the family of cargo containers 800 of FIG. 8, but each cargo container other than the 5' container 2802 includes additional fitting locations along the length of the cargo container. This design increases redundancy in case of failure of any fitting. This design will also allow a single 5' container 2802 to be connected on both front and back ends to the spine or to other containers.

Figure 29:
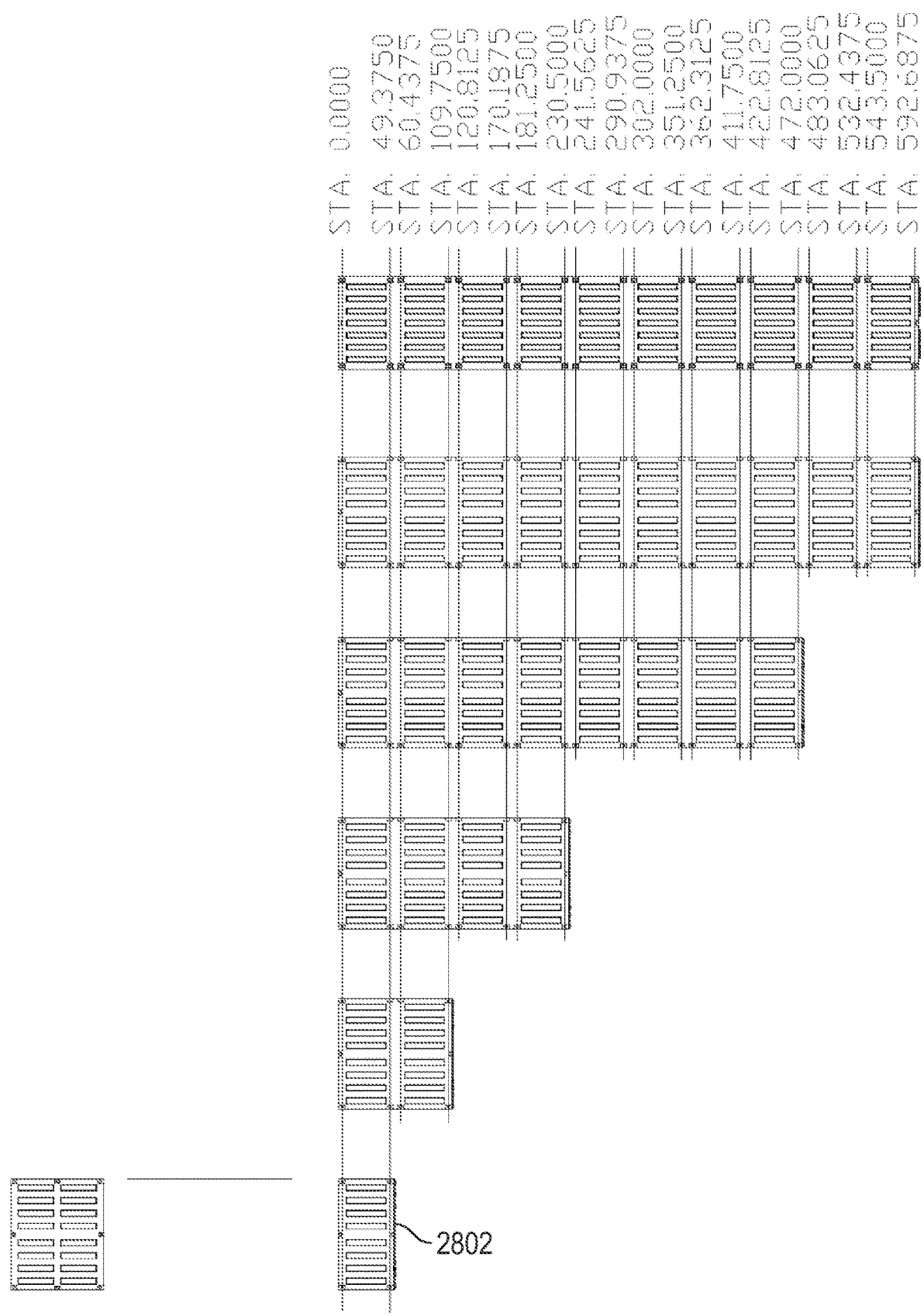
FIG. 29 depicts a side plan view of various configurations of a family of containers connected to one another and to a transport vehicle spine, according to an embodiment of the present disclosure.

FIG. 29 depicts a side plan view of various configurations of the family of containers 2800 of FIG. 28 connected to one another and to a transport vehicle spine, according to an embodiment of the present disclosure. The depicted embodiment shows a 50' spine, similar to FIG. 24. However, rather than having only six rows of mounts 10' apart, the 50' spine in FIG. 29 has 20 rows of mounts. Again, this higher density configuration (1) increases redundancy in case of failure of any fitting, and (2) allows for a single 5' container 2802 to be connected on both front and back ends to the spine or to other containers, among other related advantages.

Figure 30:
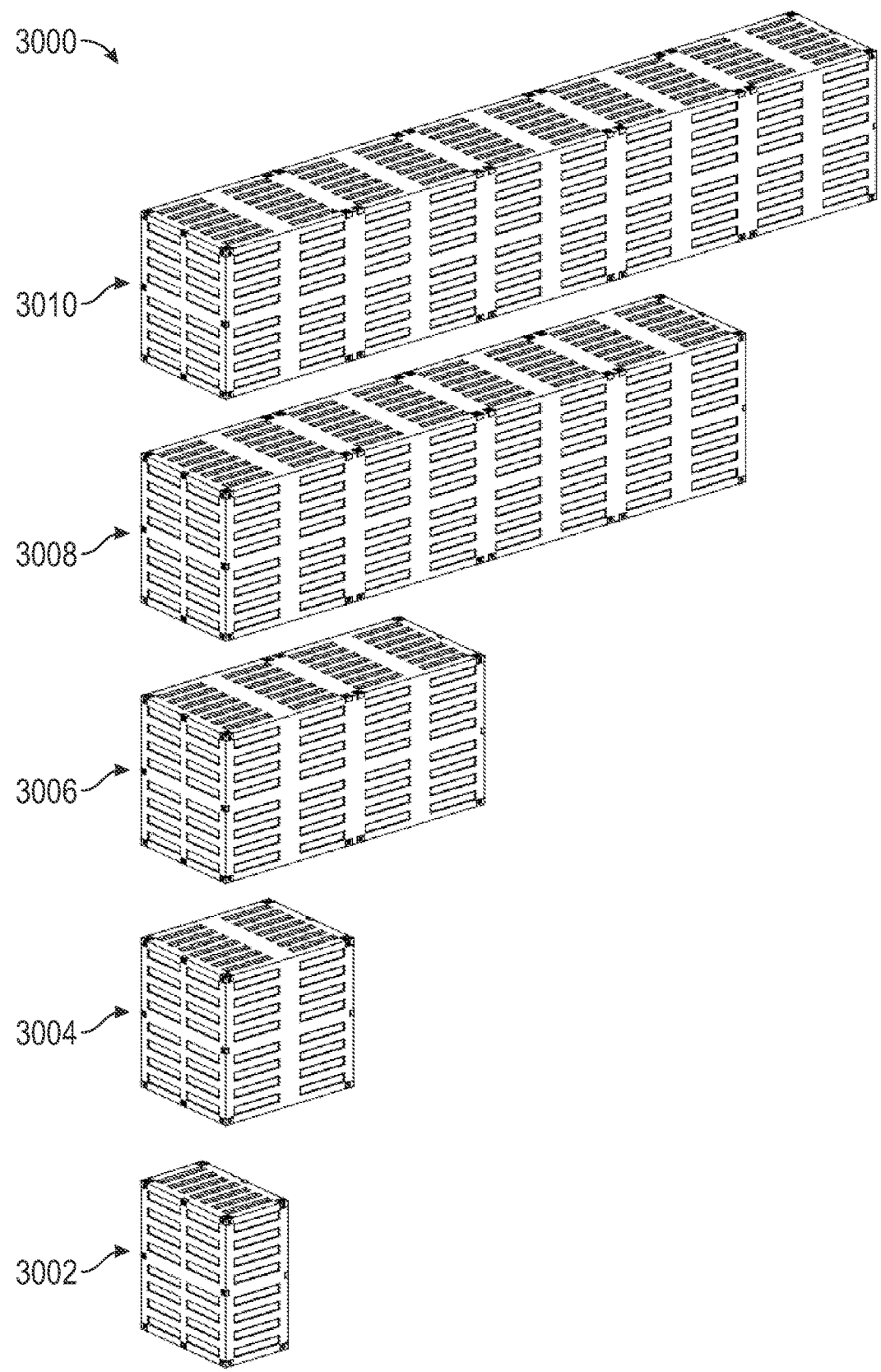
FIG. 30 depicts perspective views of a family of cargo containers, according to an embodiment of the present disclosure

FIG. 30 provides perspective views of a family of cargo containers 3000, according to an embodiment of the present disclosure. The family of cargo containers 3000 includes a 5' container 3002, a 10' container 3004, a 20' container 3006, a 40' container 3008, and a 50' container 3010. It can be seen that the family of cargo containers 3000 are substantially similar to the family of cargo containers 800 of FIG. 8 and the family of cargo containers 2800 of FIG. 28, but the cargo containers 3000 have a greater density of fittings than the cargo containers 800, and a lower density of fittings than the cargo containers 2800.

Figure 31:
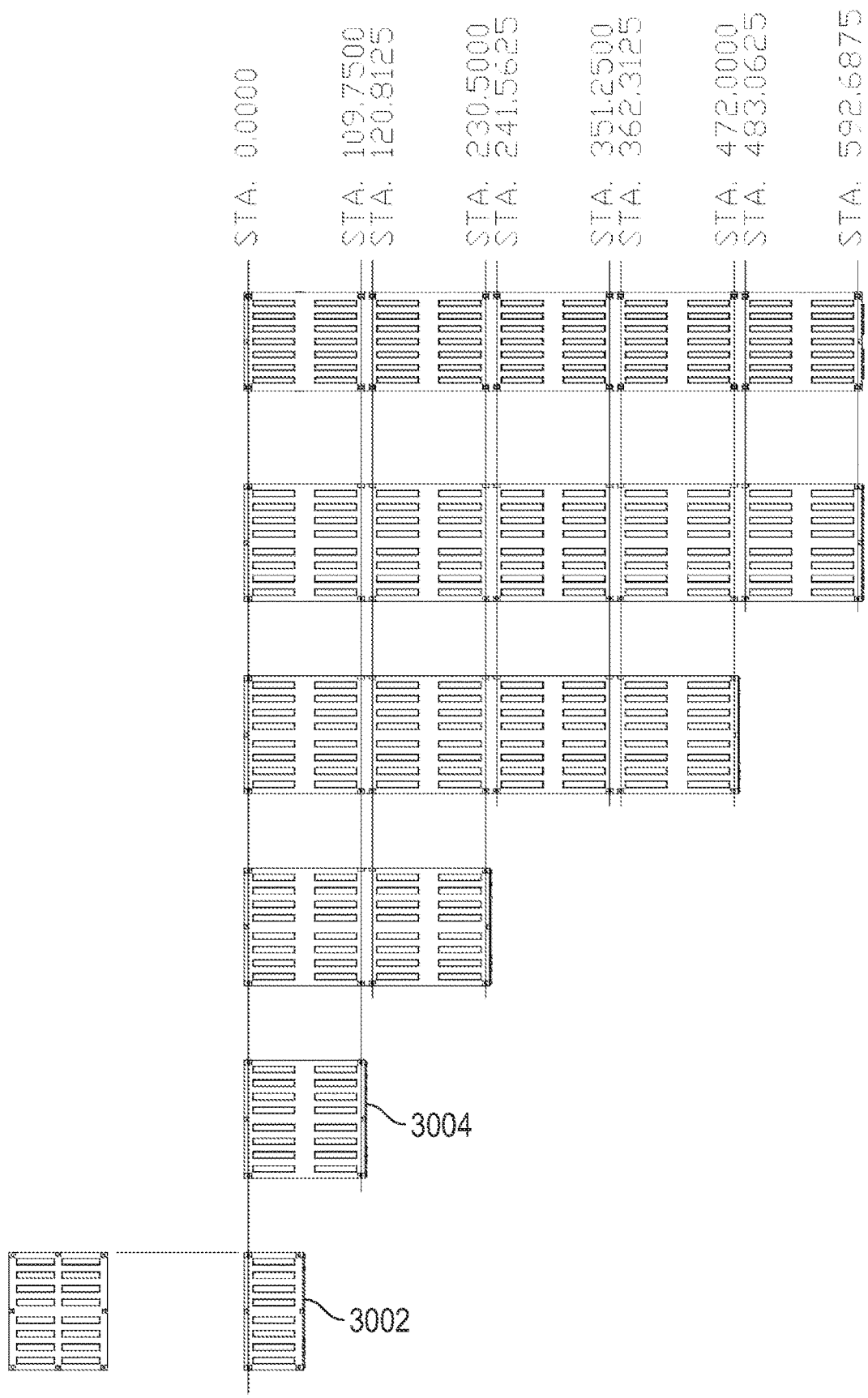
FIG. 31 depicts a side plan view of various configurations of a family of containers connected to one another and to a transport vehicle spine, according to an embodiment of the present disclosure.

FIG. 31 depicts a side plan view of various configurations of the family of containers 3000 of FIG. 30 connected to one another and to a transport vehicle spine, according to an embodiment of the present disclosure. Once again, the depicted embodiment shows a 50' spine, similar to FIGS. 24 and 28. However, rather than having only six rows of mounts 10' apart such as FIG. 24, or 20 rows of mounts such as FIG. 28, the embodiment shown in FIG. 31 has 10 rows of mounts. Similar to the embodiment shown in FIG. 24, this embodiment still requires two 5' containers 3002 to be connected together to form the equivalent of a 10' container, but increases redundancy compared to that equivalent. This, for example, increases redundancy in case of failure of any fitting.

Figure 32:
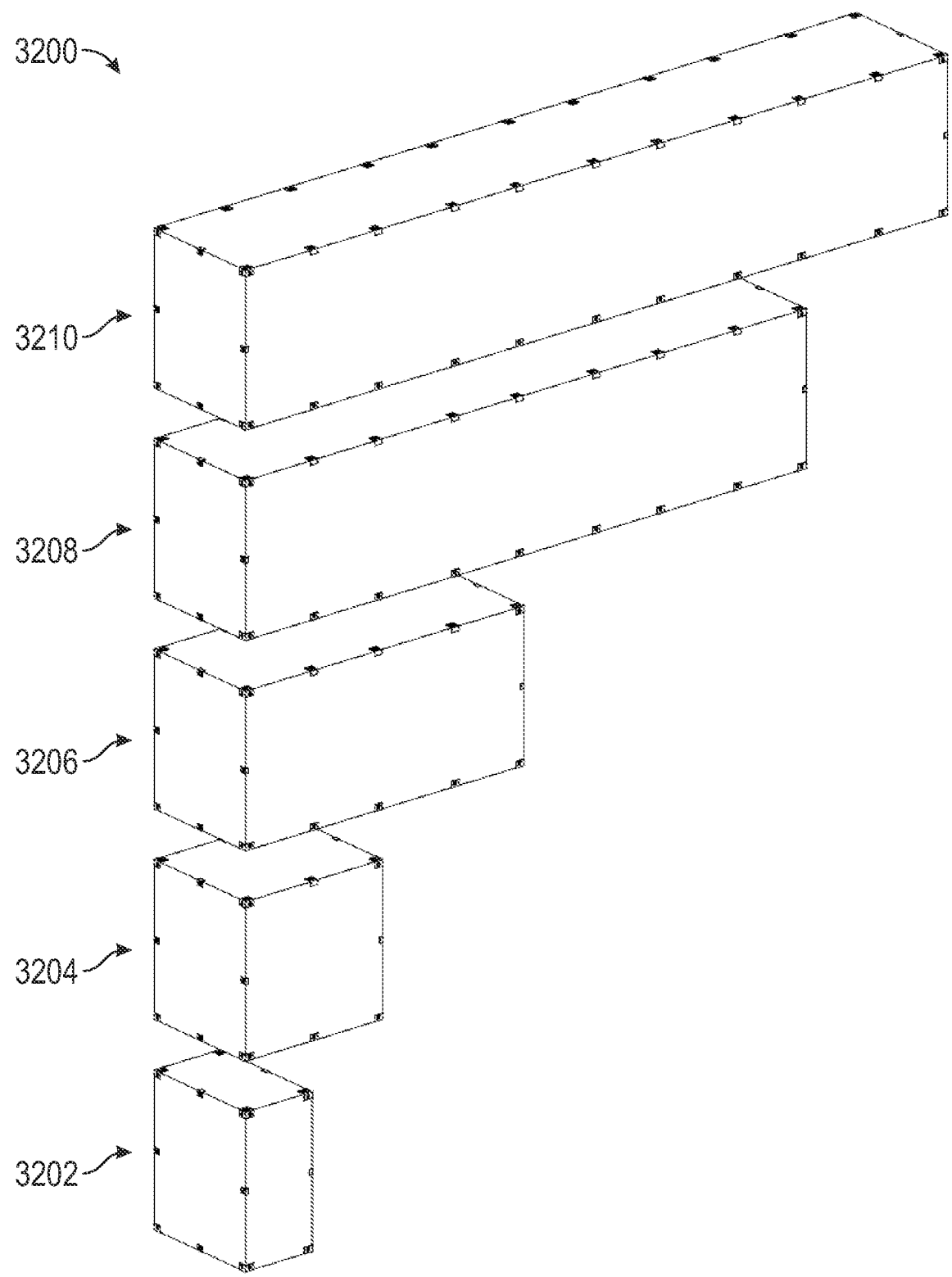
FIG. 32 depicts perspective views of a family of cargo containers, according to an embodiment of the present disclosure
Figure 33:
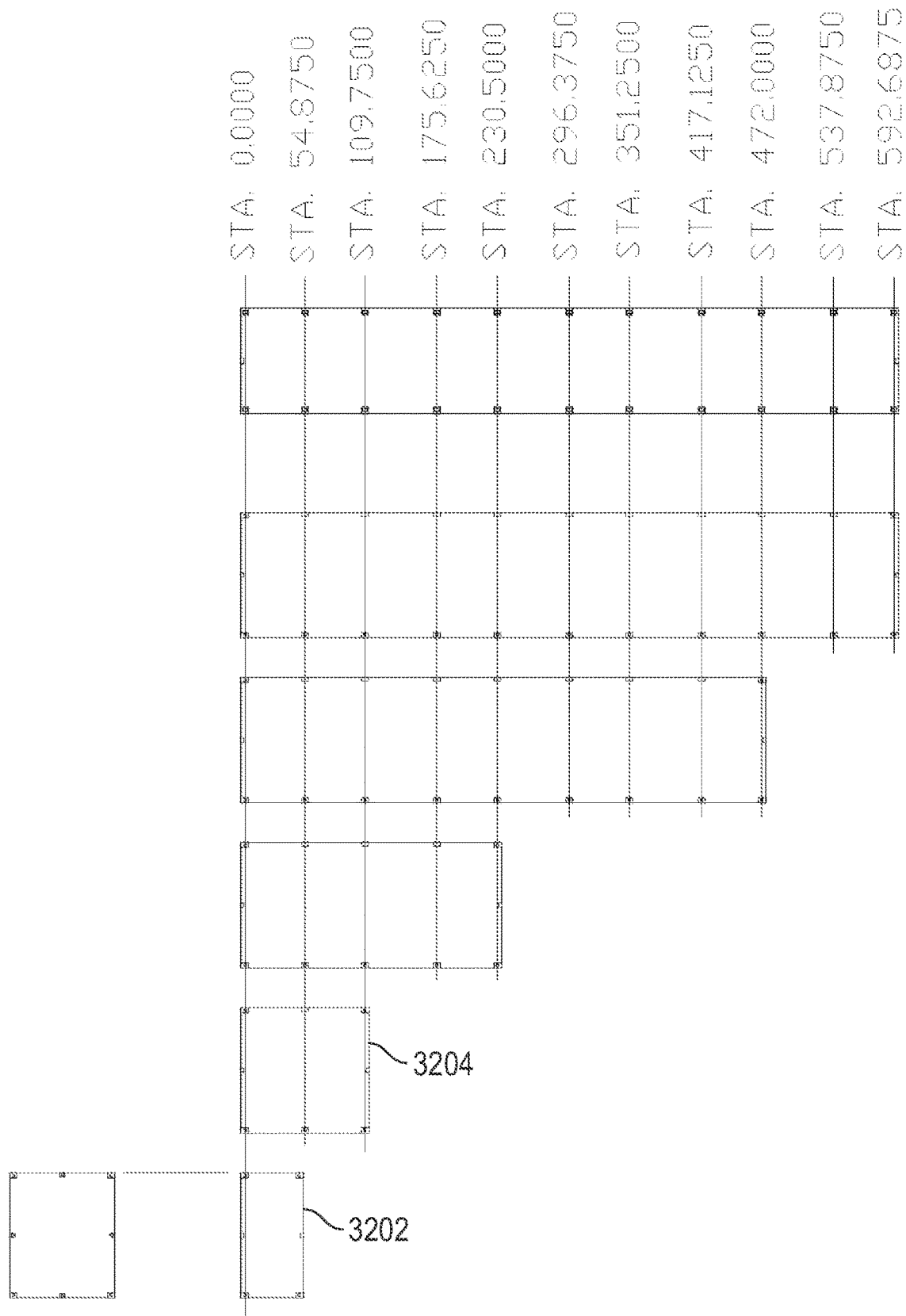
FIG. 33 depicts a side plan view of various configurations of a family of containers connected to one another and to a transport vehicle spine, according to an embodiment of the present disclosure.

FIGS. 32 and 33 illustrate another family of containers 3200 and corresponding fitting locations for a 50' spine to facilitate the family of containers 3202, according to an embodiment of the present disclosure.

Now that it has been demonstrated how cargo containers can be connected together, various example scenarios are presented in which containers with some walls removed can be connected together to provide a larger payload area, e.g., two containers wide and two containers tall. Different length containers can be created by attaching different types to containers, such as a 40' long container and a 20' long container to make a 60' long combined container. In certain embodiments, containers may have additional connections between them and bracing in their structure to account for missing/removed walls.

Figure 34A:
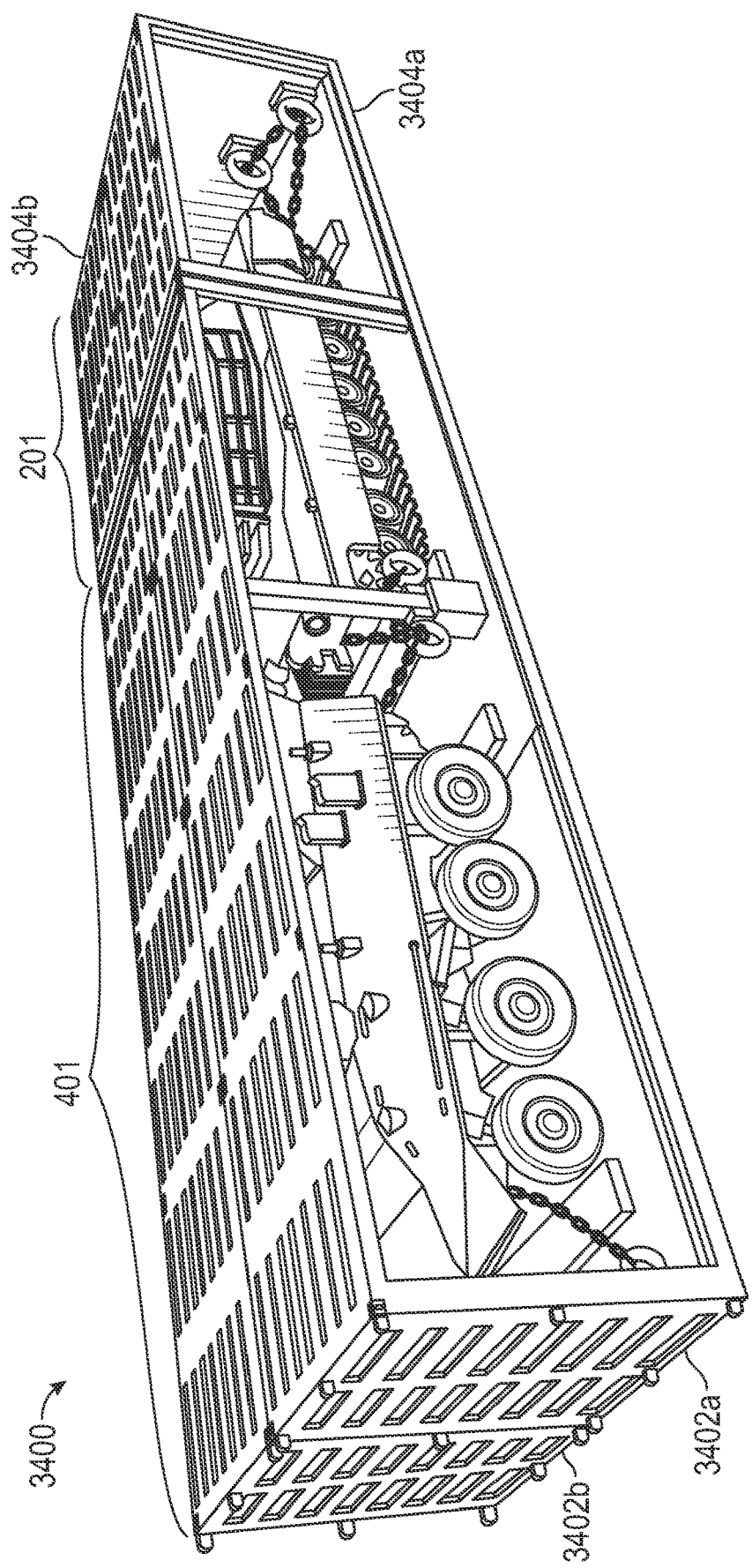
FIGS. 34A and 34B depict perspective views of an example scenario in which a container assembly houses oversized cargo with one set of sidewalls removed to allow a clearer view of the cargo, according to an embodiment of the present disclosure.
Figure 34B:
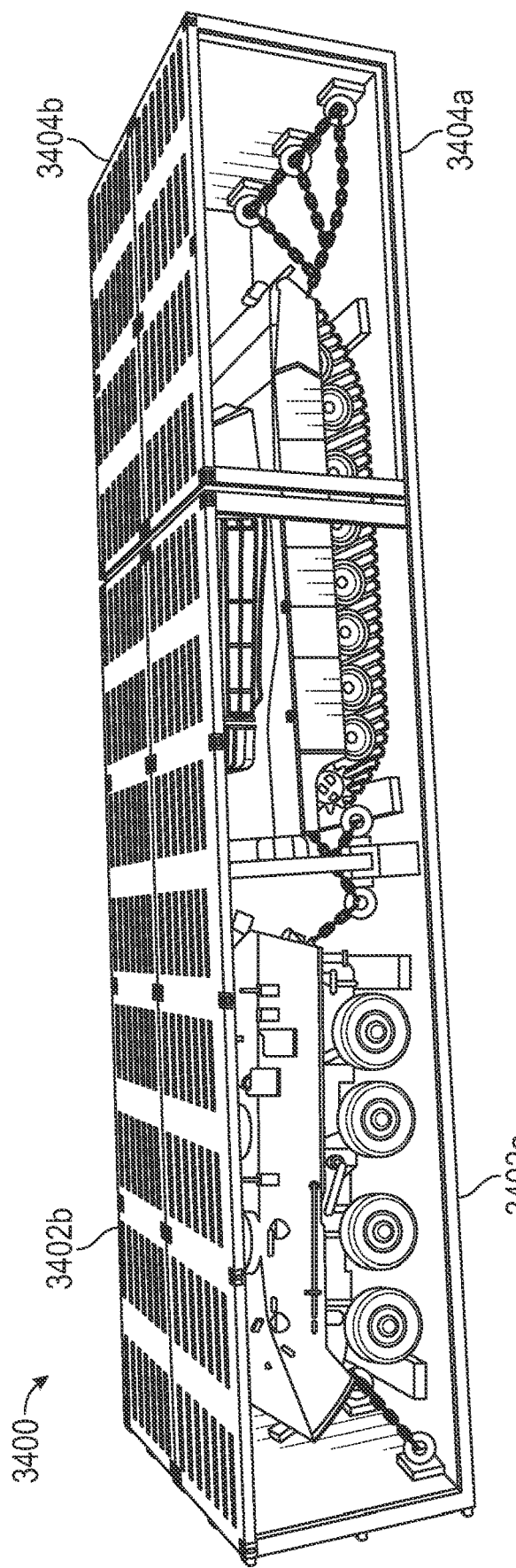

FIGS. 34A and 34B depict an example scenario including a specially constructed container assembly 3400, in accordance with an embodiment of the present disclosure. The container assembly 3400 has been constructed by combining two 40' containers 3402a-b and two 20' containers 3404a-b. Each container 3402a-b, 3404a-b is 9'6" high and 8' wide. All of the interior walls have been removed in order to create an interior cavity measuring 60'×16'×9'6". One set of exterior walls have been removed in the figures in order to depict the contents of the container assembly 3400. In this case, an M1A1 Abram tank and a USMC LAV-R system are shown loaded and ready to transport.

Figure 35A:
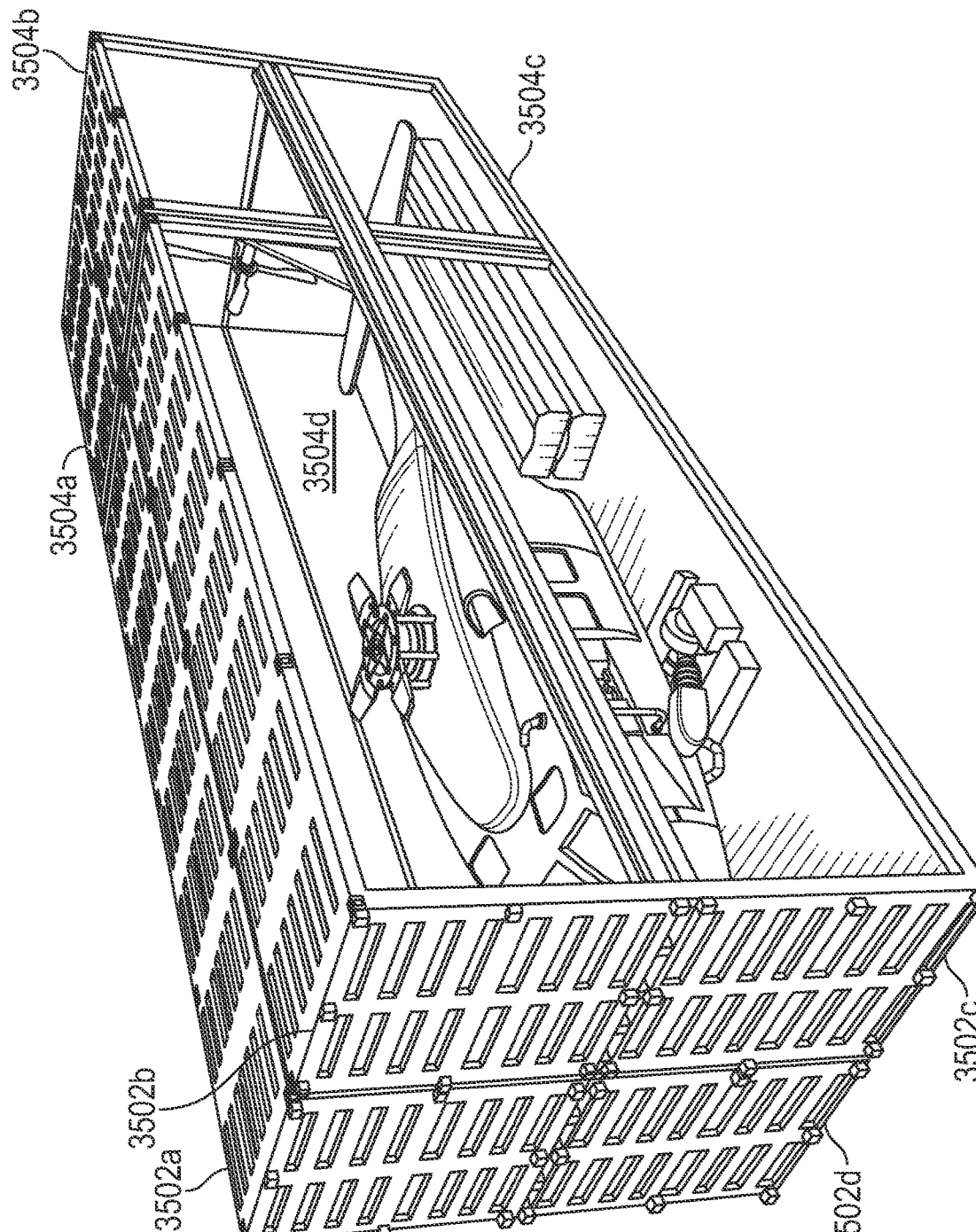
FIGS. 35A and 35B depict perspective views of an example scenario in which a container assembly houses oversized cargo with one set of sidewalls removed to allow a clearer view of the cargo, according to an embodiment of the present disclosure.
Figure 35B:
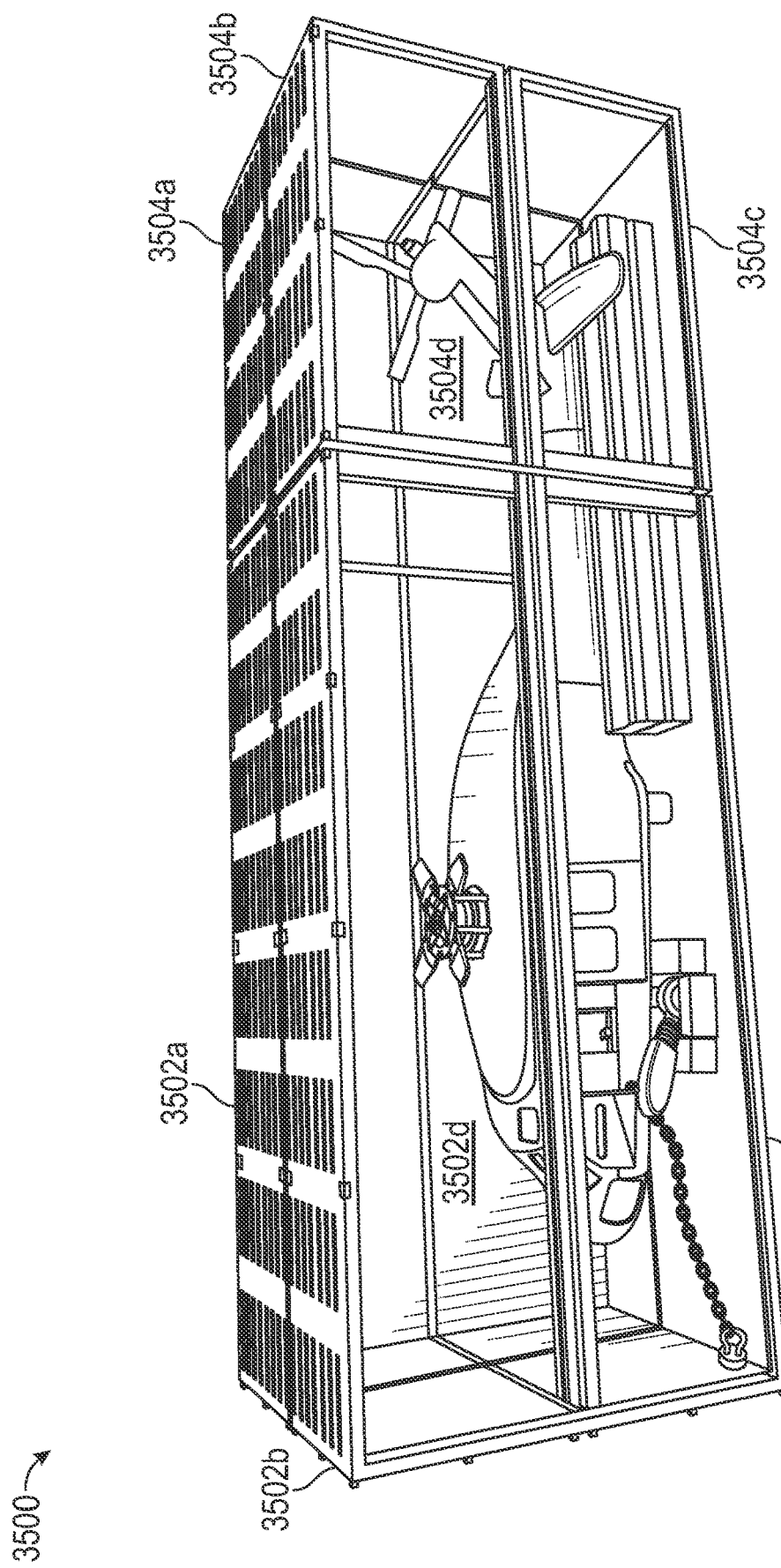

FIGS. 35A and 35B depict an example scenario including a specially constructed container assembly 3500, in accordance with an embodiment of the present disclosure. The container assembly 3500 includes four 40' containers 3502a-d and four 20' containers 3504 a-d joined together. The container assembly 3500 is equivalent to two of the container assemblies 3400 of FIGS. 34A-34B stacked on top of one another to create a double high, double wide, 60' long container. Once again, all interior walls have been removed in order to create an interior cavity measuring 60'×16'×19'. One set of exterior walls have been removed in the figures in order to more clearly depict the contents of the container assembly 3500. The container assembly 3500 is holding a UH-60 Blackhawk helicopter, again demonstrating the flexibility of this system compared to today's existing aircraft technology.

Figure 36A:
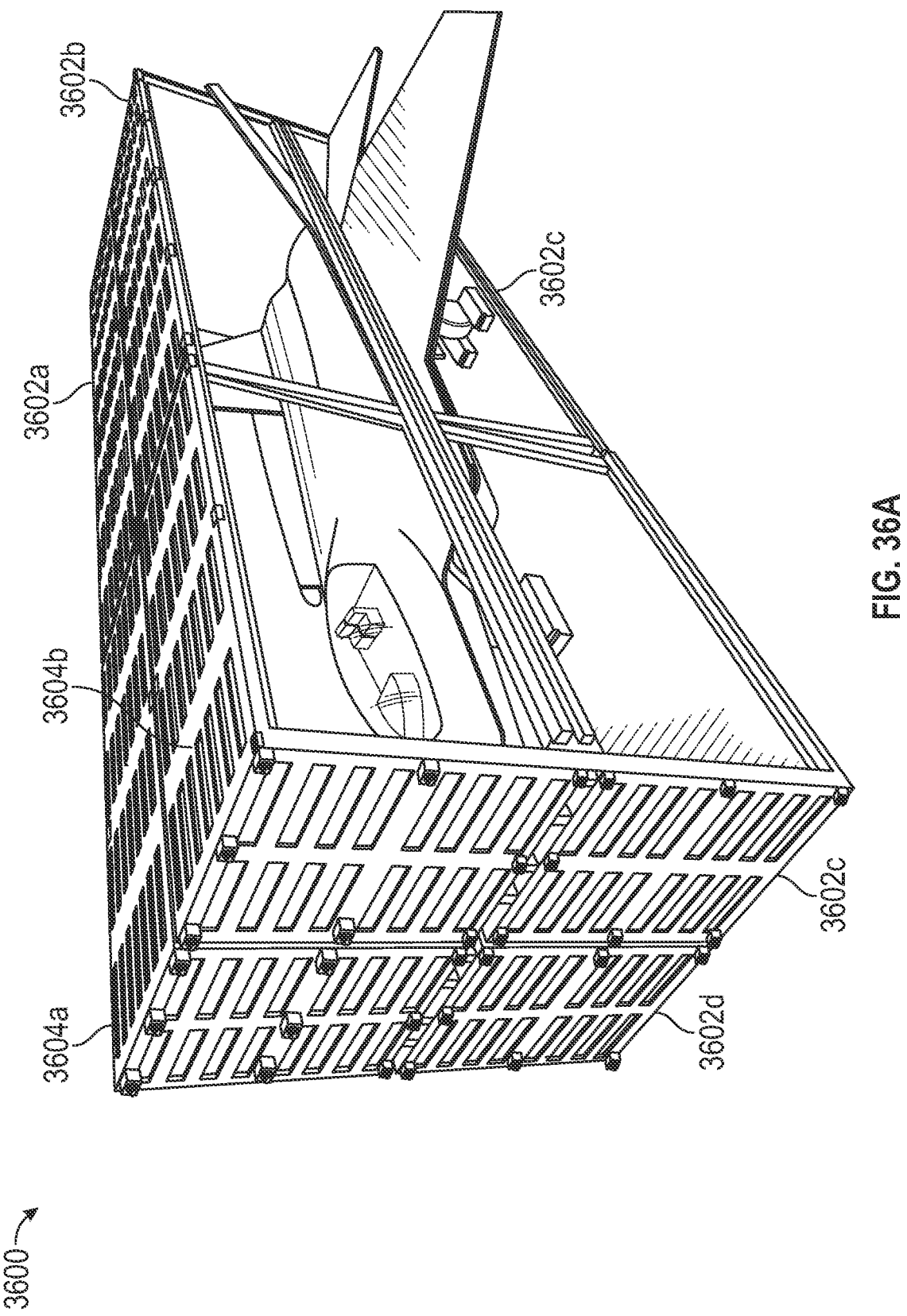
FIGS. 36A and 36B depict perspective views of an example scenario in which a container assembly houses oversized cargo with one set of sidewalls removed to allow a clearer view of the cargo, according to an embodiment of the present disclosure.
Figure 36B:
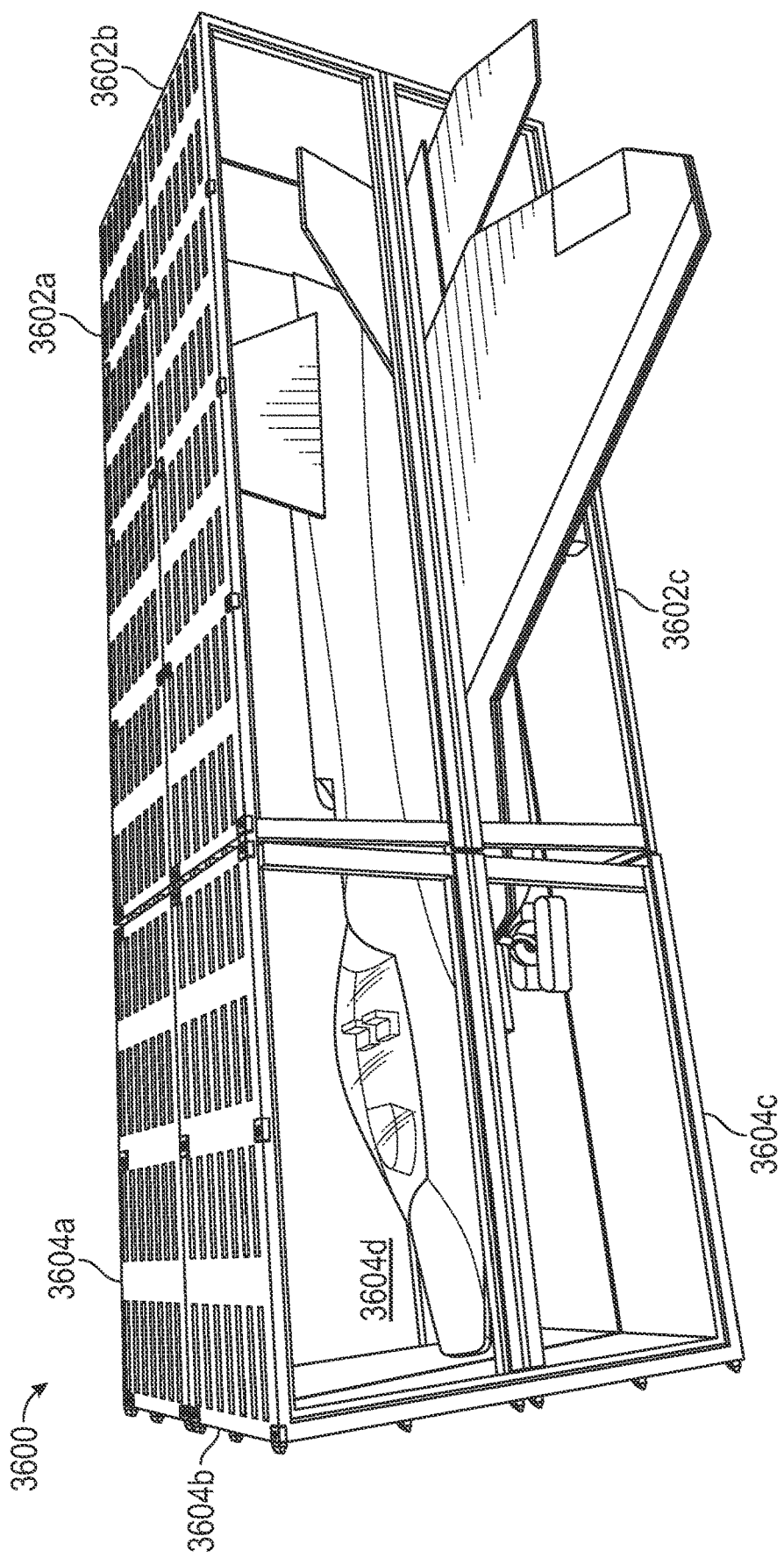

FIGS. 36A and 36B depict an example scenario including a specially constructed container assembly 3600, in accordance with an embodiment of the present disclosure. The container assembly 3600 includes four 40' containers 3602a-d and four 20' containers 3604 a-d joined together. The container assembly 3600 is equivalent to the container assembly 3500 of FIGS. 35A-35B. Once again, all interior walls have been removed in order to create an interior cavity measuring 60'×16'×19'. The container assembly 3600 is housing an F-22 Jet fighter to demonstrate an oversized payload with wings extending outside the container assembly 3600. Any oversized load can be accommodated as long as the parts that extend outside the fuselage do not interfere with transport (e.g., do not interfere with landing gear structure on a transport aircraft). In certain embodiments, any protruding portion of the payload that extends outside of the container can be covered by an aerodynamic fairing or other covering. For example, in the case of the F-22 fighter shown in FIGS. 36A AND 36B, a fairing may act not only to provide some cover and protection to the payload, but also to prevent any lift added by the protruding wing.

In various embodiments, spines can be made for fixed wing systems, rotary wing systems, and multi-rotor systems. In various embodiments, spines can also be made for non-aircraft transport, such as ships, trucks, and/or trains. Containers can even be developed to become drone mother ships, or specialized truck bodies, or any other requirement.

As the disclosed containers are standardized to existing intermodal infrastructures, full logistics capabilities are available. Products can ship via any mode of transportation (including ground, sea, and air) including switching en route between any of the modes, essentially, finding the cheapest cost and fastest delivery via all combinations of available intermodal capacities.

For civilian markets, the presently disclosed technology opens up the ability to go point to point instead of hub and spoke by allowing the use of cross-docking technology instead of requiring gigantic sorting and fulfillment centers. Whereas today, a letter shipped from Los Angeles to Seattle may have to travel to a sorting facility in Memphis, the presently disclosed technology would allow multiple transfers if necessary between different modes of transportation without requiring the need to visit a sorting facility. In addition, training of personnel with containers is greatly reduced and as automation continues to expand, automated filling and emptying of standard containers would be significantly improved compared to conventional approaches.

Various embodiments of the present disclosure also provide for the ability to have electrical and data communication connections between the various spine systems and container systems to expand the functionality of modular containers. For example, using the power and/or data connections on a container and/or a spine, the container could become a radar system of an aircraft, and a separate container could become an air to air weapon system of the aircraft, or a container could be heated, cooled, or pressurized, etc. Thus, different containers within a single container assembly and/or attached to the same spine assembly can have different environmental conditions on the same aircraft.

In certain embodiments, spines configured to connect to one or more containers may be configured with the ability to connect to individual containers via one or more power and/or data probes. In the figures discussed below, an example of a single wide spine design is demonstrated with the addition of separate power and data connection systems. In this case, the power and data probes/connections from the spine can extend into one or more connected containers as needed. Thus, containers that do not need any power or data connections do not need to have their associated probes extended from the spine. Some containers may need just a data connection while others may need just power connections while others may need both power and data connections. Examples of containers requiring only data connections may include temperature sensors or pressure sensors or similar sensors that a customer has requested records on during a particular flight segment. A container that may require only a power connection may be a specialized unit for which a company owning the container has specified no other requirements. In certain embodiments, spines can be configured to house fuel, electrical equipment, controls, and data distribution systems, among others.

Figure 37:
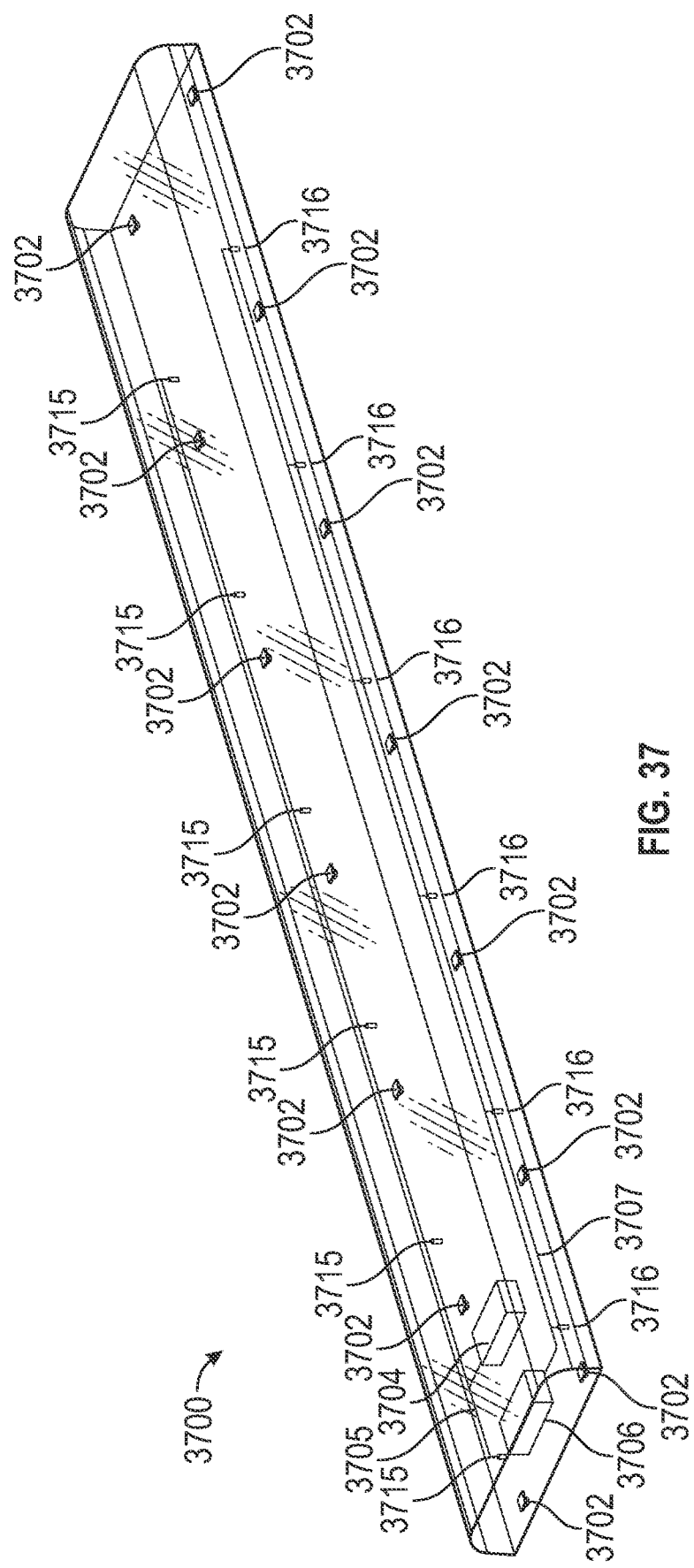
FIG. 37 depicts a perspective view of an example single container wide spine assembly, according to an embodiment of the present disclosure.

FIG. 37 depicts a spine 3700, according to an embodiment of the present disclosure. The spine 3700 is similar to that shown in FIG. 25, essentially a one container wide spine that is 60' feet long with seven rows of mounts spaced approximately 10' apart. The spine 3700 includes seven rows of mounts, with each row comprising a pair of mounts 3702. Each mount 3702 is configured to be inserted into a corresponding fitting on a top surface of a container, and then rotate into a locked position to secure the container to the spine 3700. In certain embodiments, each mount 3702 can be rotated between a locked position and an unlocked position via electronic controls installed in the spine 3700 to secure and release containers.

The spine 3700 includes a data distribution system 3704, a plurality of data probes 3715, and a data transmission line 3705 for transmitting instructions between the data distribution system 3704 and the plurality of data probes 3715. The spine 3700 also includes a power distribution system 3706, a plurality of power probes 3716, and a power transmission line 3707 for transmitting power between the power distribution system 3706 and the plurality of power probes 3716. In certain embodiments, each data probe 3715 and power probe 3716 can be retractable and/or extendable so that only a selected subset of containers are connected to the data and/or power distribution systems 3704, 3706. Data and power distribution systems in the spine may be implemented using wire, fiber optics, or even integrated in the materials of the spine or any other media that can provide the function of the power and or data distribution systems. In various embodiments, a spine can have a number of power probes and a number of data probes equal to a maximum number of containers that can be connected to the spine. For example, the spine 3700 has seven rows of mounts, and can connect to a maximum of six containers. As such, the spine 3700 has six data probes 3715 and six power probes 3716.

In certain embodiments, once a container assembly is mated to the spine, data can either be entered, transmitted, and/or programmed into an aircraft's flight or mission parameters and the spine can extend the necessary probes into the containers of the container assembly. Automated checks can be performed to assure proper connections have occurred and that systems are functional.

Figure 38:
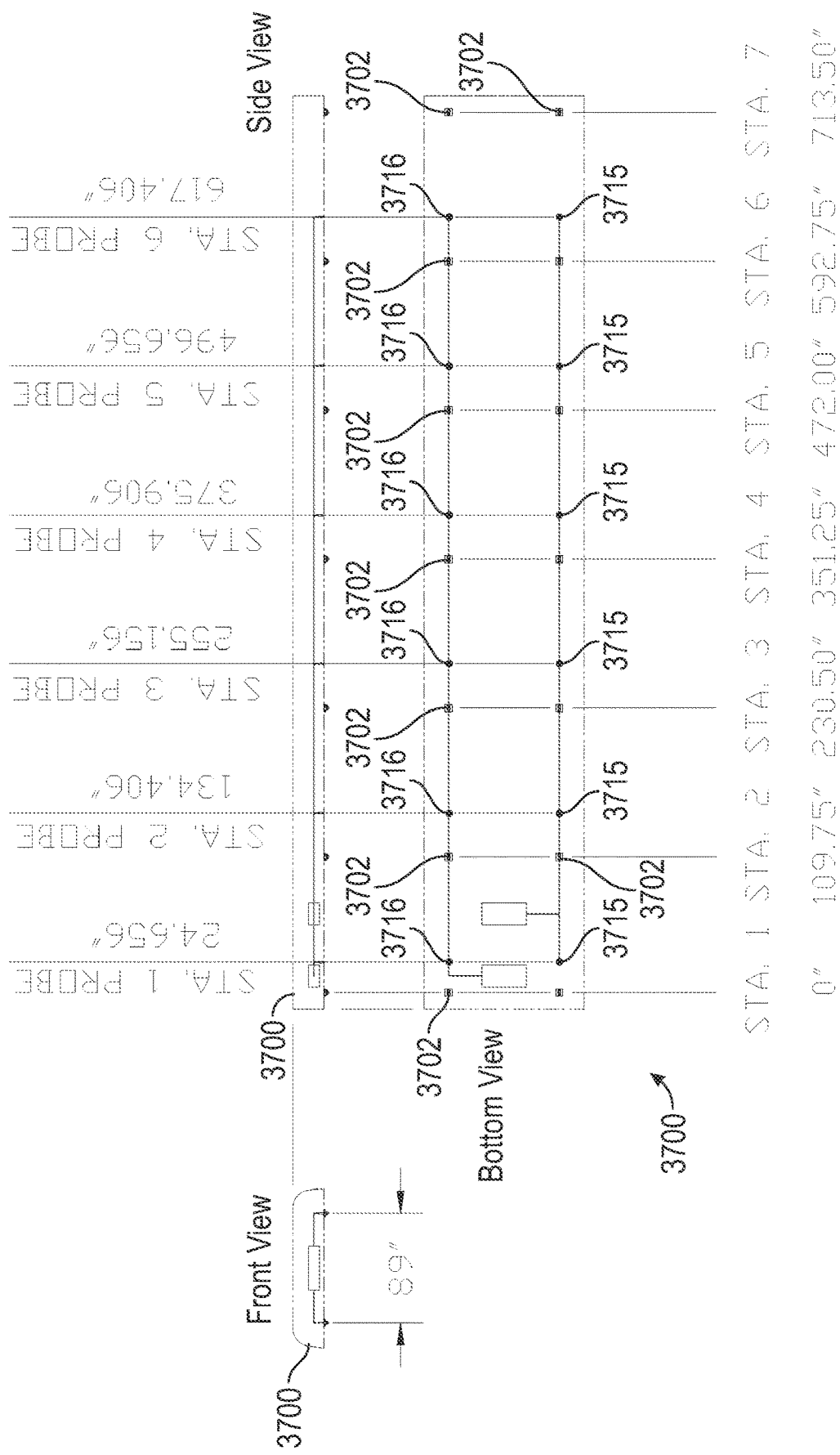
FIG. 38 depicts front, side, and bottom profile views of the spine assembly of FIG. 37, according to an embodiment of the present disclosure.

FIG. 38 provides front, side, and bottom profile views of the spine 3700, according to an embodiment of the present disclosure. FIG. 38 more clearly depicts the positions of the mounts 3702, the data probes 3715, and the power probes 3716. In this example embodiment, the data network runs on one side of the spine 3700 and the power network runs on the opposite side.

Figure 39:
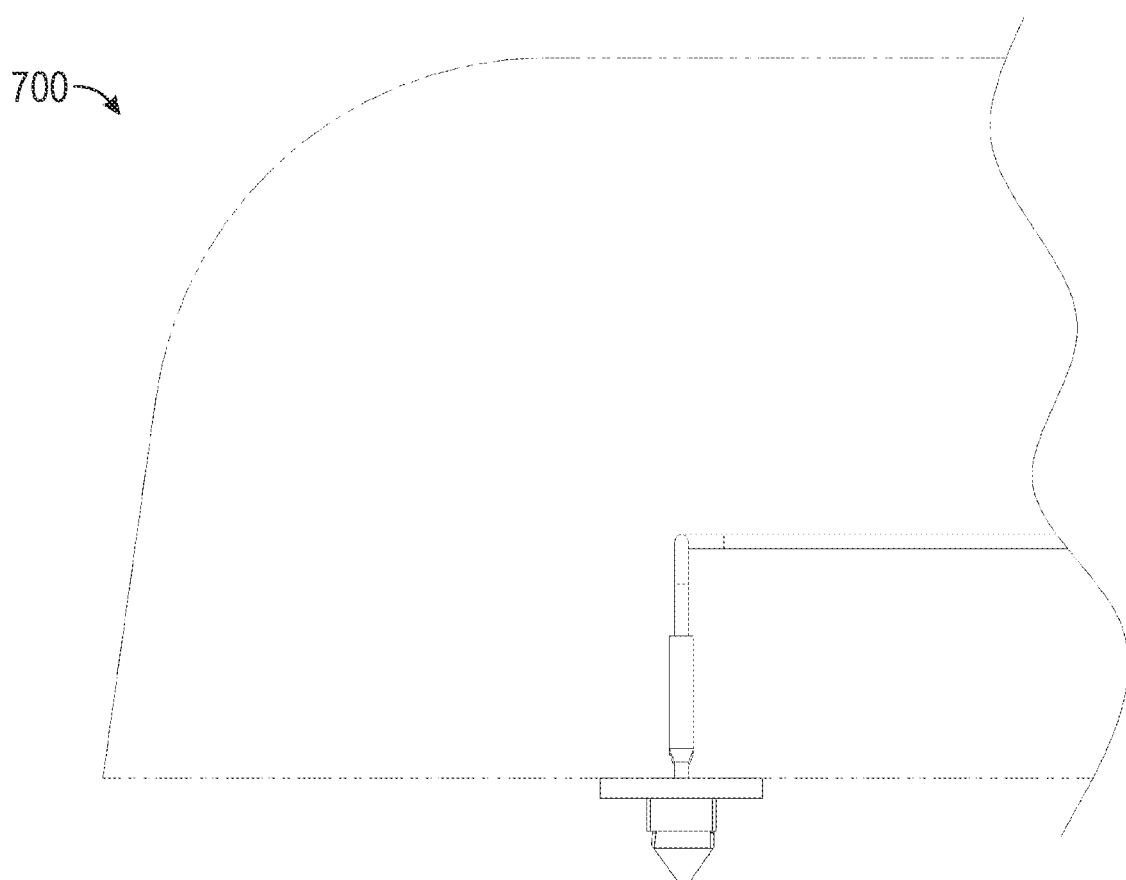
FIG. 39 depicts a close-up view of a data transmission and/or power probe of the spine assembly of FIG. 37, according to an embodiment of the present disclosure.

FIG. 39 demonstrates how the probes, both power and data, can extend below and retract above the spine-container mating surface, according to an embodiment of the present disclosure. In certain embodiments, the probes can also be in-line with the fitting connectors on the spine 3700 so that the probes match corresponding receptacles on attached containers. In other embodiments, the probes can extend and connect on the side of the containers to avoid having upper surfaces that may have a tendency to collect foreign object matter.

In various embodiments, each container in a container assembly can connect to at least one other container in the container assembly via data and/or electronic probes. Containers in a container assembly may also be daisy chained with one another such that data and/or power can be transmitted from one container to another, and containers can communicate with one another. Furthermore, in addition to direct connections between containers, containers may be connected through the spine, such that damage to any container or container connections can be circumvented by transmitting power or data through the spine. For example, in scenarios in which there is in-flight damage, data and power connections can be re-routed between container-to-container and/or container-to-spine.

Figure 40:
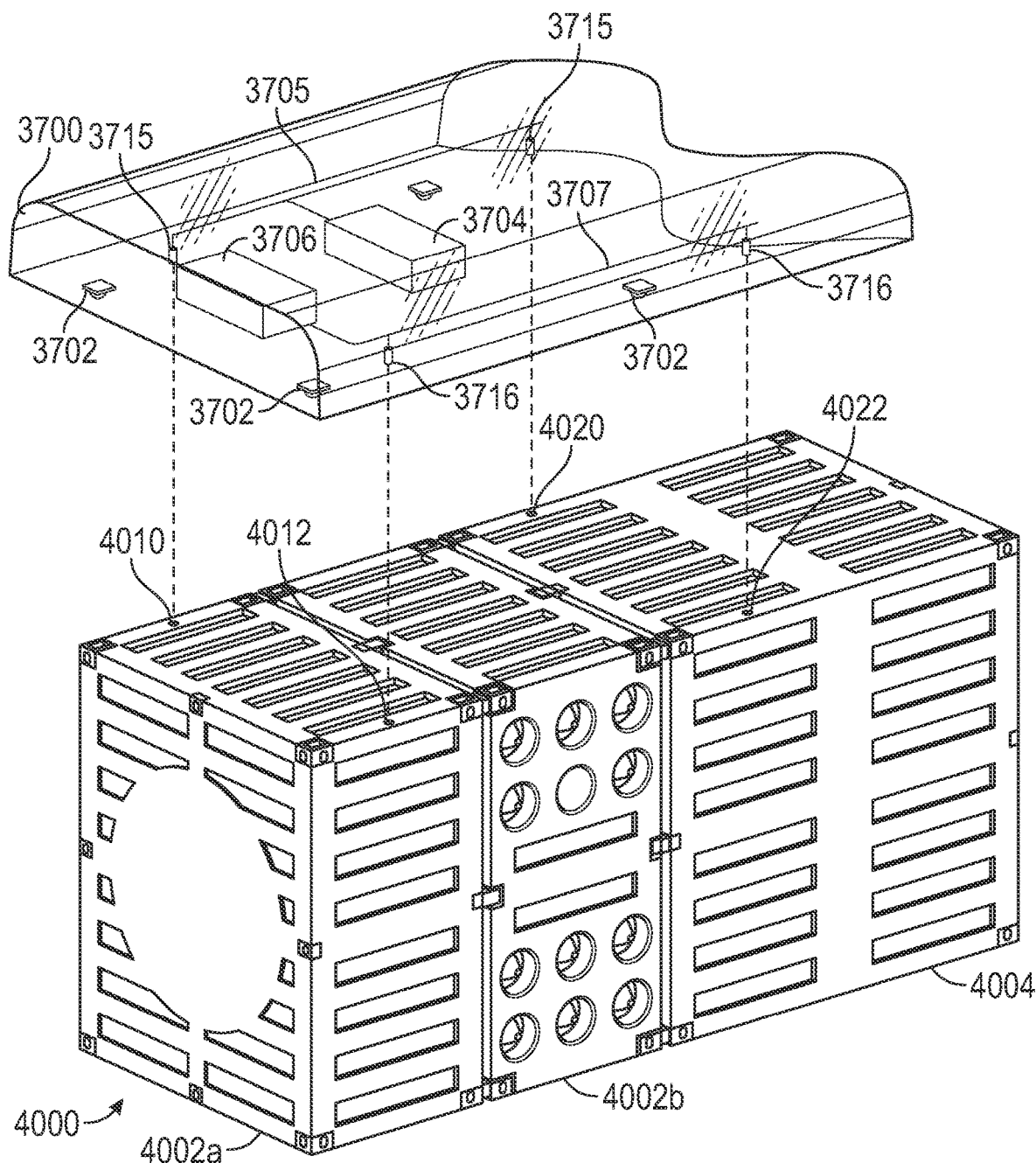
FIG. 40 depicts a perspective view of an example scenario in which a single container wide spine assembly is being connected to a container assembly, according to an embodiment of the present disclosure.

FIG. 40 depicts an example scenario in which the spine 3700 is being connected to a container assembly 4000, according to an embodiment of the present disclosure. The container assembly 4000 includes a first 5' container 4002a, a second 5' container 4002b, and a 10' container 4004. A first data probe 3715 of the spine 3700 connects to a data receptacle 4010 on the container 4002a. Similarly, a first power probe 3716 of the spine 3700 connects to a power receptacle 4012 on the container 4002a. A second data probe 3715 of the spine 3700 connects to a data receptacle 4020 on the container 4004. Similarly, a second power probe 3716 of the spine 3700 connects to a power receptacle 4022 on the container 4004. The second 5' container 4002b is not connected to any data or power probe on the spine 3700. In one embodiment, the container 4002b may receive data and/or power via data and/or power connections with the container 4002a.

Figure 41A:
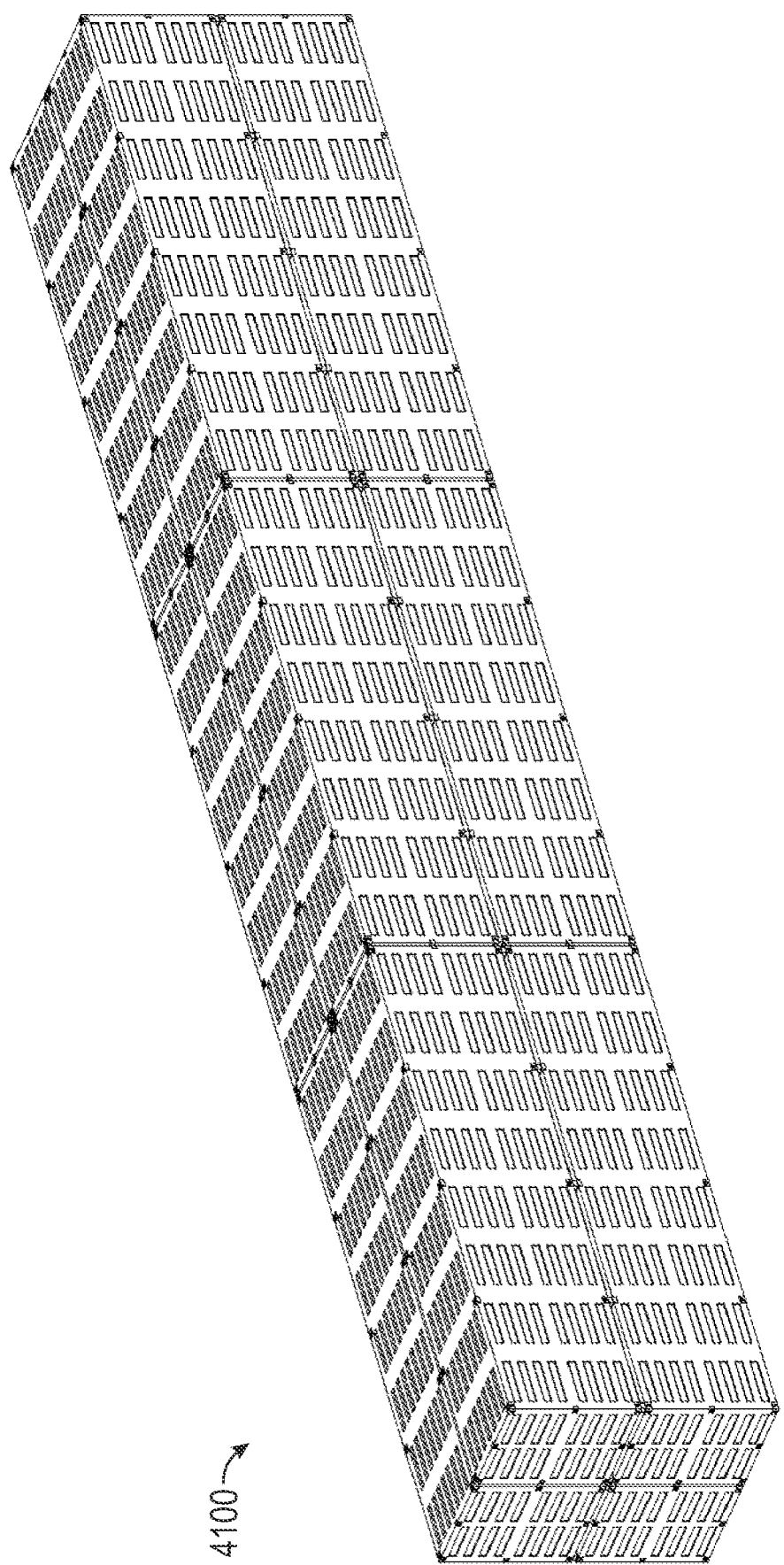
FIGS. 41A and 41B depict perspective, front, side, and rear views of a 12 container assembly mating with a spine assembly, according to an embodiment of the present disclosure.
Figure 41B:
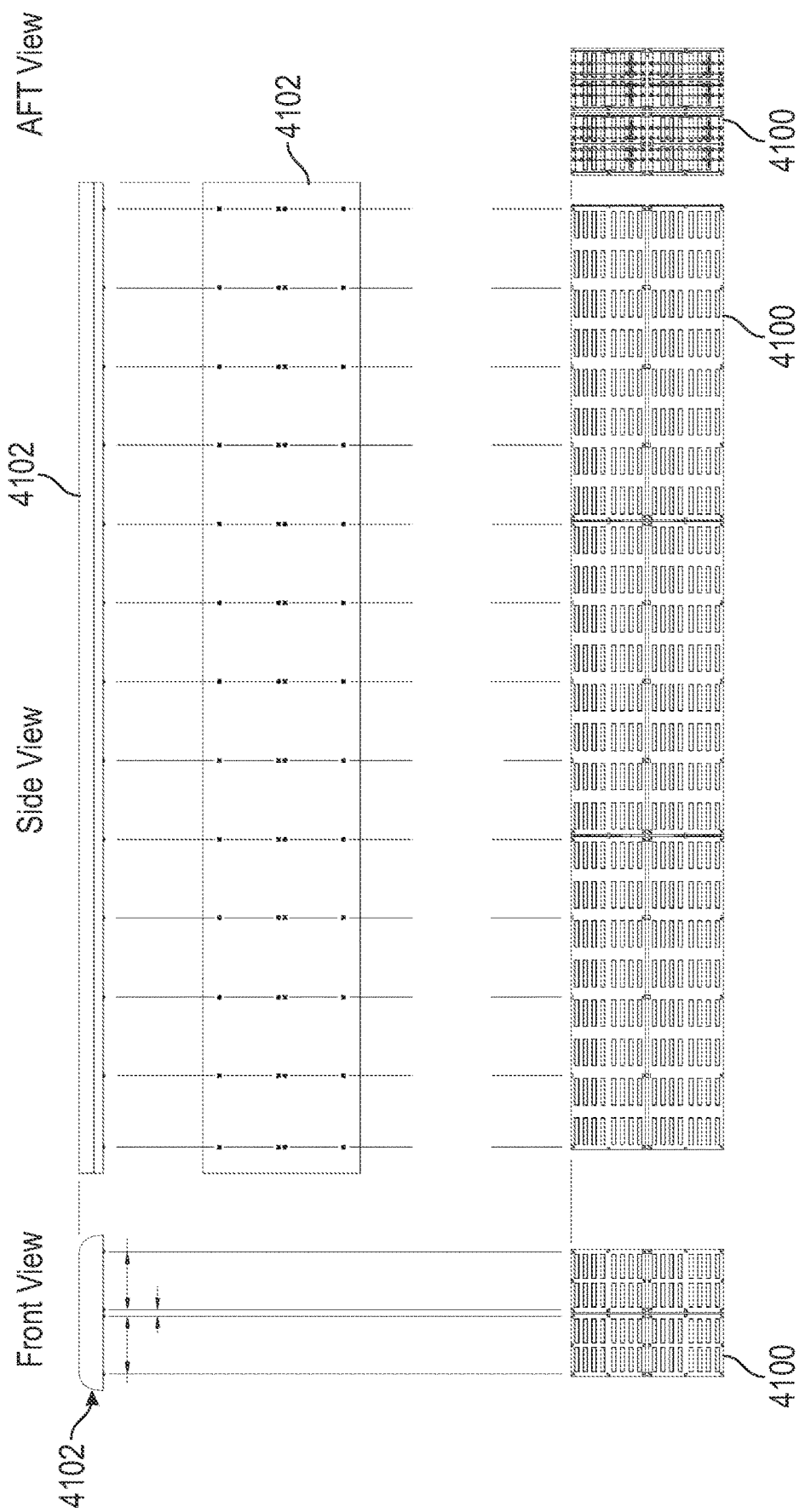

FIGS. 41A and 41B demonstrates how a 12×40' container assembly 4100 mates with a spine assembly 4102, according to an embodiment of the present disclosure. This system could also replicate the data and power connections demonstrated and discussed above. Any containers directly connected to the spine 4102 can receive power and/or data directly from the spine, whereas other containers may receive power and/or data through connections with other containers.

One advantage of the disclosed technology is the ability to allow containers to be connected to different sized spines. The disclosed technology also allows containers to be sent to vendors for modifications instead of sending an entire aircraft. Once a container is customized, it can fit many platforms. For example, a container that has been fitted with a radar and missile platform can now be fitted on any spine systems. The container is no longer simply a container, but the actual weapon system. As long as the container structure can carry the required fittings loads, it can be configured endlessly and be made from an almost unlimited material types.

Figure 42A:
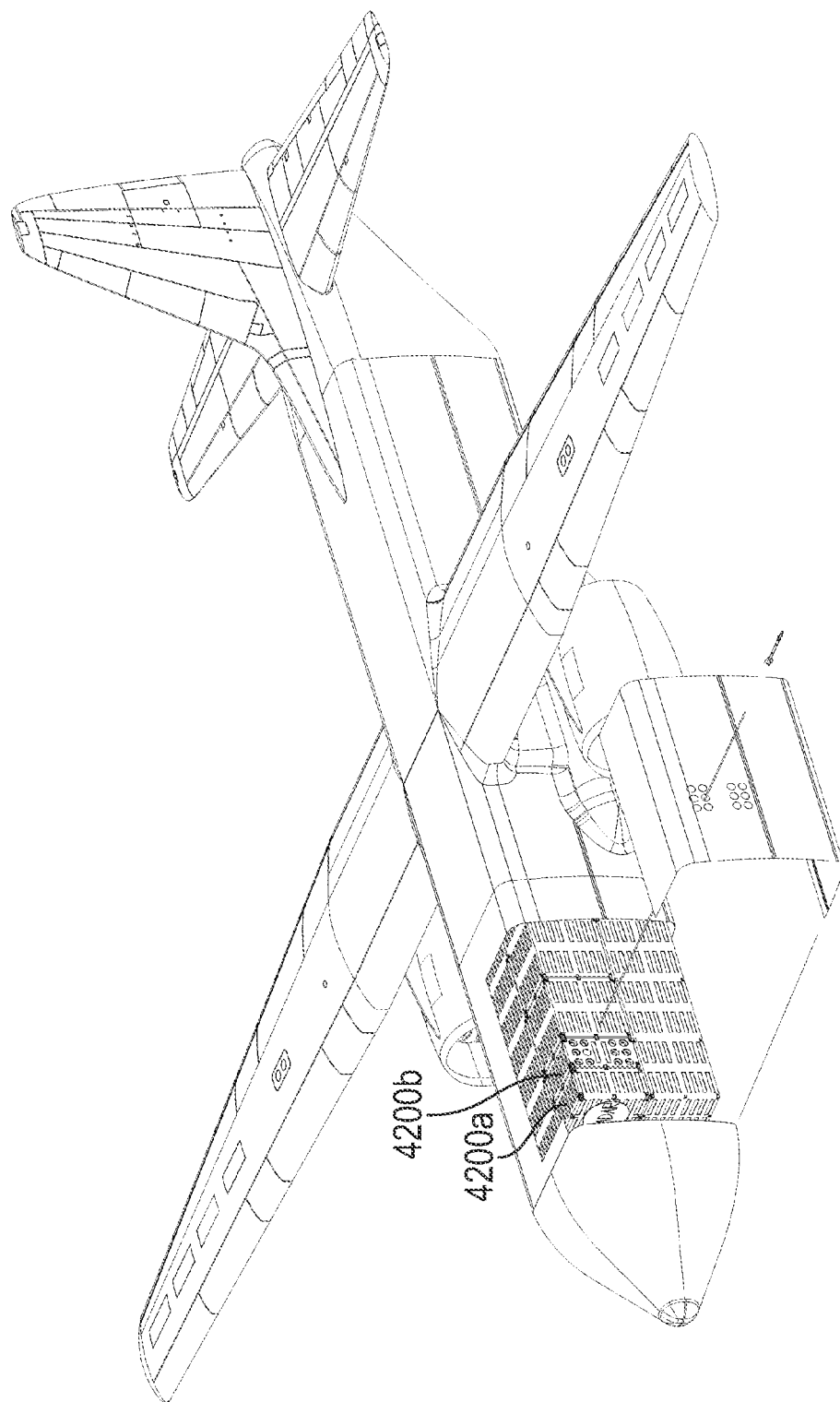
FIGS. 42A-42D depict perspective views of a container assembly secured to various aircraft spines, according to various embodiments of the present disclosure.
Figure 42B:
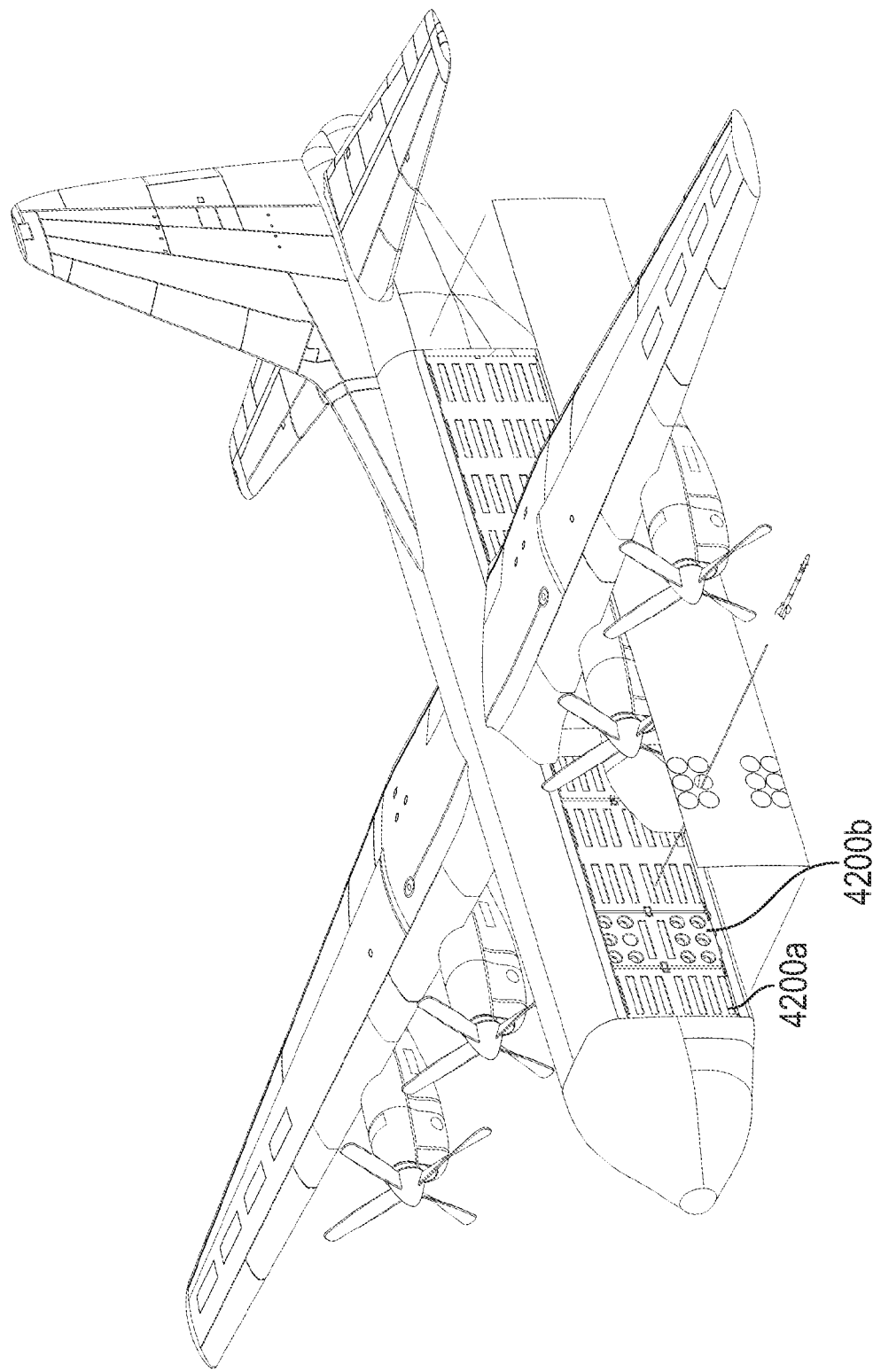
Figure 42C:
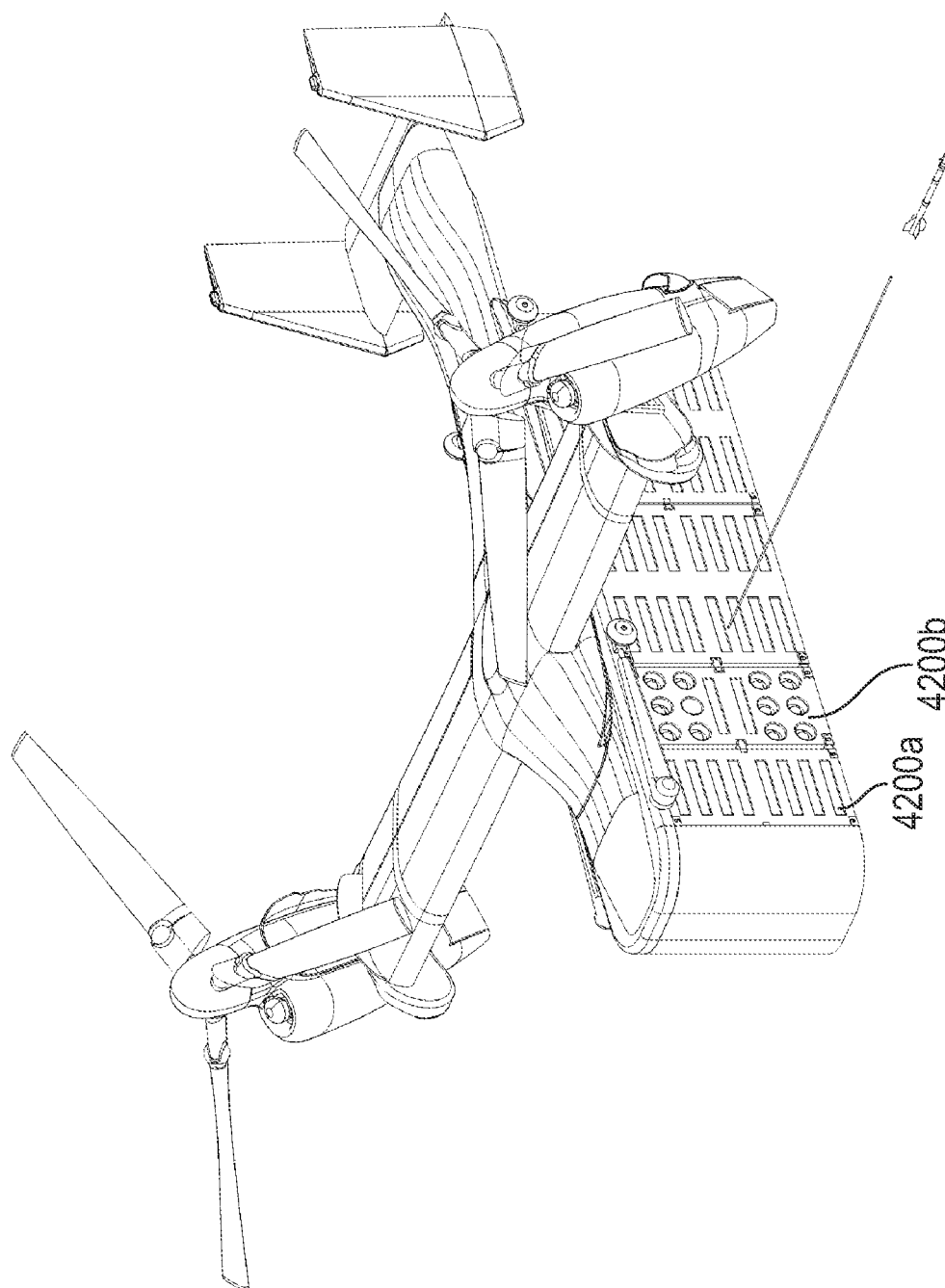
Figure 42D:
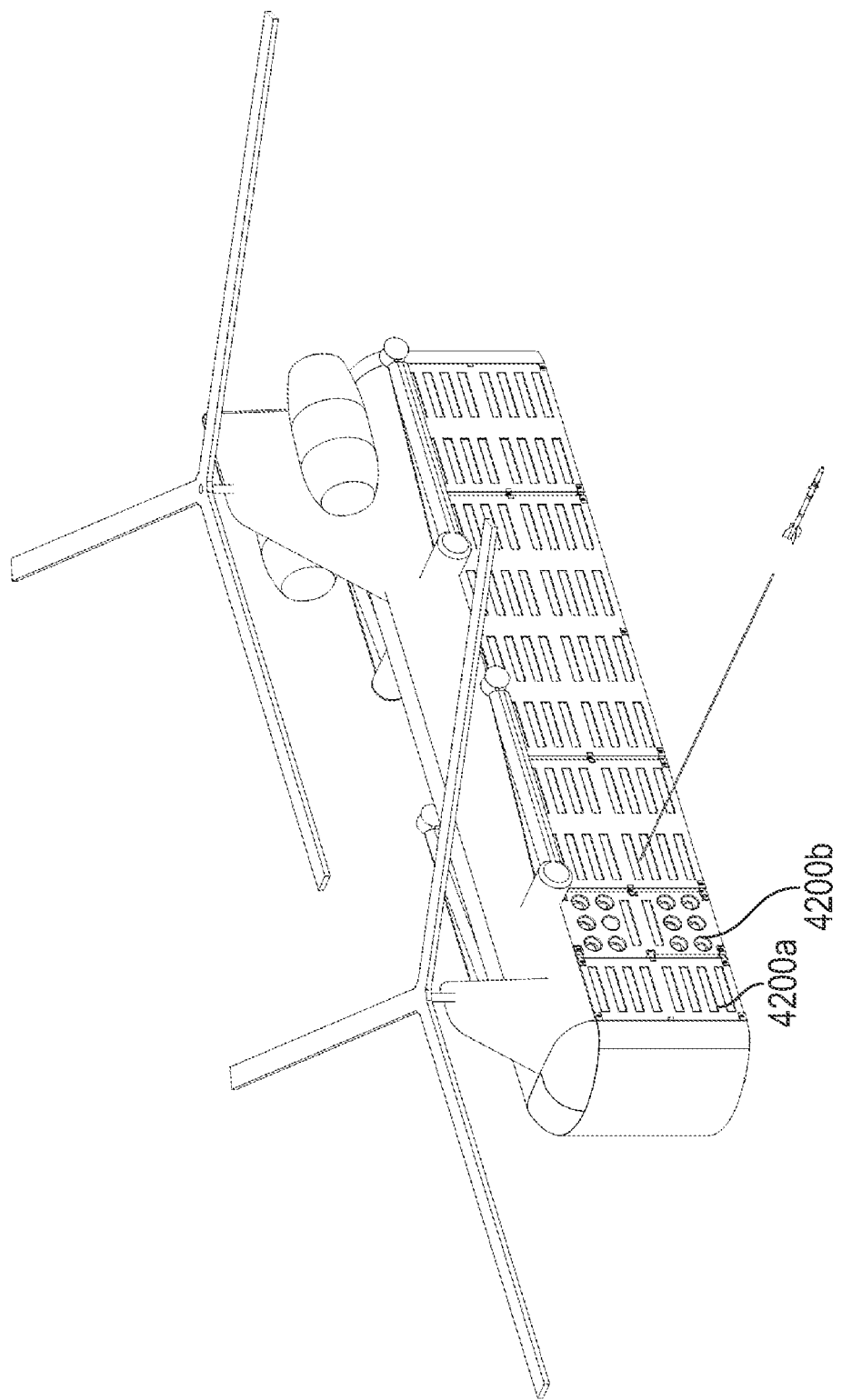

FIG. 42A shows a weaponized wide body cargo jet system in which a radar system 4200a and a missile launch system 4200b have been secured to a spine of a wide body cargo jet. In certain embodiments, the radar system 4200a and/or the missile launch system 4200b may be connected to data and/or power distribution systems implemented in the spine of the jumbo cargo jet. FIGS. 42B-42D show the same radar system 4200a and missile launch system 4200b secured as containers to spines of various other aircraft systems. It should be appreciated that these are simply example embodiments, and weaponized systems (e.g., radar system 4200a and missile launch system 4200b) can be attached as containers to any spine transport system, including spine transport systems implemented on ships, trucks, trains, or any other transport vehicle. This can, for example, help military logistics transports protect themselves instead of having to have expensive escorts.

The disclosed technology has demonstrated how the cargo fuselage part of an aircraft system can be decoupled from the rest of the airframe while continuing to be compatible with existing ground and ocean intermodal modular cargo systems. In addition, the cost of customizing a particular application has been greatly reduced due to the ability to customize the container, rather than having to customize an entire aircraft or other transport vehicle, and to be able to send a container so easily across existing logistics infrastructures for modification. The ability for the airframe or other transport vehicle to provide power and data capability greatly increases the applications of this technology.

Various aspects of the present disclosure have demonstrated how a container assembly of one or more containers can become part of a load carrying structure of an aircraft. In addition, it has been demonstrated how the fuselage can be decoupled from the rest of the aircraft. Thus, the container becomes the modular unit that ties ground, sea, and air systems. Various aspects of the present disclosure demonstrate how the same innovations applied to an aircraft, can be applied to a truck or ground transport system such that the container becomes the truck. Thus various aspects of the inventions provided in this disclosure demonstrate improved systems and methods that use modern technologies to reduce the weight and thus the fuel needed to transport a container or container assembly that can act as the structural component of a ground transportation system.

Figure 43:
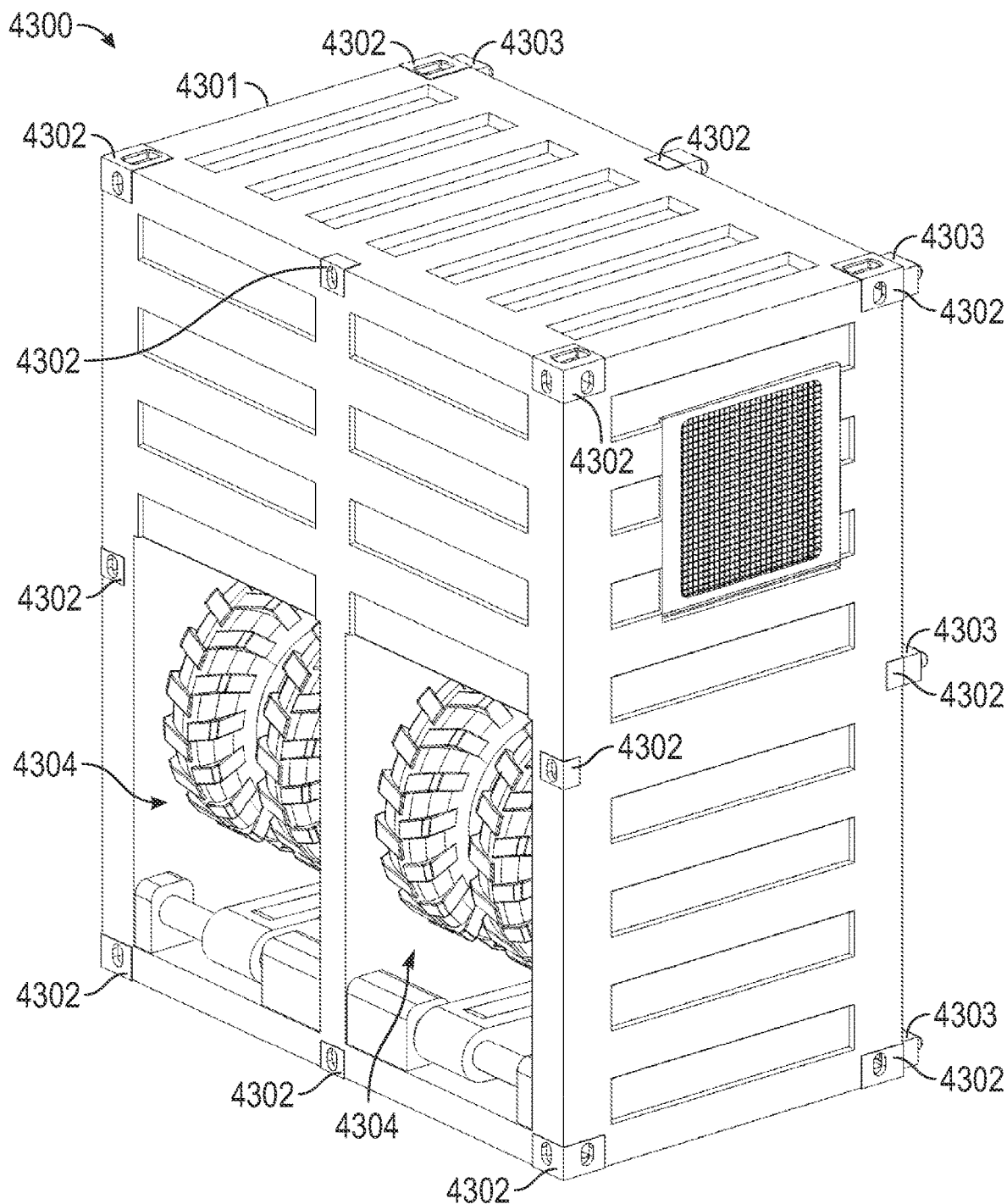
FIG. 43 depicts a perspective view of a drive container in a stowed configuration, according to an embodiment of the present disclosure.

Various embodiments of the present disclosure treat the container (or container assembly) as the load carrying structure, chassis, and/or propulsion system for powering (i.e., propelling) of a truck. FIG. 43 shows a 5' drive container 4300 that has been modified into a ground transport propulsion system. The drive container 4300 includes an outer container 4301 that is generally cuboid or box-like in shape, and a drive wheel assembly 4304 housed within the outer container 4301. The outer container 4301 can include vertical sliding panels that can cover the drive wheel assemblies 4304 and completely enclose the drive container 4300. FIG. 43 depicts the drive container 4300 in a stowed configuration, in which drive wheel assemblies 4304 are completely contained within the outer container 4301. In the stowed configuration, the drive container 4300 acts as any other container described herein such that it can secured to other containers, secured to a spine on a transport assembly, and/or be shipped, for example, via intermodal transportation modes.

The drive container 4300 has fittings 4302 along the outer container 4301 that allow the drive container 4300 to attach to other containers as described herein. Furthermore, in one embodiment, the drive container 4300 can also include built-in fitting connectors 4303 on a rear portion of the drive container 4300. The built-in fitting connectors 4303 can engage with corresponding fittings on another container to secure the other container to the drive container 4300. In certain embodiments, the built-in fitting connectors 4303 can be controlled by a controller built into the drive container 4300. In various embodiments, the built-in fitting connectors 4303 can correspond to one or more of the various fitting connectors described herein in various combinations.

Figure 44:
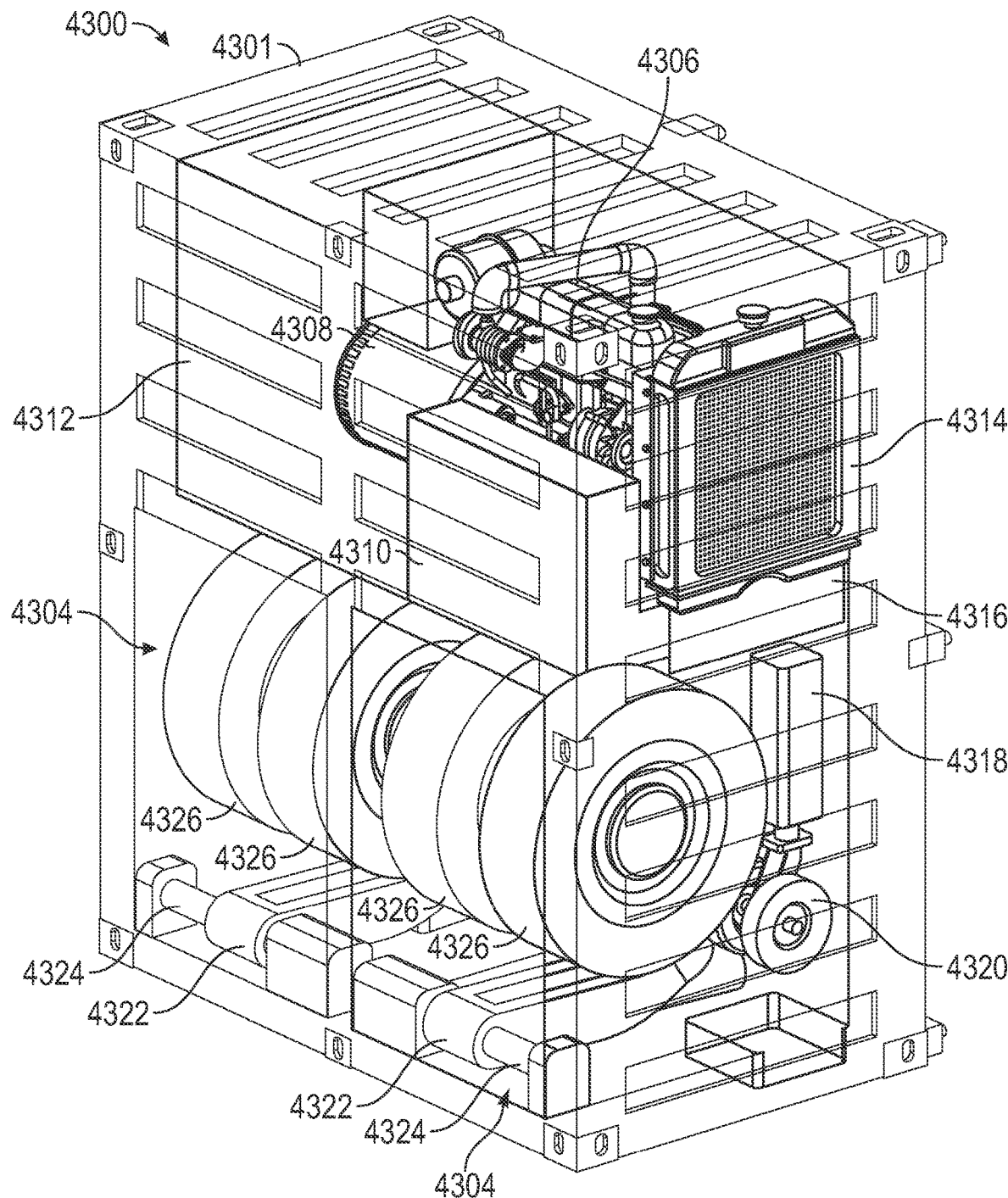
FIG. 44 depicts a perspective internal view of the drive container of FIG. 43, according to an embodiment of the present disclosure.

FIG. 44 provides an internal view of the drive container 4300 to view the propulsion system that is stowed away within the outer container 4301 of the drive container 4300. The drive container 4300 includes two drive wheel assemblies 4304. The drive wheel assemblies 4304 are currently shown in a retracted or stowed state. Each drive wheel assembly comprises one or more wheels 4326 and a propulsion system for powering (i.e., propelling) the one or more wheels. In the depicted embodiment, the propulsion system comprises an in-wheel electric motor installed within one or more of the wheels 4326. Brakes are also installed within the wheels 4326. In other embodiments, other propulsion systems are possible. For example, hydraulic systems can drive the wheels, or articulating jointed drive shafts can be used to transmit power generated by a fuel and/or electric motor located inside the drive container 4300.

The drive wheel assemblies 4304 are attached to pivot arms 4322 which are rotatably secured to the drive container 4300 (e.g., the outer container 4301) via pivot shafts 4324 for rotatably deploying and/or retracting the drive wheel assemblies 4304 between various configurations (e.g., a stowed configuration and one or more deployed configurations). The pivot arms 4322 may be secured to an actuating mechanism, such as a hydraulic pump or electric actuator, for rotating the pivot arms 4322 between the various configurations. In the depicted embodiment, the pivot arms 4322 are attached to hydraulic pumps for actuating the pivot arms (more clearly shown in FIG. 45). It should be understood that while various embodiments of the present disclosure show wheels and/or drive wheel assemblies being deployed rotationally using a pivot arm, any kind of deployment mechanism can be used. For example, a vertical deployment (similar to the deployment of the casters 4320 described below) may be used, or a horizontal deployment mechanism, or any combination. Furthermore, wheels and/or drive wheel assemblies may be deployed in any direction, e.g., front, rear, side, top, and/or bottom.

The drive container 4300 also includes deployable and/or retractable casters 4320, and double acting hydraulic cylinders 4318 for deploying and/or retracting the casters 4320, the operation of which will be described in greater detail below. The casters 4320 are shown in a retracted state in FIG. 44. The casters 4320 may be attached to any actuating mechanism for deploying and/or retracting the casters, such as, for example, hydraulic cylinders or electric actuators. In one embodiment, rotation of the pivot arms 4322 (and, therefore, deployment and/or retraction of the drive wheel assemblies 4304) can also performed by the hydraulic cylinders 4318 or, in other embodiments, may be performed by a separate actuating mechanism, such as separate hydraulic cylinders, electric actuators, or the like. In the depicted embodiment, rotation of the pivot arms 4322 is performed by separate hydraulic cylinders, which are more clearly shown in FIG. 45.

In the depicted embodiment, the drive container 4300 also includes an energy system which comprises a diesel engine 4306, an electric generator and controller 4308, a battery array 4310, a fuel tank 4312, and a radiator 4314. In the depicted embodiment, these components can be used to generate power for powering the in-wheel electric motors that propel the drive wheel assemblies 4304. It should be appreciated, however, that alternative energy systems may be used including, for example, an electric and/or hydrogen fuel cell system. A container control CPU and communications system 4316 can receive data from various sensors such as cameras, proximity systems, lasers, attached containers, GPS, laser gyroscopes, etc., which may be used for autonomous navigation.

Figure 45:
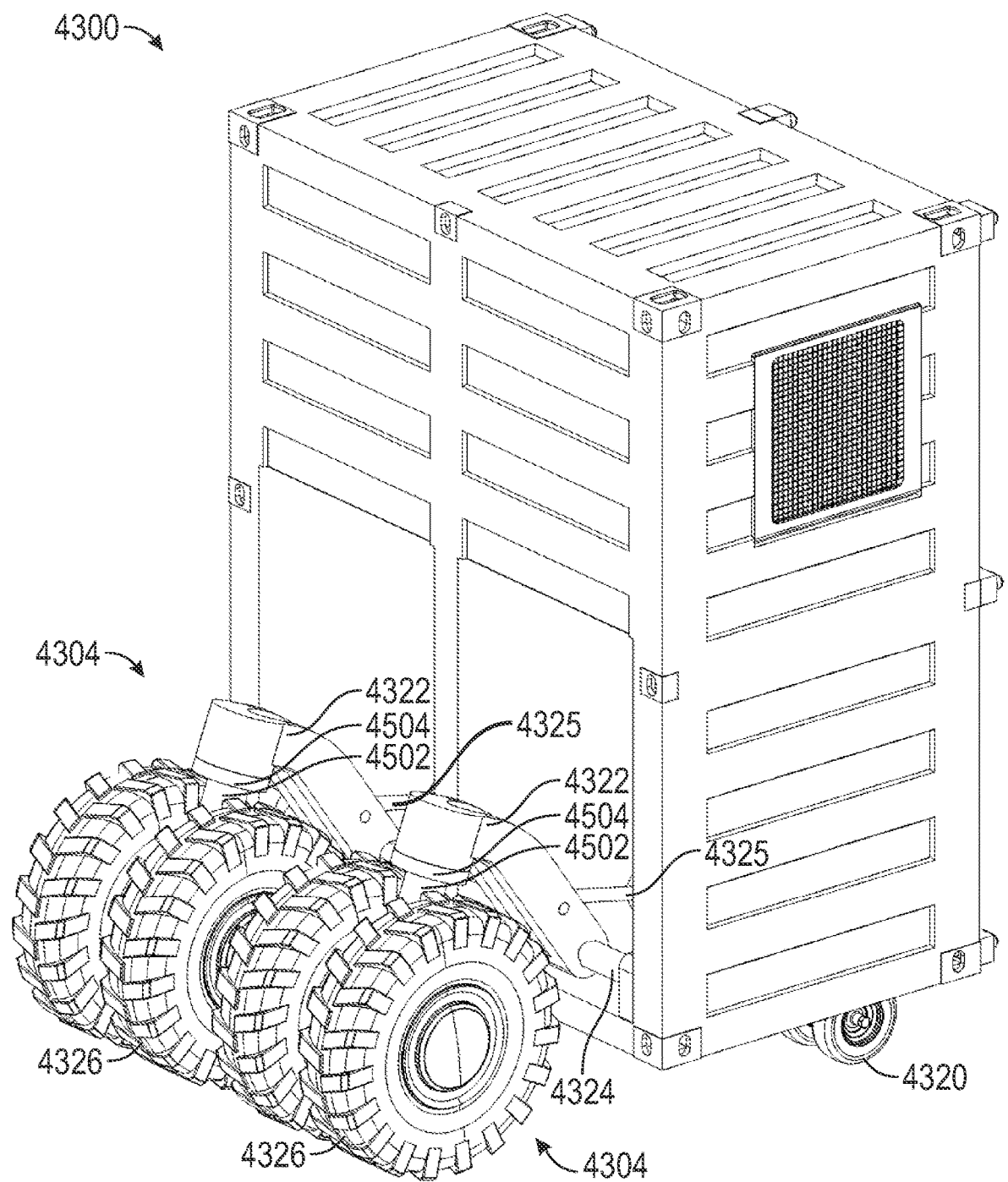
FIG. 45 depicts a perspective view of the drive container of FIG. 43 in a partially deployed configuration, according to an embodiment of the present disclosure.
Figure 50:
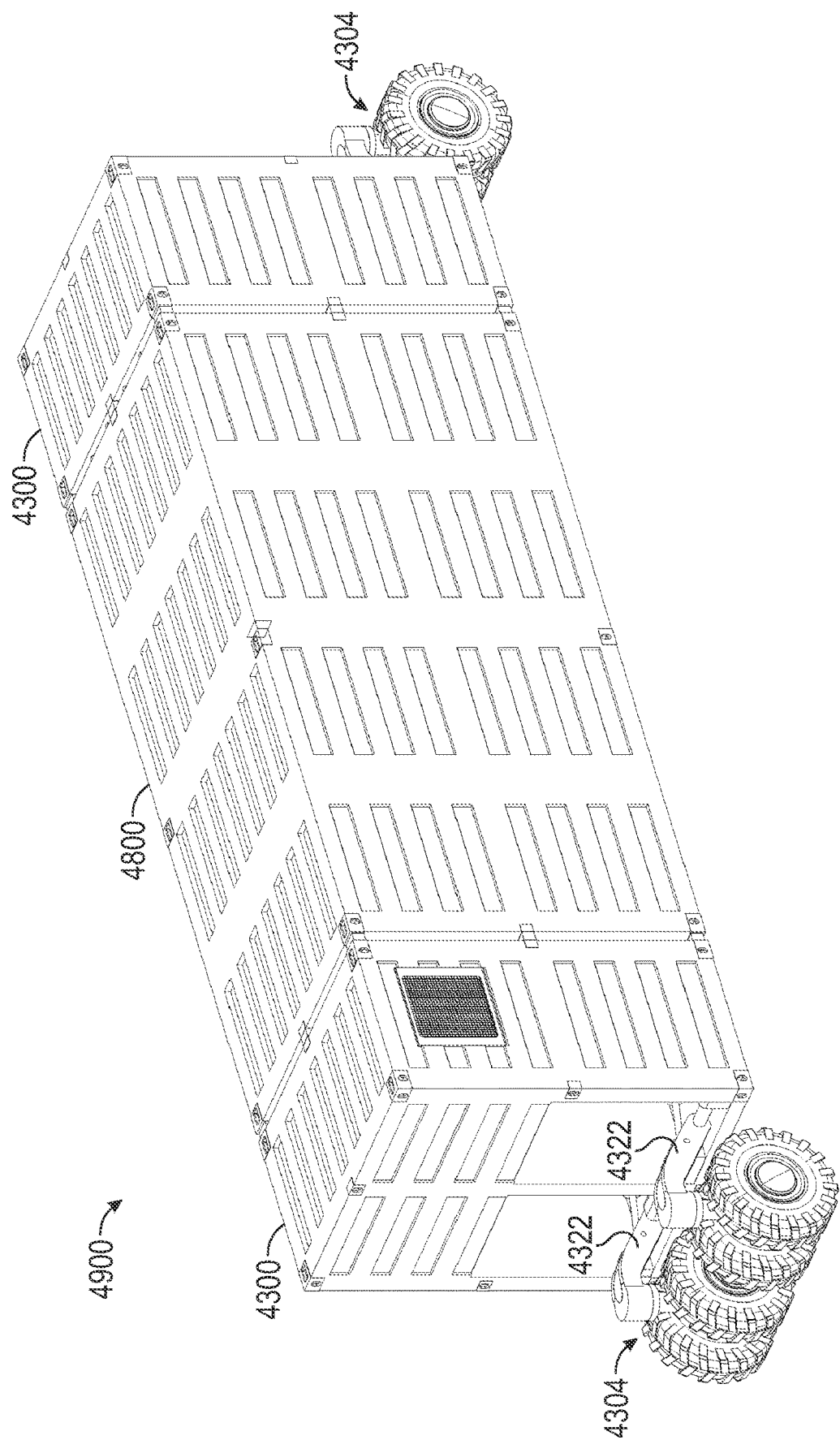
FIG. 50 depicts a perspective view of the cargo transport assembly of FIG. 49 in a fully deployed configuration, according to an embodiment of the present disclosure.

In one embodiment, the drive container 4300 can be transitioned between three configurations: (1) a stowed configuration (shown in FIGS. 43 and 44), (2) a short distance or partially deployed configuration (FIG. 45), and (3) a long distance or fully deployed configuration (FIG. 50). FIG. 45 depicts a perspective view of an embodiment of the drive container 4300 deployed in a short distance configuration (which may also referred to herein as a partially deployed configuration). In this example configuration, the pivot arms 4322 of the drive wheel assembly 4304 have been partially rotated about the pivot shafts 4324 using hydraulic pumps 4325 such that the drive wheel assembly 4304 is partially deployed, while the caster wheels 4320 are fully deployed. As described above, each drive wheel assembly 4304 includes one or more wheels 4326. In the depicted embodiment, each drive wheel assembly includes two wheels 4326. In each drive wheel assembly 4304, the wheels 4326 are supported by a central shaft 4502 and a rotation joint 4504 that allows the wheels 4326 to rotate and provide steering. The short distance configuration shown in FIG. 45 can, in certain embodiments, be used when the drive container 4300 does not have any additional containers attached. For example, the short distance or partially deployed configuration may be used when the drive container 4300 is traveling on its own, or on smooth roads, or when the drive container 4300 is traveling towards another container to be attached to the drive container 4300, as will be demonstrated later on.

In certain embodiments, the drive container 4300 may be configured for ground operation only and may not include additional fittings for mating with spines (e.g., may include only corner fittings). Various configurations could mate with the presently disclosed containers and standard ISO containers. If a drive container is to be secured to standard ISO containers, then, in various embodiments, the corner connections could be used.

Figure 46:
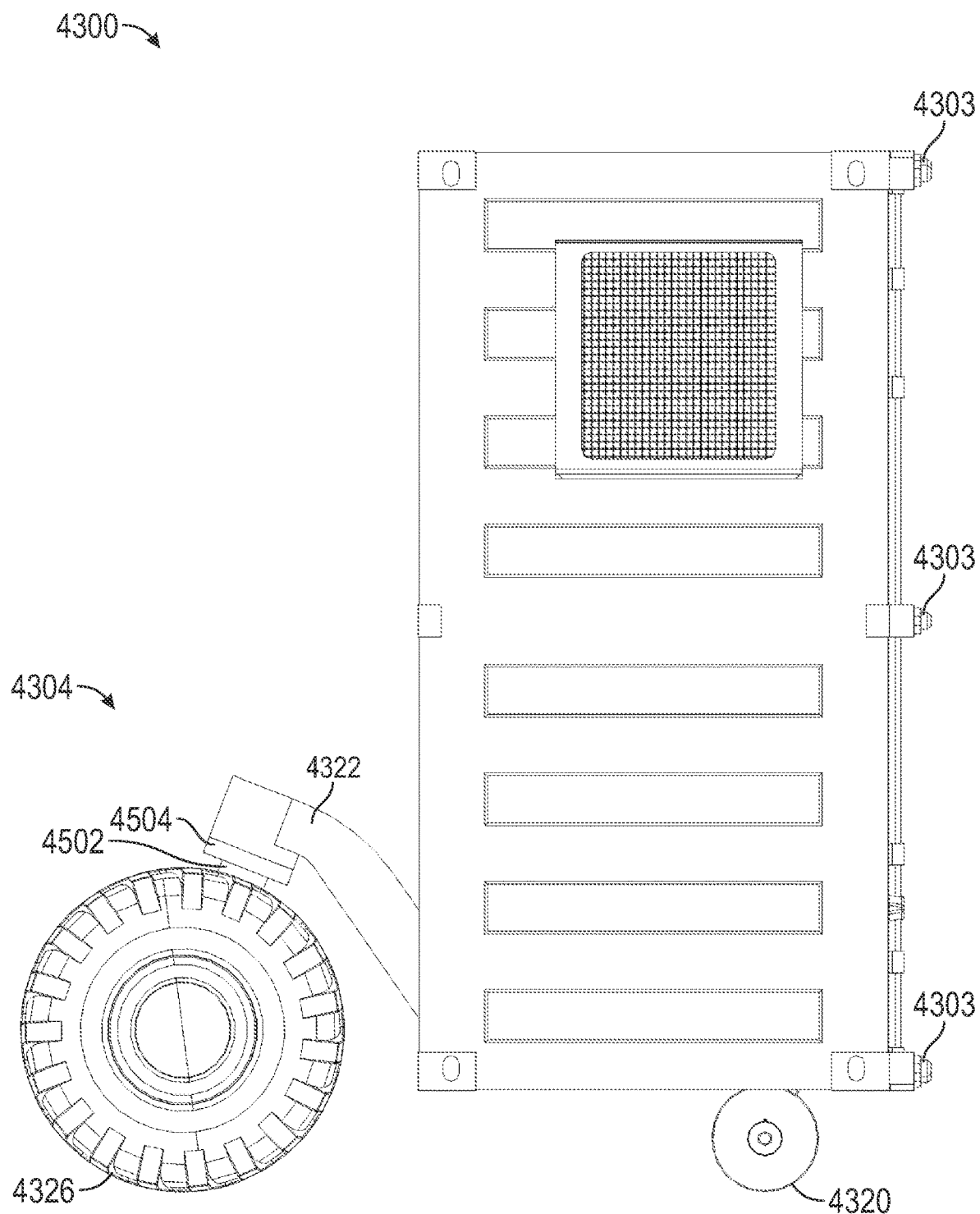
FIG. 46 depicts a side plan view of the drive container of FIG. 45.

FIG. 46 provides a side plan view of the drive container 4300 deployed in the short distance or partially deployed configuration shown in FIG. 45. The casters 4320 are fully deployed and the drive wheel assembly 4304 is partially deployed. In various embodiments, the casters 4320 and the drive wheel assembly 4304 can actuate up and down as necessary to mate with a container. For example, this may be performed by actuating the hydraulic cylinders 4318 to lower or raise the casters 4320 and/or actuating the hydraulic cylinders 4325 to rotate the pivot arms 4322 (thereby lowering or raising the drive wheel assemblies 4304).

Figure 47A:
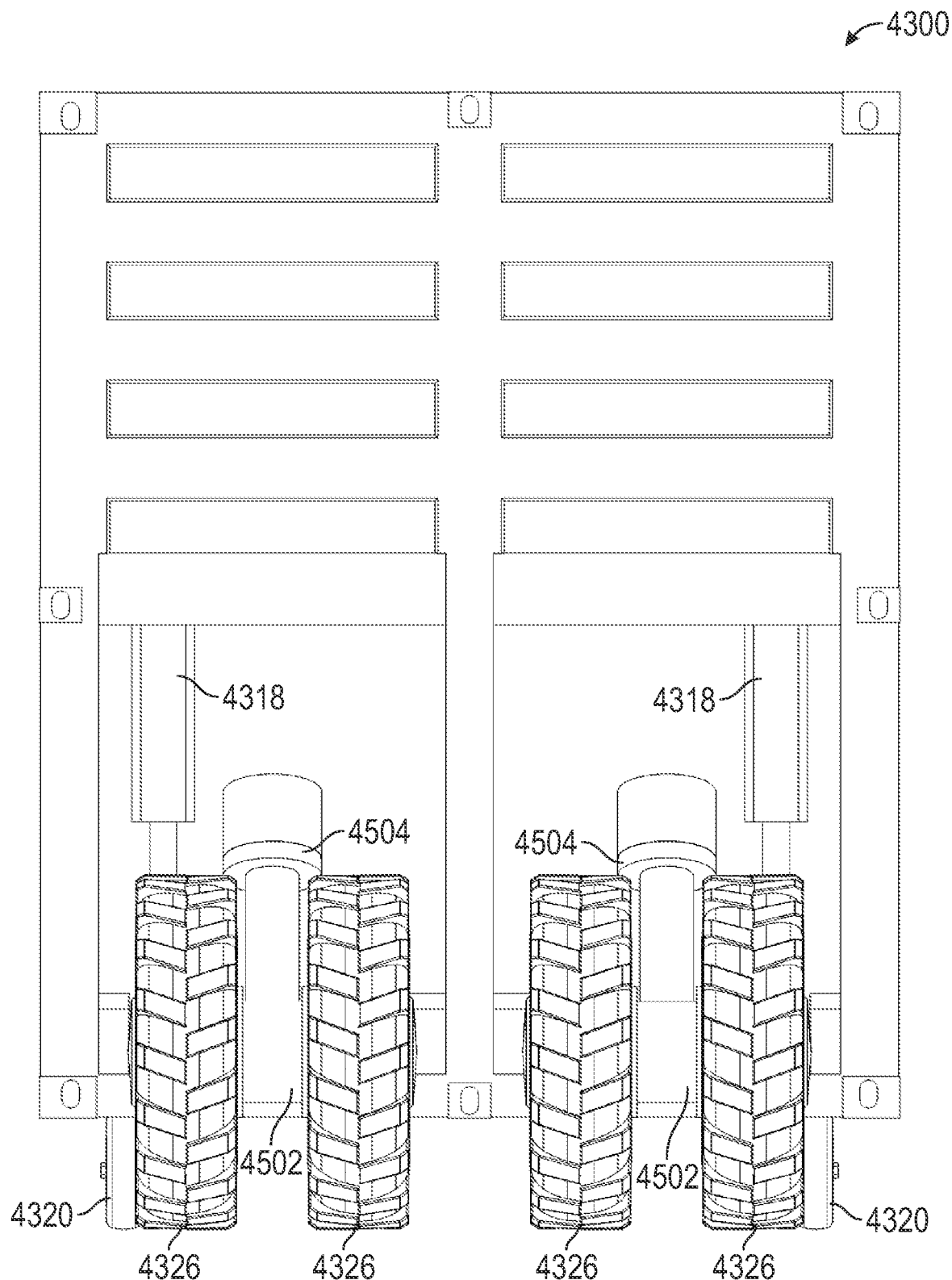
FIG. 47A depicts a front plan view of the drive container of FIG. 45.
Figure 47B:
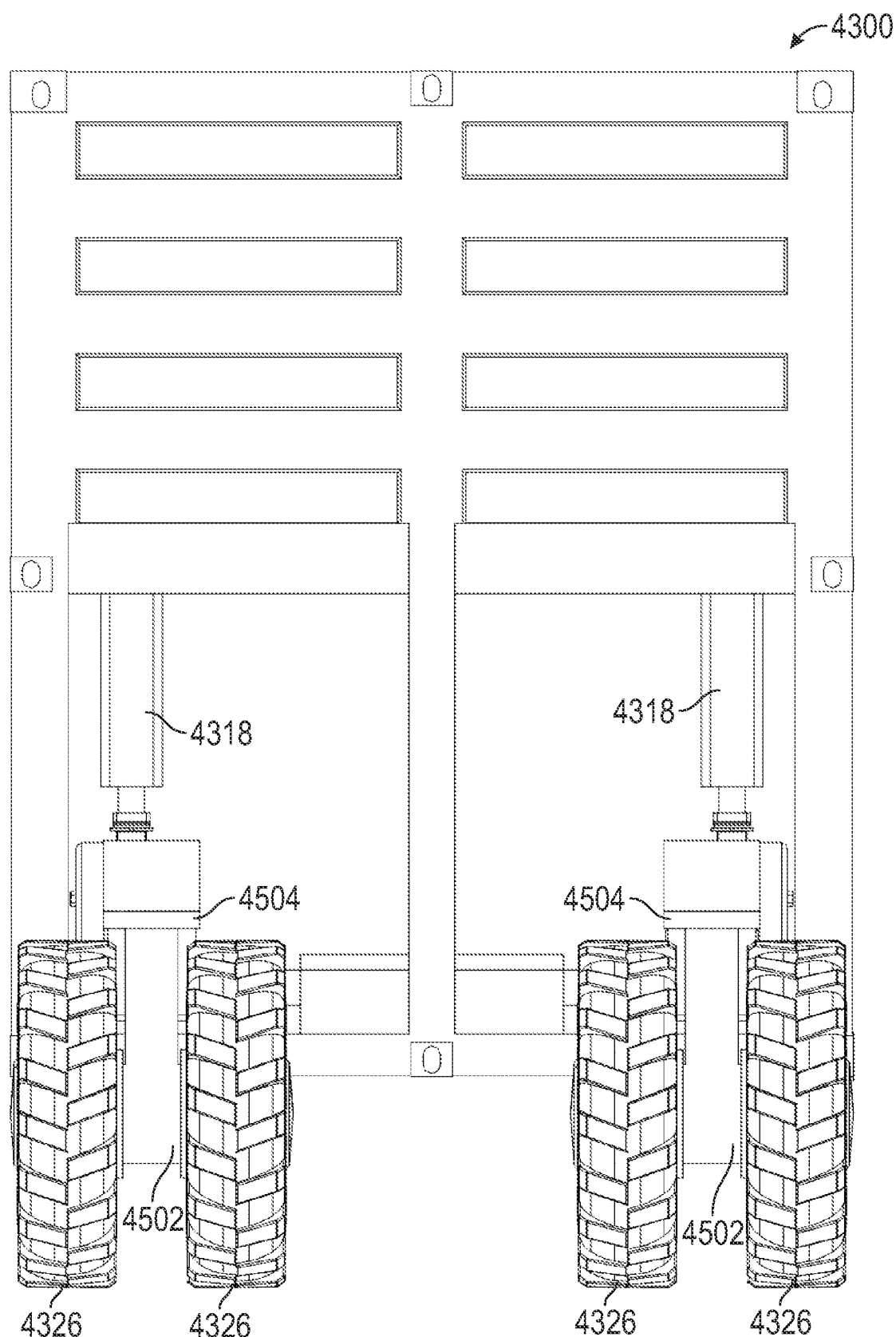
FIG. 47B depicts a front plan view of the drive container of FIG. 45 in a wide wheel configuration, according to an embodiment of the present disclosure.

FIG. 47A provides a front plan view of the drive container 4300 deployed in the short distance or partially deployed configuration shown in FIG. 45. In certain embodiments, the drive wheel assembly 4304 can be deployable in both a narrow configuration and a wide configuration. FIG. 47B depicts a front plan view of the drive container 4300 in a wide configuration. In FIG. 47B, the drive container 4300 is in a "fully deployed" configuration, resulting in greater ground clearance compared to the partially deployed configuration, as will be described in greater detail below. In various embodiments, the narrow and wide configurations may be used in any of the drive wheel assembly's configurations, including the stowed configuration, short distance configuration, and long distance configuration. The drive wheel assembly 430 can transition between the narrow configuration and the wide configuration by, for example, moving the pivot arm 4322 along the pivot shaft 4324. For example, the wide configuration may provide greater stability when necessary.

Figure 48:
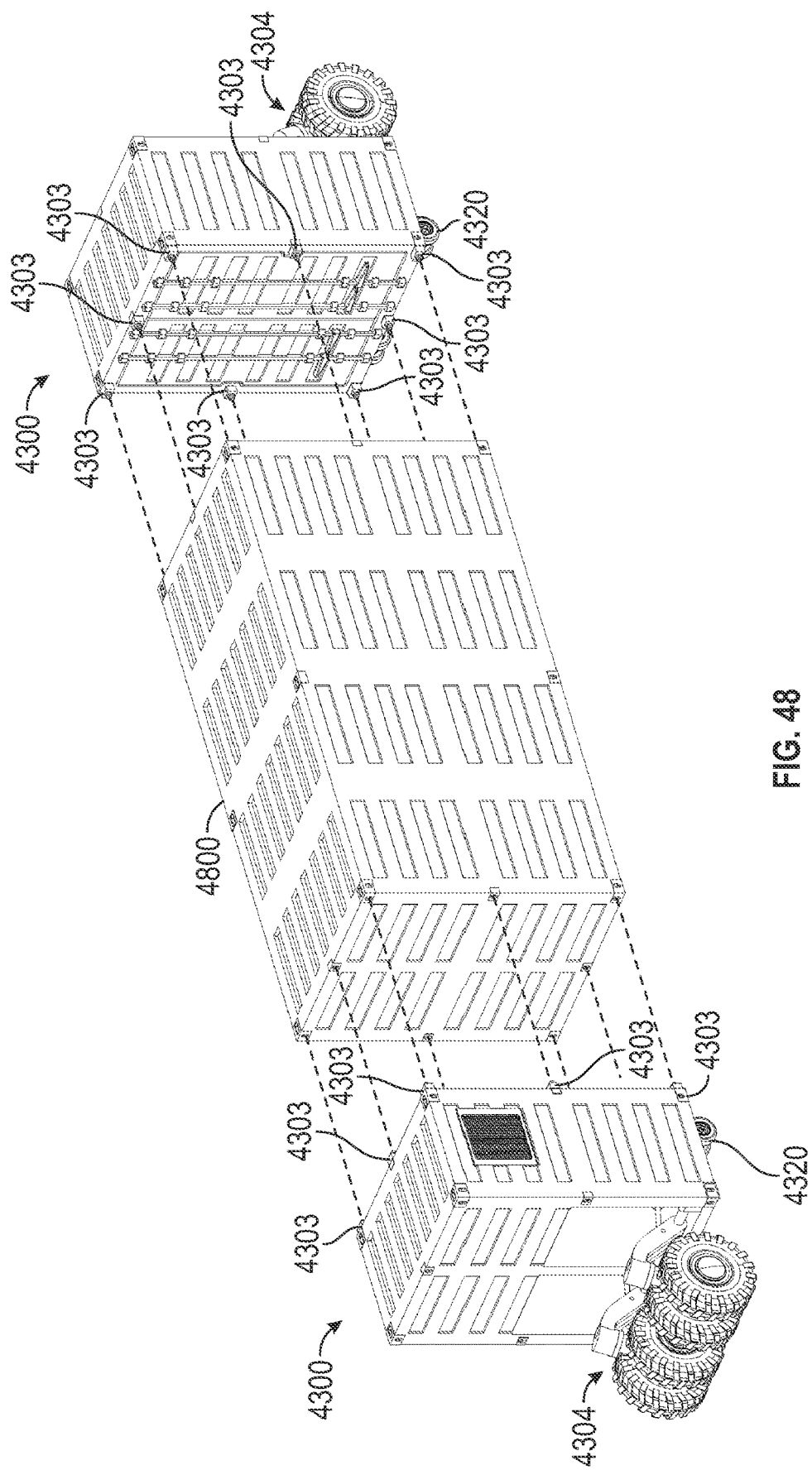
FIG. 48 depicts a perspective view of two drive containers moving to secure a container, according to an embodiment of the present disclosure.

FIG. 48 shows two drive containers 4300 deployed in the short distance configuration and maneuvering to mate with a container 4800. In one embodiment, the container 4800 may be substantially similar or identical to the container 100 of FIGS. 1A-B. In various embodiments, the drive containers 4300 may be controlled remotely by an operator, or may be controlled automatically by a software program. In certain embodiments in which the drive container 4300 is configured to accept a driver, the drive container 4300 may be controlled manually by a driver. Many variations are possible. Built-in fitting connectors 4303 on the rear sides of the drive containers 4300 can mate with and secure to corresponding fittings on the container 4800. When mating with existing ISO type containers, the corner attachments could be used.

Figure 49:
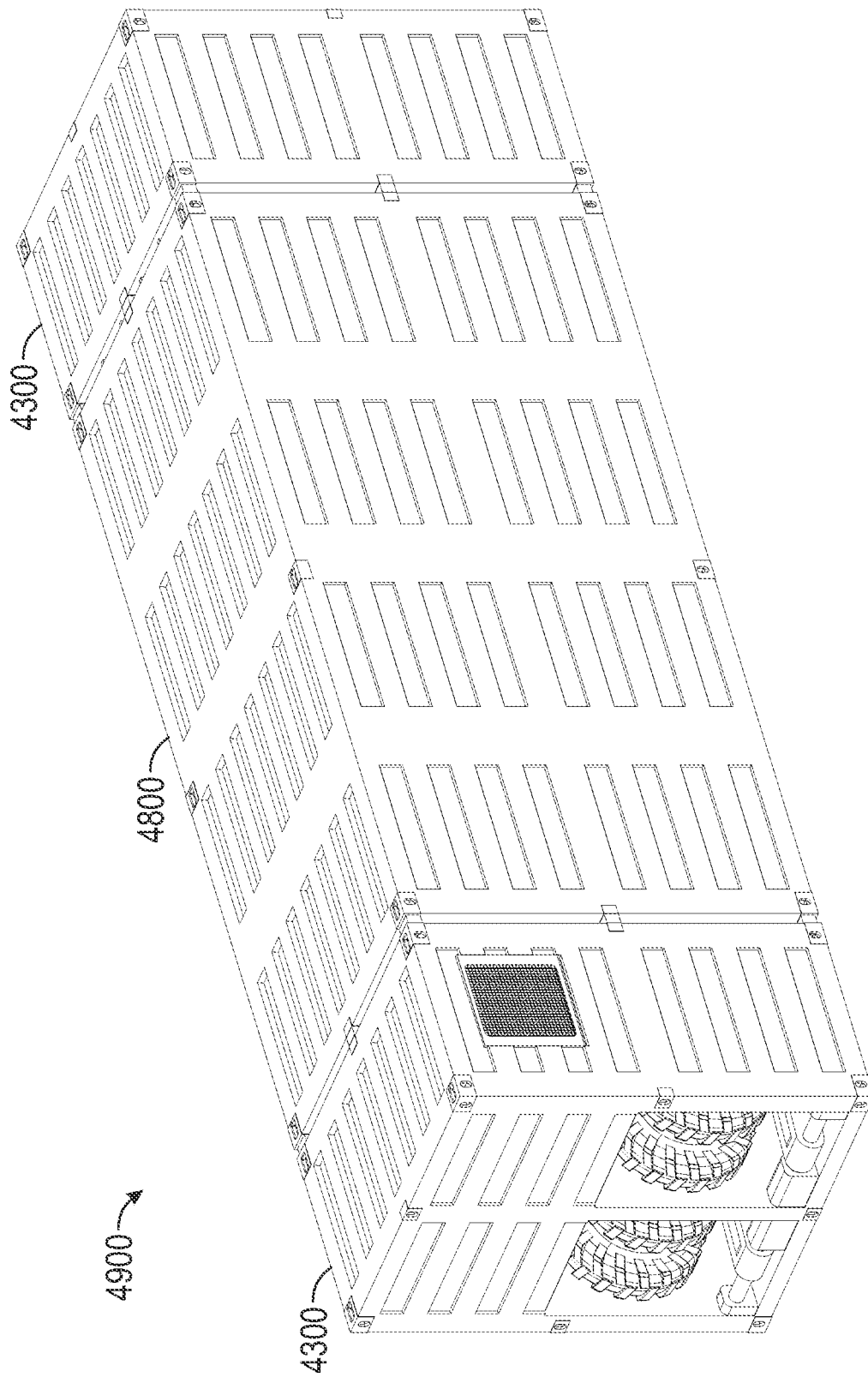
FIG. 49 depicts a perspective view of a cargo transport assembly in a stowed configuration, according to an embodiment of the present disclosure.

FIG. 49 provides a plan view of a cargo transport assembly 4900 in which the two drive containers 4300 are secured to the container 4800. The drive containers 4300 actuate their built-in fitting connectors 4303 to structurally mate with the 20' container 4800. The two drive containers 4300 are now in a stowed configuration, with casters 4320 and drive wheel assemblies 4304 retracted and stowed away into the containers 4300. When mating with existing ISO or similar existing containers, the corner attachments could be used. There also can be instances where the drive containers 4800 go into the partially deployed configuration when mated to other containers while retracting the casters 4320 to allow for better aerodynamic configurations. In other words, this configuration would result in the drive wheel assemblies 4304 being partially deployed, while the casters 4320 remain retracted or stowed.

FIG. 50 provides a perspective view of the cargo transport assembly 4900 in which the two drive containers 4300 are secured to the container 4800. In FIG. 50, two drive containers 4300 are now deployed in a long distance configuration (or fully deployed configuration). In this configuration, the pivot arms 4322 are rotated further out than in the short distance configuration. As such, in the long distance configuration, the attached container 4800 has greater ground clearance than if the drive containers 4300 were in the short distance configuration. Furthermore, in one embodiment, the casters 4320 remain retracted within the drive containers 4300 when the drive containers 4300 are deployed in the long distance configuration.

Figure 51:
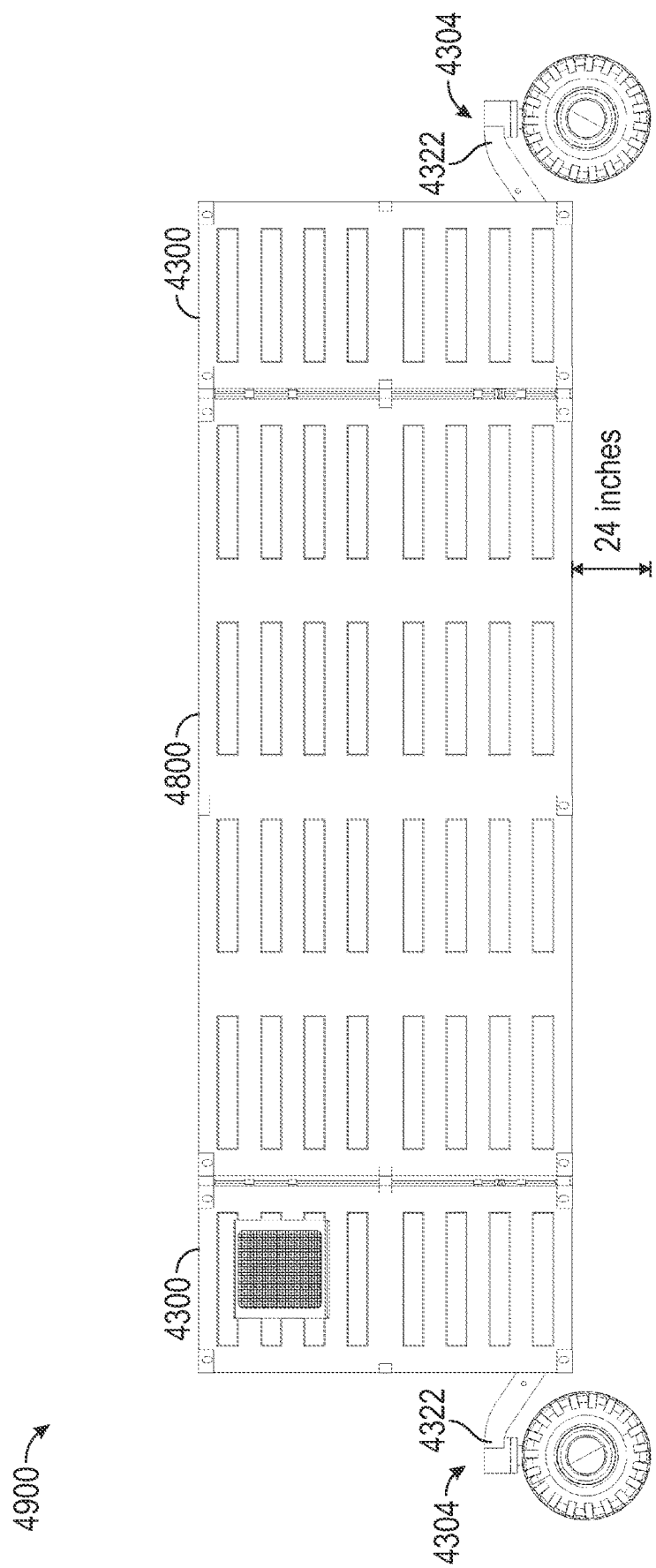
FIG. 51 depicts a side plan view of the cargo transport assembly of FIG. 50.

FIG. 51 provides a side plan view of the cargo transport assembly 4900 in which the two drive containers 4300 are deployed in the long distance configuration. In the depicted example embodiment, deploying the two drive containers 4300 to the long distance configuration provides 24 inches of ground clearance for the container 4800. Of course, it should be appreciated that in other embodiments, the amount of ground clearance may vary. As discussed, the long distance configuration provides greater ground clearance than the short distance configuration, as well as the stowed configuration (which may provide zero ground clearance).

Figure 52:
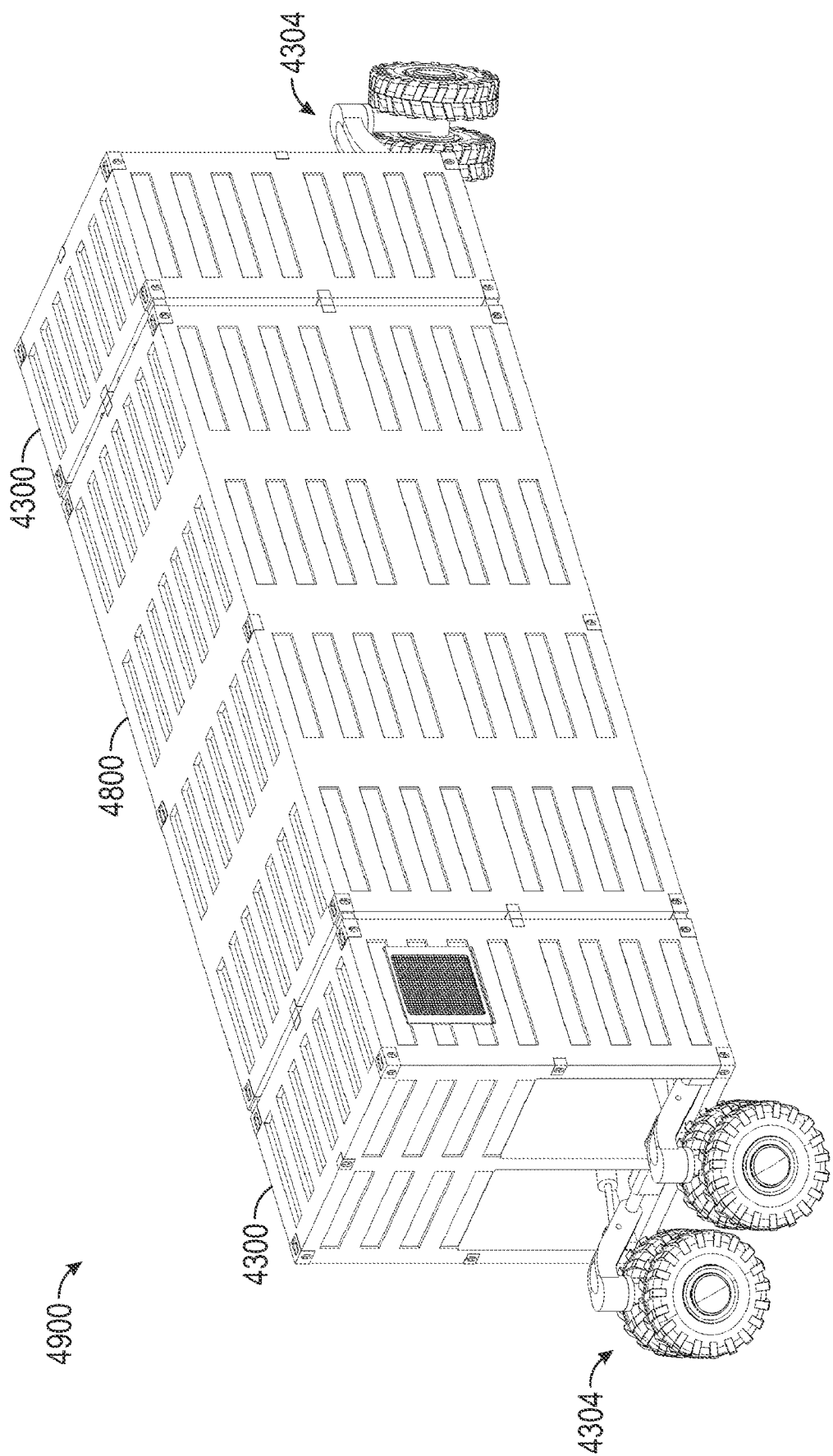
FIG. 52 depicts a perspective view of the cargo transport assembly of FIG. 50 in which the drive wheel assemblies are turned.
Figure 53:
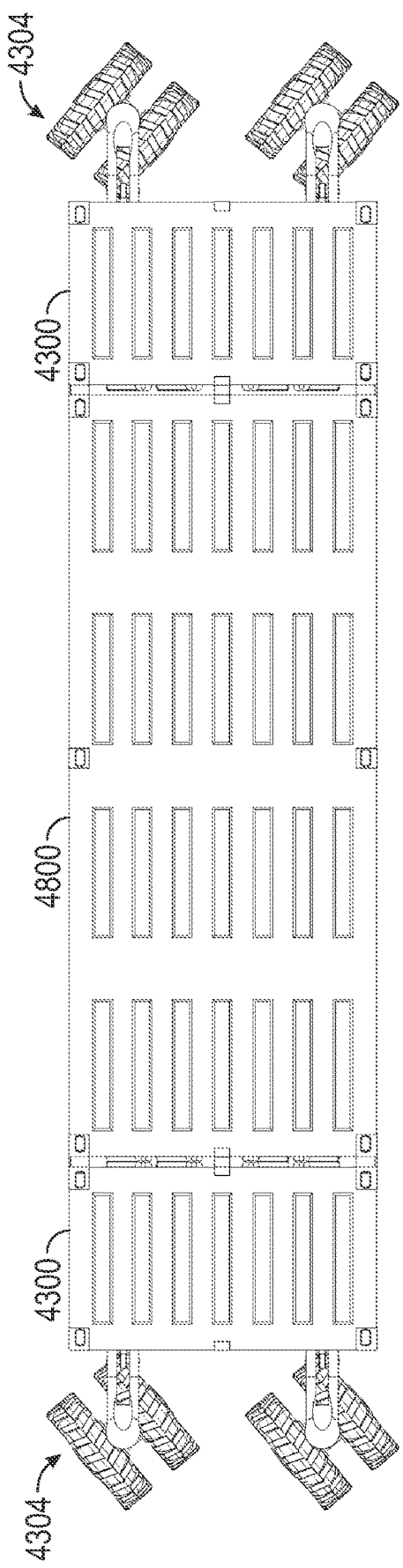
FIG. 53 depicts a top plan view of the cargo transport assembly of FIG. 52.

FIG. 52 provides a perspective view of the cargo transport assembly 4900 in which both drive wheel assemblies 4304 are turned. FIG. 53 provides a top plan view of FIG. 52. In all cases, wheel mud flaps and other coverings may be implemented, but are not shown in the figures.

Figure 54:
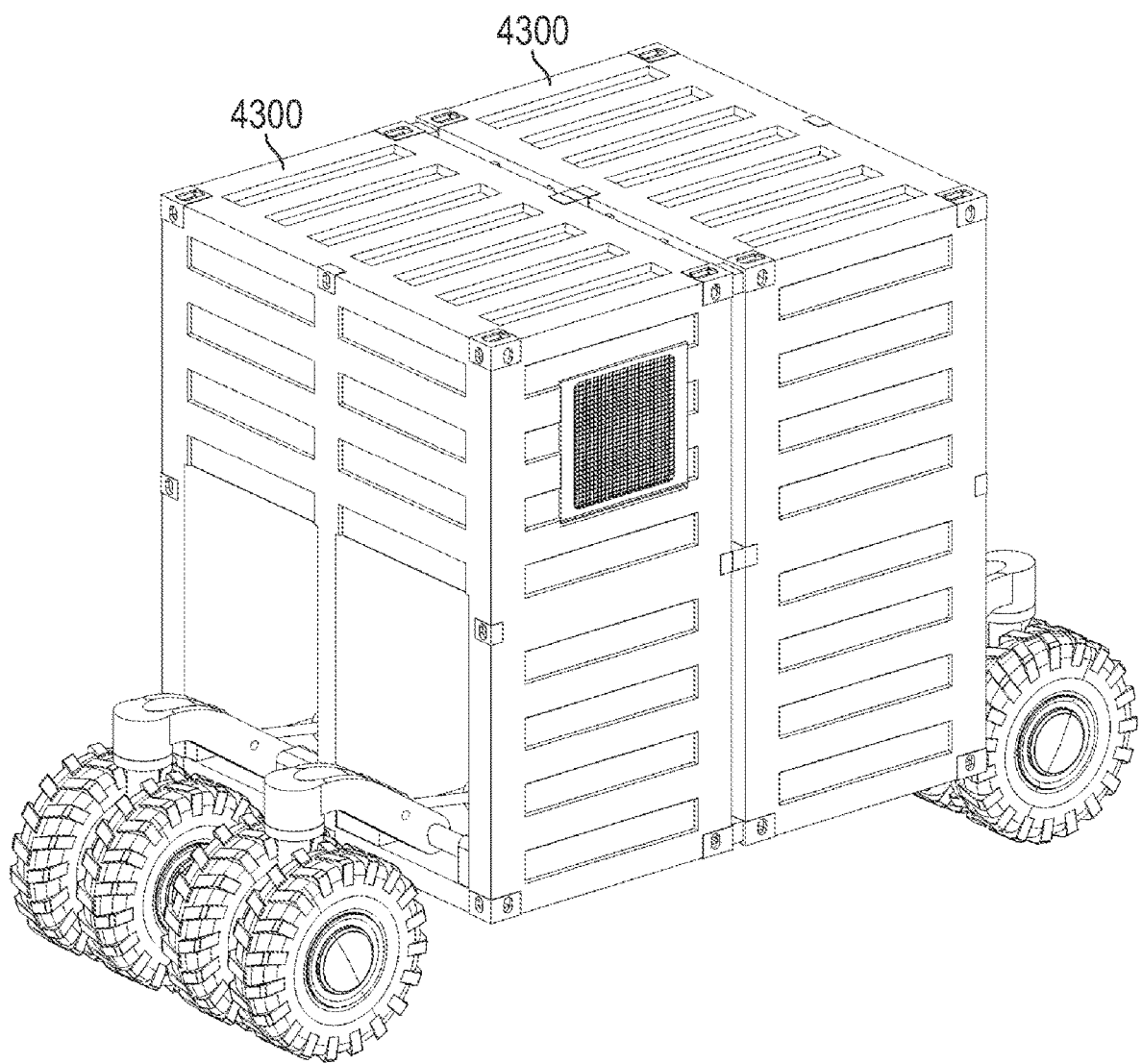
FIG. 54 depicts a perspective view of two drive containers secured together, according to an embodiment of the present disclosure.

Once a container has been delivered, drive containers can transport themselves to a next pick-up location or to another location to await the next delivery. In FIG. 54, the two drive containers 4300 have detached themselves from the container 4800 (e.g., having successfully delivered the container 4800). The two drive containers 4300 are secured to one another and are both deployed in a long distance configuration. In certain embodiments, if both drive containers 4300 have built-in fitting connectors on a rear surface, one set of fitting connectors can be removed and/or retracted so that the two drive containers 4300 can be secured to one another. Furthermore, in certain embodiments, one of the drive containers 4300 can be de-powered (i.e., can forego use of its propulsion systems) so that only one of the drive containers 4300 is propelling the container assembly.

It should be understood that the present disclosure can be applied to convert containers into different types of ground based systems such as trucks or forklifts. In certain embodiments, containers can be converted to provide additional wheels to support a longer container assembly to better spread the load. For example, a drive container can be connected to a middle portion of a container assembly. An unpowered passive wheel container that has passive wheels can also be included for non-drive locations on a moving container assembly. In certain embodiments, a drive container can be utilized as a passive wheel container by de-activating and/or not utilizing the propulsion system on the drive container. Example embodiments of certain of these configurations will be presented in later figures.

Figure 55:
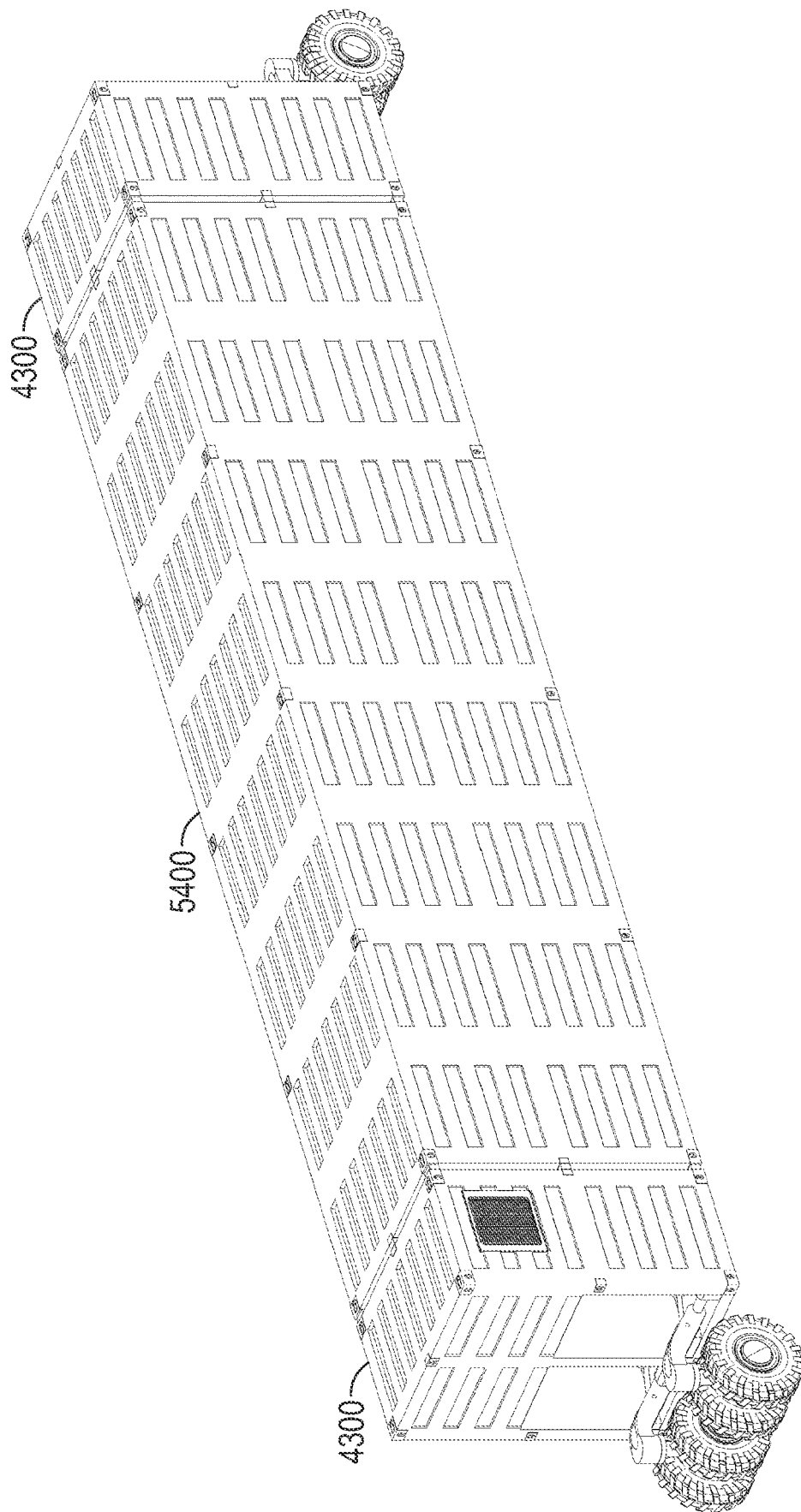
FIG. 55 depicts a perspective view of two drive containers secured to a 40' container, according to an embodiment of the present disclosure.

FIG. 55 shows two 5' drive containers 4300 mated to a 40' container 5400. In certain embodiments, for heavier payloads, more tires and axle equivalents can be included, as will be demonstrated in greater detail below.

In various embodiments, there can be 10' containers converted into drive containers with more wheels than a 5' drive container to tackle more difficult terrain. Weaponized systems can also be added to the container assembly and provide defensive modular capabilities for the military.

Figure 56:
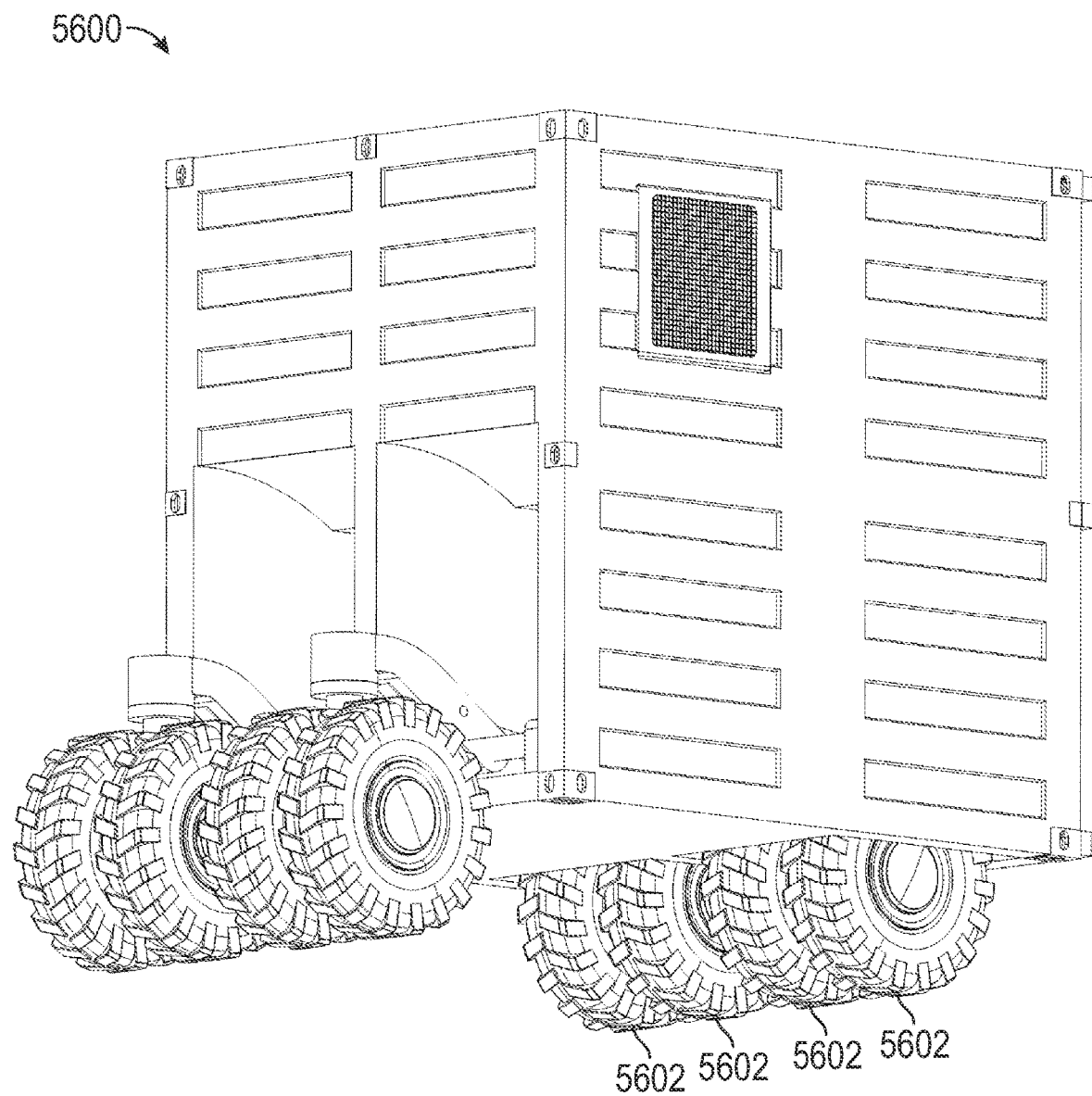
FIG. 56 depicts a perspective view of a drive container, according to an embodiment of the present disclosure.

FIG. 56 is a perspective view looking up and shows a modified 10' drive container 5600, according to an embodiment of the present disclosure. The modified 10' drive container 5600 uses the components of the 5' drive container 4300 and adds additional wheels 5602 in the aft section of the container, depending on the orientation of the container in an assembly, according to an embodiment. These wheels can be either free turning (e.g., passive or unpowered), with or without brakes, or be powered with, for example, in-wheel electric motors. In certain embodiments, the additional wheels 5602 can also be configured to rotate to assist in turning. Similar to the casters 4320 discussed above, the additional wheels 5602 can be retracted and/or deployed vertically by an actuating mechanism to move between various configurations of the container 5600 (e.g., stowed configuration, short distance configuration, long distance configuration). In certain embodiments, the additional wheels 5602 may replace the casters 4320, while in other embodiments, the container 5600 may include both casters and the additional wheels 5602. In certain embodiments, the wheels 5602 and/or the casters 4320 described above may be deployable in numerous "in-between" configurations of varying heights. In certain embodiments, the front drive wheels can deploy from the bottom as the aft drive wheels 5602 deploy. All wheels can be configured to be able to rotate to allow for turning. All wheels can also be configured to deploy to different heights to, for example, mate with containers and/or to provide a more aerodynamic profile, especially on smooth roads.

Figure 57:
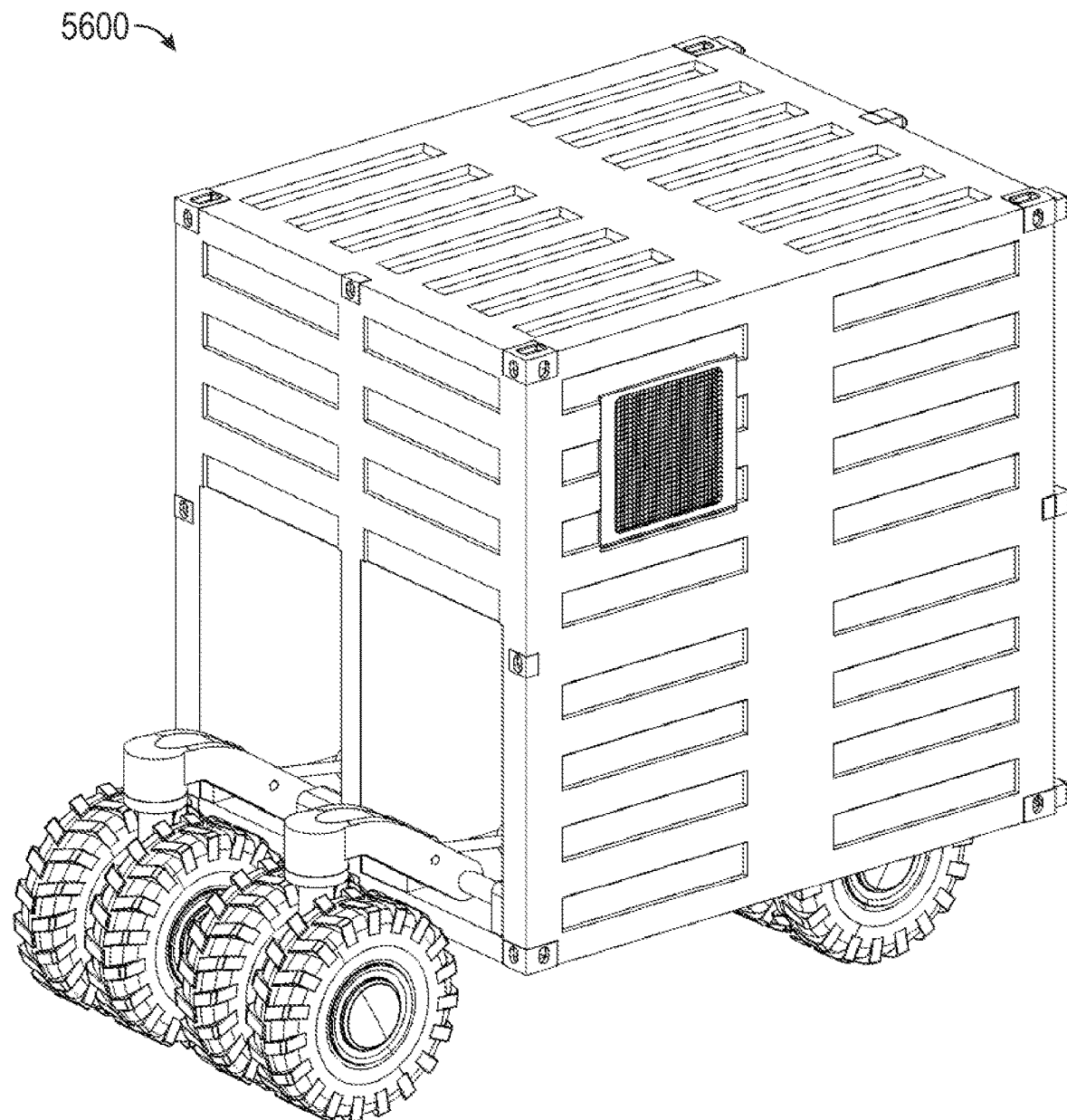
FIG. 57 depicts a top perspective view of the drive container of FIG. 56.

FIG. 57 provides another perspective view of the 10' drive container 5600.

Figure 58:
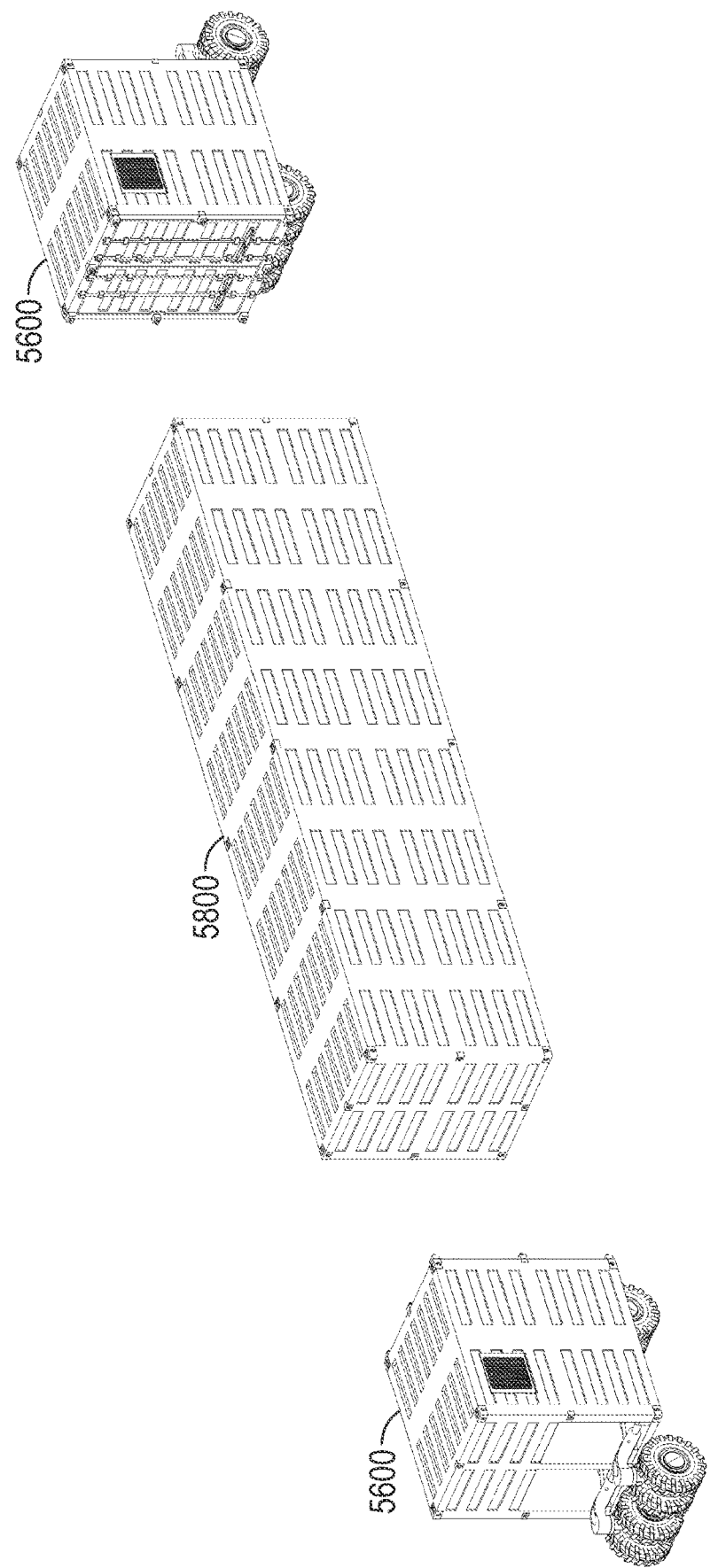
FIG. 58 depicts a perspective view of two drive containers moving into position to secure a container, according to an embodiment of the present disclosure.

FIG. 58 provides a perspective view of two 10' drive containers 5600 moving into position to be secured to a 40' container 5800. In certain embodiments, drive containers can work in the forward and/or aft direction of travel. Each drive container 5600 can adjust its ground clearance in order to be secured to a container. For example, this may be done by raising and/or lowering the drive wheel assemblies and the additional wheels 5602.

Figure 59:
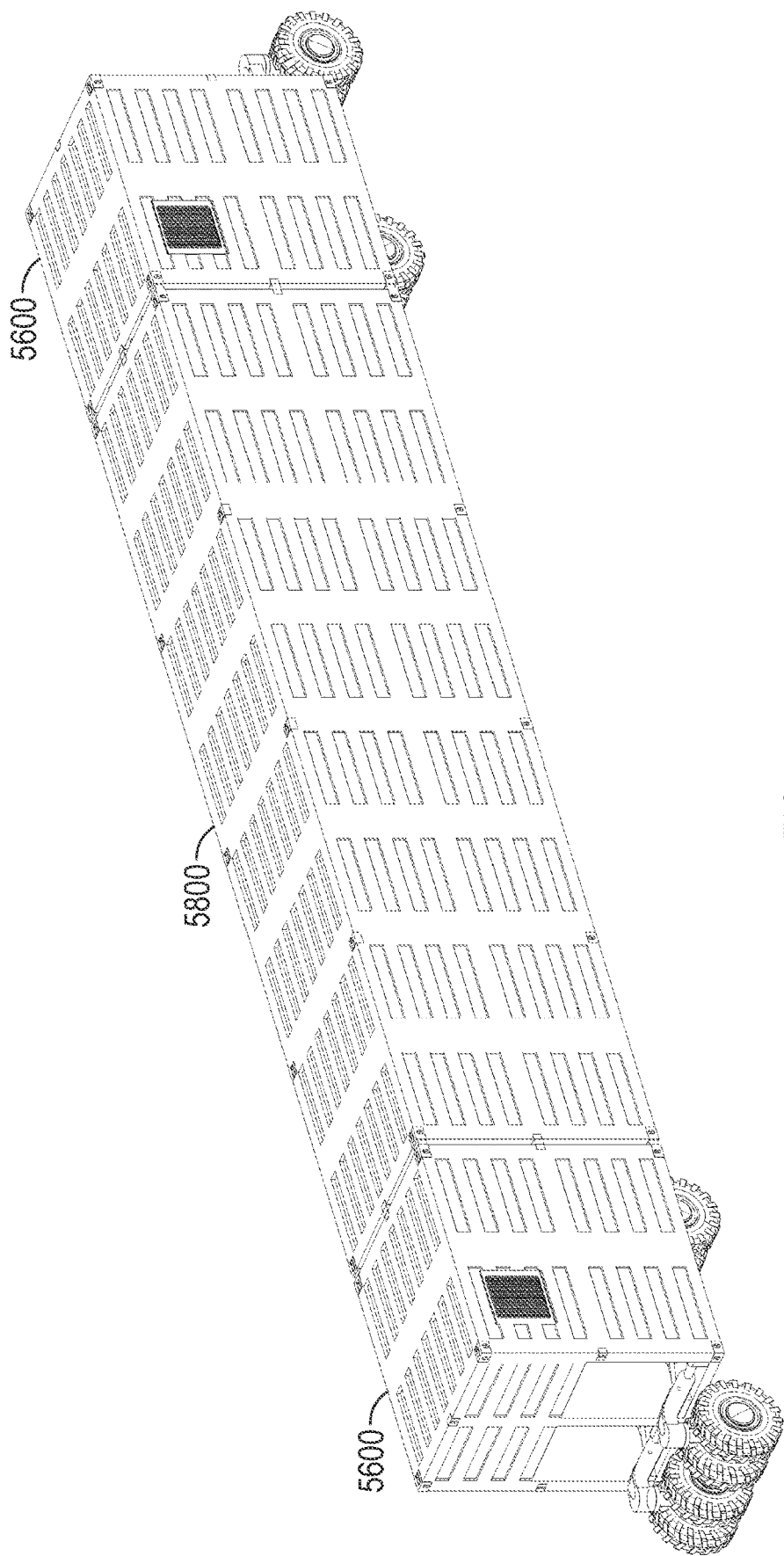
FIG. 59 depicts a perspective view of the two drive containers and container of FIG. 58 secured together, according to an embodiment of the present disclosure.

FIG. 59 provides a perspective view of the two 10' drive containers 5600 secured to the 40' container 5800. In the depicted embodiments, the two 10' drive containers 5600 are deployed in a long distance configuration, in which the drive wheel assemblies and the additional wheels 5602 are fully deployed.

Figure 60:
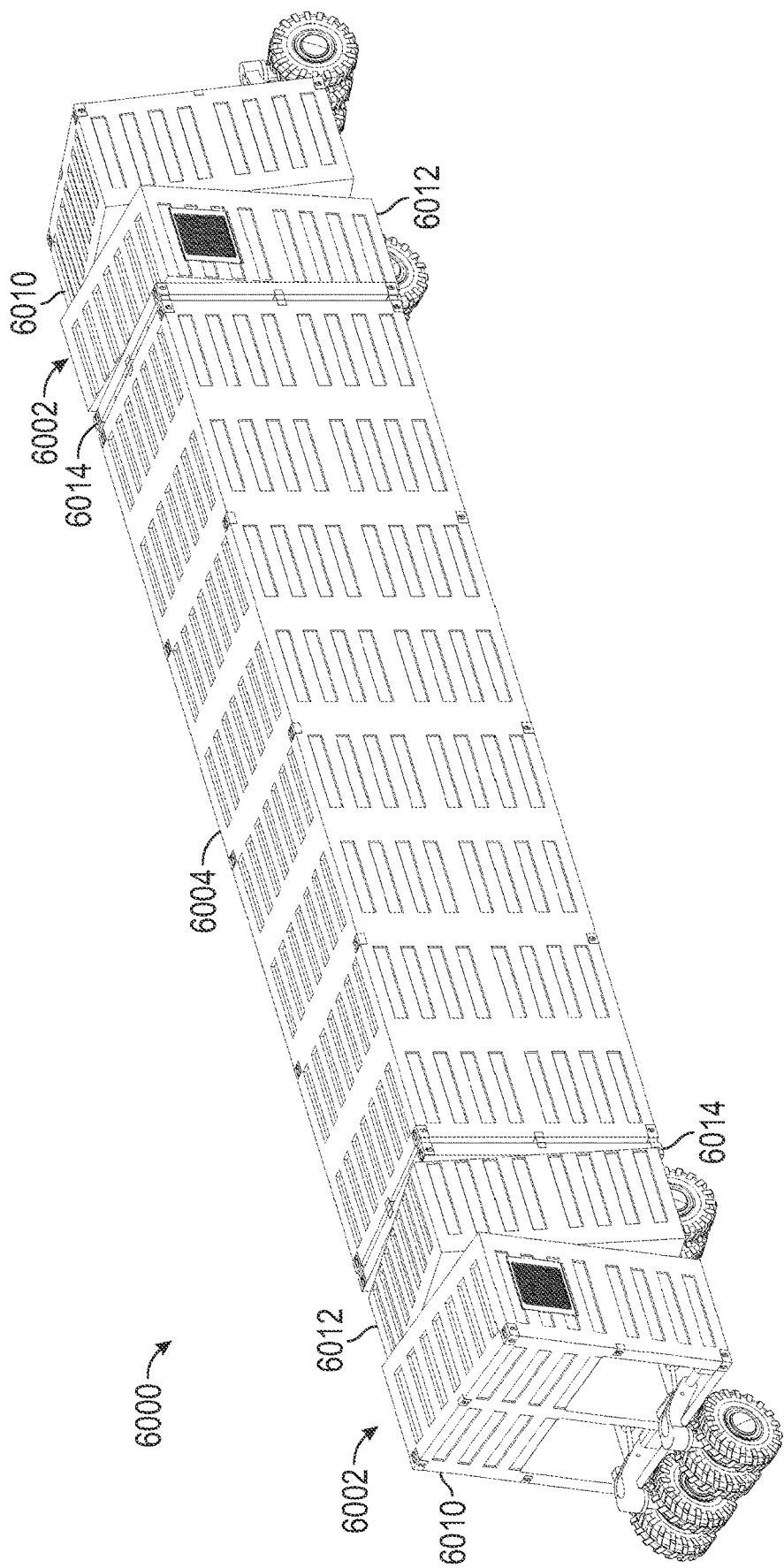
FIG. 60 depicts a perspective view of a cargo transport assembly having rotatable drive containers, according to an embodiment of the present disclosure.

Systems with minimal or no long axis articulation may be acceptable for relatively flat roads. However, once the terrain becomes more challenging, such as in off-road or dirt road scenarios, articulated systems may have an advantage. In FIG. 60, a cargo transport assembly 6000 includes two rotatable 10' drive containers 6002 secured to a 40' container 6004. Each rotatable drive container 6002 has one or more rotating portions that can rotate freely with respect to the container 6004 and/or other portions of the drive container 6002. In certain embodiments, rotating portions can rotate freely without a defined range of rotation. Each 10' drive container 6002 comprises a rotatable end portion 6010, a rotatable center portion 6012, and a secured portion 6014. The secured portion 6014 is secured and fixed to the container 6004. The rotatable center portion 6012 is rotatably secured to the secured portion 6014 (e.g., by a pivot joint). The rotatable center portion 6012 is also rotatably secured to the rotatable end portion 6010 (e.g., by a second pivot joint). In this way, the end portion 6010 and the center portion 6012 are free to rotate relative to one another and relative to the secured portion 6014 and the container 6004 in order to accommodate terrain irregularities. FIG. 60 demonstrates some of the rotatability of the rotatable end portion 6010 and the rotatable center portion 6012. In certain embodiments, the pivot joints used to secure rotatable portions of the drive container 6002 may comprise tank turret rings or other similar systems that provide rotational capability in heavy loaded conditions.

It may be desirable, in certain circumstances, to lock and/or restrict the rotatability of the rotatable end portion 6010 and/or the rotatable center portion 6012. For example, when the drive container 6002 is in a stowed configuration and is being transported as simply a container, it may be desirable to lock the three portions relative to one another such that they remain fixed in a cuboid box shape without rotation. In such embodiments, the rotational systems can include manually, hydraulically, or electrically actuated locking pins and/or pull pins to lock two portions together such that, for example, in flight, rotational components cannot rotate and will transmit any necessary flight loads.

Figure 61:
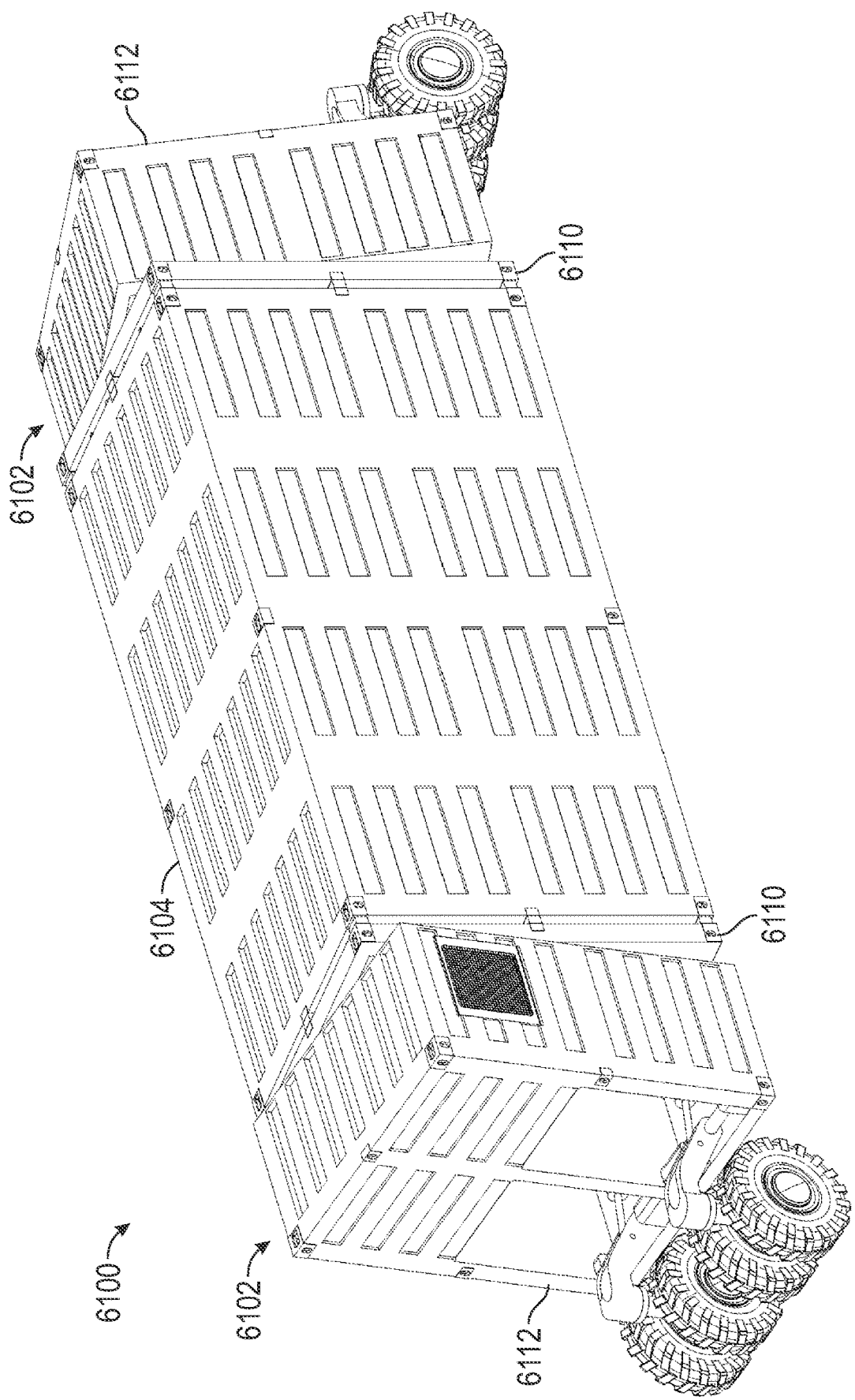
FIG. 61 depicts a perspective view of a cargo transport assembly having rotatable drive containers, according to an embodiment of the present disclosure.

FIG. 61 provides a perspective view of a cargo transport assembly 6100 comprising two 5' rotatable drive containers 6102 mated to a 20' container 6104, according to an embodiment of the present disclosure. The 5' rotatable drive containers 6102 each include a secured portion 6110 that is secured and fixed to the container 6104, and a rotatable end portion 6112 that is rotatably secured to the secured portion 6110. It should be appreciated that any length drive container with any number of rotatable and/or fixed portions are possible.

Figure 62:
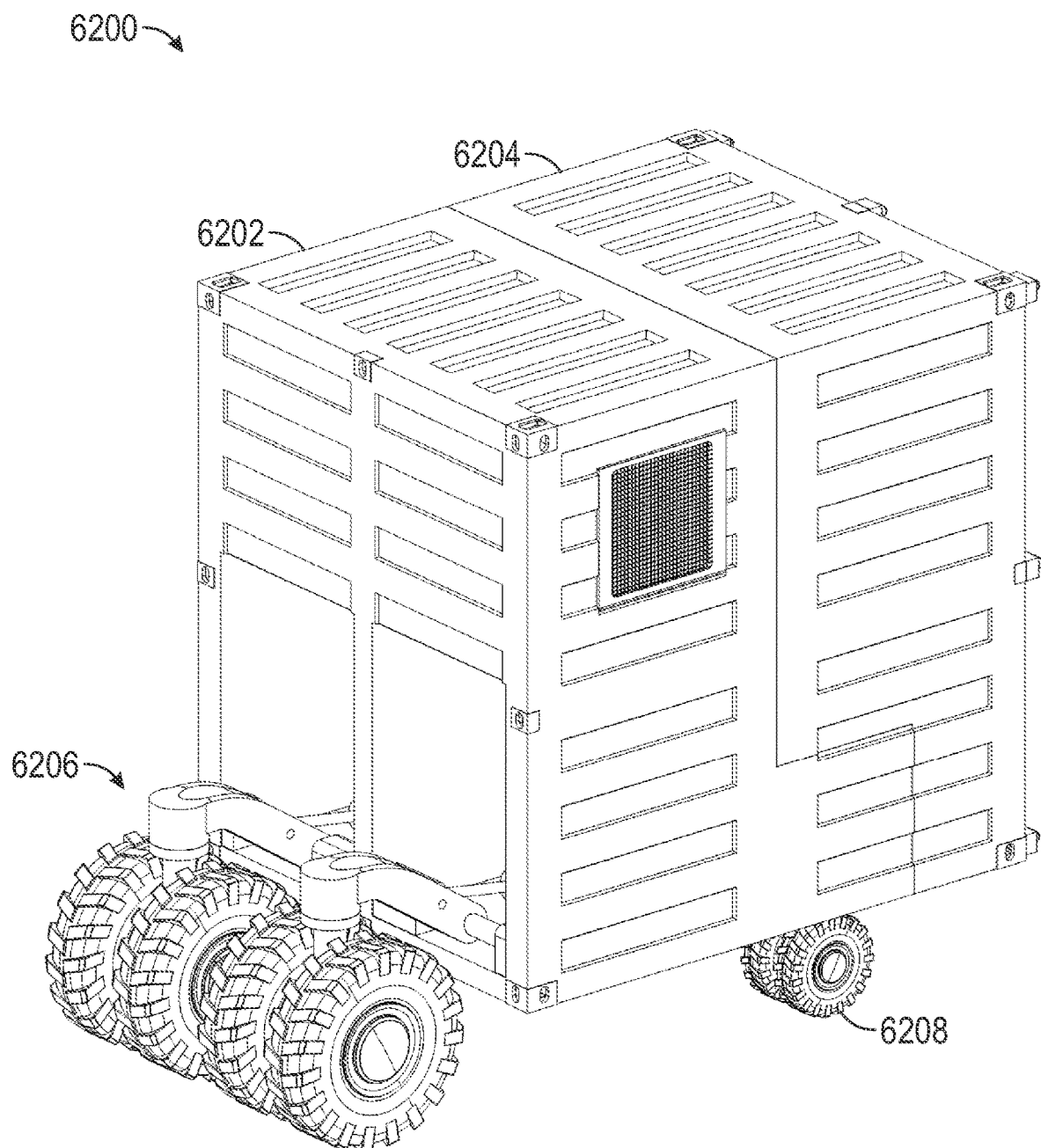
FIG. 62 depicts a perspective view of a configurable drive container, according to an embodiment of the present disclosure.
Figure 63:
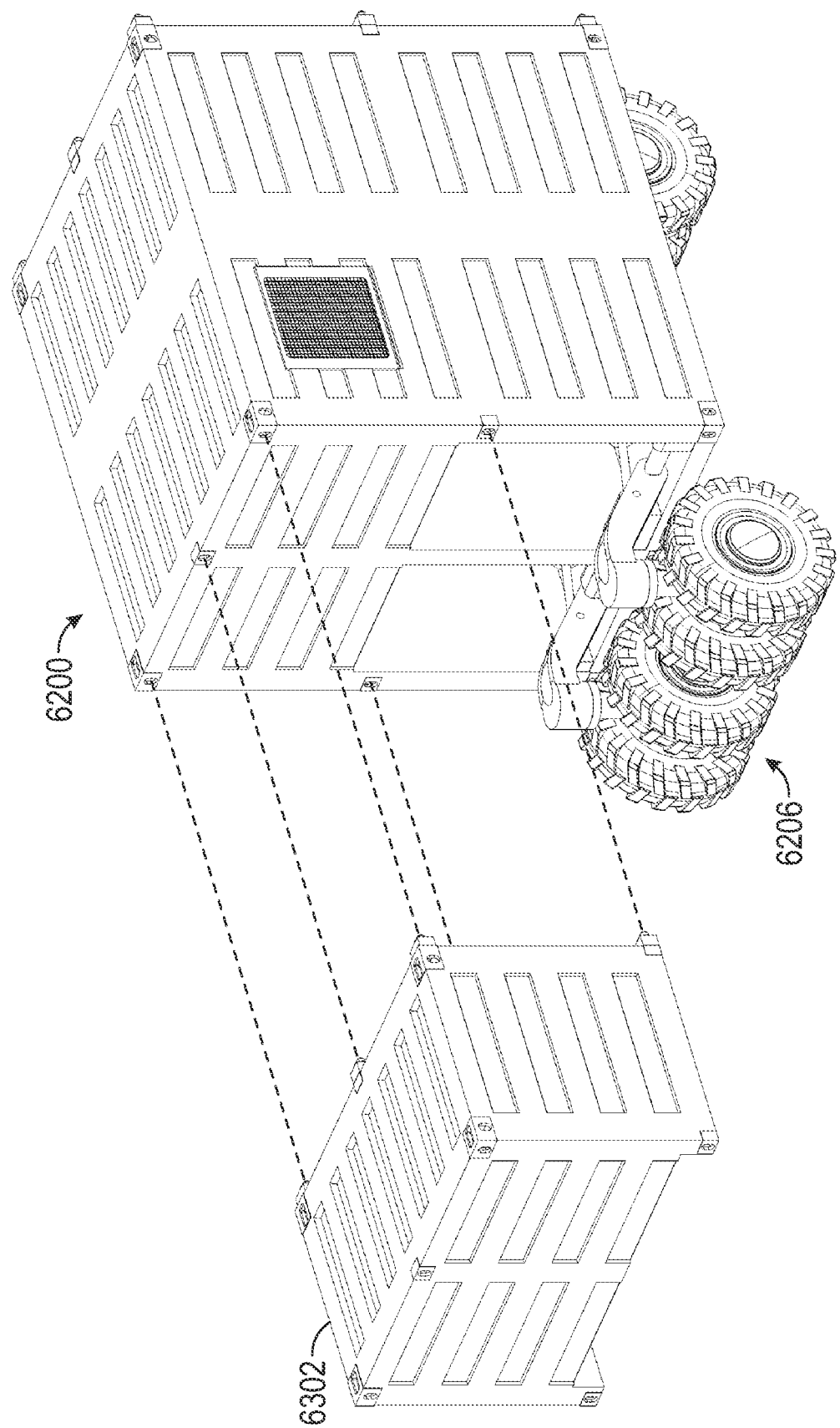
FIG. 63 depicts an exploded perspective view of a configuration drive container and an attachable ballast, according to an embodiment of the present disclosure.

FIG. 62 provides a perspective view of a configurable drive container 6200, according to an embodiment of the present disclosure. The configurable drive container 6200 includes a propulsion end 6202 and a fully configurable end 6204. The propulsion end comprises a retractable/deployable drive wheel assembly 6206 similar to those described herein, and also includes smaller wheels 6208. The smaller wheels 6208 may operate similarly to the casters described herein, or the additional wheels 5602 of FIG. 56. For example, in various embodiments, the smaller wheels 6208 can be retractable into the drive container 6200 and deployable into a deployed state, as shown in FIG. 62. The smaller wheels 6208 may be passive (i.e., free turning) or the smaller wheels 6208 may be powered. In various embodiments, the configurable end 6204 can be customized or configured in numerous ways. For example, the configurable end 6204 can be converted into a forklift to move equipment and containers around. In certain scenarios, heavier configurations can be created with the addition of a ballast 6302 over the main drive wheel assembly 6206 to provide the ability to lift heavier items, as demonstrated in FIG. 63. Multiple ballasts can be added to provide additional weight. In other embodiments, a special container with extension arms can be attached to the propulsion end 6202 to provide the counterweight needed.

Figure 64:
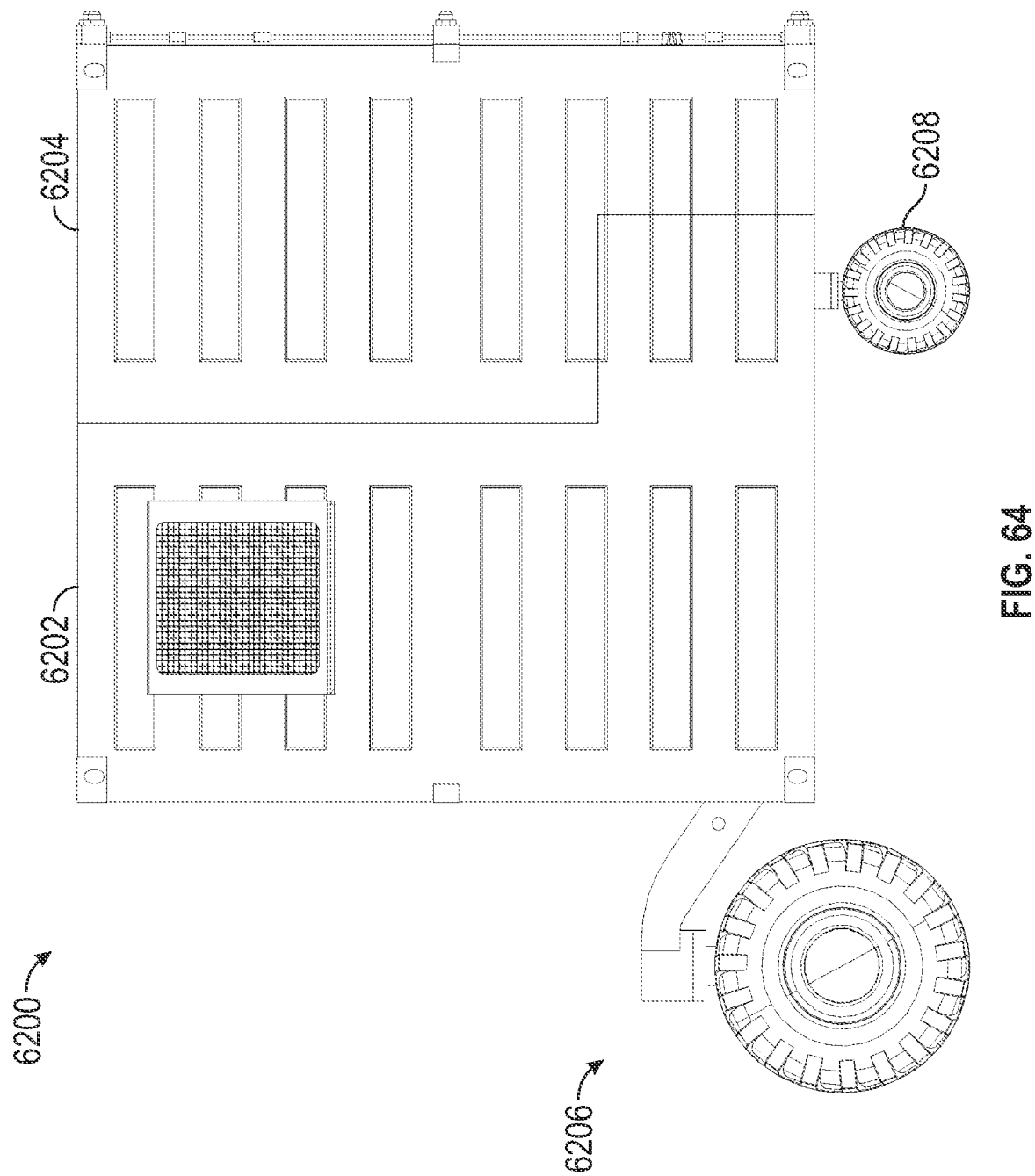
FIG. 64 depicts a side plan view of the configurable drive container of FIG. 62.

FIG. 64 provides a side plan view of the configurable drive container 6200

Figure 65:
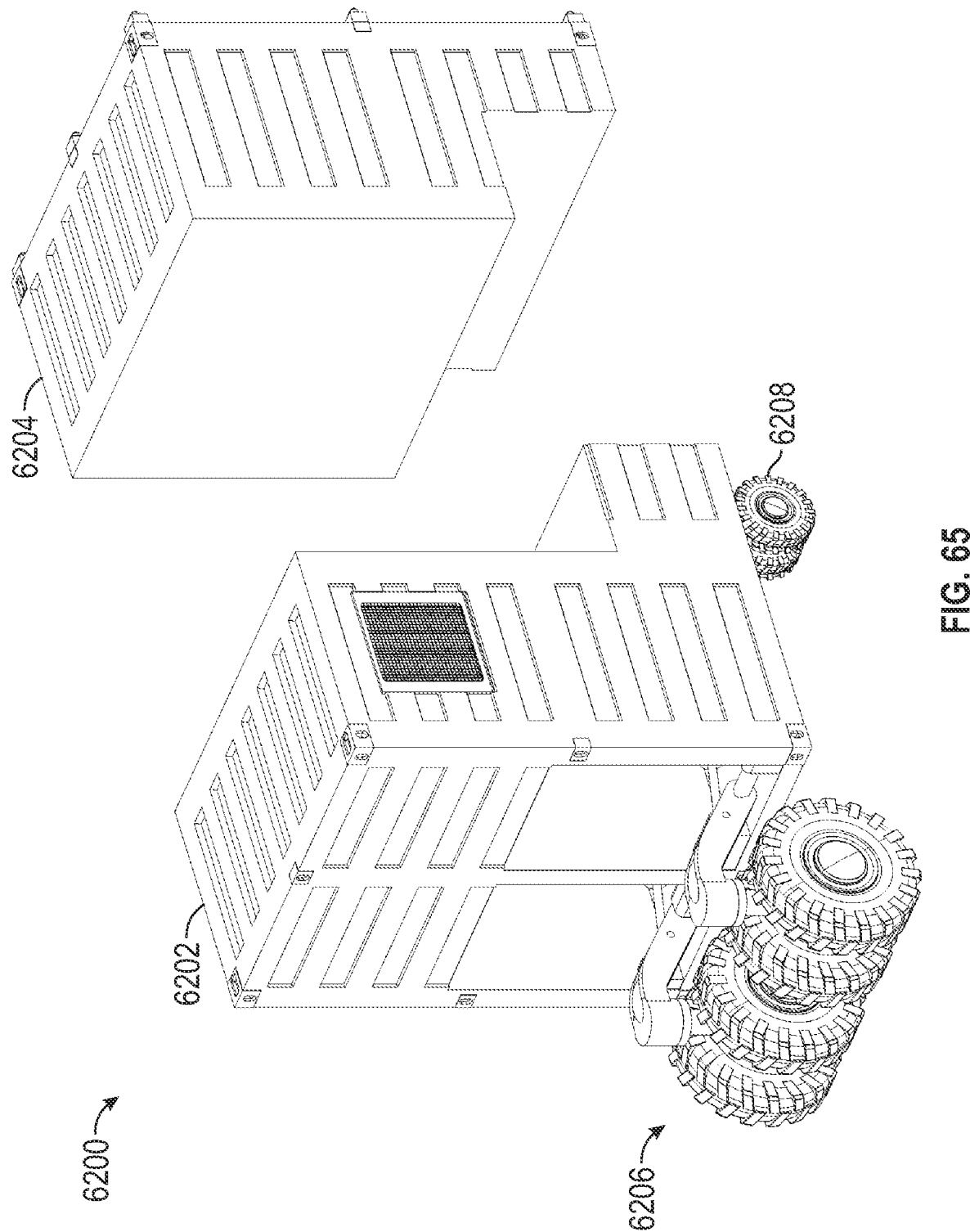
FIG. 65 depicts an exploded view of the configurable drive container of FIG. 62.

FIG. 65 provides an exploded view of the configurable drive container 6200.

Figure 66:
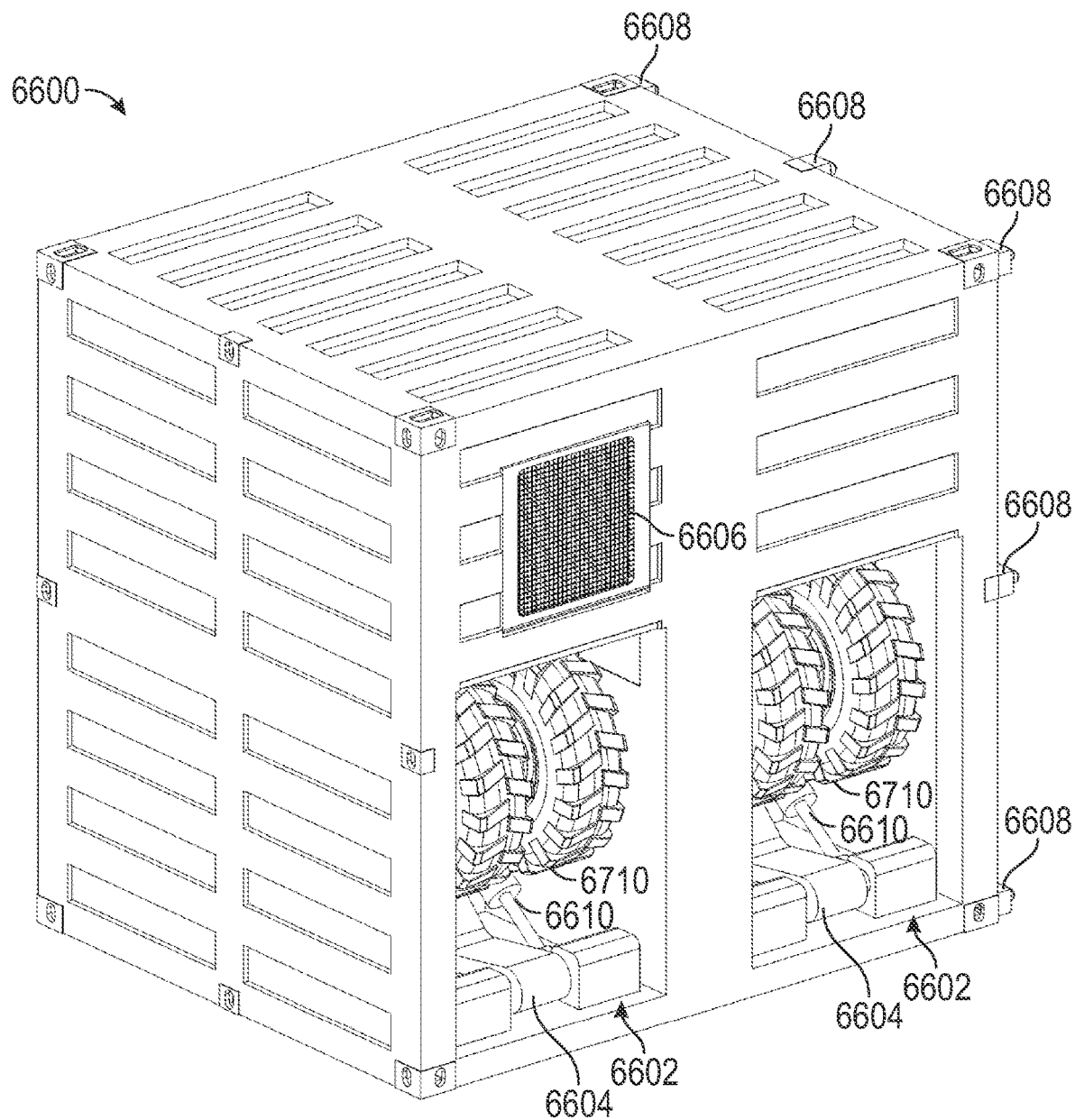
FIG. 66 depicts a perspective view of a side-deployable drive container in a stowed configuration, according to an embodiment of the present disclosure.

Certain embodiments of the present disclosure have been described that include drive containers with drive wheel assemblies that deploy in a front/back direction (i.e., in a length-wise direction). However, it may be desirable, in some embodiments, for drive wheel assemblies to deploy in a side-to-side, or width-wise direction. FIG. 66 provides a perspective view of 10' drive container 6600 with side deployable wheel assemblies 6602, according to an embodiment of the present disclosure. Each wheel assembly is attached to a pivot arm 6604 which can be rotated by an actuating mechanism (e.g., a hydraulic pump) 6605. Each pivot arm 6604 can rotatably transition the wheel assembly 6602 between a stowed configuration and a deployed configuration. A radiator 6606 is also shown. In one embodiment, the wheel assemblies 6602 may be unpowered or passive. In another embodiment, the wheel assemblies may be powered and include a propulsion system for powering the wheel assemblies, such as in-wheel electric motors, as previously discussed. In various embodiments, and as discussed above, each drive container 6600 can include on one surface (e.g., a rear surface) a set of built-in fitting connectors 6608 for securing the drive container 6600 to another container.

Figure 67:
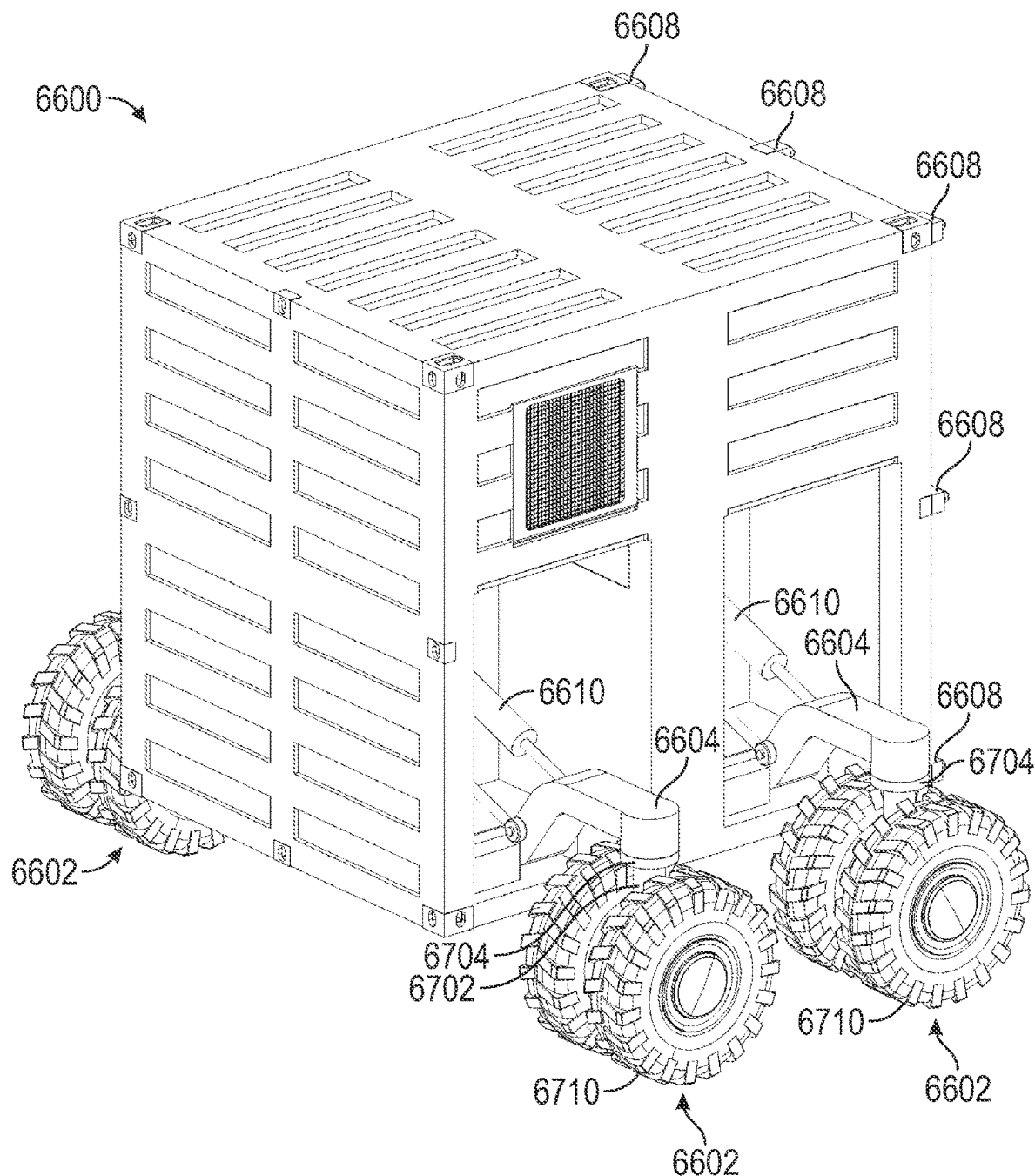
FIG. 67 depicts a perspective view of the side deployable drive container of FIG. 66 in a deployed configuration.

FIG. 67 shows the drive container 6600 in a deployed configuration, with the wheel assemblies 6602 deployed via hydraulic cylinders 6610 rotating each pivot arm 6604. Each wheel assembly 6602 includes a central shaft 6702 and a rotation joint 6704 which secures the wheels 6710 to the pivot arm 6604. The central shaft 6702 and the rotation joint 6704 also allow the wheels 6710 to rotate (e.g., for steering).

In certain embodiments, as shown in FIG. 66, each wheel assembly 6602 can be stowed with the wheels 6710 directed in a side-to-side, or width-wise direction. Upon deployment, the wheels 6710 can be rotated 90 degrees such that they are deployed in the front-to-back or length-wise direction, as shown in FIG. 67. In other embodiments, the wheels 6710 can be stowed in the front-to-back or length-wise direction such that the 90 degree rotation is not needed upon deployment.

Figure 68:
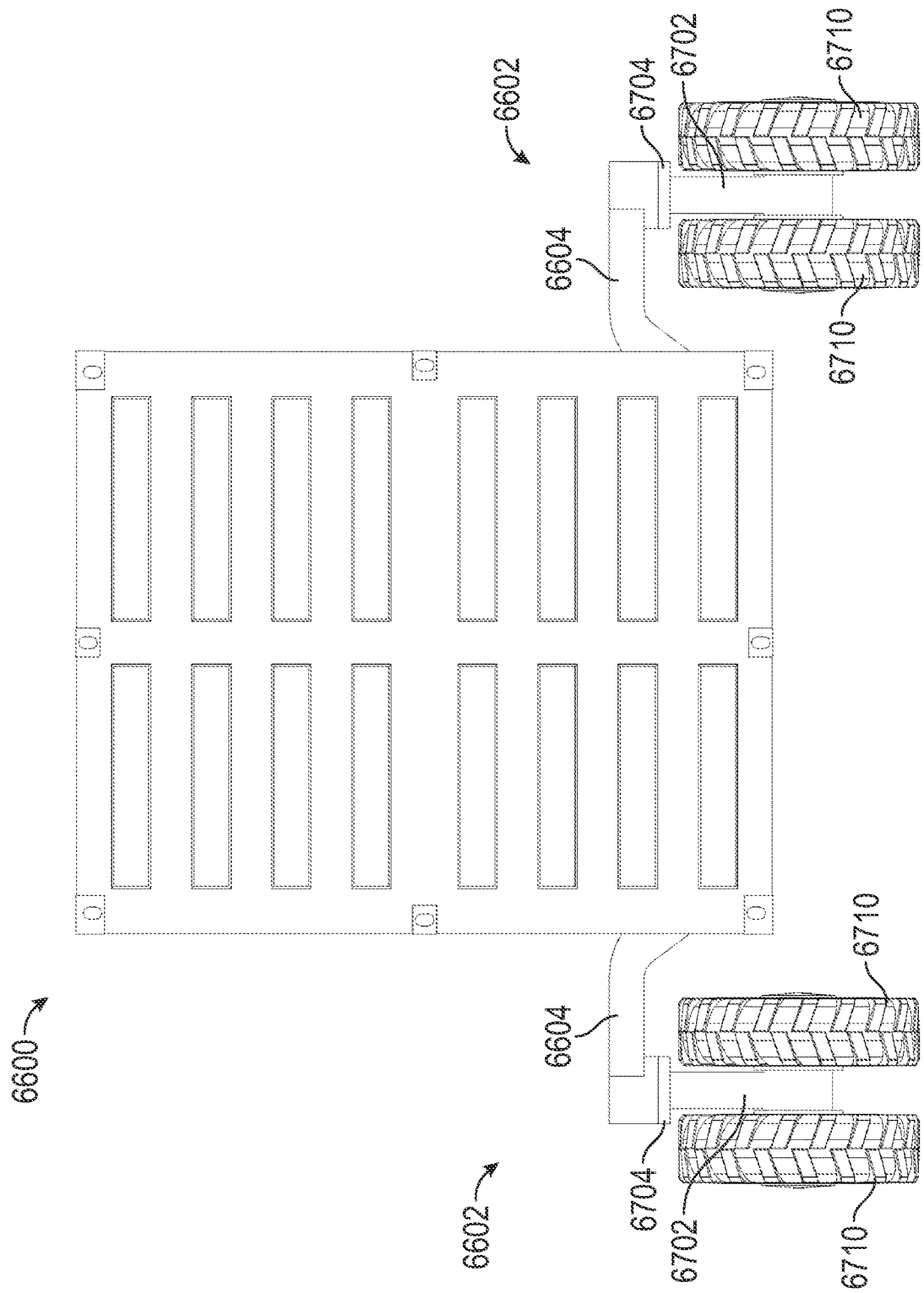
FIG. 68 depicts a front plan view of the side deployable drive container of FIG. 67.

FIG. 68 provides a front plan view of the drive container 6600 in the deployed configuration. Wheel mud flaps and other fairings may be implemented, but are not shown.

Figure 69:
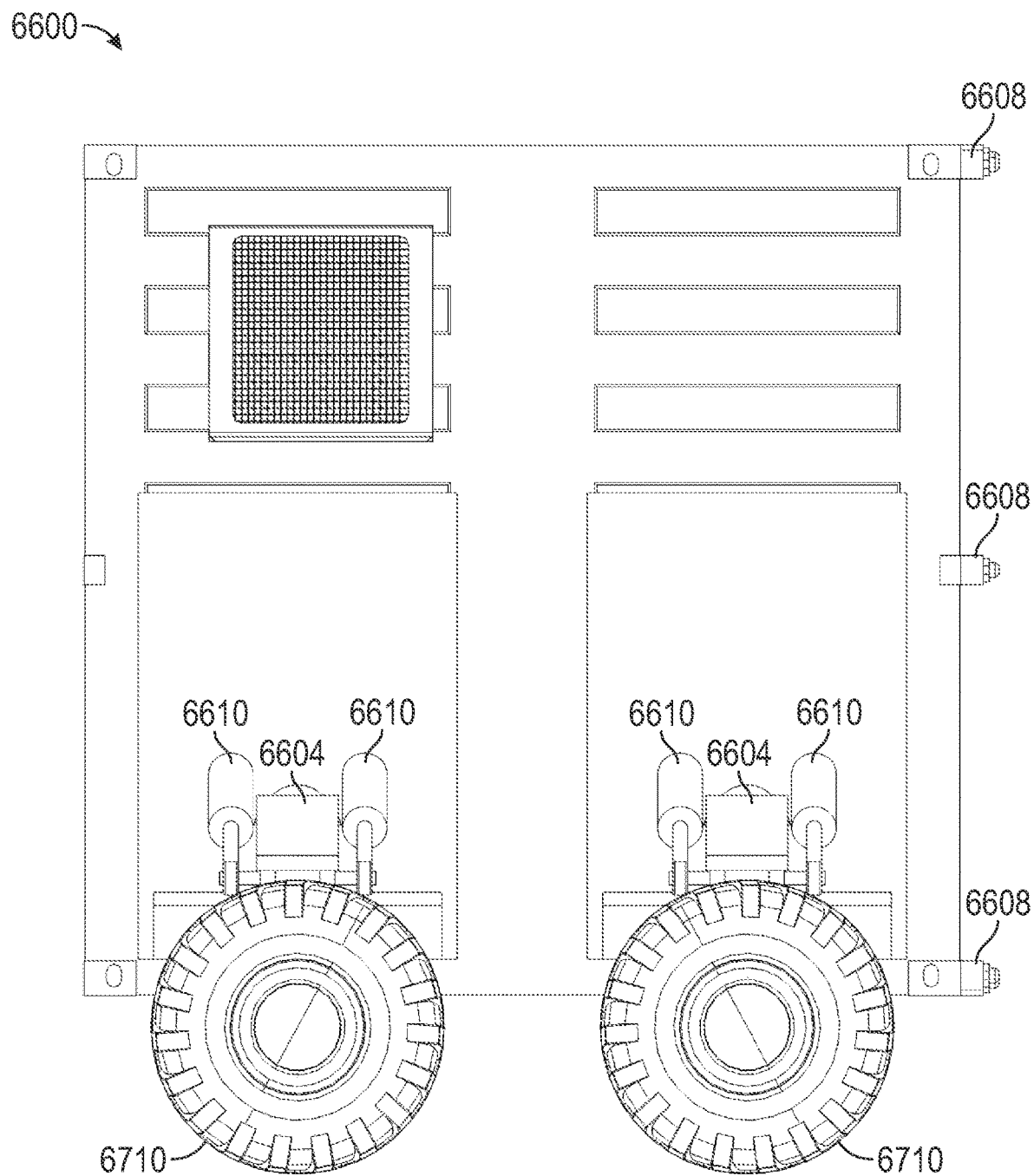
FIG. 69 depicts a side plan view of the side deployable drive container of FIG. 67.

FIG. 69 provides a side plan view of the drive container 6600 in the deployed configuration.

Figure 70:
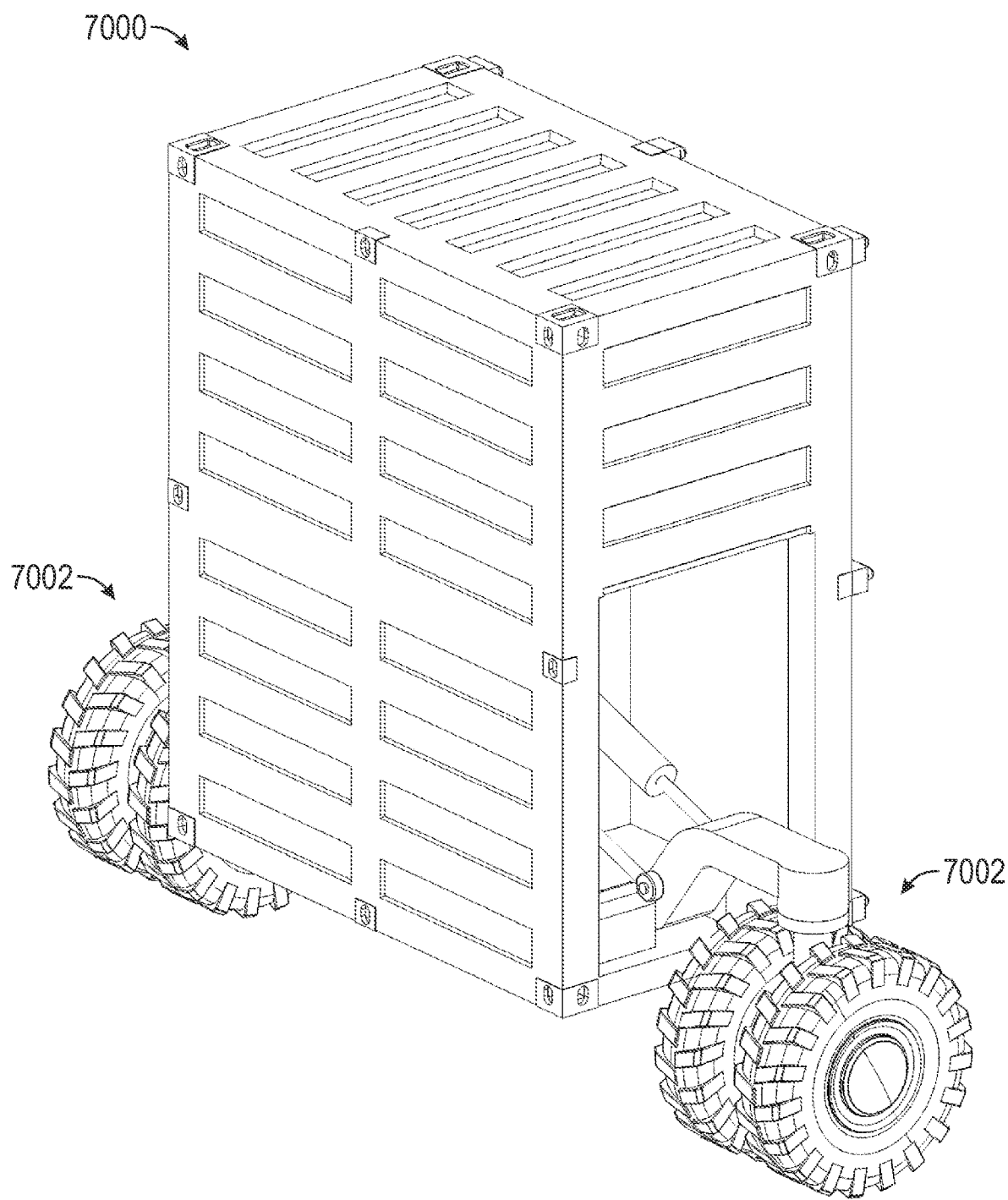
FIG. 70 depicts a perspective view of a side-deployable drive container, according to an embodiment of the present disclosure.

FIG. 70 shows a perspective view of a modified 5' drive container 7000 with side deploying wheel assemblies 7002, according to an embodiment of the present disclosure. The 5' drive container 7000 is substantially similar to the 10' drive container 6600, except that it is half the length and has half the wheel assemblies. In various embodiments, the side-deploying drive containers 6600, 7000 can be powered or unpowered (i.e., passive). For example, the side-deployed drive containers may be unpowered if they are used in the center of a cargo transport assembly to provide additional support for a container assembly being transported, as will be demonstrated in later figures.

Figure 71:
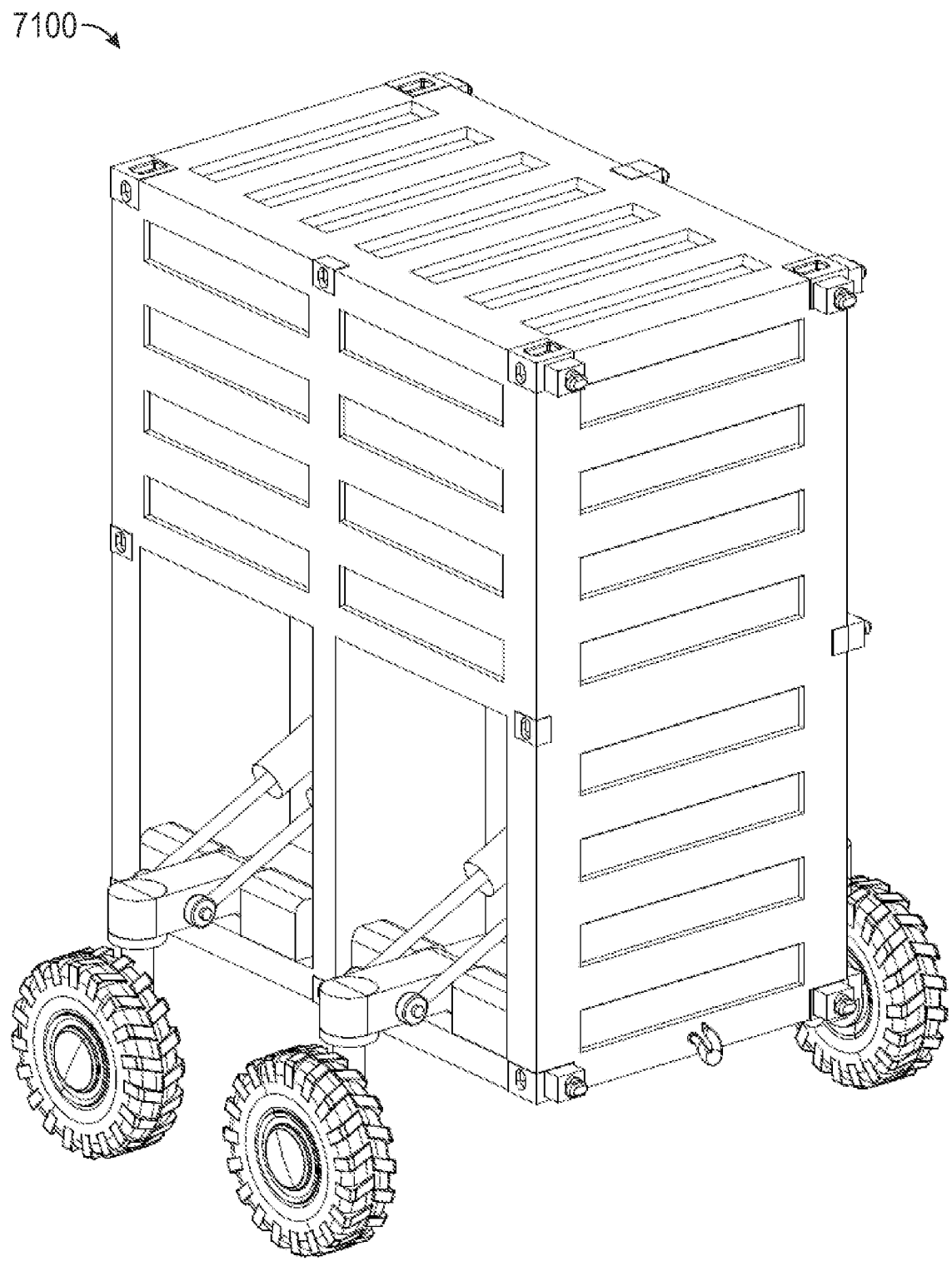
FIG. 71 depicts a perspective view of a transverse-deployable drive container, according to an embodiment of the present disclosure.

FIG. 71 provides a perspective view of a modified 5' drive container 7100 that is similar to the drive container 7000 of FIG. 70, except that the wheel assemblies deploy in a transverse direction (i.e., front-to-back, or length-wise direction) of container 7100. In certain embodiments, the drive container 7000 can have a hook or ball connection to pull trailers or it can have side to side connections to connect to other small width containers in order to access smaller width areas that wider containers cannot access.

Figure 72:
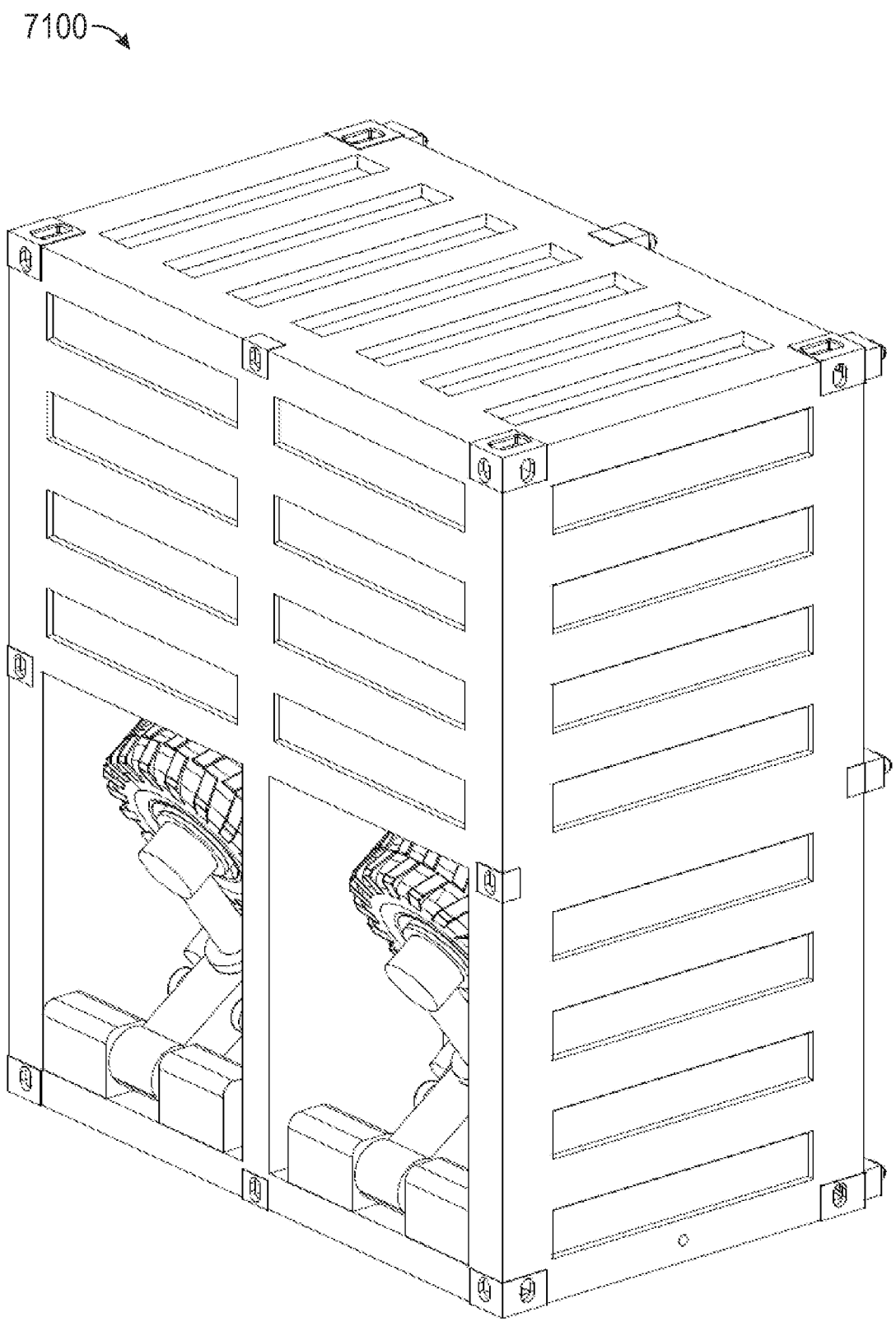
FIG. 72 depicts a perspective view of the transverse-deployable drive container of FIG. 71 in a stowed configuration, according to an embodiment of the present disclosure.

FIG. 72 provides a perspective view of the drive container 7100 in a stowed configuration. The hook has been removed from FIG. 71. The hook may be removably secured to the drive container 7100 using, for example, a threaded end to secure the hook to the container 7100. The hook can also be deployable and retractable.

Figure 73:
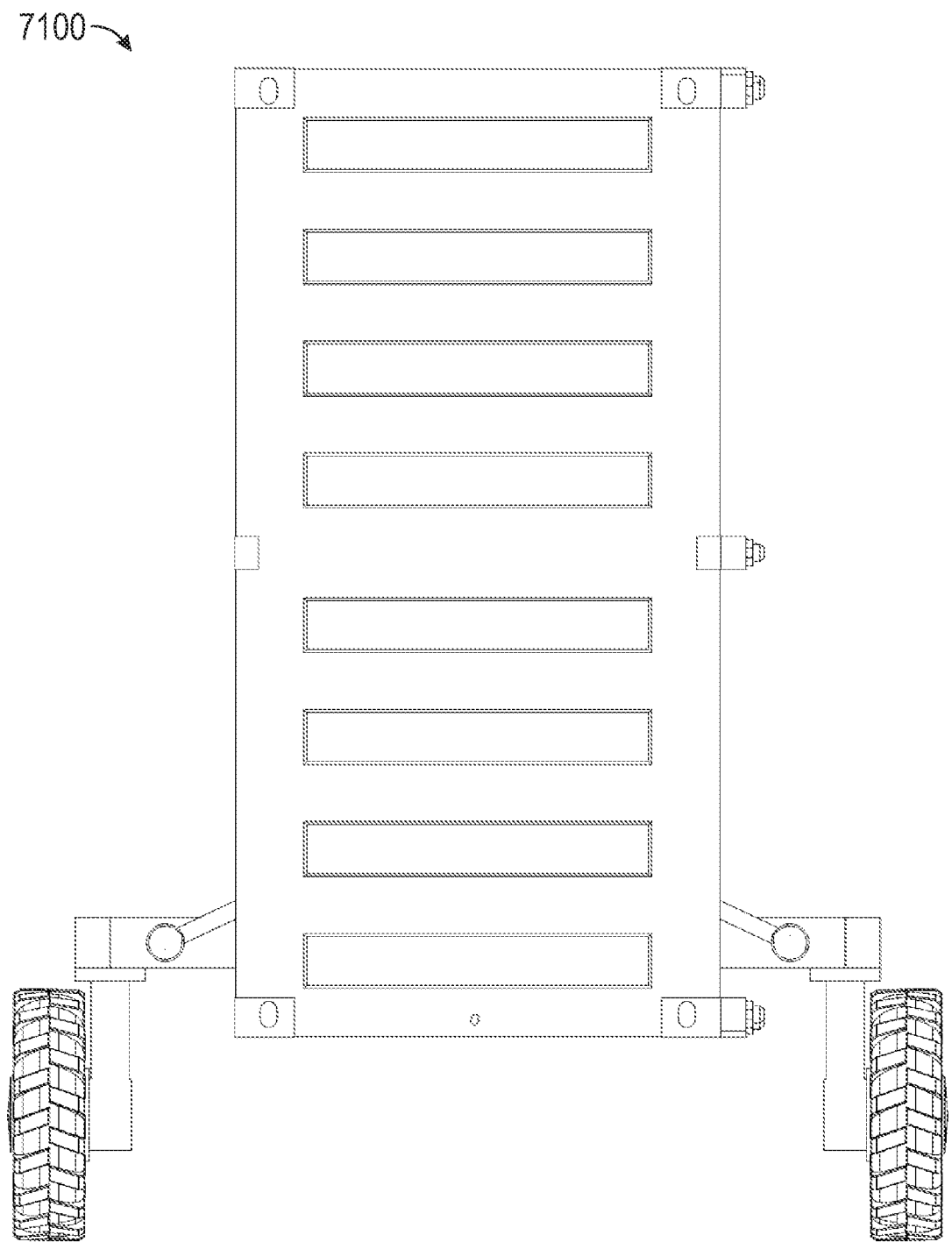
FIG. 73 depicts a side plan view of the transverse-deployable drive container of FIG. 71.

FIG. 73 provides a side plan view of the drive container 7100.

Figure 74:
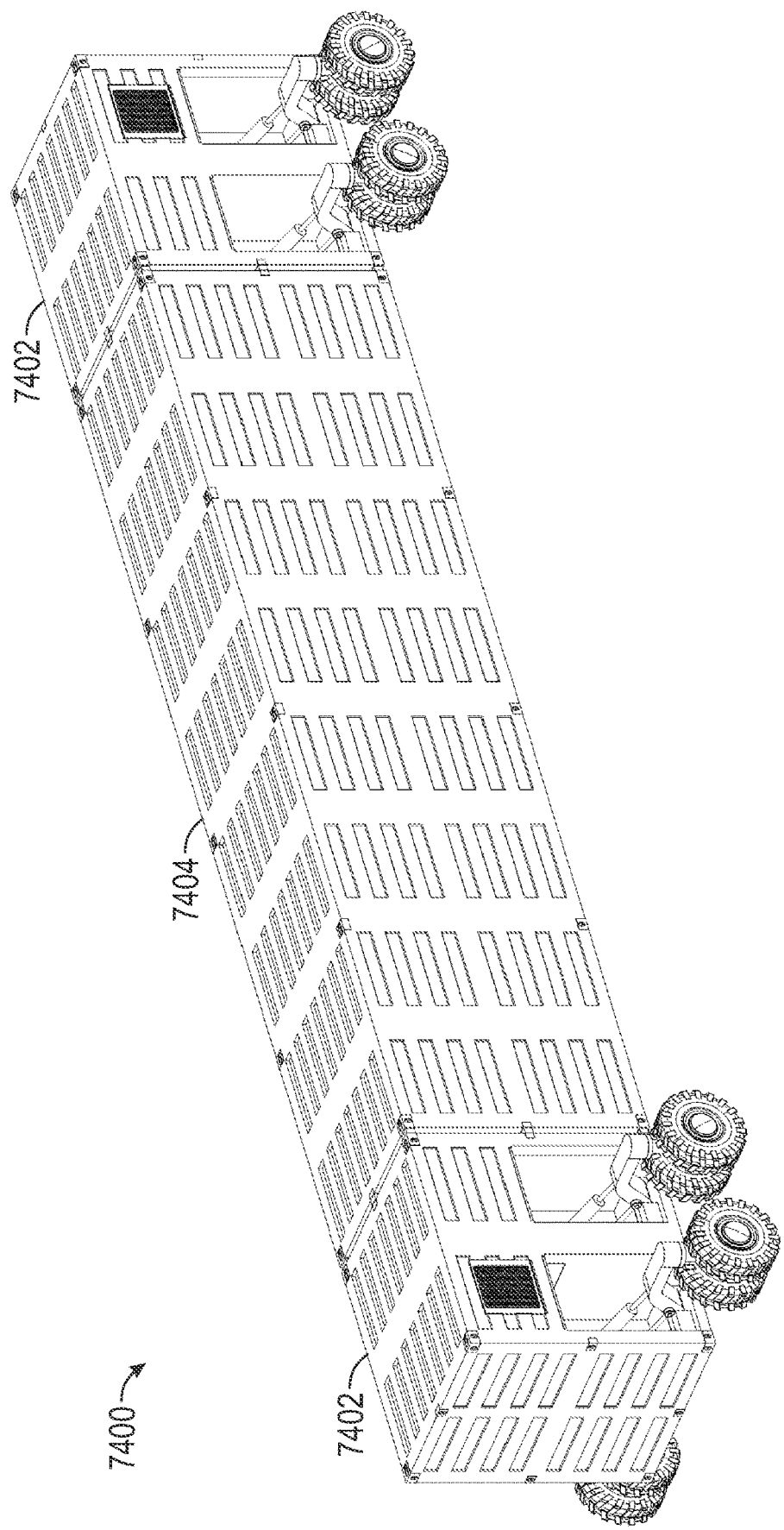
FIG. 74 depicts a perspective view of a cargo transport assembly having side-deployable drive containers, according to an embodiment of the present disclosure.

FIG. 74 provides a perspective view of a cargo transport assembly 7400 comprising two 10' drive containers 7402 connected to a 40' container 7404. Each drive container 7402 may, in one embodiment, be implemented using the drive container 6600 of FIGS. 66-67. In the depicted embodiment, at least one of the drive containers 7402 may be powered and, in certain embodiments, a subset of the drive containers 7402 may be passive or unpowered. As can be seen, containers of differing lengths and drive configurations can be implemented as needed.

Figure 75:
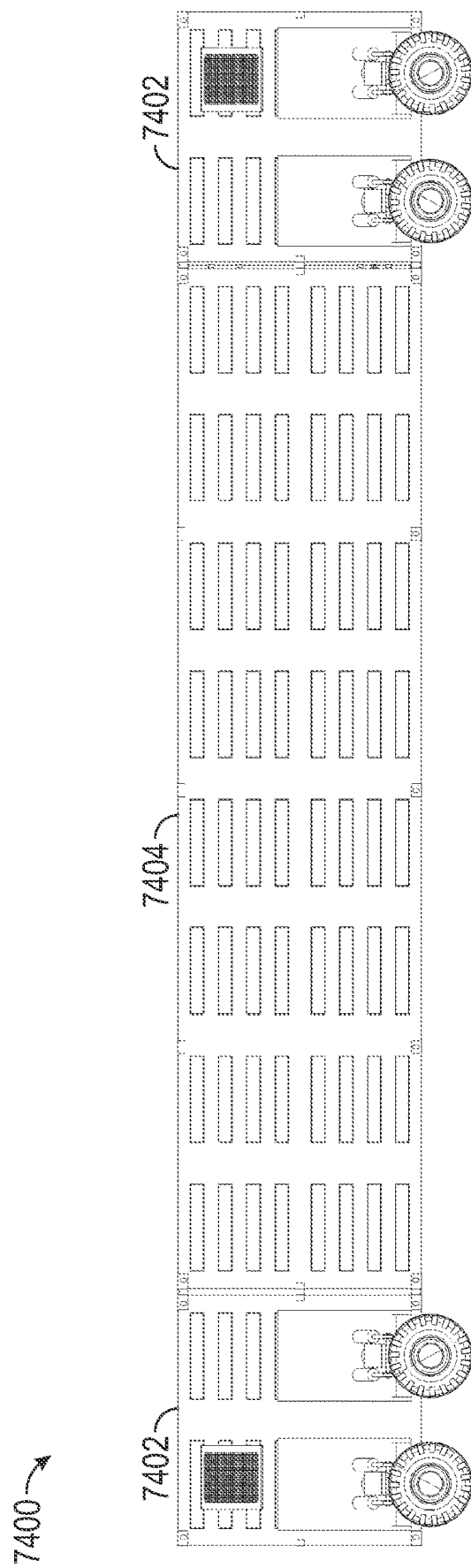
FIG. 75 depicts a side plan view of the cargo transport assembly of FIG. 74.

FIG. 75 provides a side plan view of the cargo transport assembly 7400.

Figure 76:
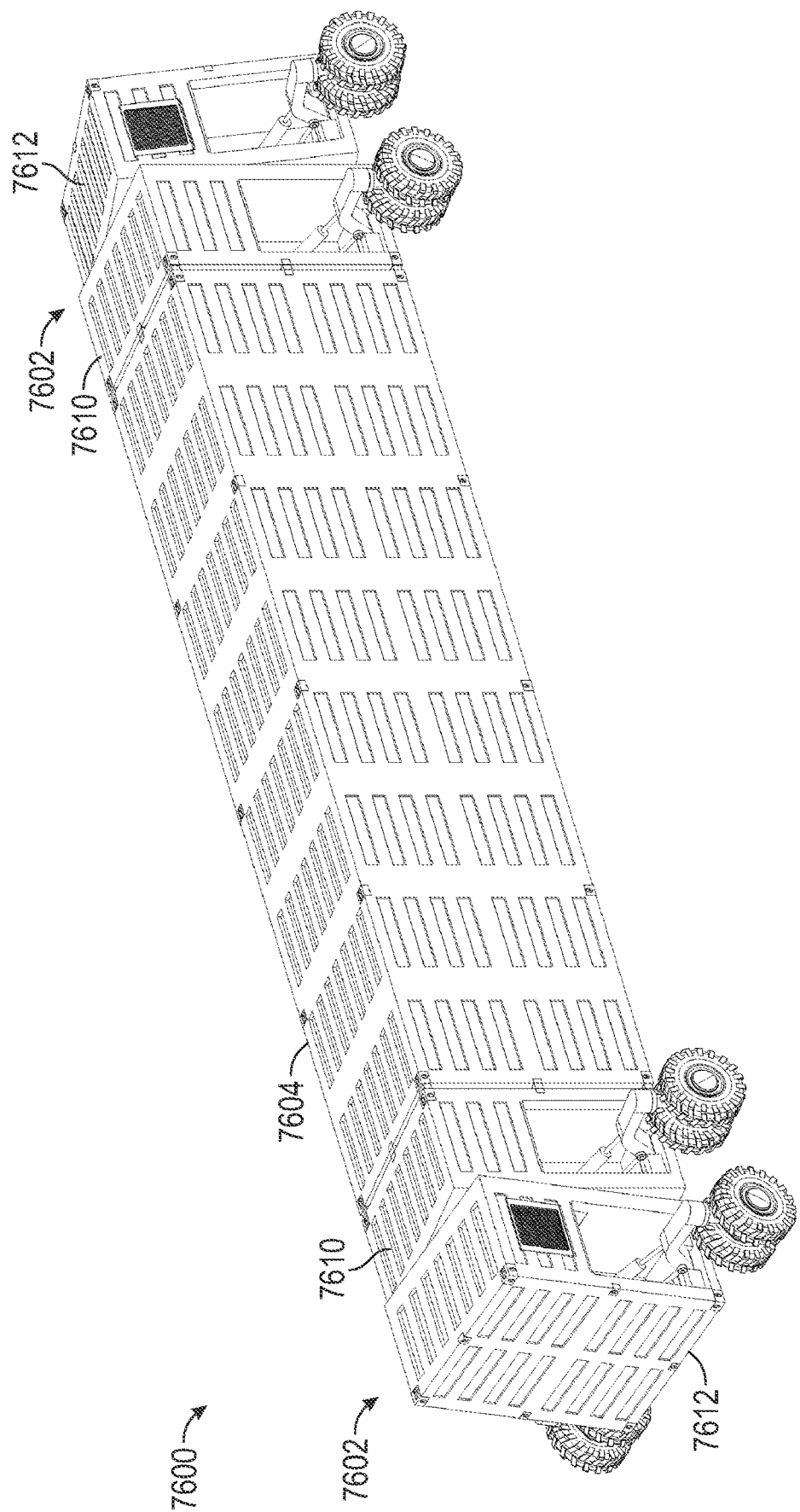
FIG. 76 depicts a perspective view of a cargo transport assembly having rotatable side-deployable drive containers, according to an embodiment of the present disclosure.

FIG. 76 provides a perspective view of a cargo transport assembly 7600 comprising two 10' rotatable drive containers 7602 connected to a 40' container 7604. The cargo transport assembly 7600 is very similar to the cargo transport assembly 7400. However, it is slightly modified in that each drive container 7602 is rotatable, and has a fixed end 7601 secured to the container 7604, and a rotatable end 7612 that is rotatably secured to the fixed end 7610 (e.g., via a center joint). Of course, it can be appreciated that in other embodiments, as described and demonstrated above, each drive container 7602 could include additional rotatable portions and/or fixed portions.

Figure 77:
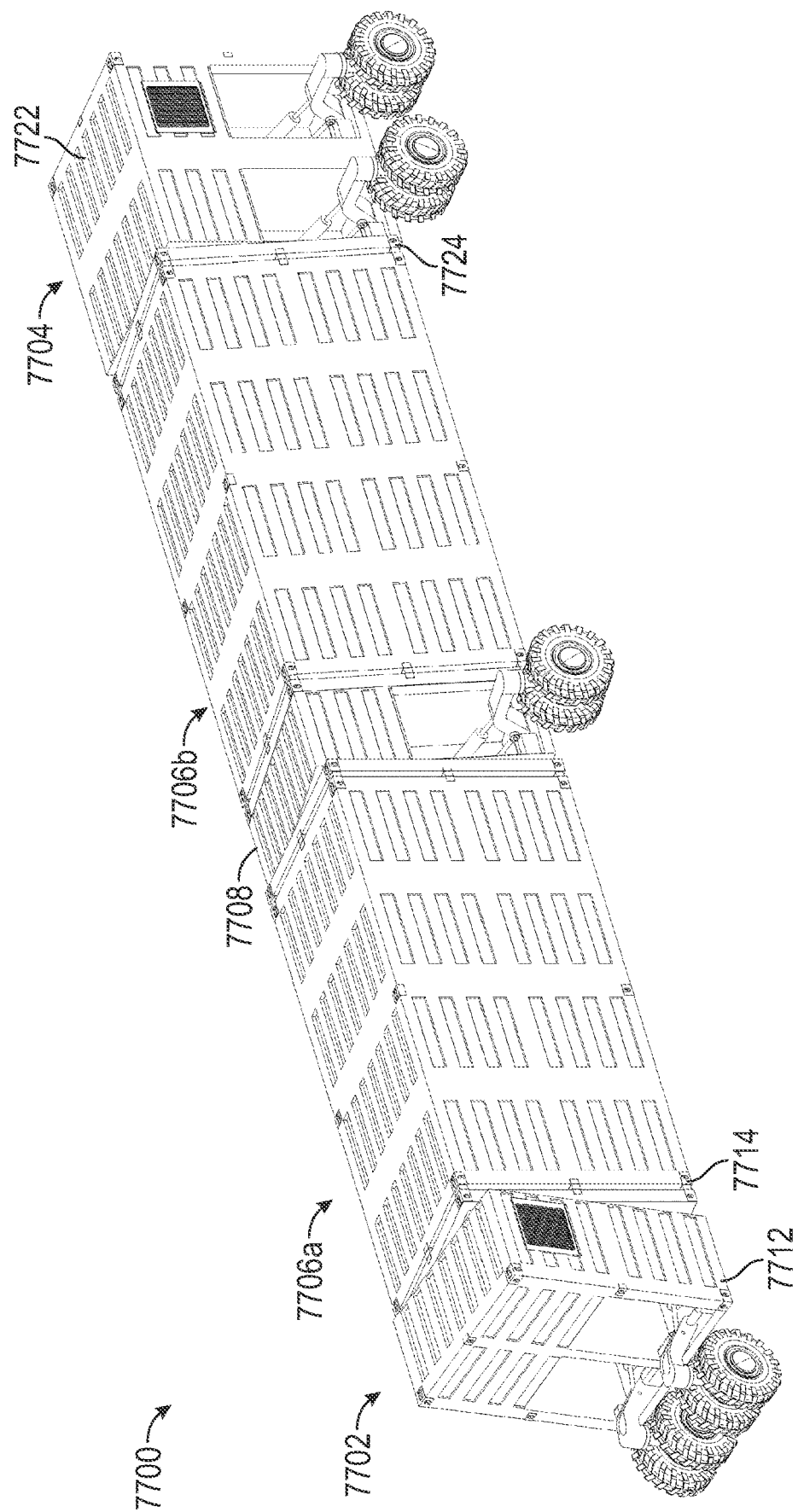
FIG. 77 depicts a perspective view of a cargo transport assembly having rotatable side-deployable drive containers and a central drive container, according to an embodiment of the present disclosure.

FIG. 77 provides a perspective view of a cargo transport assembly 7700 comprising a 5' rotatable drive container 7702, a 10' rotatable drive container 7704, two 20' containers 7706a, 7706b, and a central 5' drive container 7708. The cargo transport assembly 7700 is an example of the flexibility of using multiple parts together. The 5' rotatable drive container 7702 includes a single rotatable portion 7712 that is rotatably secured to a fixed portion 7714. The fixed portion 7714 is secured to the container 7706a. Similarly, the 10' rotatable drive container 7704 includes a single rotatable portion 7722 that is rotatably secured to a fixed portion 7724. The fixed portion 7724 is secured to the container 7706b. Each container 7706a, 7706b is secured to the central drive container 7708. In various embodiments, any combination of the three drive containers 7702, 7704, 7708 may be powered and a subset of the drive containers 7702, 7704, 7708 may be passive/unpowered. If desired, the central drive container 7708 could also be implemented as a rotatable drive container with a one or more fixed secured portions and one or more rotatable portions.

Figure 78:
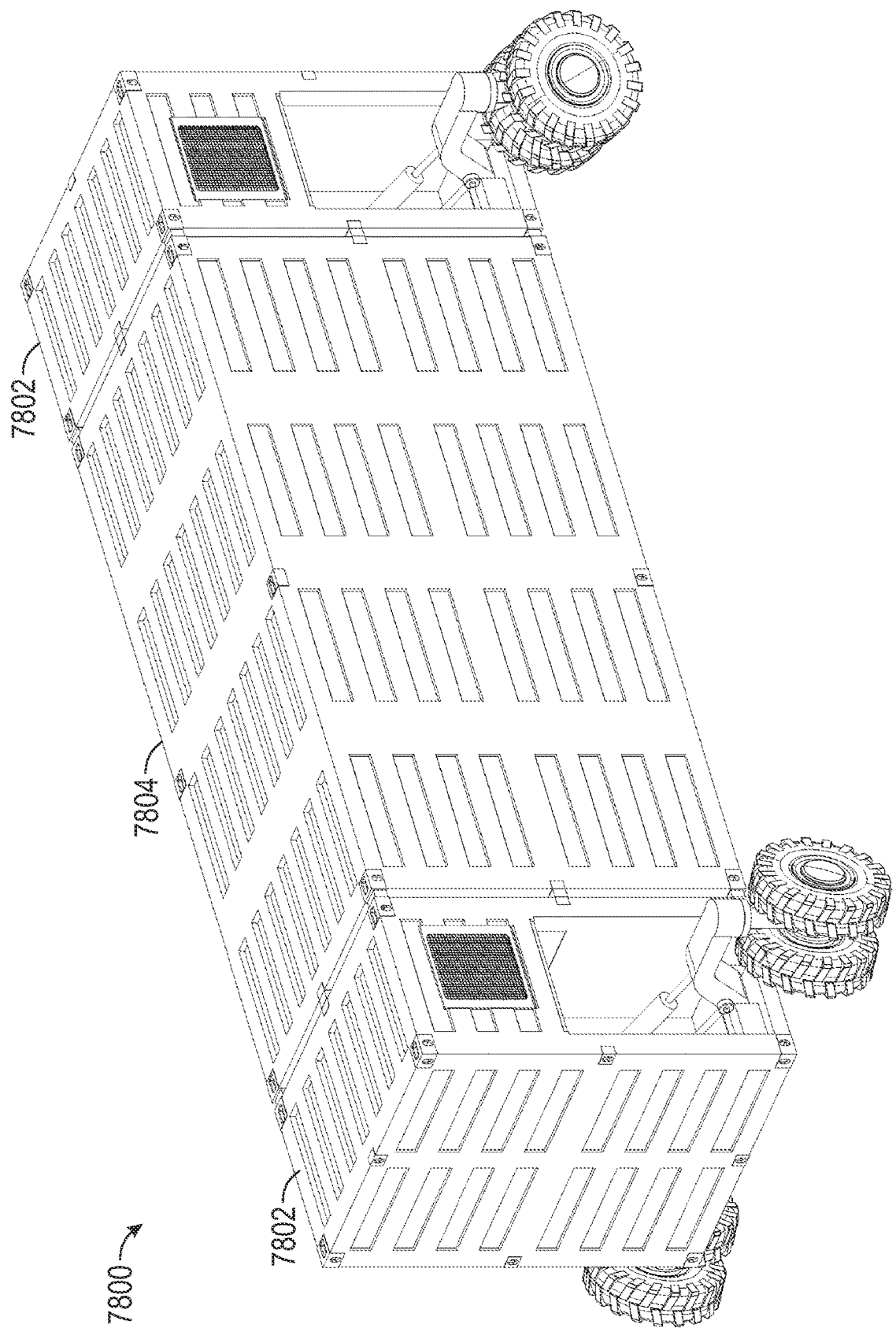
FIG. 78 depicts a perspective view of a cargo transport assembly having side-deployable drive containers, according to an embodiment of the present disclosure.

FIG. 78 provides a perspective view of a cargo transport assembly 7800 comprising two 5' drive containers 7802 with dual side deployable wheels (similar to the 5' drive container 7000 of FIG. 70) carrying a 20' container 7804.

Figure 79:
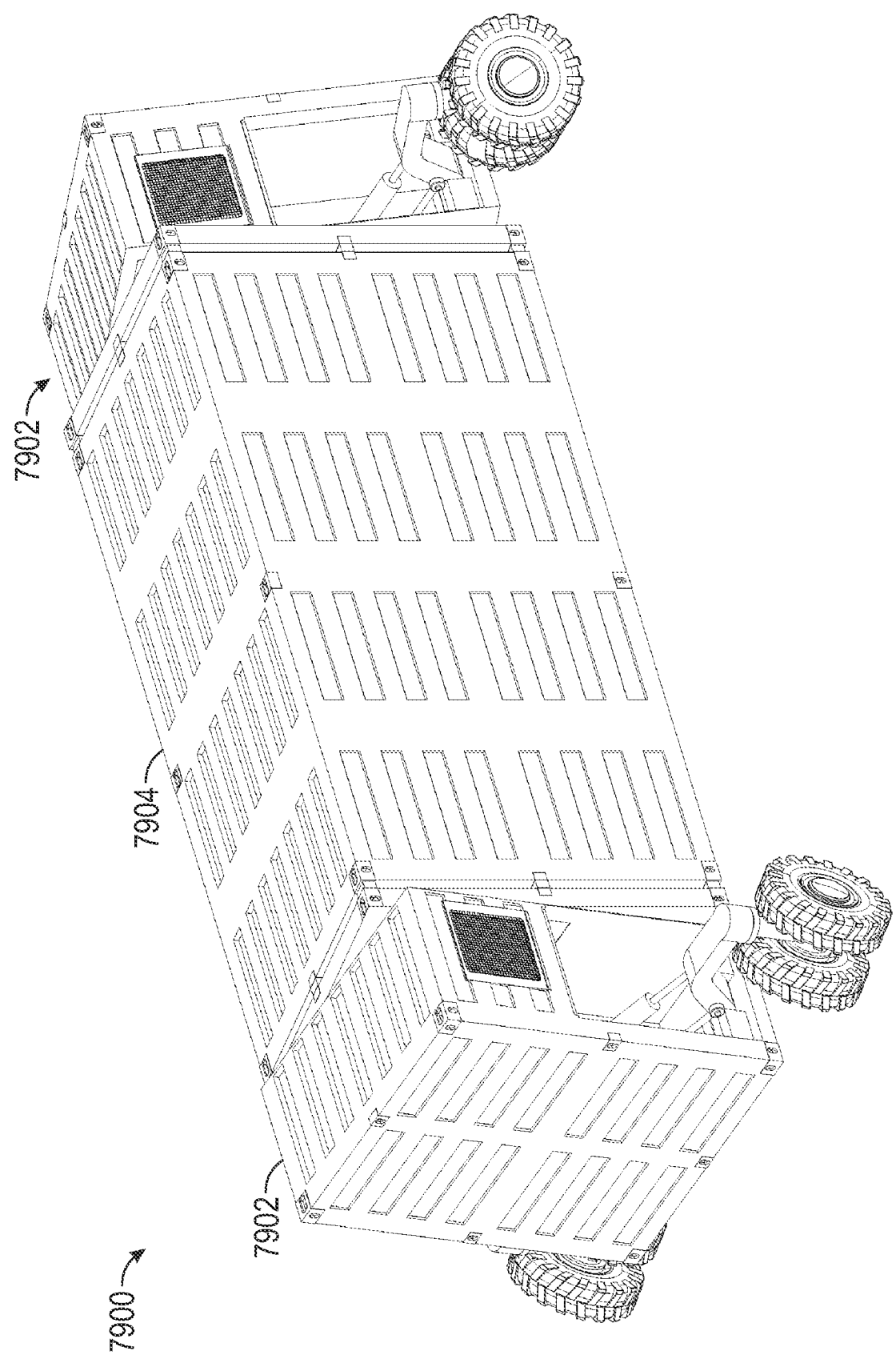
FIG. 79 depicts a perspective view of a cargo transport assembly having rotatable side-deployable drive containers, according to an embodiment of the present disclosure.

FIG. 79 provides a perspective view of a cargo transport assembly 7900 comprising two 5' rotatable drive containers 7902 carrying a 20' container 7904. The cargo transport assembly 7900 is very similar to the cargo transport assembly 7800, except that each drive container 7902 has been made rotatable by including a rotating portion and a fixed portion, as has been described above.

Figure 80:
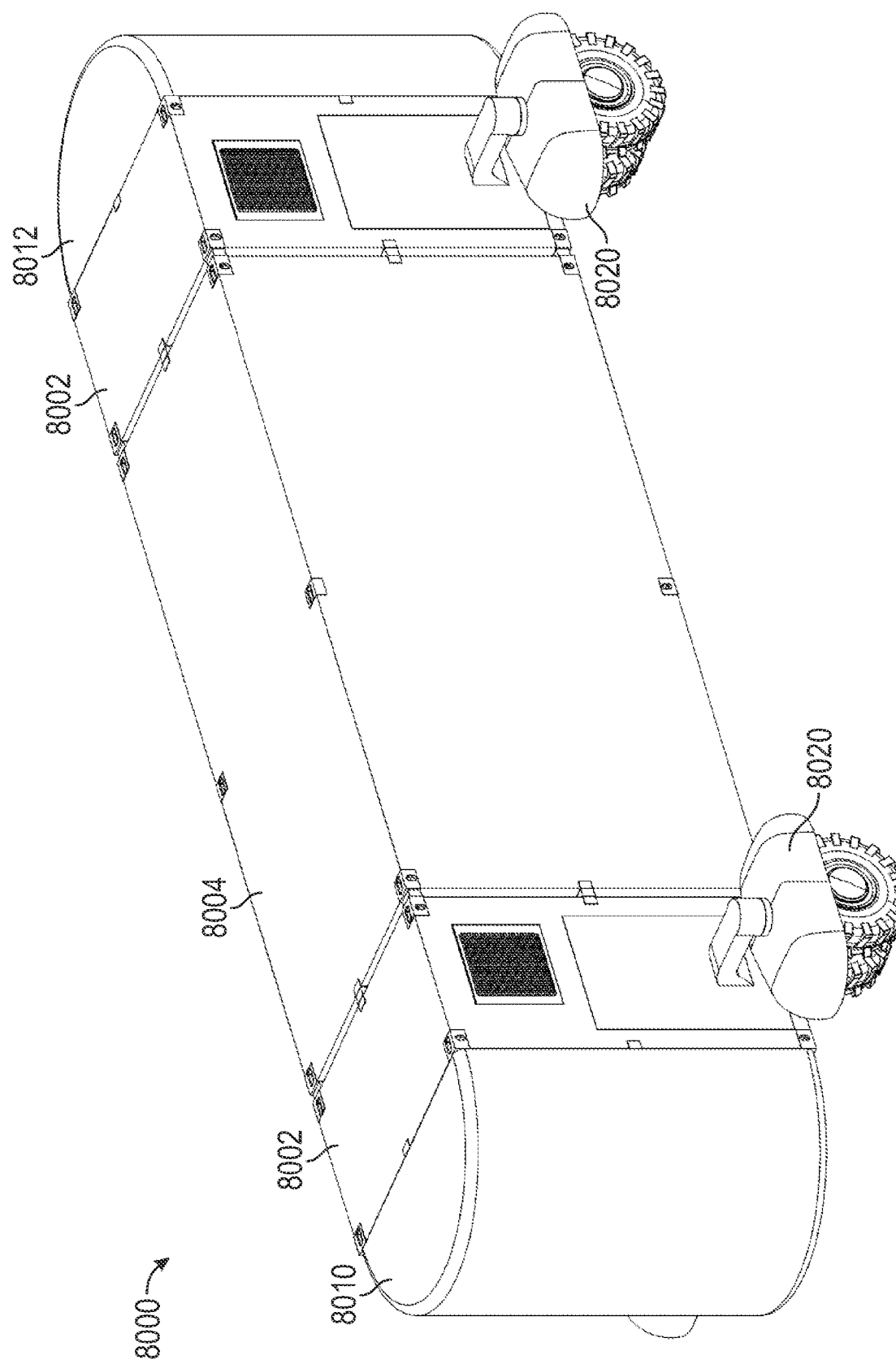
FIG. 80 depicts a perspective view of an aerodynamic cargo transport assembly, according to an embodiment of the present disclosure.

FIG. 80 provides a perspective view of a cargo transport assembly 8000, according to an embodiment of the present disclosure. The cargo transport assembly 8000 includes two 5' drive containers 8002 with side-deploying wheel assemblies carrying a 20' container 8004. The cargo transport assembly 8000 includes various features which improve the aerodynamics of the cargo transport assembly in order to improve fuel consumption. For example, the cargo transport assembly 8000 has containers with smooth sidewalls. The cargo transport assembly 8000 also includes a rounded, semi-cylindrical front fairing 8010, and a rounded, semi-cylindrical rear fairing 8012. In certain embodiments, the front fairing 8010 and the rear fairing 8012 may be built into the drive containers 8002 such that they are retractable and deployable as needed. In other embodiments, the fairings 8010, 8012 may be removably attached to the drive containers 8002. The cargo transport assembly 8000 also includes wheel covers 8020 which cover at least a portion of the wheels to further improve aerodynamic performance. It should be understood that any combination of these aerodynamic features may be applied to any of the containers (including drive containers), container assemblies, and/or cargo transport assemblies disclosed herein.

In various embodiments, containers can communicate with each other via wireless and/or wired connections, as has been described above. In various embodiments, containers may also be able to transmit electrical power to one another if necessary, as has also been described above. It should be understood that while various examples of drive containers were shown in 5' and 10' configurations, any sized container can be modified into a drive container having one or more wheel assemblies and, in certain instances, one or more propulsion systems. Drive containers may be powered drive containers with propulsion systems, or passive drive containers with free-turning wheels. Furthermore, certain powered drive containers may be utilized as passive drive containers by de-activating or not utilizing the propulsion systems. In addition, vertically and side articulated systems can be developed to further expand the capabilities of these reconfigured container shapes.

Fueling systems can be implemented that would automatically refuel the other automated systems. Forklift systems can be used to move containers around and assist in assembly of container assemblies and/or cargo transport assemblies. Stacking systems that can stack up two high containers, and many other systems including weaponized, defensive and offensive systems, jamming systems, radar systems, missile systems, tanker systems, laser systems, and many other configurations are possible.

Instead of treating the container as a necessary evil that needs to be disposed of once goods and/or systems are delivered, the present disclosure utilizes the container as a backbone structure that can be used to reduce the weight of all the other systems while maintaining structural integrity. Instead of a full aircraft fuselage, the fuselage can be converted into a spine container combination. Instead of using a truck to carry the container as dead weight, the container is converted into a major component of the truck's structure.

With the continued advent of robotics and automation, and with more standardization and modularization available, the easier it will be to automate. It is much easier to automate the moving of containers as has been shown in today's modern container ports than to move an unlimited number of various sized objects.

Using the container as part of the aircraft structure and/or as ground systems structure helps to create reduced weight systems that can translate to reduced fuel, reduced material use in fabrication, and reduced space requirements in the logistics chain.

Previous portions of the present disclosure have demonstrated how a container can become a modular unit that ties ground, sea, and air systems. In the next portion, various embodiments demonstrate how a truck system itself can be containerized making it easier to move around, but still be compatible with today's semi-tractor trailer system. Various embodiments also demonstrate how a robotic truck system can be made from modular containers and thus itself become a container when in a stowed or retracted state.

Figure 81:
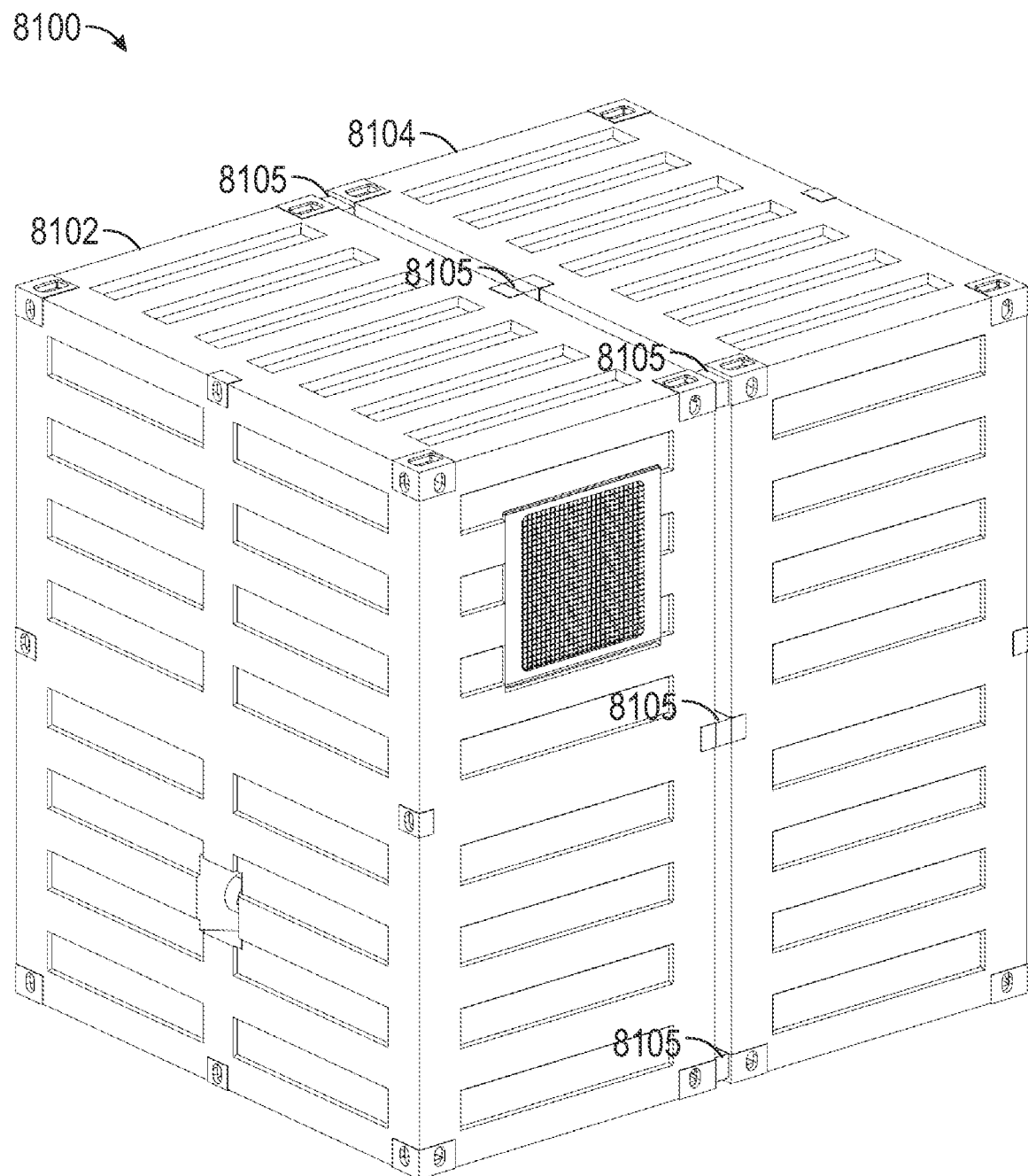
FIG. 81 depicts a perspective view of a semi-truck propulsion system in a stowed configuration, according to an embodiment of the present disclosure.

FIG. 81 presents a perspective view of a semi-truck-type transport system 8100 in a stowed (or containerized) configuration, according to an embodiment of the present disclosure. The system 8100 includes two modified 5' containers 8102, 8104 secured together using fitting connectors 8105. The depicted embodiment includes a first container 8102 houses a retractable/deployable a semi-truck-type chassis system, as will be described in greater detail below. A second container 8104 is used to cover components of the chassis system when it is in a retracted state. When the chassis system is extended/deployed, the cover container 8104 can be removed, and attached to the opposite side of the container 8102, as will be shown in the following figures. In the depicted retracted state, the semi-truck-type transport system is, in one embodiment, dimensionally identical to two 5' intermodal containers connected together (as described herein), and includes the identical fittings of two connected 5' intermodal containers.

Figure 82:
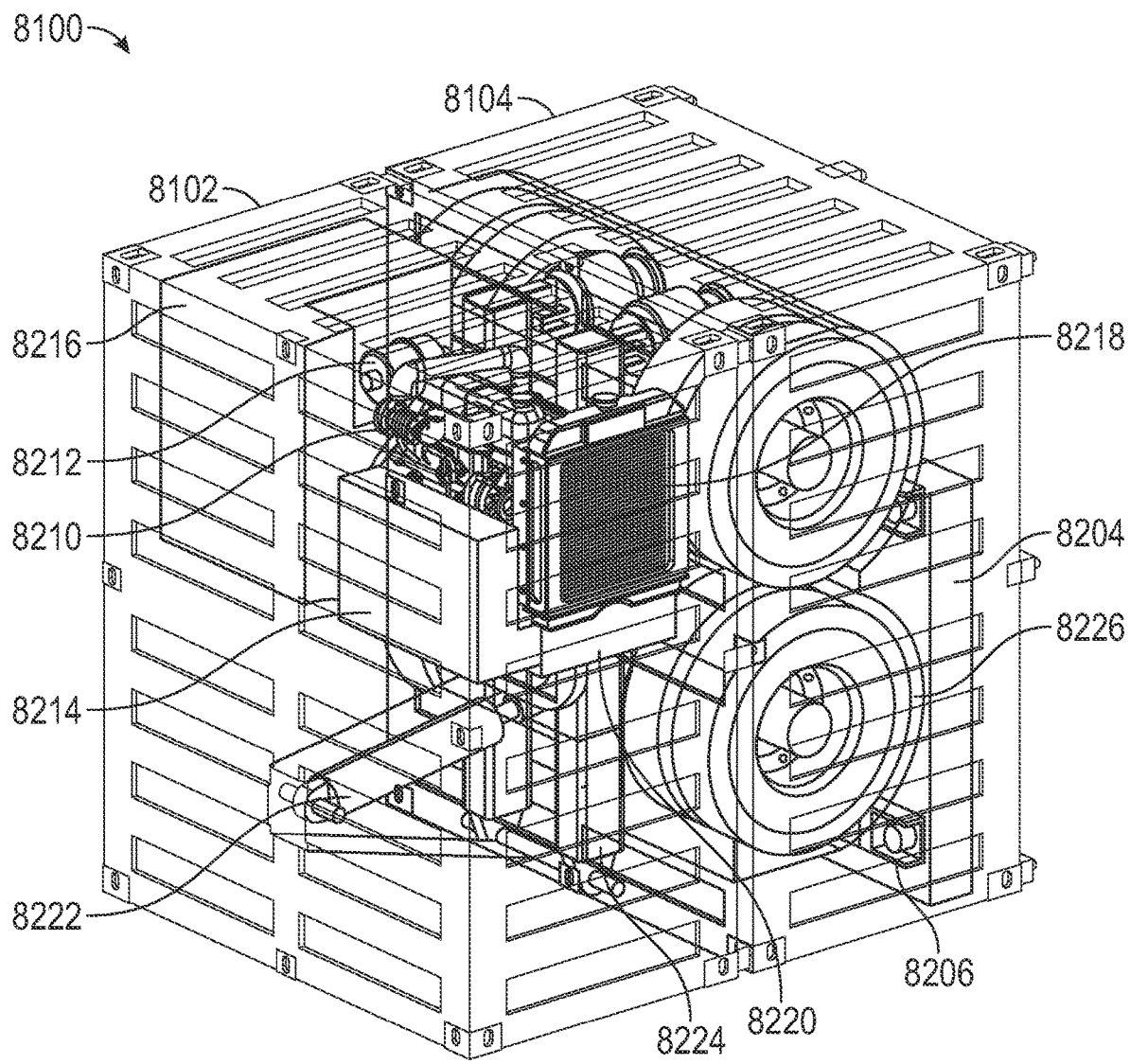
FIG. 82 depicts an internal perspective view of the semi-truck propulsion system of FIG. 81, according to an embodiment of the present disclosure.

FIG. 82 shows an internal view of the semi-truck-type transport system 8100. As mentioned, the container 8102 houses a chassis system. This container 8102 has fittings that are attached to the container 8104 via fitting connectors (various embodiments of which have been described herein). The container 8104 acts as a cover/container for portions of the chassis system implemented in and housed within the container 8102. The container 8102 and the container 8104 together enclose the chassis system. The container 8104 also includes a cavity 8204 to store container support hardware 8206, such as king pin hardware and container support legs, which will be described in greater detail below.

The container 8102 houses a chassis system which includes a double acting hydraulic cylinder 8222 for raising and lowering a drive chassis 8224, and drive wheel assemblies 8226. In various embodiments, the hydraulic cylinder 8222 can be implemented using any actuating mechanism, such as an electric drive actuator. Drive wheel assemblies 8226 can, in various embodiments, include an in-wheel electric motor for powering the drive wheel assemblies 8226 and/or brakes. The container 8102 also includes an energy system for, for example, generating power for the in-wheel electric motors. In the depicted embodiment, the energy system includes a diesel engine 8210, an electric generator and controller 8212, a battery array 8214, a fuel tank 8216, a radiator 8218. Of course, it should be appreciated that other energy systems can be implemented. The container 8102 also includes a container control CPU system and communications system 8220 that can be configured to receive data from various sensors (not shown) such as cameras, proximity systems, lasers, other containers, etc., which can be utilized for autonomous navigation.

Figure 83:
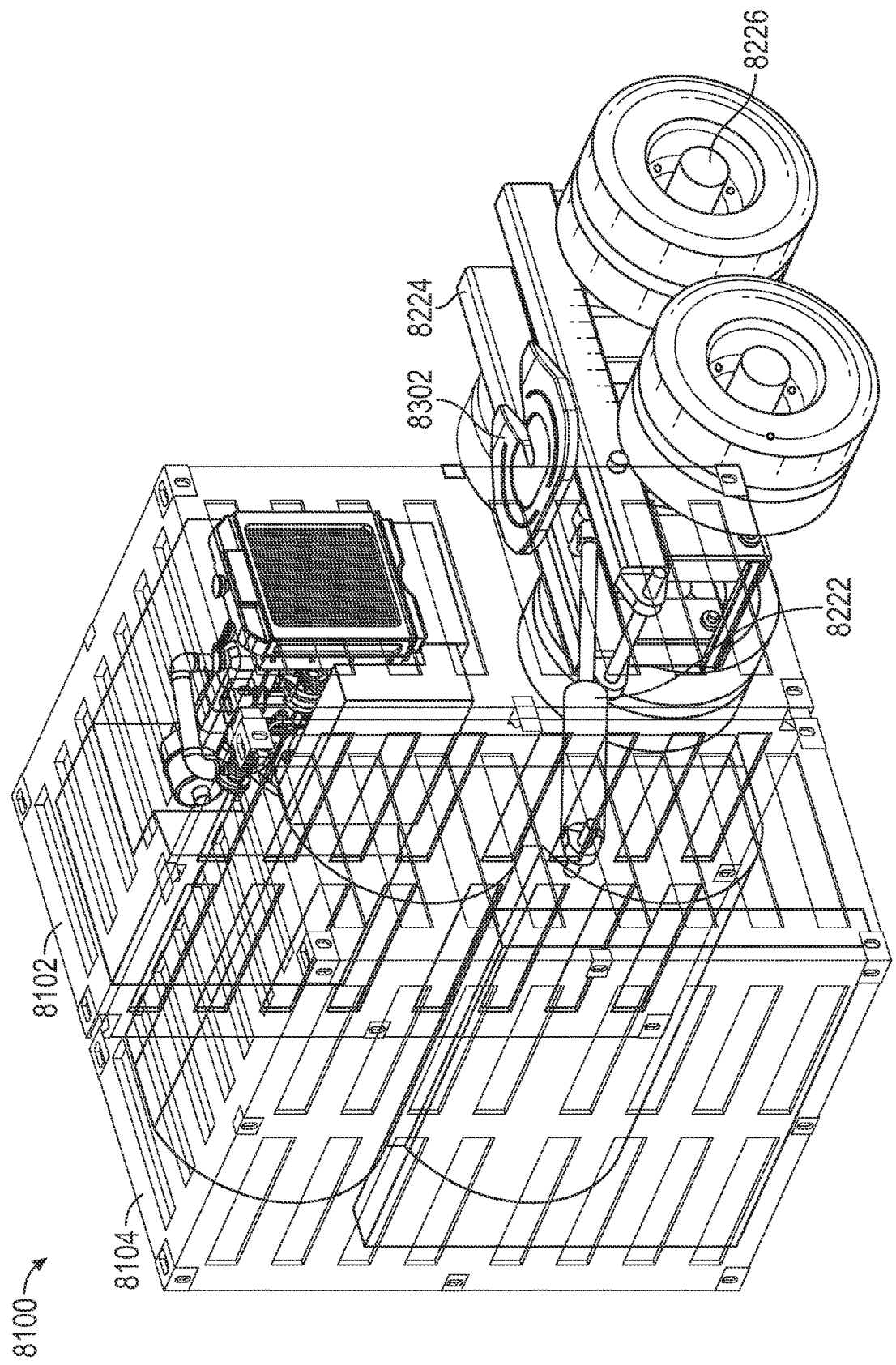
FIG. 83 depicts an internal perspective view of the semi-truck propulsion system of FIG. 82 in a deployed configuration, according to an embodiment of the present disclosure.

FIG. 83 provides a perspective, internal view of the system 8100 in a deployed configuration, according to an embodiment of the present disclosure. In FIG. 83, the drive chassis 8224 is deployed in an extended position by extending the hydraulic cylinder 8222. A king pin interface plate 8302 on the drive chassis 8224 is now clearly shown. The king pin interface plate 8302 can be configured to interface with a king pin and/or king pin hardware to secure a container assembly to the drive chassis 8224. Notice that container 8104 is now rotated and attached to the front of container 8102. In the depicted, deployed configuration, the container 8104 has been removed to allow the drive chassis 8224 to be deployed into the extended position, and the container 8104 has been moved from a rear portion of the container 8102 to a front portion of the container 8102.

Figure 84:
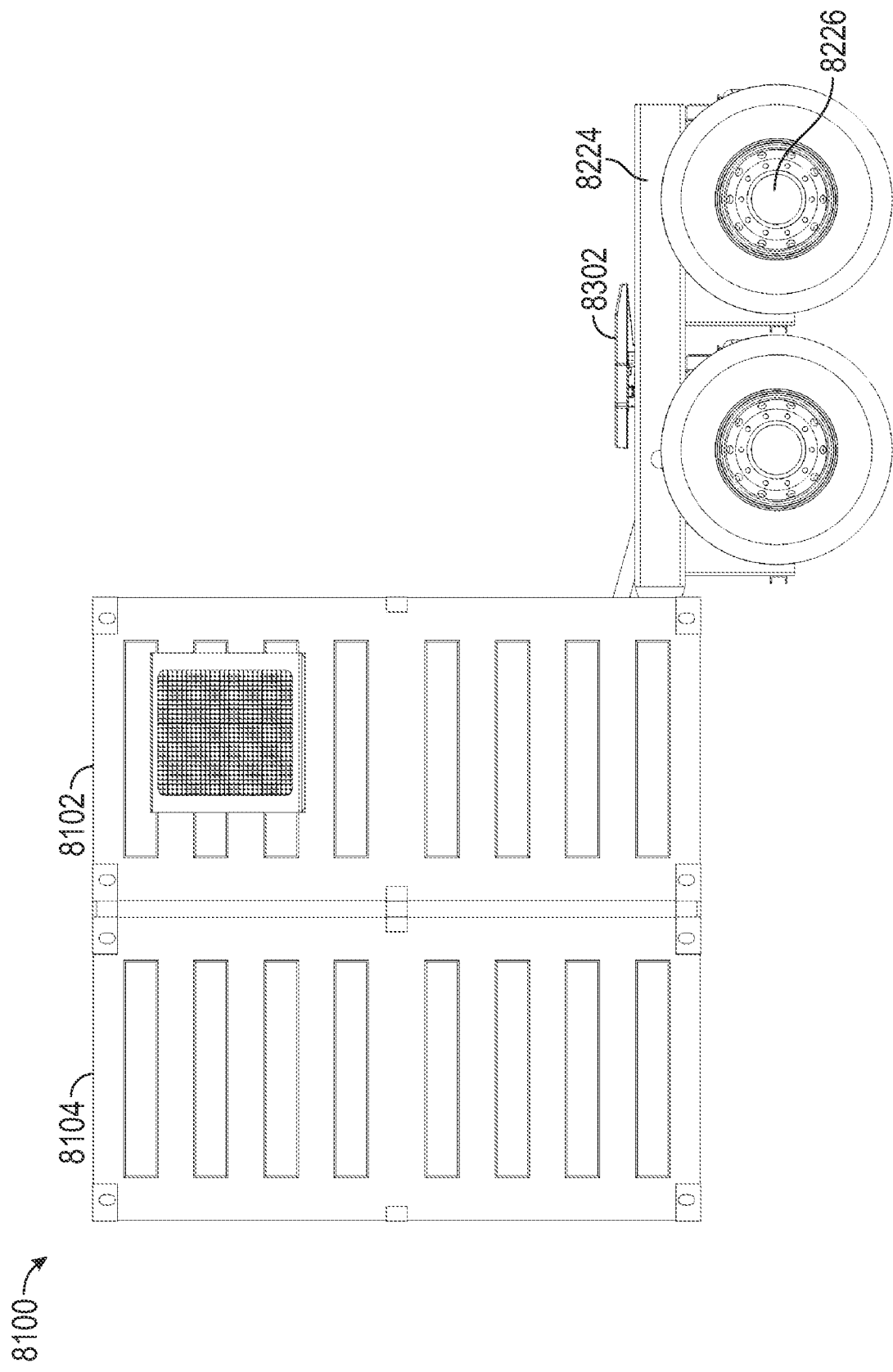
FIG. 84 depicts a side plan view of the semi-truck propulsion system of FIG. 83.

FIG. 84 provides a side plan view of the deployed system 8100.

Figure 85:
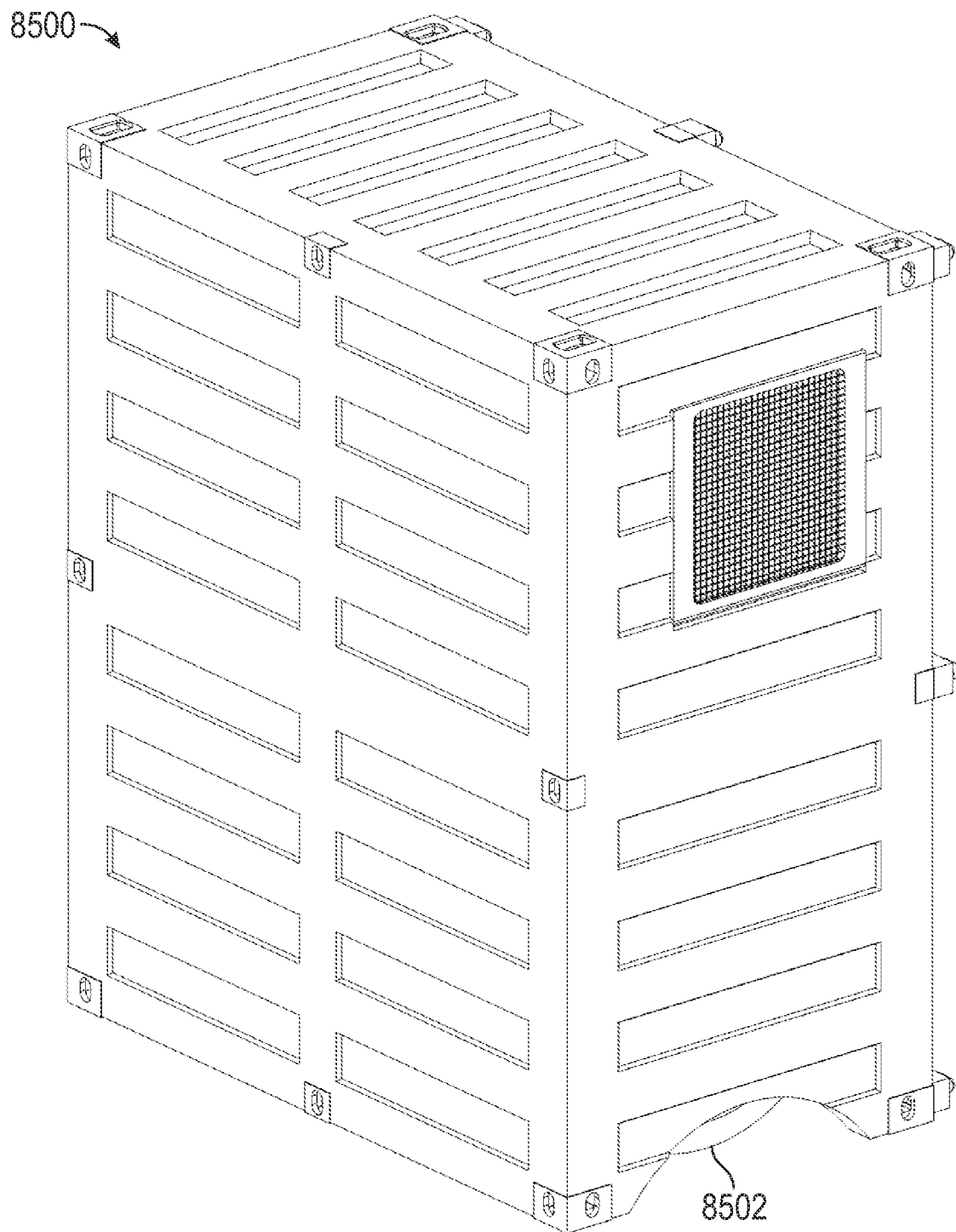
FIG. 85 depicts a perspective view of a front turning axle module container in a stowed configuration, according to an embodiment of the present disclosure.

FIG. 85 provides a perspective view of a front turning axle module container 8500, according to an embodiment of the present disclosure. The container 8500 includes front tires 8502 that are shown in FIG. 85 in a retracted position. In one embodiment, the container 8500 can optionally include an engine, generator and controller, and/or radiator. These components may be used, for example, to provide power to in-wheel electric motors implemented within the front tires 8502. In another embodiment, these components may be used to mechanically drive the front tired 8502.

Figure 86:
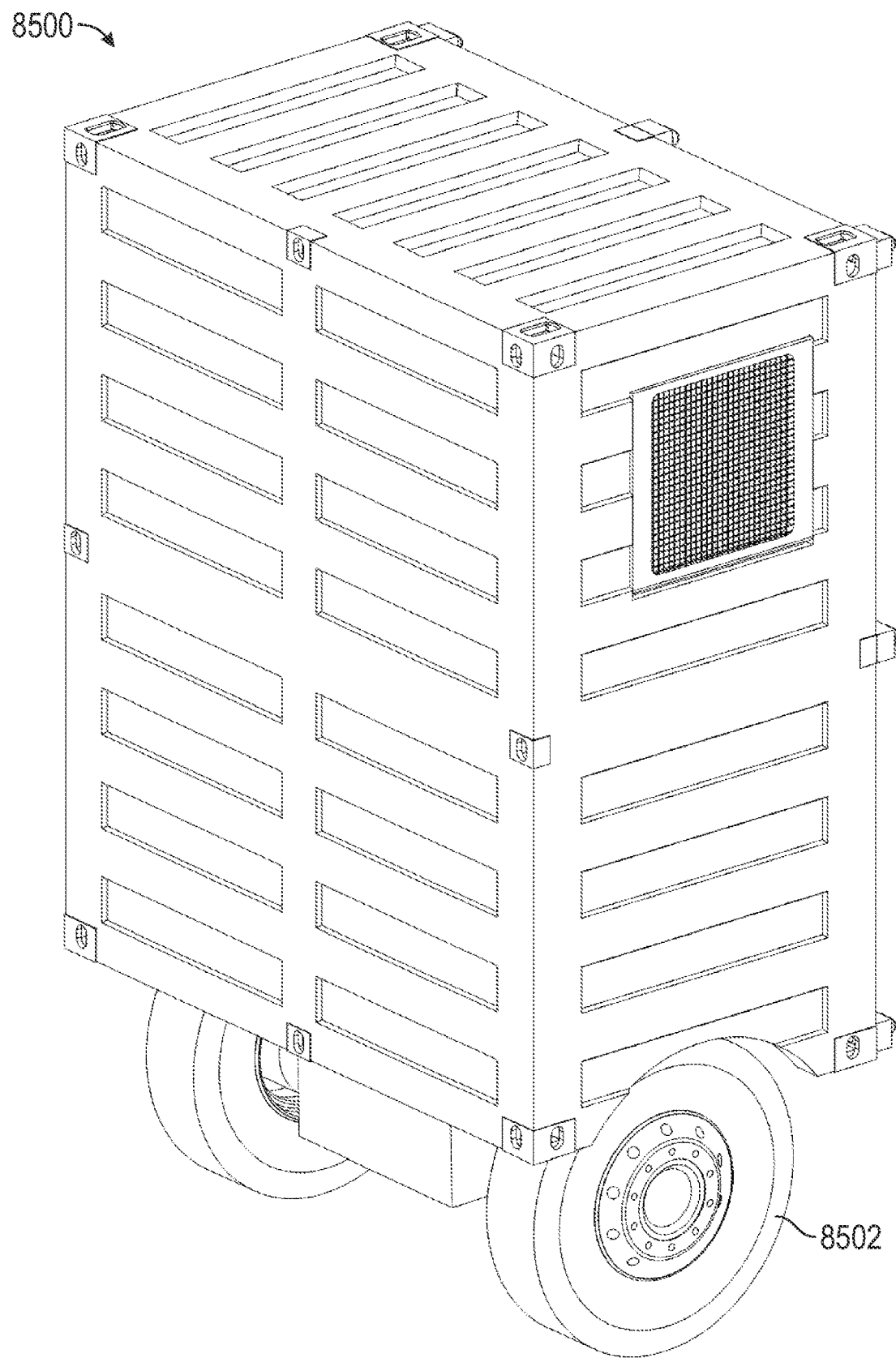
FIG. 86 depicts a perspective view of the front turning axle module container of FIG. 85 in a deployed configuration, according to an embodiment of the present disclosure.

FIG. 86 provides a perspective view of the container 8500 with the front tires 8502 shown in an extended (or deployed) position.

Figure 87:
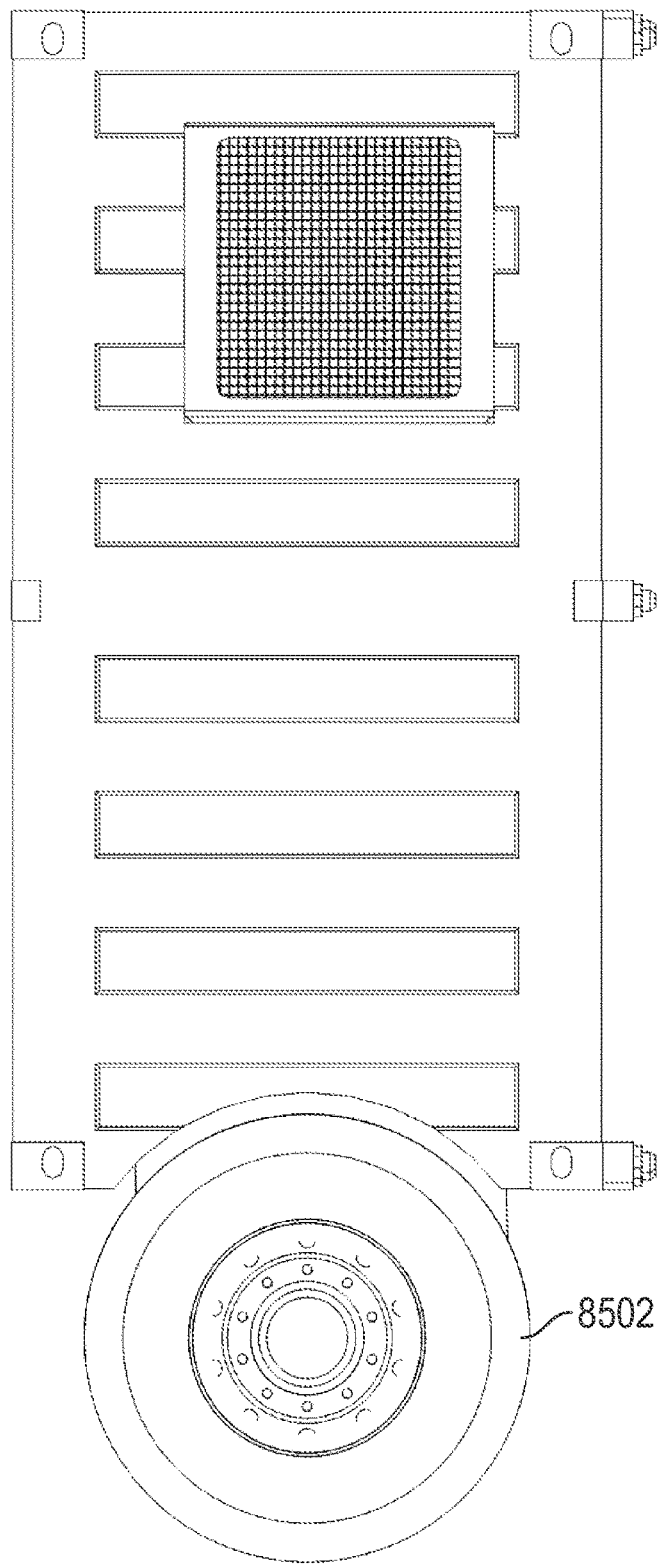
FIG. 87 depicts a side plan view of the front turning axle module container of FIG. 86.

FIG. 87 provides a side plan view of the container 8500 with the front wheels 8502 shown in the extended position.

Figure 88:
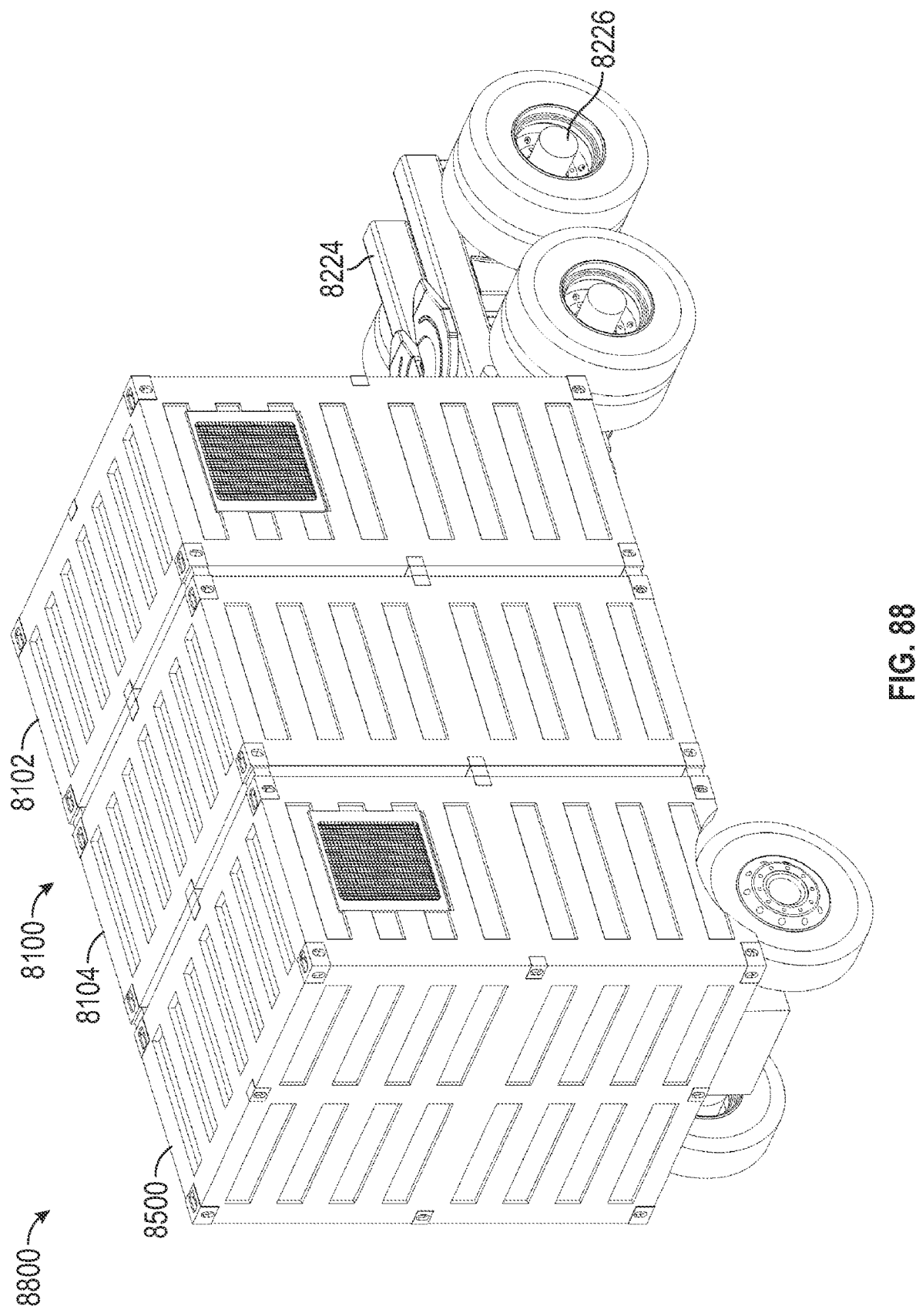
FIG. 88 depicts a perspective view of a semi-trailer-type cargo transport assembly, according to an embodiment of the present disclosure.

FIG. 88 depicts a perspective view of a semi-trailer-type cargo transport assembly 8800, according to an embodiment of the present disclosure. The cargo transport assembly 8800 includes the container 8500 of FIGS. 85-87 secured to the system 8100 of FIG. 83. In certain embodiments, the container 8104 can be removed from the rear portion of the container 8102, and then the assembly can be configured as shown in FIG. 88 prior to extending all the wheels. The wheels can then be extended once the container 8500 has been connected to the containers 8104 and 8102.

Figure 89:
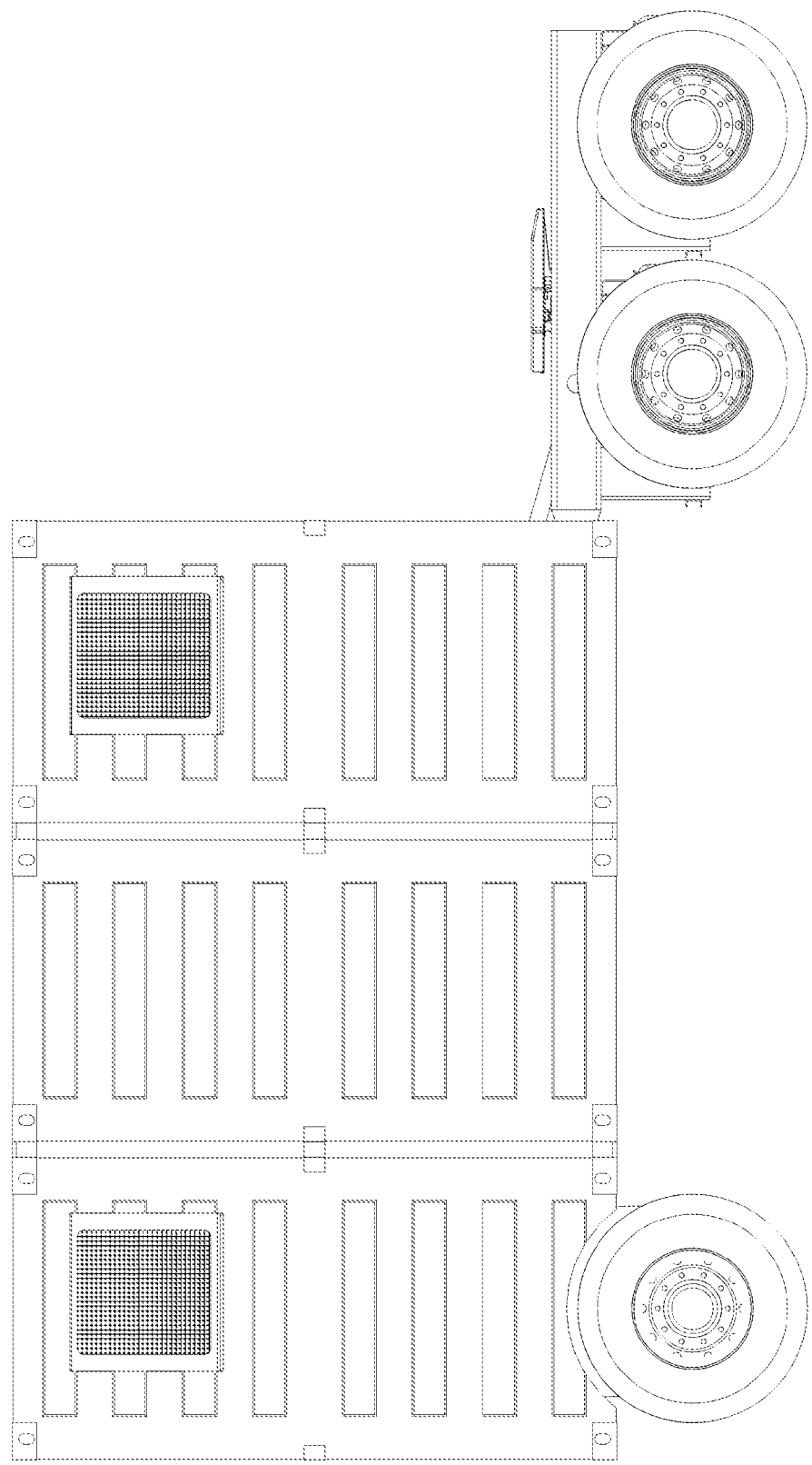
FIG. 89 depicts a side plan view of the semi-trailer-type cargo transport assembly of FIG. 88.

FIG. 89 provides a side plan view of the semi-trailer-type cargo transport assembly 8800. In various embodiments, the cargo transport assembly 8800 can include propulsion systems (e.g., in wheel electric motors and energy systems to power the in-wheel electric motors) in both container 8102 and 8500, or in only one of the two, depending on power requirements.

Figure 90:
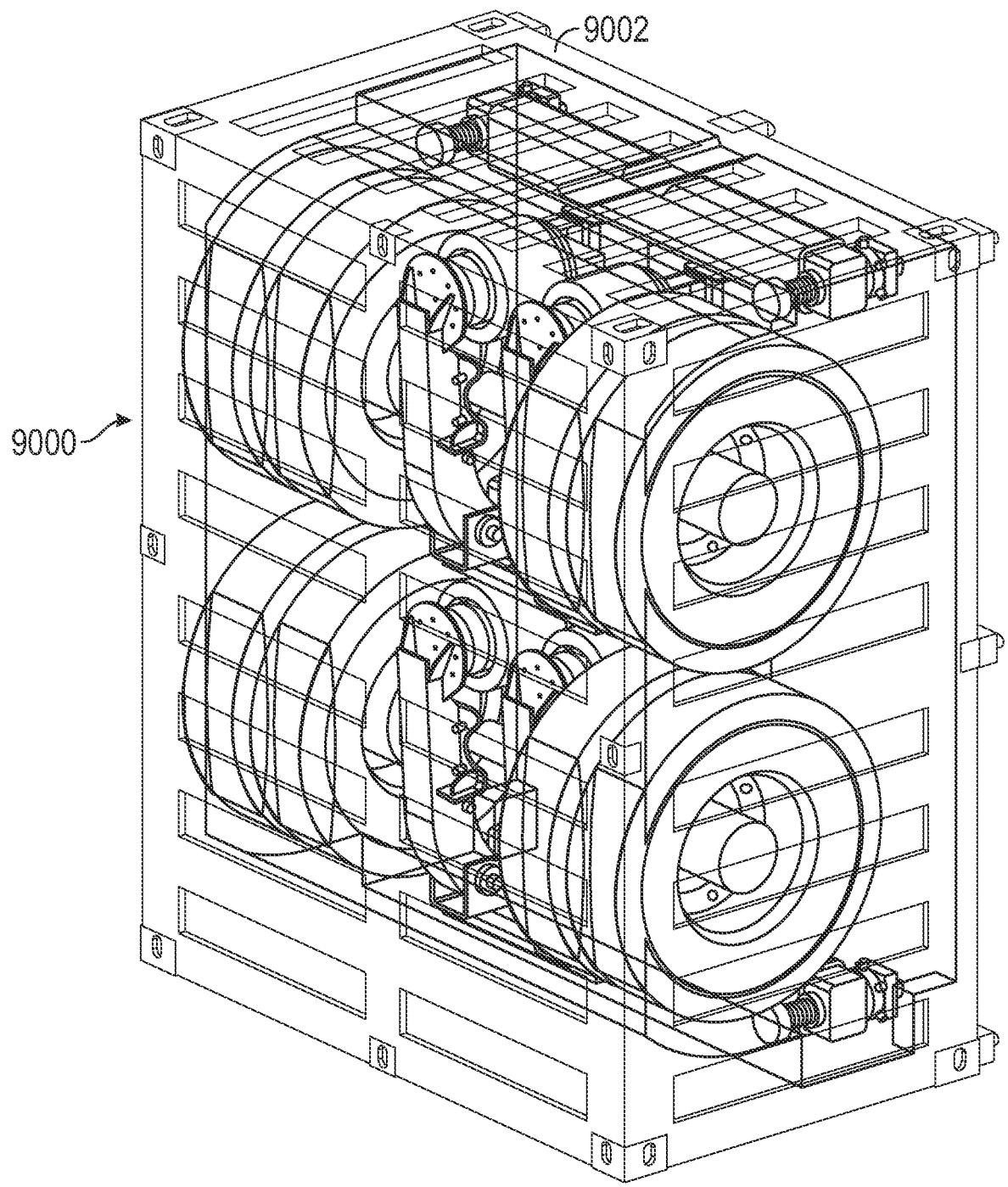
FIG. 90 depicts a perspective view of a container dolly system stored within a container, according to an embodiment of the present disclosure.

In some cases, the system may be taken to an area where there are intermodal containers without any available trailers. In that instance, a dolly system can be used. FIG. 90 depicts a perspective view of a container dolly system 9000 housed within a container 9002, in accordance with an embodiment of the present disclosure.

Figure 91:
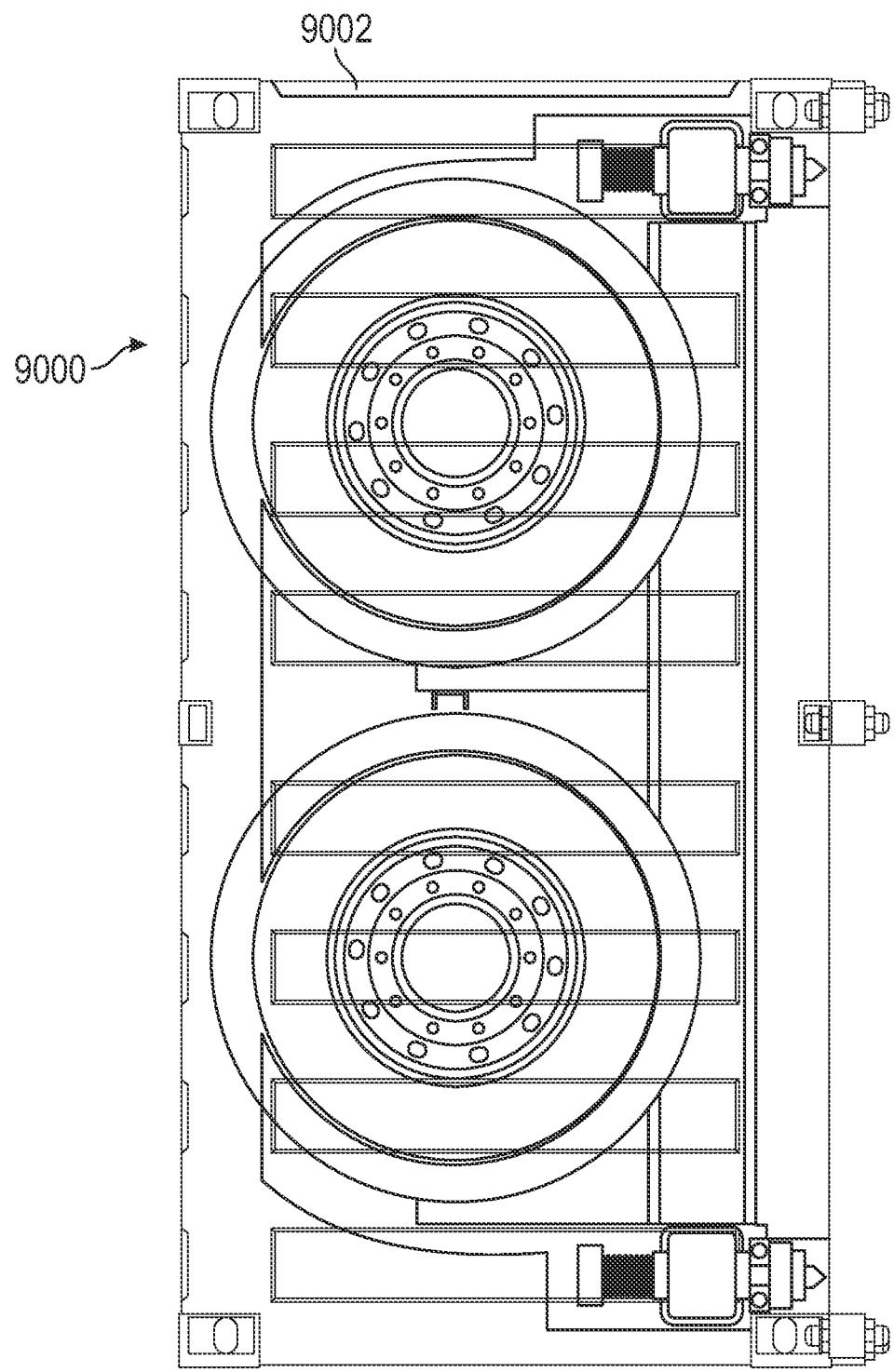
FIG. 91 depicts a side plan view of the container dolly system and container of FIG. 90.

FIG. 91 depicts a side plan view of the container 9002 holding a container dolly system 9000.

Figure 92:
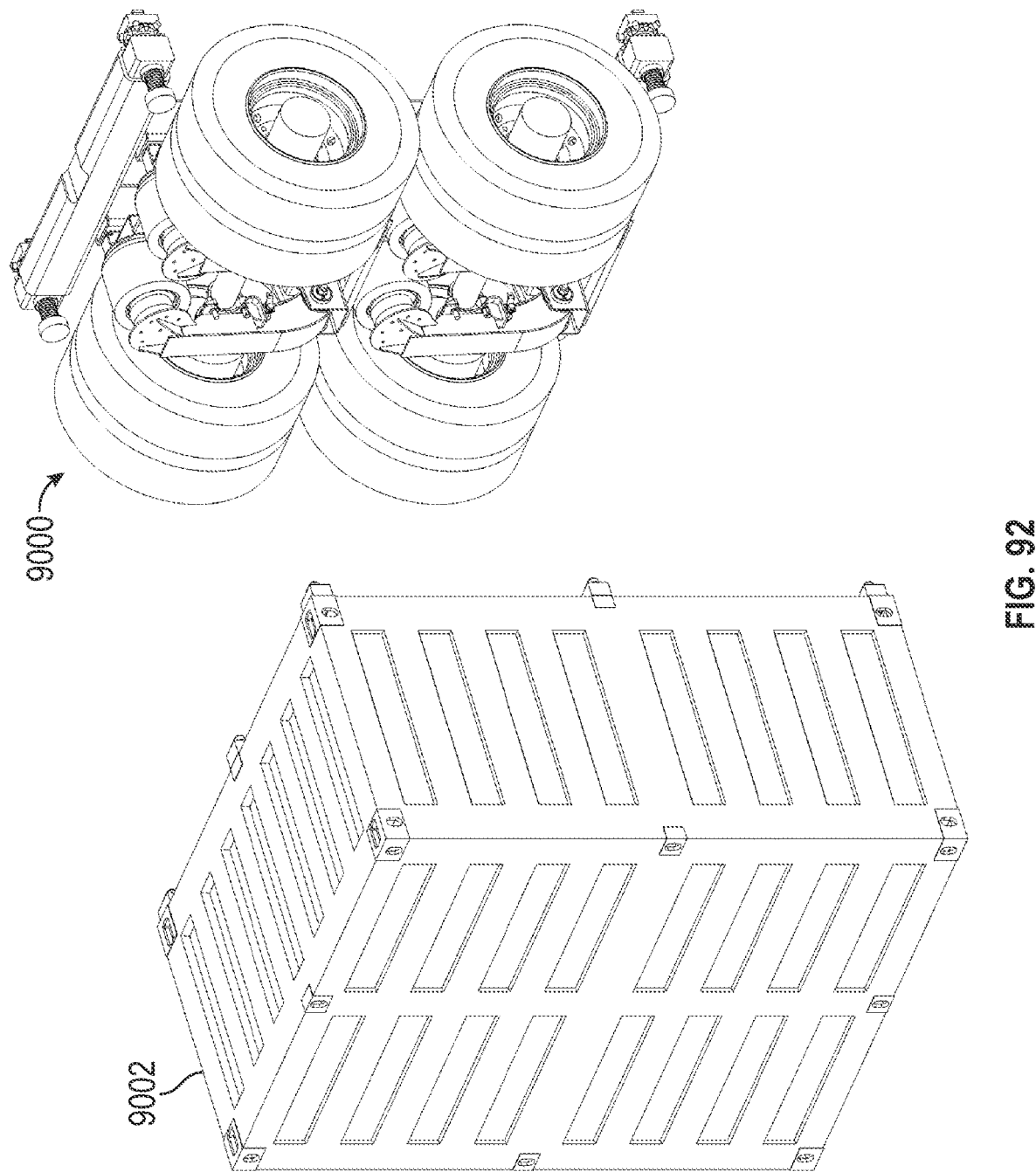
FIG. 92 depicts a perspective view of a container dolly system removed from a container, according to an embodiment of the present disclosure.

FIG. 92 depicts the container dolly system 9000 being removed from container 9002.

Figure 93:
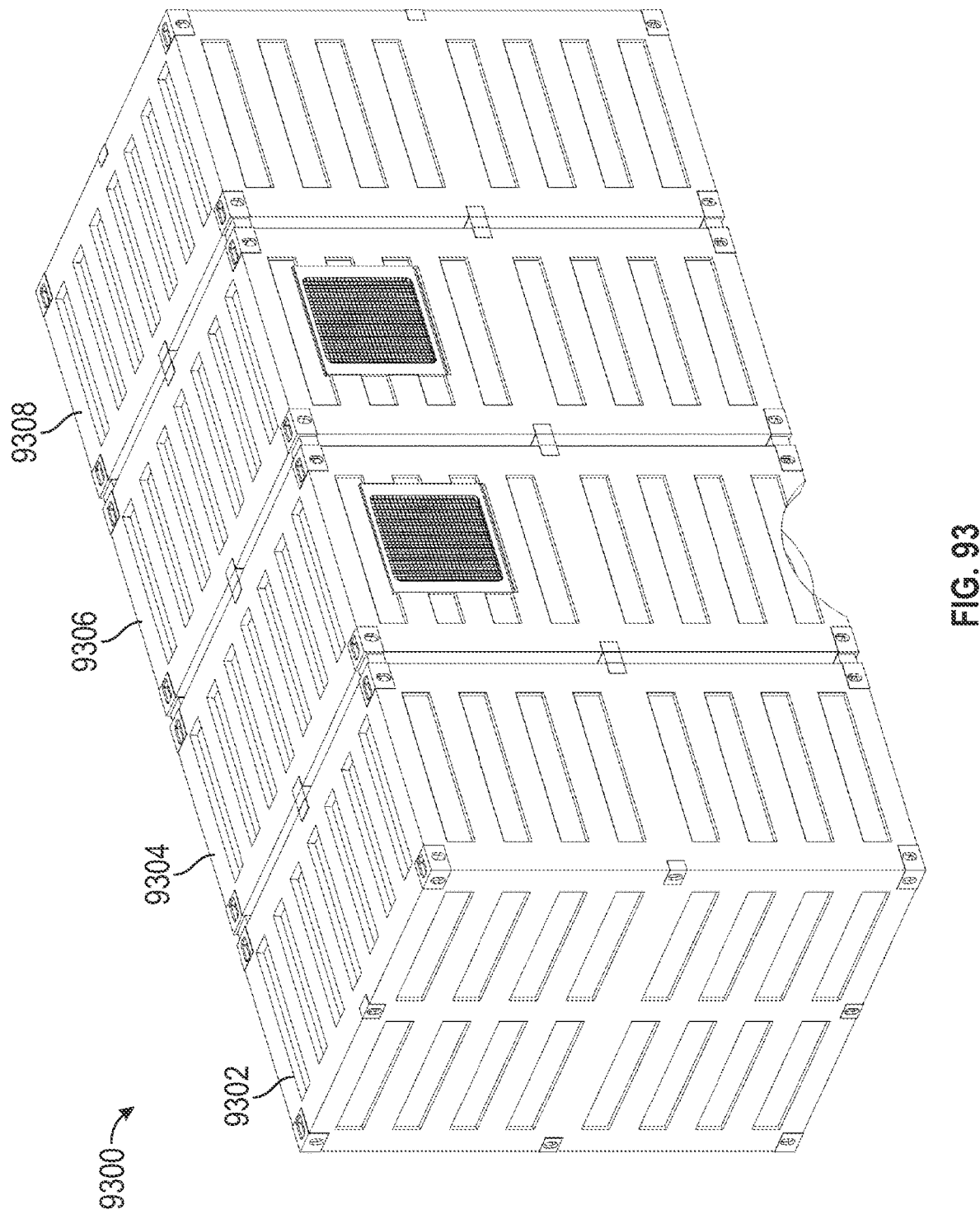
FIG. 93 depicts a perspective view of a cargo transport assembly, according to an embodiment of the present disclosure.

The next few figures show how a complete semi-truck system, including trailer supports, can be shipped in a total of four 5' containers or an equivalent 20' container, in accordance with an embodiment of the present disclosure. FIG. 93 provides a perspective view of a container assembly 9300 comprising four 5' containers 9302, 9304, 9306, 9308. The first container 9302 can be implemented as the container 9002 of FIG. 90, and houses a container dolly system. The second container 9304 can be implemented as the front turning axle module container 8500 of FIG. 86. The third container 9306 can be implemented as the semi-truck-type chassis system container 8102 of FIGS. 81-84, and the fourth container 9308 can be implemented as the container 8104 of FIGS. 81-84.

Figure 94:
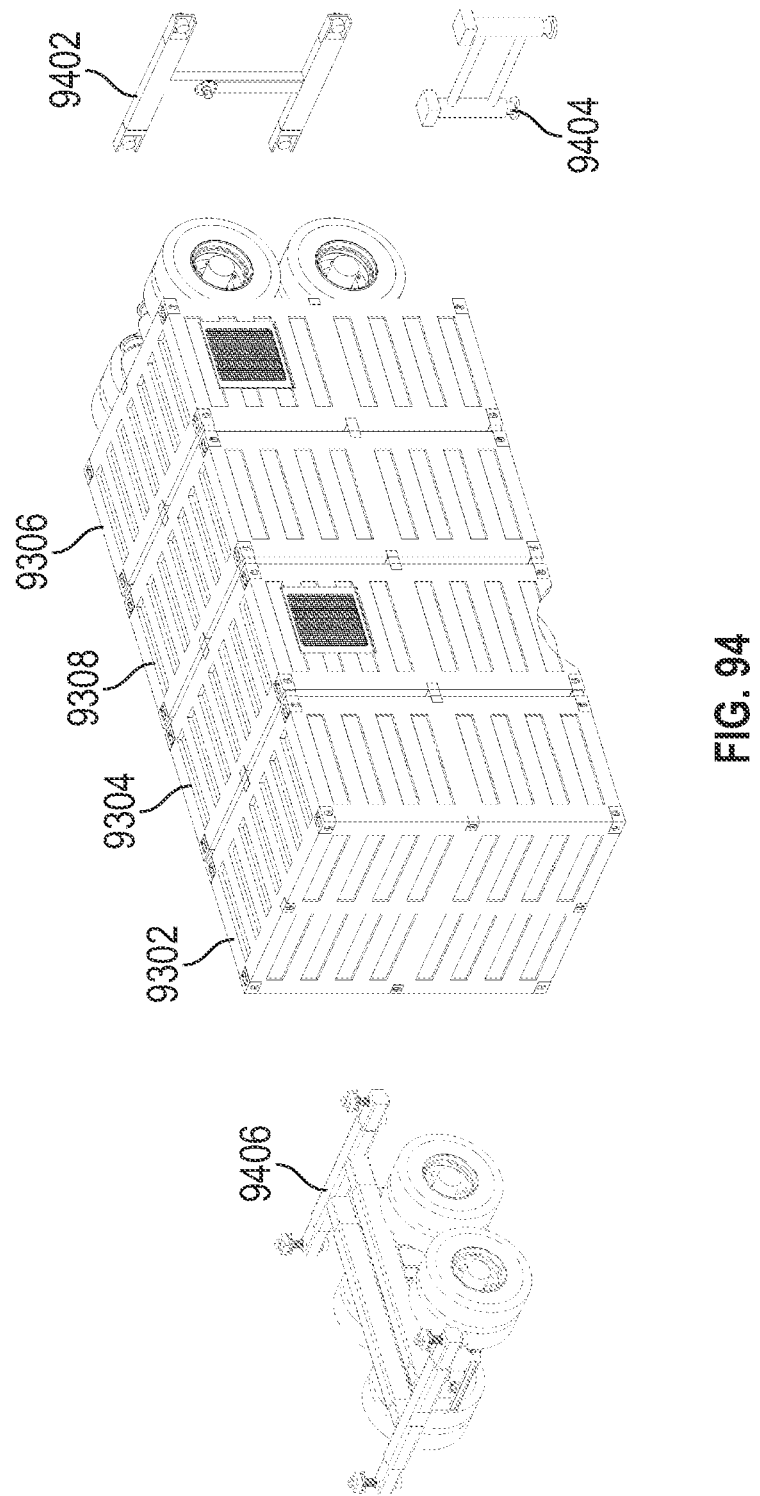
FIG. 94 depicts a perspective view of the cargo transport assembly of FIG. 93 in a ready-to-deploy configuration, according to an embodiment of the present disclosure.

FIG. 94 depicts an embodiment in which the containers 9302, 9304, 9306, and 9308 have been arranged into a ready-to-deploy configuration. A container support 9404 and king pin hardware 9402 have been unpacked from the container 9308. A container dolly system 9406 has been unpacked from the container 9302. Furthermore, the container 9308 has been removed from the rear of the container 9306, revealing the chassis system housed within container 9306, and the container 9308 has been moved to the front of the container 9306.

Figure 95:
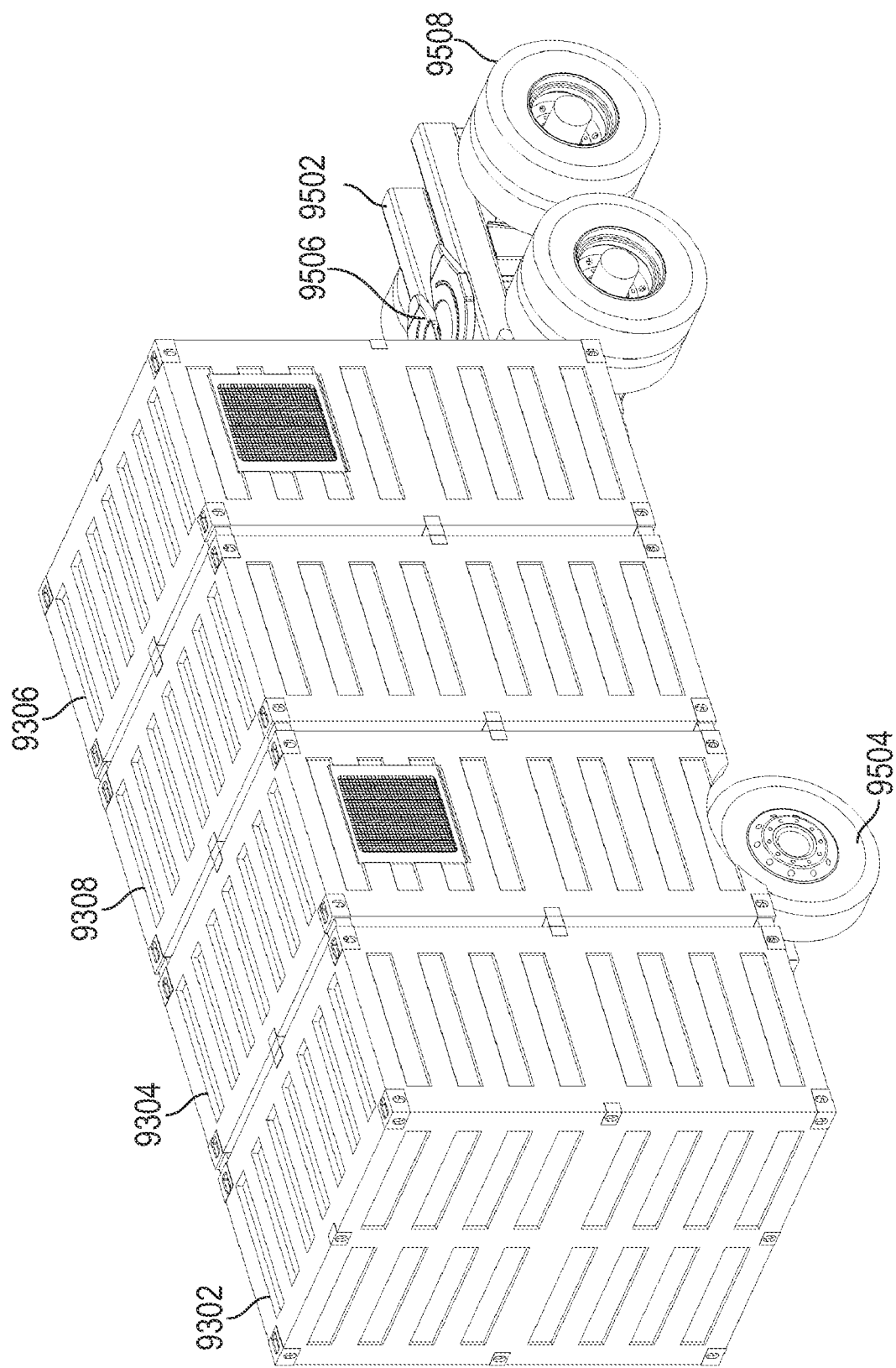
FIG. 95 depicts a perspective view of the cargo transport assembly of FIG. 94 in a deployed configuration, according to an embodiment of the present disclosure.

FIG. 95 shows the containers 9302, 9304, 9306, 9308 in a deployed configuration, in accordance with an embodiment of the present disclosure. Front wheels 9504 have been deployed from the container 9304, and a chassis system including a chassis 9502 and drive wheel assembly 9508 has been rotatably deployed from the container 9306. The chassis 9502 includes a king pin interface plate 9506 for interfacing with king pin hardware to secure a container to the chassis 9502. In certain embodiments, the dolly container 9302 can include one or more sensors, data relays, and computers that may also and/or otherwise be found on container 9304. In one embodiment, any combination of the containers can have data and/or electrical connections to each other, as previously described herein.

Figure 96:
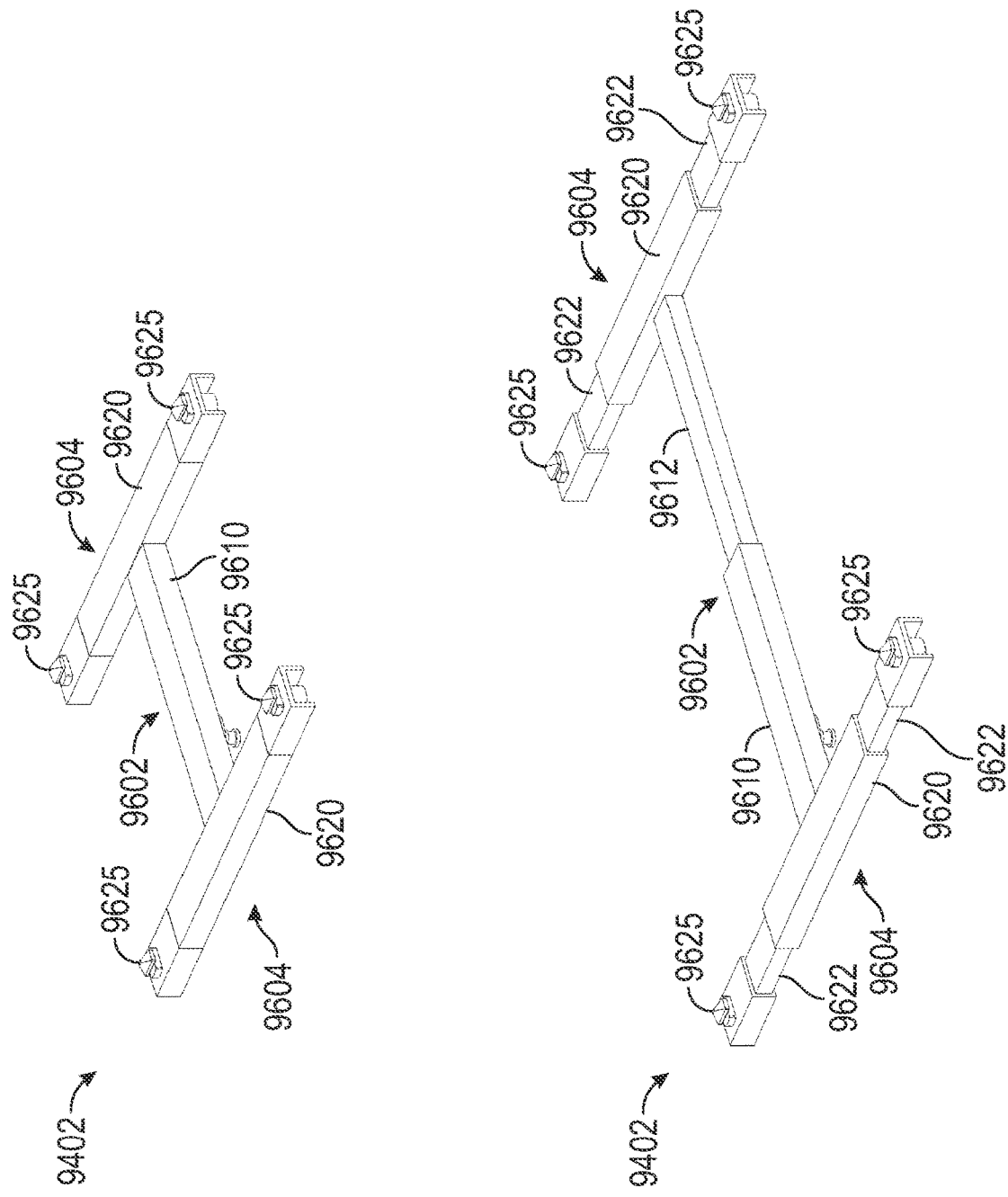
FIG. 96 depicts a perspective view of collapsible king pin support hardware, according to an embodiment of the present disclosure.

In certain embodiments, one or both of the container support 9404 and the king pin hardware 9402 can be stored in a retracted configuration, and then extended into an expanded configuration before use. FIG. 96 shows the king pin hardware 9402 in a retracted, or as-stored, configuration (top), and then in an expanded configuration (bottom). The king pin hardware 9402 secures a container to the king pin interface plate 9506 on the chassis 9502 (shown in FIG. 95). In the depicted embodiment, the king pin hardware includes a central beam 9602 and two arms 9604. The central beam 9602 includes an outer portion 9610 and an inner portion 9612. In the retracted configuration, the inner portion 9612 is pushed into the outer portion 9610 such that the outer portion 9610 completely and/or substantially surrounds the inner portion 9612, while in the expanded configuration, the inner portion 9612 is extended out from the outer portion 9610. Similarly, each arm 9604 includes an outer portion 9620 and one or more inner portions 9622. In the retracted configuration, the inner portion(s) 9622 are pushed into the outer portion 9620 such that the outer portion 9620 completely and/or substantially surrounds the inner portion(s) 9622, while in the expanded configuration, the inner portion(s) 9622 are extended out from the outer portion 9620. Each arm has a fitting connector 9625 at either end of the arm for securing the king pin hardware 9402 to one or more containers.

FIG. 97 shows the container support 9404 in a retracted, or as-stored, configuration (top), and then in an expanded configuration (bottom). The container support 9404 has one or more legs 9702. Each leg 9702 is extendable such that in the retracted configuration, each leg is contracted into a shortest possible length, and in the expanded configuration, each leg is extended. The container support 9404 may be used to support a container when the container is not connected to a truck, as will be depicted in greater detail in later figures.

Figure 98:
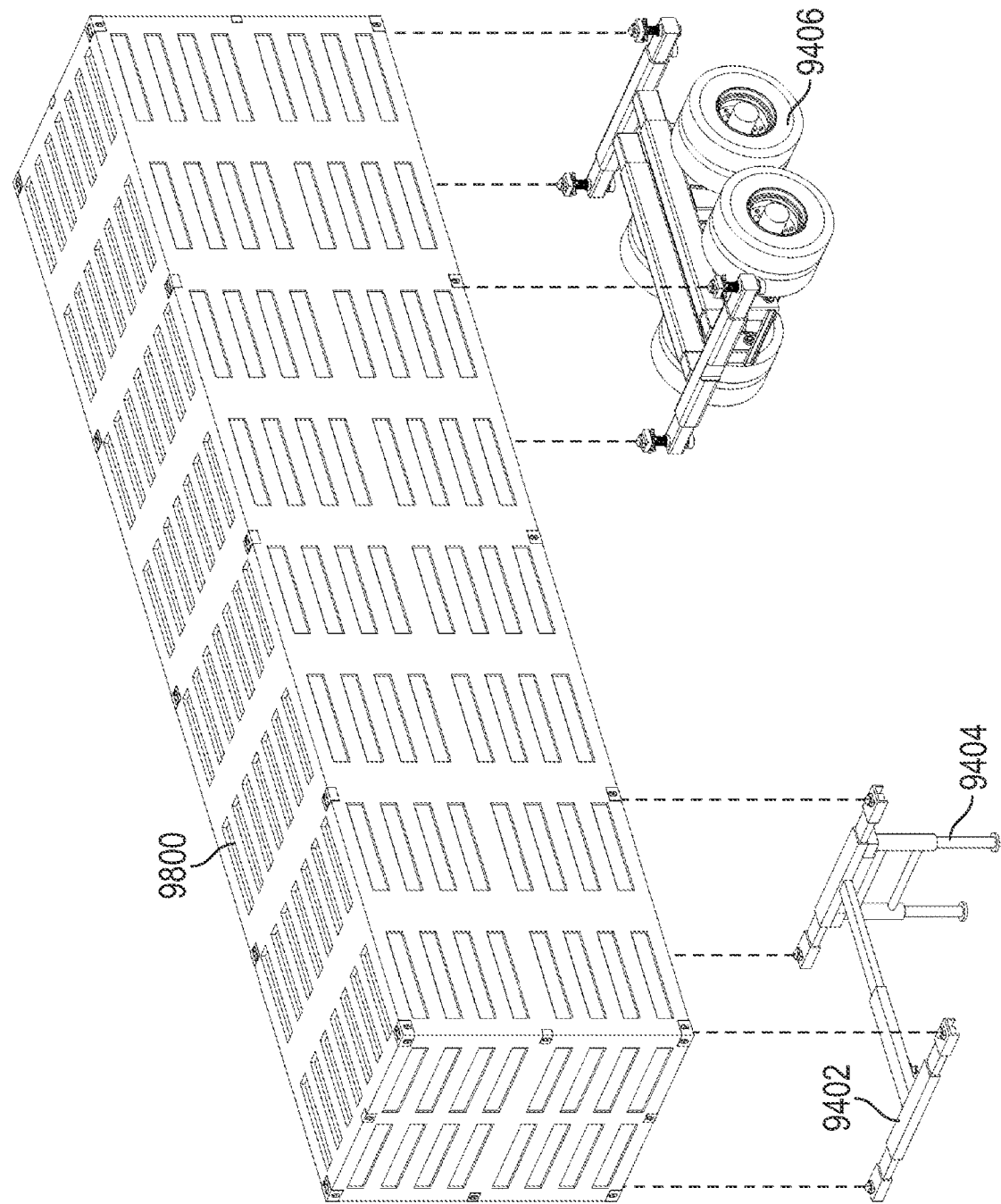
FIG. 98 depicts an exploded perspective view of container support hardware, king pin hardware, a container dolly system, and a container, according to an embodiment of the present disclosure.

FIG. 98 provides a perspective view of the container support 9404, the king pin hardware 9402, and the container dolly system 9406 ready to be mated to a container 9800, in accordance with an embodiment of the present disclosure. It can be seen that the container support 9404 and the king pin hardware 9402 have been connected together to support a front portion of the container 9800. In one embodiment, the container support 9404 can be removably attached to the king pin hardware 9402. In another embodiment, the container support 9404 can be attached permanently to the king pin hardware 9402 with folding mechanisms to allow the container support 9404 to fold relative to the king pin hardware 9402 in a retracted or compact configuration. In the depicted embodiment, the king pin hardware 9402 is secured to the bottom front corner fittings of the container 9800 and one other fitting station, while the container dolly system 9406 attaches to the two aft corner fittings as well as one additional fitting station.

Figure 99:
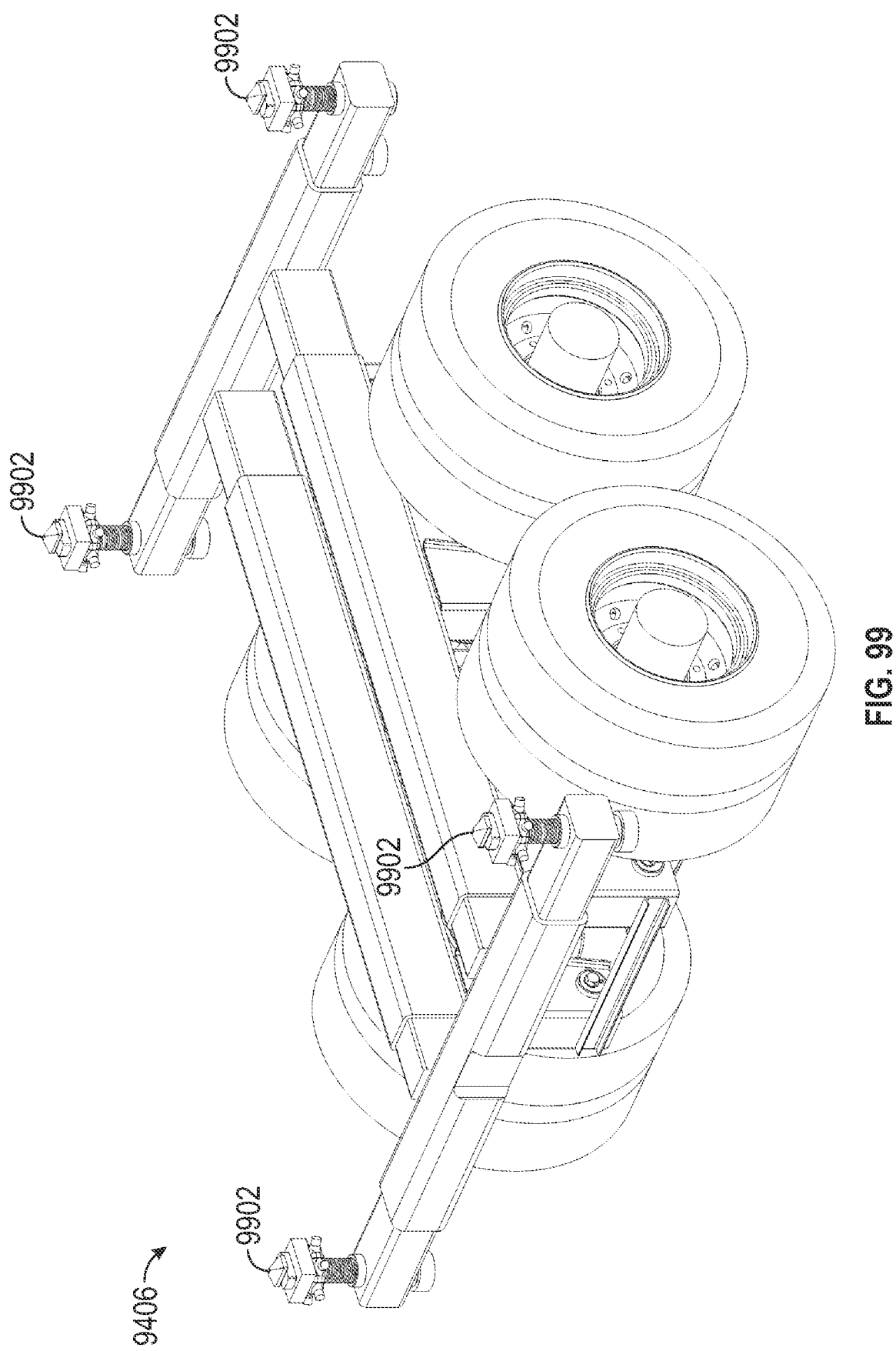
FIG. 99 depicts a perspective view of a container dolly system, according to an embodiment of the present disclosure.

FIG. 99 depicts the container dolly system 9406, in accordance with an embodiment of the present disclosure. The job of the container dolly 287 is to support the container's aft end and, in certain embodiments, to provide braking power. The depicted embodiment connects to a container by attaching to four connections from the bottom via fitting connectors 9902. The container dolly system 9406 can receive power for the brakes from an attached container, which can receive power from an attached propulsion portion (e.g., a container housing the engine/chassis). Alternatively, the container dolly system 9406 may have its own power generating system and energy storage capability via generators turned by the wheels and a local battery system. In another embodiment, the container dolly system 9406 could be connected to air lines from a truck/engine chassis portion.

Figure 100:
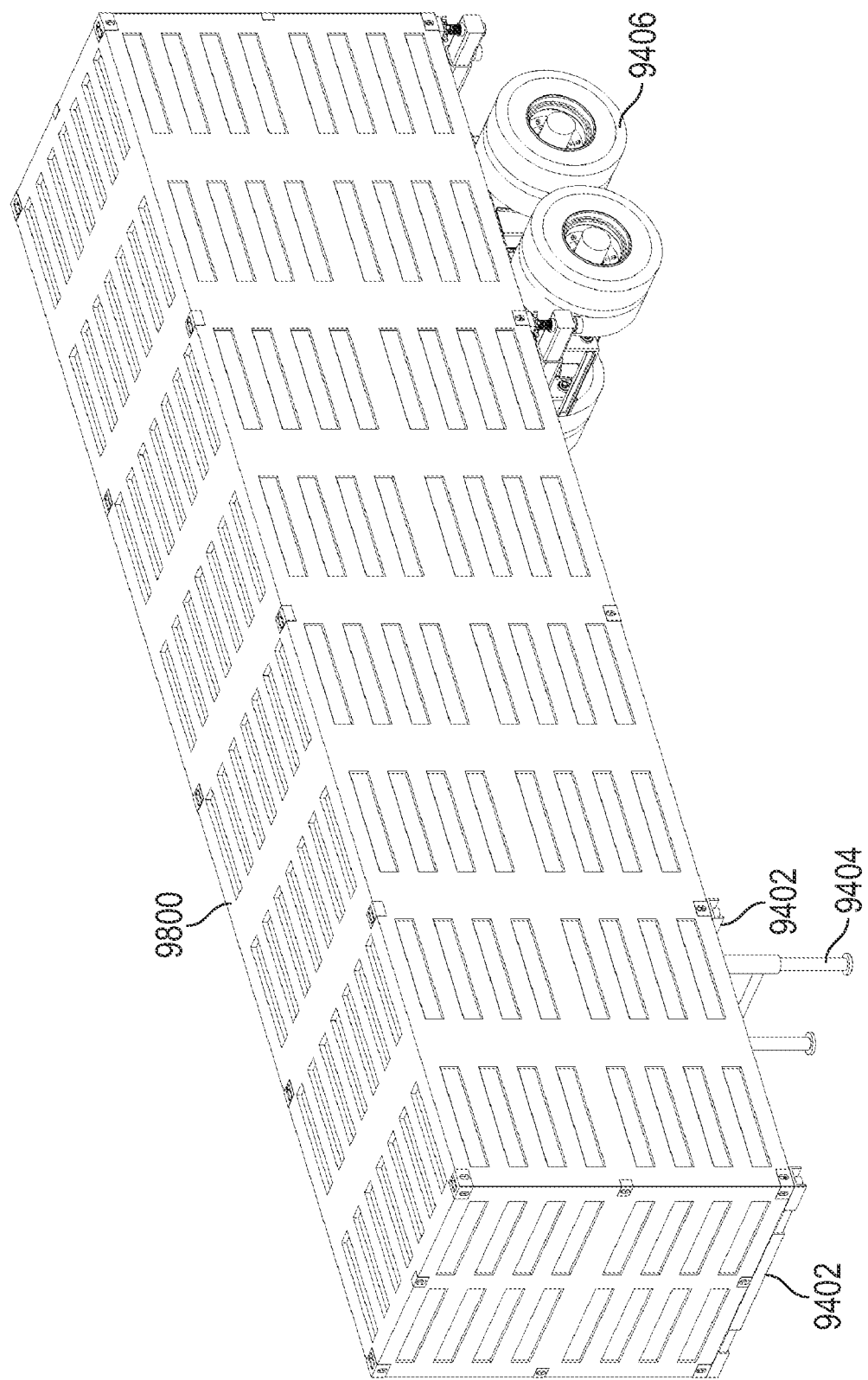
FIG. 100 depicts a perspective view of container support hardware, king pin hardware, a container dolly system, and a container in an assembled state, according to an embodiment of the present disclosure.

FIG. 100 depicts the container 9800 assembled to all support hardware, in accordance with an embodiment of the present disclosure. In certain embodiments, for containers that are 40' and longer, the configuration shown will work as is. In certain embodiments, for 20' containers, the front hardware (i.e., king pin hardware 9402 and container support 9404) can connect to the after container dolly system 9406 instead of a second station of fittings. In certain embodiments, for containers that are shorter than 20', multiple containers can be assembled to make a 20' or longer container. For instance, two 10' containers will have enough lower fittings to connect to the support hardware.

Figure 101:
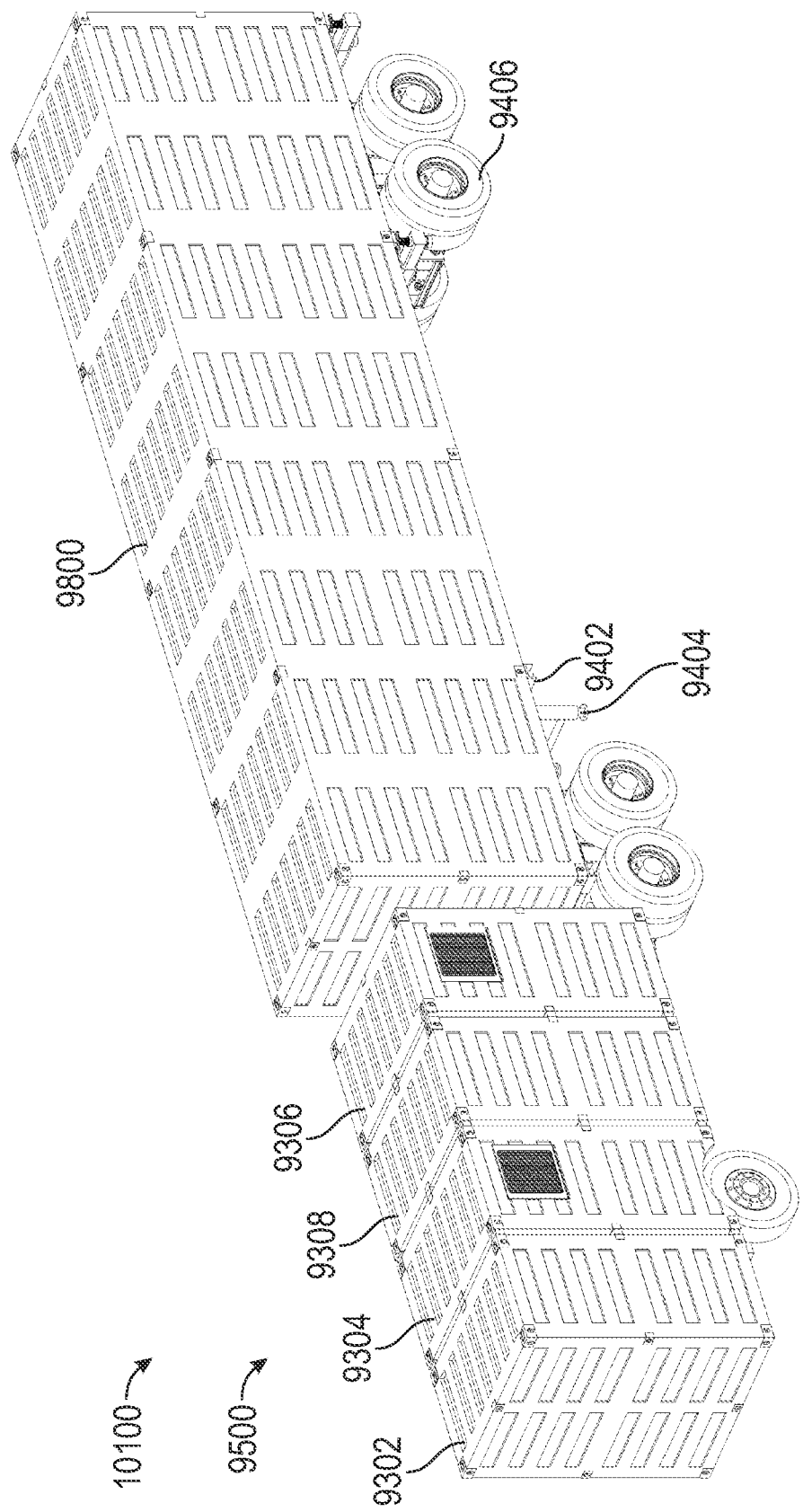
FIG. 101 depicts a perspective view of a semi-trailer-type cargo transport assembly, according to an embodiment of the present disclosure.

FIG. 101 provides a perspective view of a semi-trailer-type cargo transport assembly 10100, according to an embodiment of the present disclosure. The cargo transport assembly 10100 comprises the propulsion container assembly 9500 of FIG. 95, which includes containers 9302, 9304, 9306, and 9308 in a deployed configuration, secured to the assembly of FIG. 100, which includes a container 9800 supported by a container support 9404, king pin hardware 9402, and the container dolly system 9406. The container support 9404 has been retracted into a retracted configuration in order to provide sufficient ground clearance for transport. The king pin hardware 9402 has been secured to the king pin 9504 on the chassis 9502 (see FIG. 95) to secure the container 9800 to the propulsion container assembly 9500.

Figure 102:
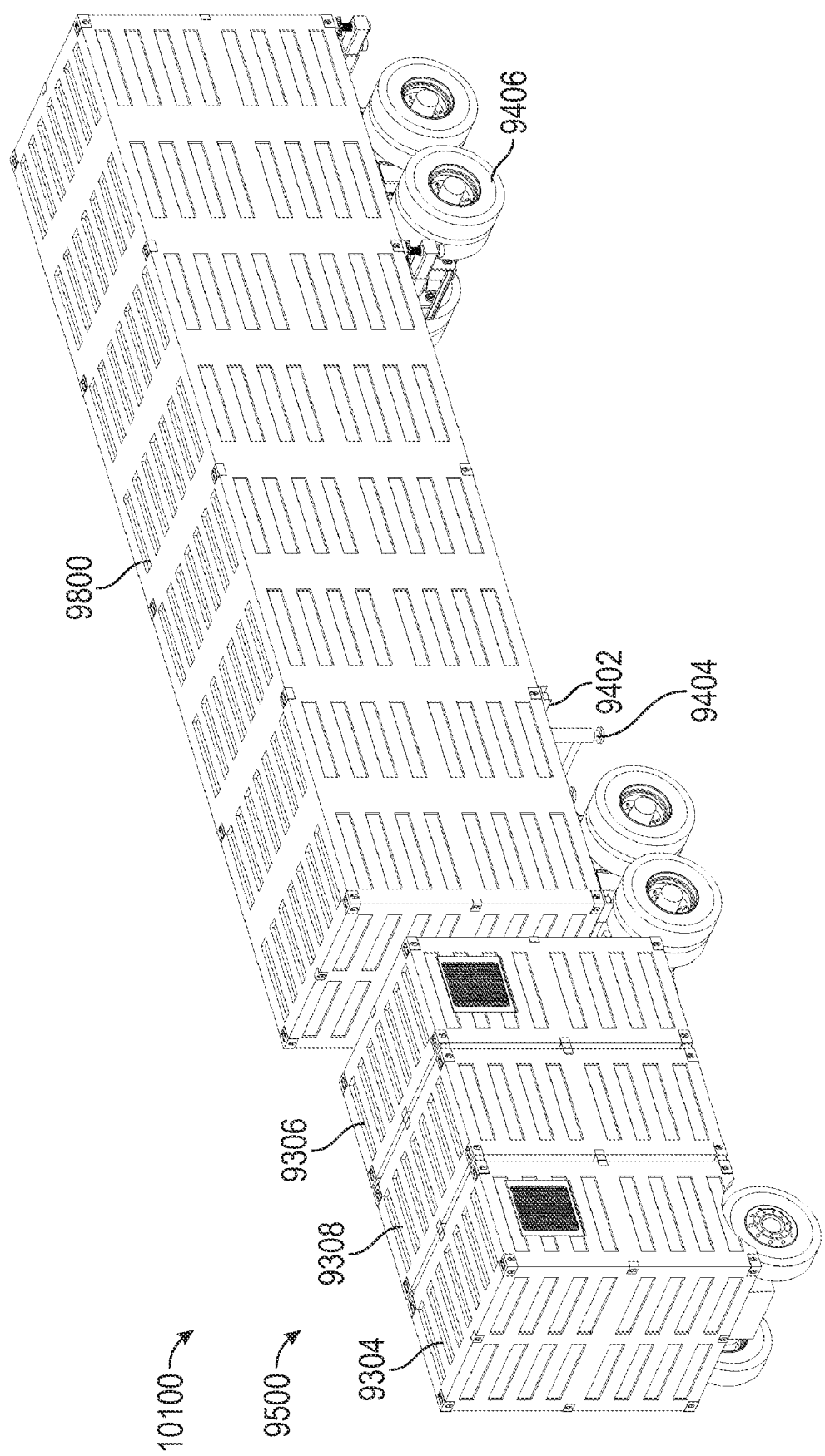
FIG. 102 depicts a perspective view of a semi-trailer-type cargo transport assembly, according to an embodiment of the present disclosure.

FIG. 102 provides a perspective view of the semi-trailer type cargo transport assembly 10100 of FIG. 101, but with the hardware storage container 9302 removed, according to an embodiment of the present disclosure.

Figure 103:
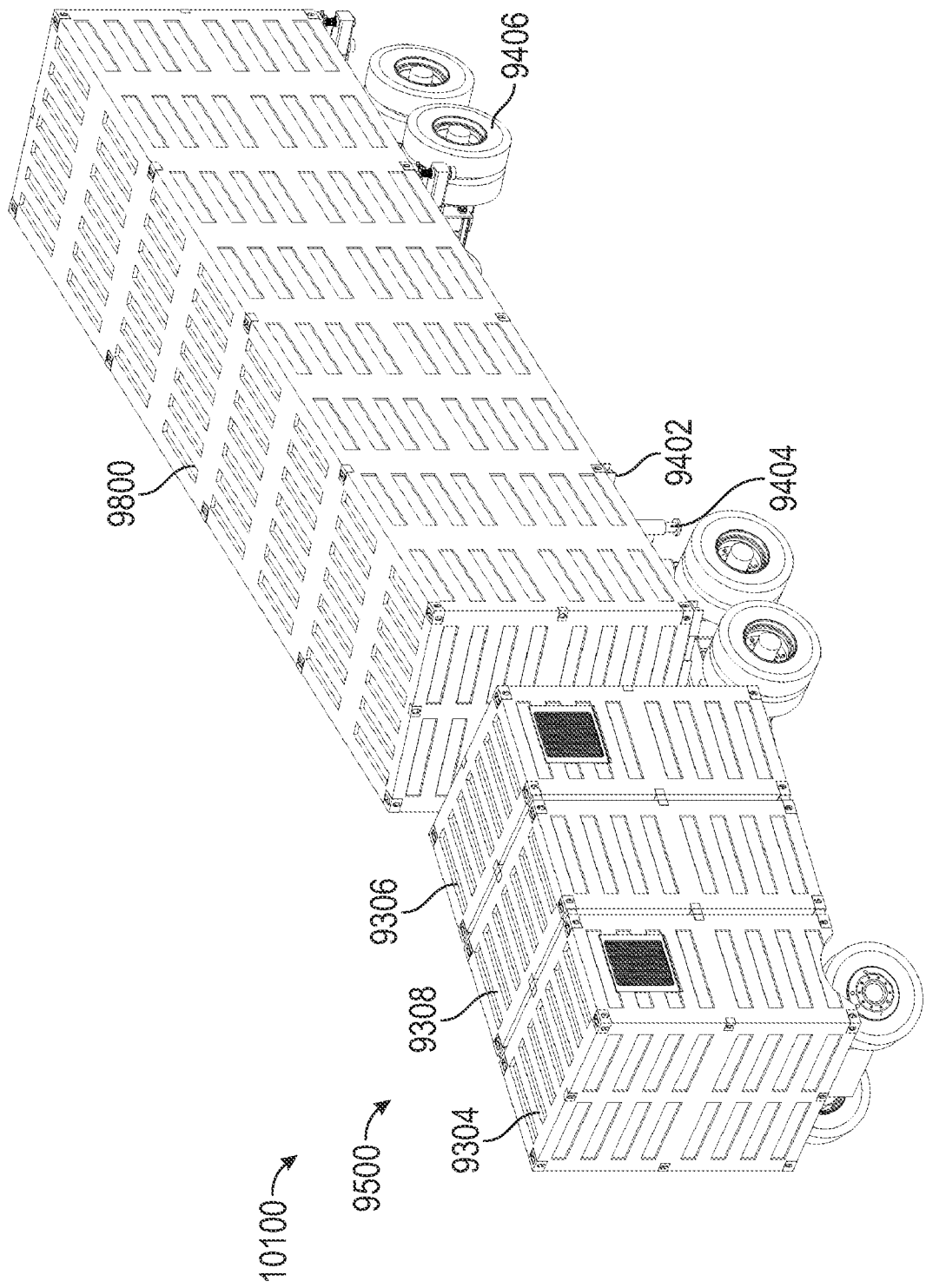
FIG. 103 depicts a perspective view of the semi-trailer-type cargo transport assembly of FIG. 102 making a turn.

FIG. 103 provides a perspective view of the cargo transport assembly 10100 of FIG. 102 taking a turn.

The following disclosure provides for various hybrid configurations where a cab for a person can be added, according to various embodiments of the present disclosure.

Figure 104:
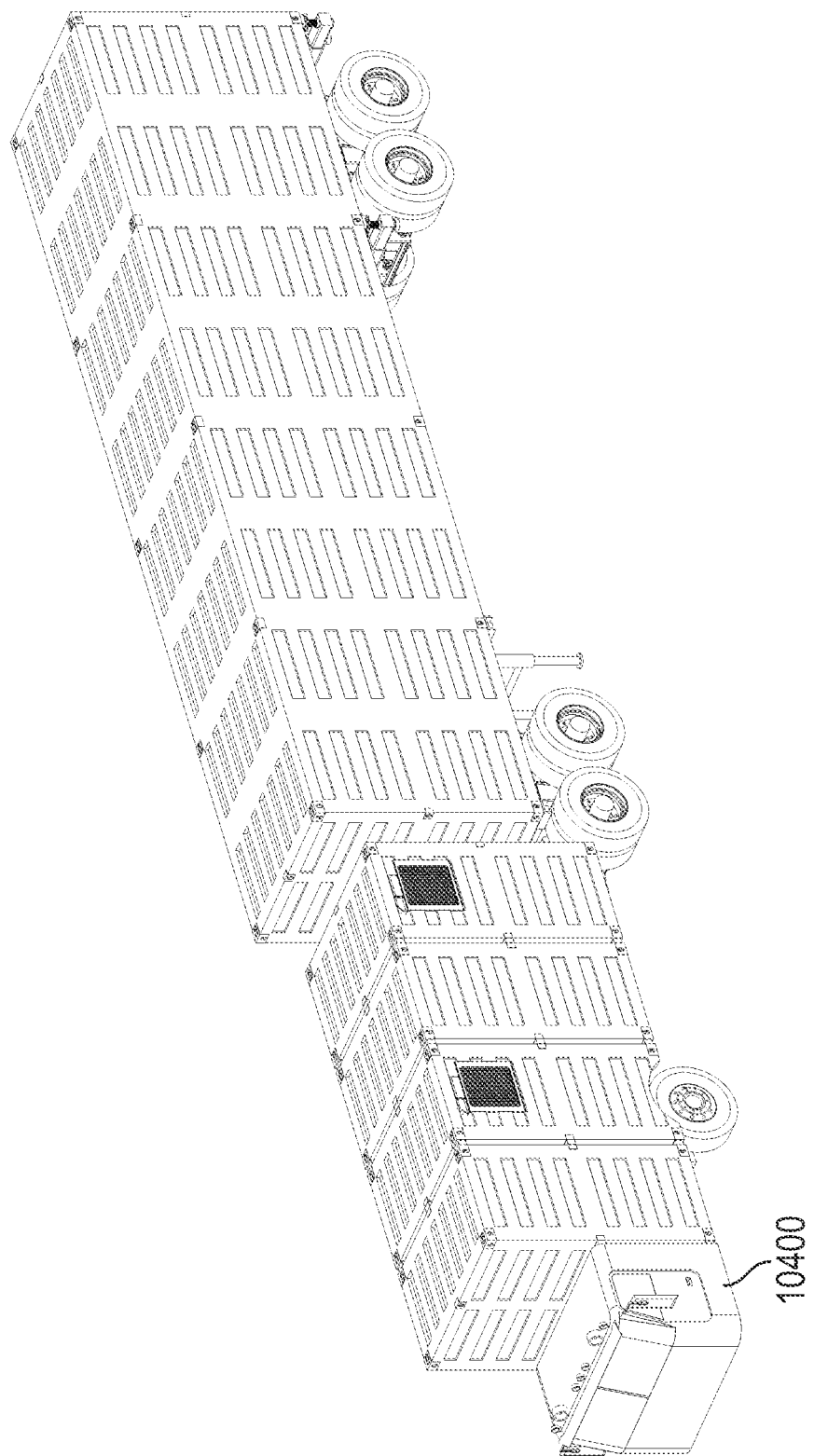
FIG. 104 depicts a perspective view of a semi-trailer-type cargo transport assembly with a control cab, according to an embodiment of the present disclosure.

FIG. 104 shows a control cab 10400 that has been added to the cargo transport assembly 10100 of FIG. 101. However, it should be understood that the control cab 1040 can be added to any of the configurations described herein. The control cab can accommodate a human that can monitor and take over, or fully control the truck system. Control cab configurations can be varied and may, in various embodiments, take on the shape of a container. Although various embodiments of control cabs will be depicted and described herein as being generally rectangular and/or box-like in shape, it should be understood that many variations are possible. For example, the control cab may have a rounded and/or semi-cylindrical front portion, or include a rounded and/or semi-cylindrical front fairing (similar to various aerodynamic container configurations described herein) to improve aerodynamic performance.

Figure 105:
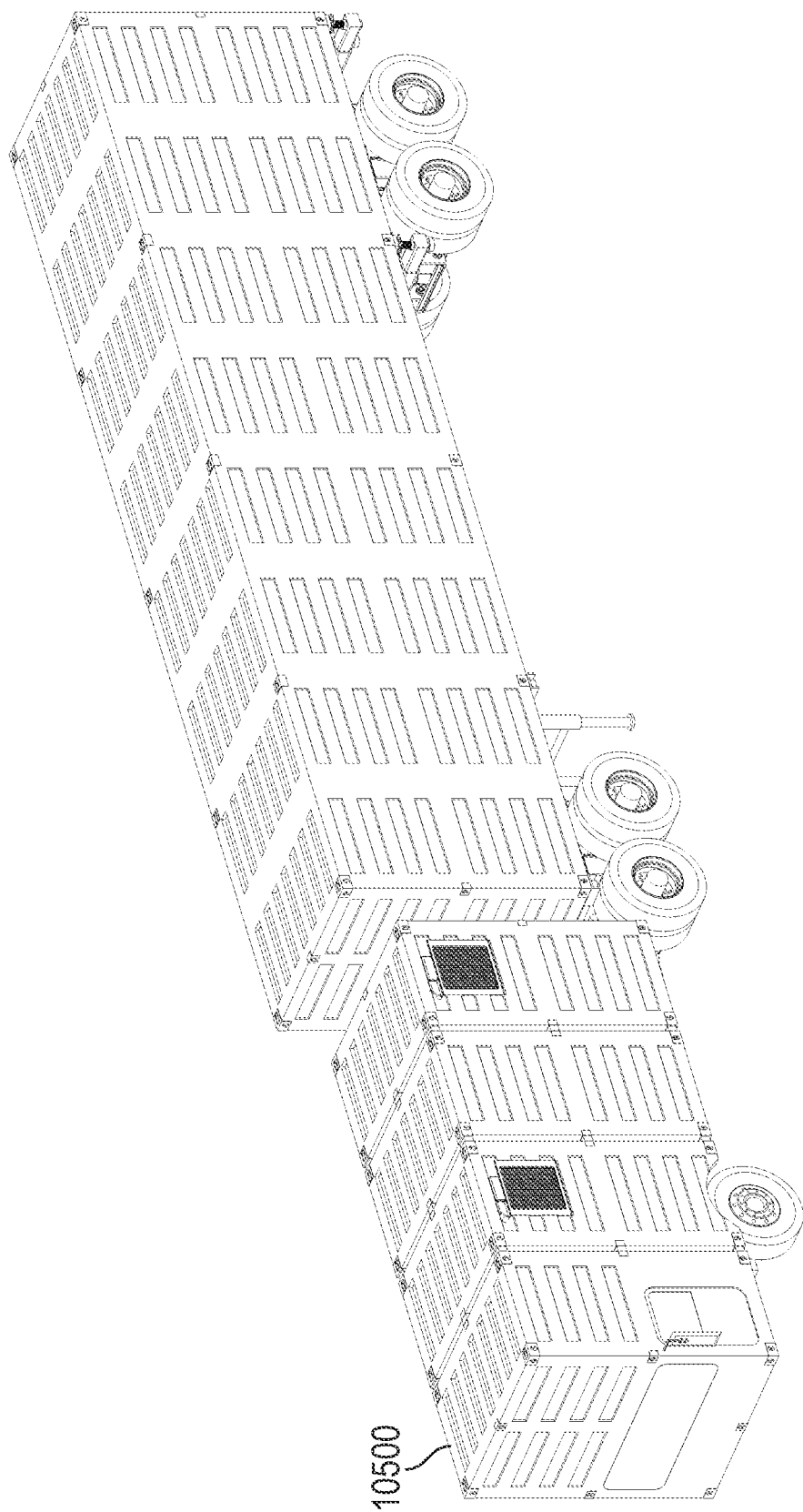
FIG. 105 depicts a perspective view of a semi-trailer-type cargo transport assembly with a control cab, according to an embodiment of the present disclosure.

FIG. 105 shows a control cab 10500 that has been added to the cargo transport assembly of FIG. 102. The control cab 10500 is shaped like a container section. This configuration will help mate the control cab 10500 to any of the previously disclosed configurations and will allow for ease of transport. If mating to a conventional ISO type container, then the corner attachments could be used.

As renewable and other forms of energy may require more storage space than diesel and gasoline systems, containers can be used to develop these additional spaces.

Figure 106:
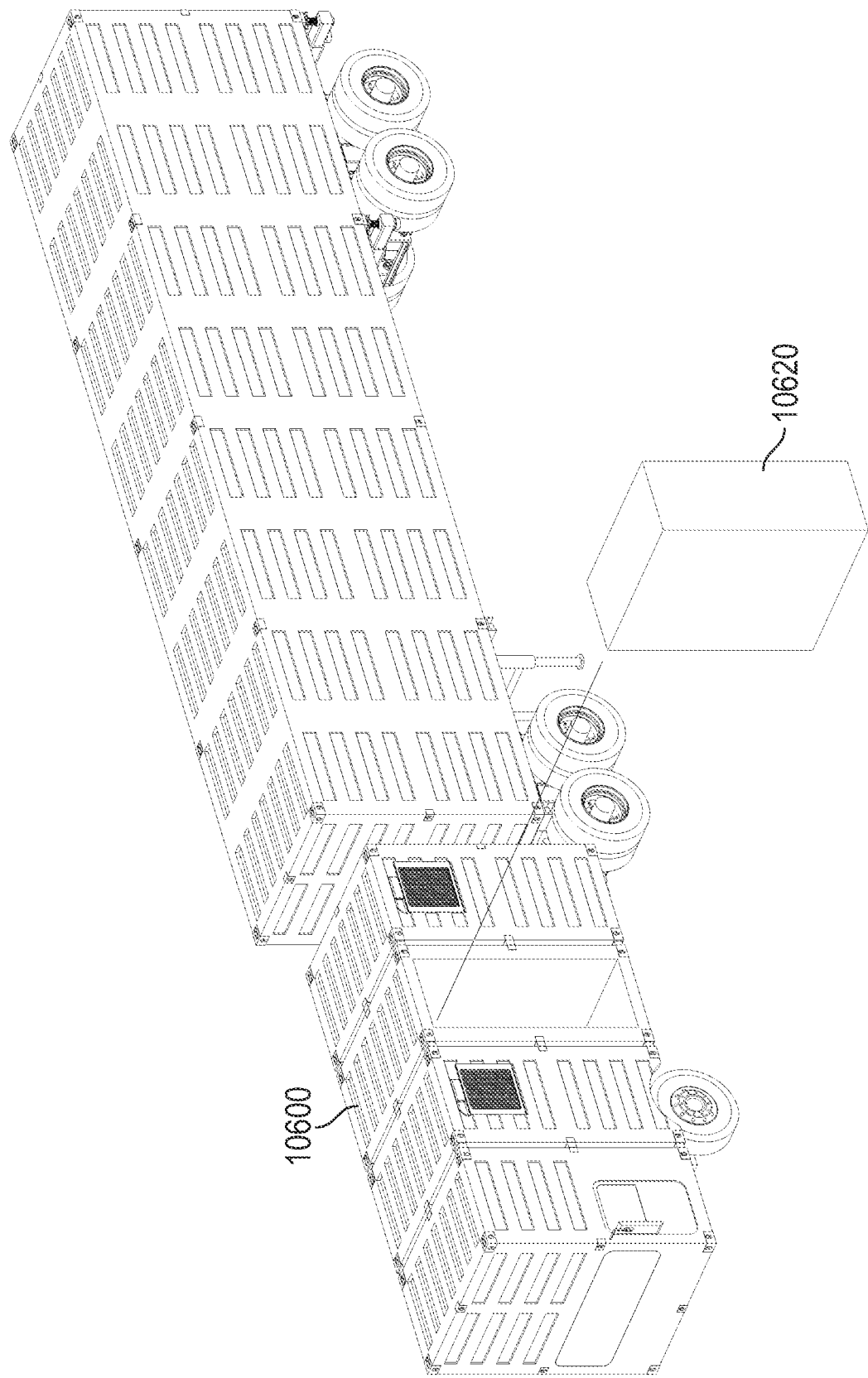
FIG. 106 depicts a perspective view of a semi-trailer-type cargo transport assembly with a removable energy storage system, according to an embodiment of the present disclosure.

FIG. 106 shows a truck configuration that converts one container 10600 into storage for a removable storage system 10620. In certain embodiments, the removable storage system 10620 may be an energy source for an energy system, such as a battery, or a hydrogen storage container, that may be used, for example, with a fuel cell. In other examples, the removable storage system 10620 could also be used to store compressed natural gas or other fuel sources to be used with in an energy system with their appropriate power conversion systems. Energy systems may be used, for example, to provide power to in-wheel electric motors for powering/propelling drive wheel assemblies. In this way, the current state of batteries sometimes requiring long recharge times can be mitigated by having a replaceable system such as the removable storage system 10620 that can replace a depleted system with a system that is fully charged. Connections between containers can be available for data and power transmission, as described previously herein. In some cases, the hydrogen and other fuel systems that have reduced refill times, can remain on board while being refilled.

As it may be advantageous for the truck systems to use containers that only have corner attach points, the truck systems can be designed to be strong enough to just connect to the corners of a standard ISO Intermodal container.

Figure 107:
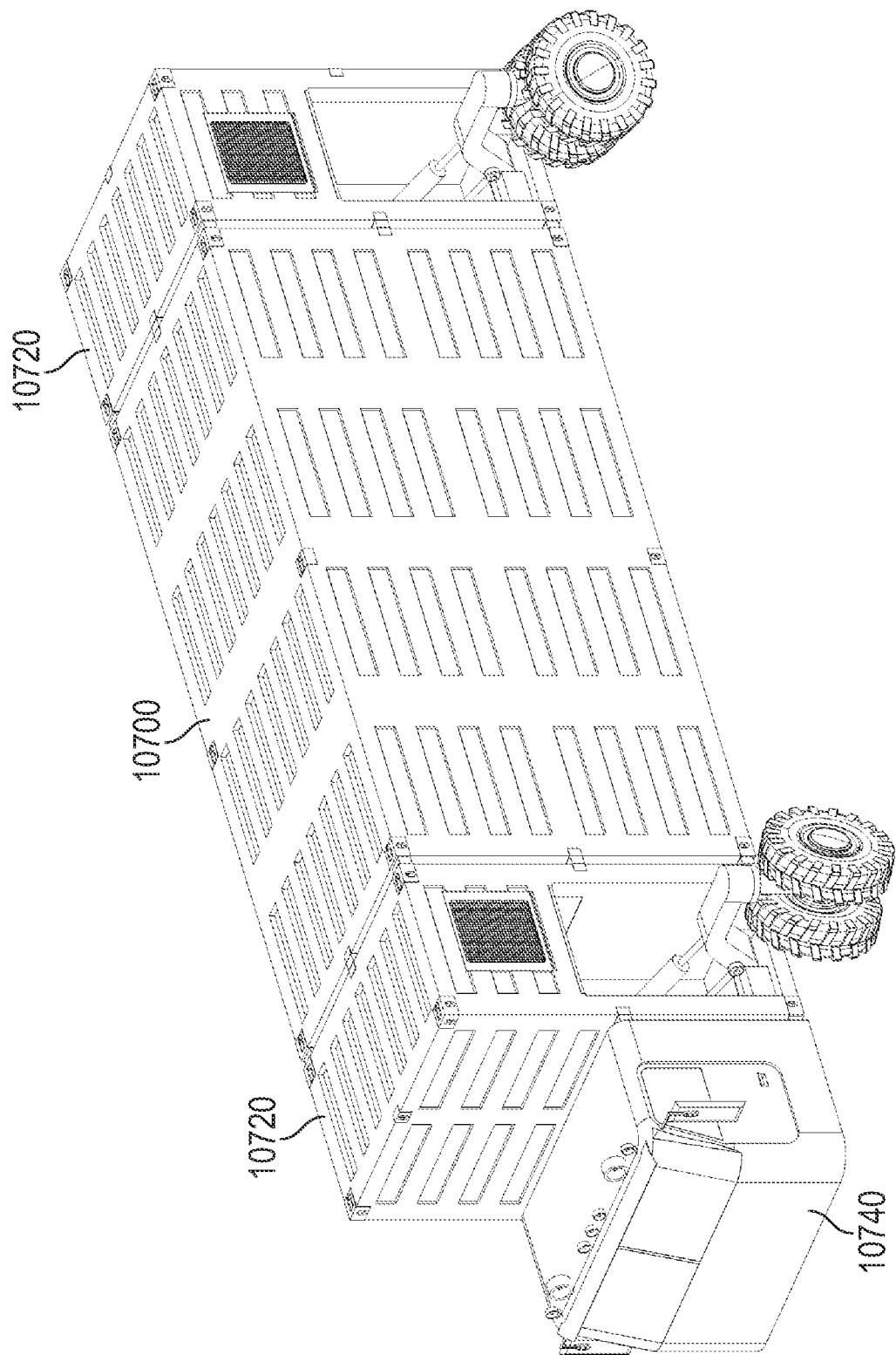
FIG. 107 depicts a perspective view of a cargo transport assembly with a control cab, according to an embodiment of the present disclosure.

FIG. 107 shows a configuration containing a 20' container 10700 and two end drive containers 10720. In addition, a control cab 10740 is added to the system for manual control and/or supervision of the system. Different control cab configurations can be used as needed.

Figure 108:
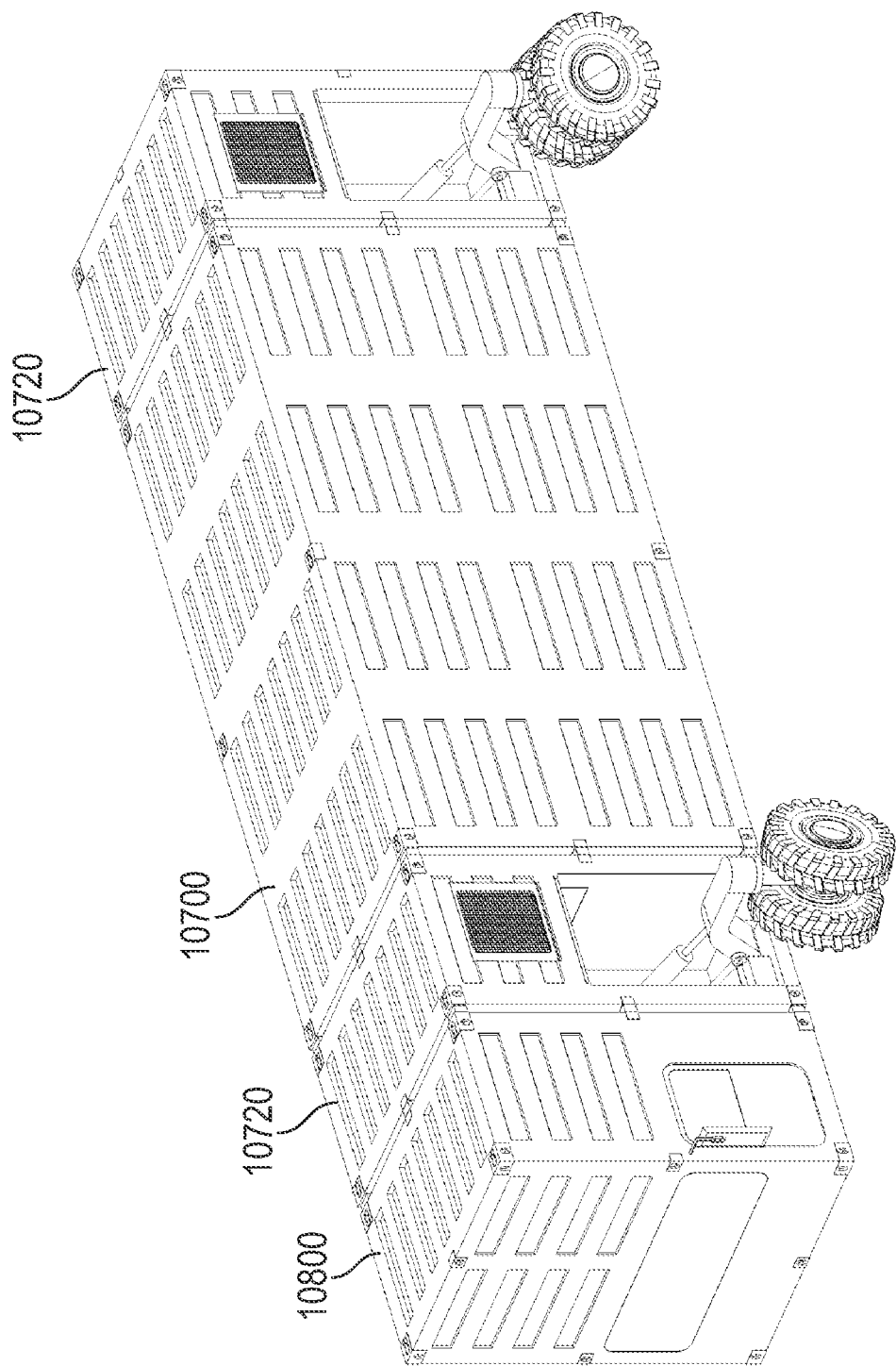
FIG. 108 depicts a perspective view of a cargo transport assembly with a control cab, according to an embodiment of the present disclosure.

FIG. 108 shows a different embodiment of a container control cab 1080 attached to the 20' container 10700 with the two drive containers 10720.

Figure 109:
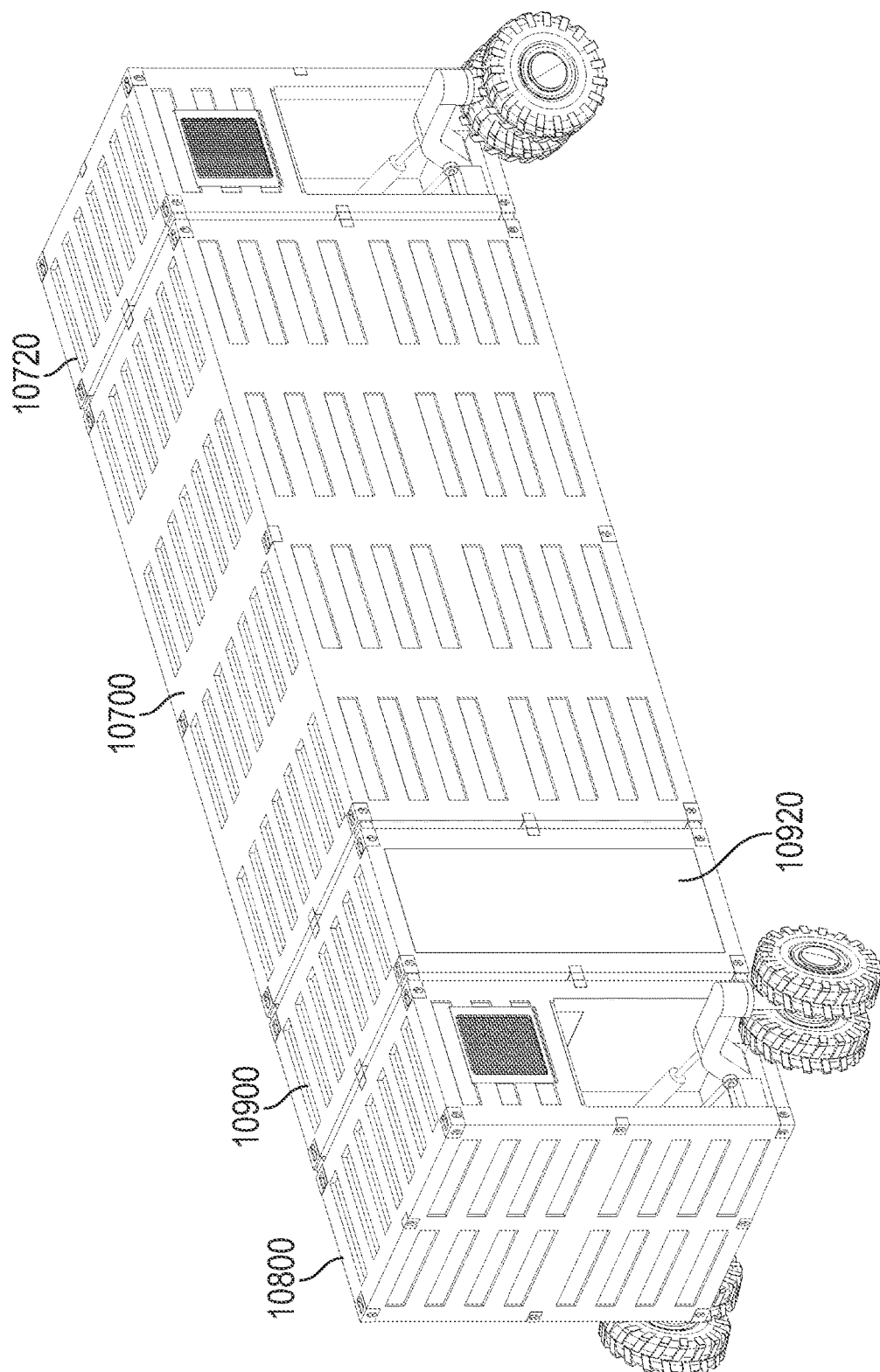
FIG. 109 depicts a perspective view of a cargo transport assembly with a removable energy storage system, according to an embodiment of the present disclosure.

FIG. 109 shows an additional energy storage container 10900 that can contain a removable storage system 10920 or just be an additional fuel tank for diesel and gasoline engines or compressed gas systems. Although the removable storage system is shown removed from the side, it can also be made to be removed from the bottom or from the top.

Figure 110:
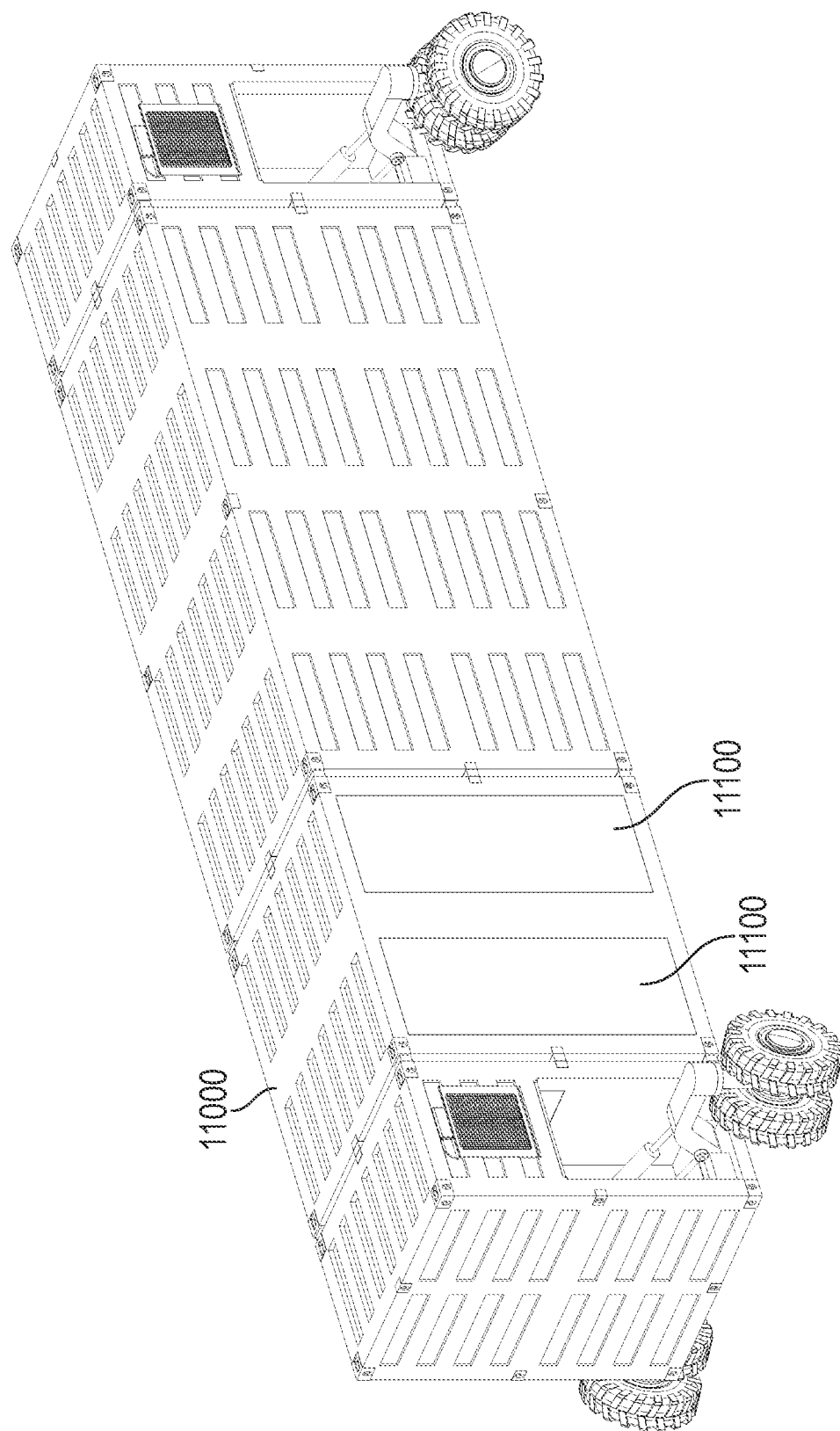
FIG. 110 depicts a perspective view of a cargo transport assembly with a removable energy storage system, according to an embodiment of the present disclosure.

FIG. 110 shows a 10' wide container 11000 that can hold two storage systems 11100.

Figure 111:
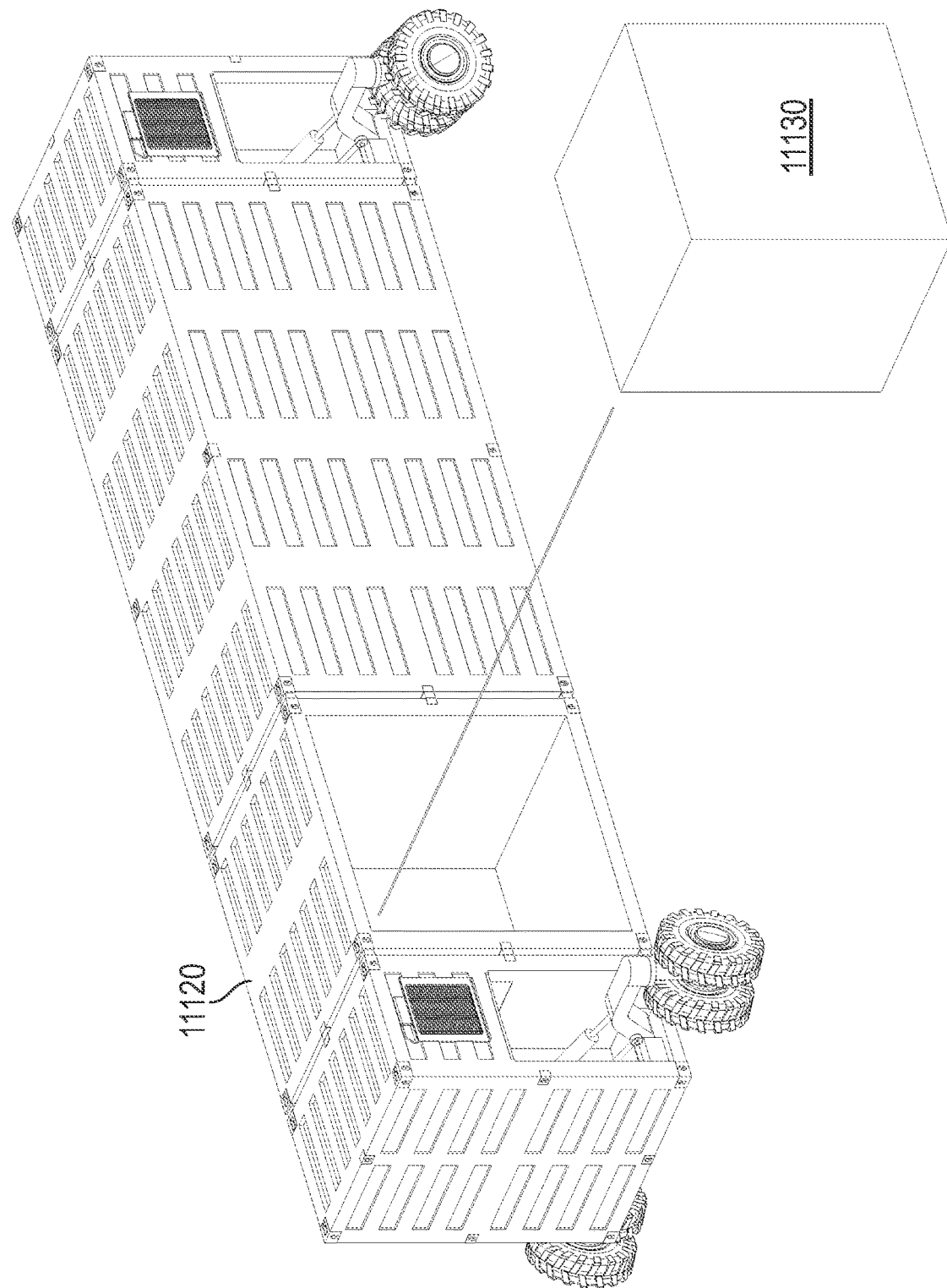
FIG. 111 depicts a perspective view of a cargo transport assembly with a removable energy storage system, according to an embodiment of the present disclosure.

FIG. 111 shows a 10' wide container 11120 that can hold a single storage system 11130.

Figure 112:
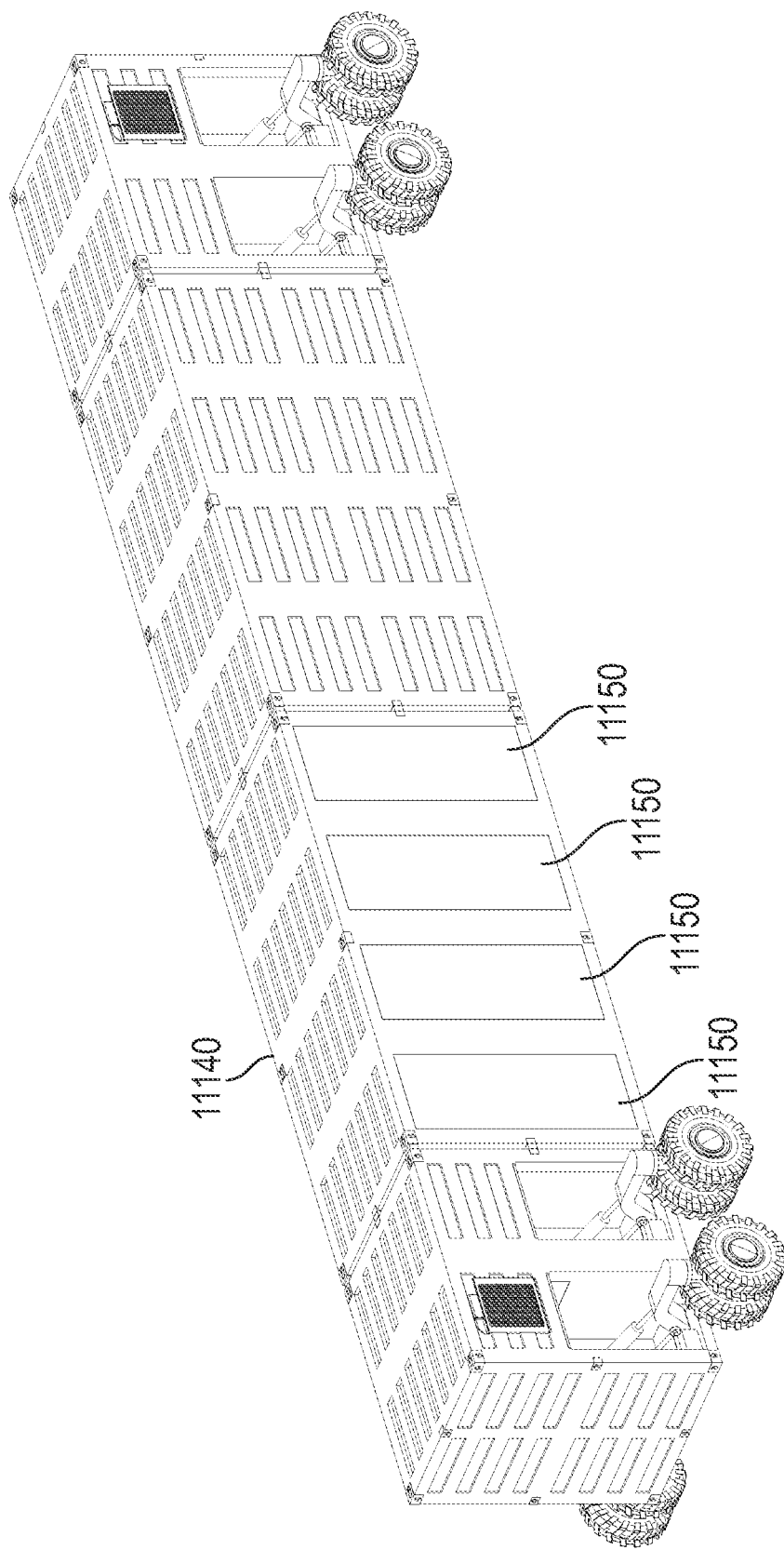
FIG. 112 depicts a perspective view of a cargo transport assembly with a removable energy storage system, according to an embodiment of the present disclosure.

FIG. 112 shows a configuration containing a 20' wide container 11140 that can hold four standard storage systems 11150 allowing for a longer range system.

As the previous configurations have shown, there can be larger storage systems.

Figure 113:
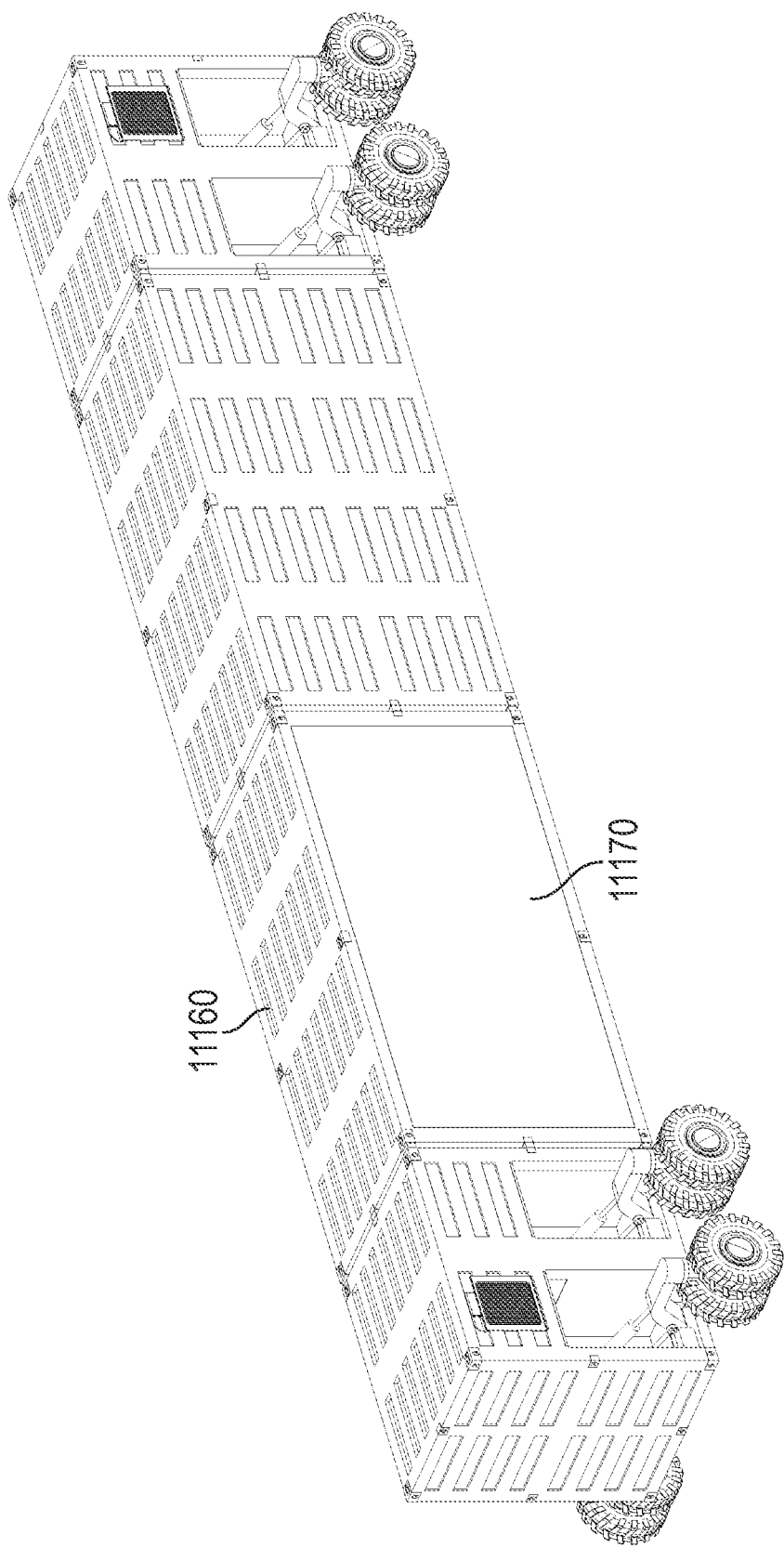
FIG. 113 depicts a perspective view of a cargo transport assembly with a removable energy storage system, according to an embodiment of the present disclosure.

FIG. 113 shows a modified 10' container 11160 that can hold a single large storage system 11170.

Although most systems discussed herein have utilized an in-wheel electric motor, there are configurations possible using mechanical linkages to transmit the power from engines to the wheels. In certain embodiments, electric motors may be preferred, as they may be easier to implement in wheel assemblies that transition between retracted and deployed configurations. In other embodiments, hydraulic lines could transmit power to the wheels instead of mechanical linkages.

FIG. 114 shows a transport system 14500 comprising an aerodynamically designed AI truck, according to an embodiment of the present disclosure. The transport system 14500 comprises an aerodynamic front fairing 14502 and containers having smooth sides to provide greater aerodynamic performance. The system 14500 can accommodate a removable battery pack if the system runs on electric power, or hold hydrogen cylinders if it uses a fuel cell.

The system also comprises a support bar 14510. In certain embodiments the support bar 14510 can be a telescoping bar. The support bar 14510 connects a container dolly system 14520 to king pin hardware 14522. The support bar 14510 allows for the container dolly system 14520 and the king pin hardware 14522 to connect to a container that only has fittings at the corners, such as the 40' container 14524 and other conventional ISO type containers. Any extraneous fitting connectors on the container dolly system 14520 and/or the king pin hardware 14522 can be retracted, turned down, removed, or the like.

In FIG. 115, the container 14524 is secured to the king pin hardware 14522 and the container dolly system 14520. The truck is ready to back up and couple with the king pin hardware 14522.

In FIG. 116, The truck is coupled to the king pin hardware 14522 and container support legs are retracted.

Although various embodiments of the present disclosure have shown drive wheel assemblies with two wheels attached to a central shaft, it should be appreciated that variations are possible. For example, rather than two wheels, a single wider wheel can be used.

For purposes of explanation, numerous specific details are set forth in order to provide a thorough understanding of the description. It will be apparent, however, to one skilled in the art that embodiments of the disclosure can be practiced without these specific details. Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A ground transport system comprising:
   a container assembly to be transported;
   a first drive container secured to a first end of the container assembly; and
   a second drive container secured to a second end of the container assembly;
   wherein each of the first drive container and the second drive container comprises:
      an outer container having a cuboid shape and comprising a plurality of fittings, the outer container being secured to the container assembly using at least some of the plurality of fittings,
      a drive wheel assembly comprising:
         one or more wheels, and
         a deployment mechanism secured to the one or more wheels, and
      an actuating member for actuating the drive wheel assembly between a stowed configuration, in which the drive wheel assembly is housed entirely within the outer container, and one or more deployed configurations, in which the drive wheel assembly extends from the outer container.

2. The ground transport system of claim 1, wherein the drive wheel assembly of the first drive container further comprises a propulsion system for powering the one or more wheels.

3. The ground transport system of claim 2, wherein the propulsion system comprises one or more in-wheel electric motors.

4. The ground transport system of claim 1, wherein the first drive container comprises
   a secured portion secured to the container assembly, and
   a rotatable portion rotatably secured to the secured portion.

5. The ground transport system of claim 1, wherein the drive wheel assembly of each of the first drive container and the second drive container further comprises a propulsion system for powering the one or more wheels.

6. The ground transport system of claim 5, wherein the propulsion system of each of the first drive container and the second drive container comprises one or more in-wheel electric motors.

7. The ground transport system of claim 1, wherein each of the first drive container and the second drive container comprises:
   a secured portion secured to the container assembly; and
   a rotatable portion rotatably secured to the secured portion.

* * * * *